United States Patent
Munger et al.

(10) Patent No.: US 9,479,426 B2
(45) Date of Patent: Oct. 25, 2016

(54) AGILE NETWORK PROTOCOL FOR SECURE COMMUNICATIONS WITH ASSURED SYSTEM AVAILABILITY

(75) Inventors: Edmund Colby Munger, Crownsville, MD (US); Vincent J. Sabio, Columbia, MD (US); Robert Dunham Short, III, Leesburg, VA (US); Virgil D. Gligor, Chevy Chase, MD (US); Douglas Charles Schmidt, Severna Park, MD (US)

(73) Assignee: VIRNETZ, INC., Zephyr Cove, NV (US)

( * ) Notice: Subject to any disclaimer, the term of this patent is extended or adjusted under 35 U.S.C. 154(b) by 0 days.

(21) Appl. No.: 13/475,637

(22) Filed: May 18, 2012

(65) Prior Publication Data
US 2013/0091354 A1 Apr. 11, 2013

Related U.S. Application Data

(60) Division of application No. 11/839,937, filed on Aug. 16, 2007, which is a continuation of application No. 11/301,022, filed on Dec. 13, 2005, now Pat. No. 7,996,539, which is a division of application No.
(Continued)

(51) Int. Cl.
*H04L 9/12* (2006.01)
*H04L 12/733* (2013.01)
(Continued)

(52) U.S. Cl.
CPC ........... *H04L 45/20* (2013.01); *H04L 29/1232* (2013.01); *H04L 29/12216* (2013.01);
(Continued)

(58) Field of Classification Search
CPC  H04L 63/0428; H04L 63/0407; H04L 45/20
USPC ........................................ 709/230, 232, 236
See application file for complete search history.

(56) References Cited

U.S. PATENT DOCUMENTS

| 2,895,502 A | 7/1959 | Roper et al. |
| 4,405,829 A | 9/1983 | Rivest |

(Continued)

FOREIGN PATENT DOCUMENTS

| DE | 19924575 | 12/1999 |
| EP | 0838930 | 4/1988 |

(Continued)

OTHER PUBLICATIONS

Office Action dated Oct. 10, 2013 from Corresponding U.S. Appl. No. 13/950,877.

(Continued)

*Primary Examiner* — Aaron Strange
(74) *Attorney, Agent, or Firm* — Finnegan, Henderson, Farabow, Garrett & Dunner, LLP

(57) ABSTRACT

A plurality of computer nodes communicates using seemingly random IP source and destination addresses and (optionally) a seemingly random discriminator field. Data packets matching criteria defined by a moving window of valid addresses are accepted for further processing, while those that do not meet the criteria are rejected. In addition to "hopping" of IP addresses and discriminator fields, hardware addresses such as Media Access Control addresses can be hopped. The hopped addresses are generated by random number generators having non-repeating sequence lengths that are easily determined a-priori, which can quickly jump ahead in sequence by an arbitrary number of random steps and which have the property that future random numbers are difficult to guess without knowing the random number generator's parameters. Synchronization techniques can be used to re-establish synchronization between sending and receiving nodes.

5 Claims, 23 Drawing Sheets

Related U.S. Application Data

09/429,643, filed on Oct. 29, 1999, now Pat. No. 7,010,604.

(60) Provisional application No. 60/137,704, filed on Jun. 7, 1999, provisional application No. 60/106,261, filed on Oct. 30, 1998.

(51) Int. Cl.
  *H04L 29/12* (2006.01)
  *H04L 12/707* (2013.01)
  *H04L 29/06* (2006.01)

(52) U.S. Cl.
  CPC ... *H04L29/12301* (2013.01); *H04L 29/12801* (2013.01); *H04L 45/24* (2013.01); *H04L 61/2007* (2013.01); *H04L 61/2076* (2013.01); *H04L 61/2092* (2013.01); *H04L 61/6004* (2013.01); *H04L 63/0272* (2013.01); *H04L 63/04* (2013.01); *H04L 63/0407* (2013.01); *H04L 63/0428* (2013.01); *H04L 63/0435* (2013.01); *H04L 63/1441* (2013.01); *H04L 63/1491* (2013.01)

(56) References Cited

U.S. PATENT DOCUMENTS

| | | |
|---|---|---|
| 4,677,434 A | 6/1987 | Fascenda |
| 4,761,334 A | 8/1988 | Sagoi et al. |
| 4,885,778 A | 12/1989 | Weiss |
| 4,920,484 A | 4/1990 | Ranade |
| 4,933,846 A | 6/1990 | Humphrey et al. |
| 4,952,930 A | 8/1990 | Franaszek et al. |
| 4,988,990 A | 1/1991 | Warrior |
| 5,007,051 A | 4/1991 | Dolkas et al. |
| 5,048,087 A | 9/1991 | Trbovich |
| 5,164,988 A | 11/1992 | Matyas |
| 5,204,961 A | 4/1993 | Barlow |
| 5,276,735 A | 1/1994 | Boebert et al. |
| 5,303,302 A | 4/1994 | Burrows |
| 5,311,593 A | 5/1994 | Carmi |
| 5,329,521 A | 7/1994 | Walsh et al. |
| 5,341,426 A | 8/1994 | Barney et al. |
| 5,345,439 A | 9/1994 | Marston |
| 5,367,643 A | 11/1994 | Chang et al. |
| 5,384,848 A | 1/1995 | Kikuchi |
| 5,416,842 A | 5/1995 | Aziz |
| 5,420,926 A | 5/1995 | Low et al. |
| 5,444,782 A | 8/1995 | Adams, Jr. et al. |
| 5,455,861 A | 10/1995 | Faucher et al. |
| 5,511,122 A | 4/1996 | Atkinson |
| 5,530,758 A | 6/1996 | Marino, Jr. et al. |
| 5,548,646 A * | 8/1996 | Aziz et al. .................. 713/153 |
| 5,559,883 A | 9/1996 | Williams |
| 5,561,669 A | 10/1996 | Lenney et al. |
| 5,588,060 A | 12/1996 | Aziz |
| 5,590,285 A | 12/1996 | Krause et al. |
| 5,623,601 A | 4/1997 | Vu |
| 5,625,626 A | 4/1997 | Umekita |
| 5,629,984 A | 5/1997 | McManis |
| 5,636,139 A | 6/1997 | McLaughlin et al. |
| 5,654,695 A | 8/1997 | Olnowich et al. |
| 5,682,480 A | 10/1997 | Nakagawa |
| 5,689,566 A | 11/1997 | Nguyen |
| 5,689,641 A | 11/1997 | Ludwig et al. |
| 5,740,375 A | 4/1998 | Dunne et al. |
| 5,757,925 A | 5/1998 | Faybishenko |
| 5,764,906 A | 6/1998 | Edelstein et al. |
| 5,771,239 A | 6/1998 | Moroney et al. |
| 5,774,660 A | 6/1998 | Brendel et al. |
| 5,781,550 A | 7/1998 | Templin et al. |
| 5,787,172 A | 7/1998 | Arnold |
| 5,790,548 A | 8/1998 | Sistanizadeh et al. |
| 5,796,942 A | 8/1998 | Esbensen |
| 5,805,801 A | 9/1998 | Holloway et al. |
| 5,805,803 A | 9/1998 | Birrell et al. |
| 5,805,820 A | 9/1998 | Bellovin et al. |
| 5,812,670 A | 9/1998 | Micali |
| 5,822,434 A | 10/1998 | Caronni et al. |
| 5,838,796 A | 11/1998 | Mittenthal |
| 5,842,040 A | 11/1998 | Hughes et al. |
| 5,845,091 A | 12/1998 | Dunne et al. |
| 5,864,666 A | 1/1999 | Shrader |
| 5,867,650 A | 2/1999 | Osterman |
| 5,870,610 A | 2/1999 | Beyda et al. |
| 5,870,744 A | 2/1999 | Sprague |
| 5,878,231 A | 3/1999 | Baehr et al. |
| 5,884,038 A | 3/1999 | Kapoor |
| 5,884,270 A | 3/1999 | Walker et al. |
| 5,889,863 A | 3/1999 | Weber |
| 5,892,903 A | 4/1999 | Klaus |
| 5,898,830 A | 4/1999 | Wesinger, Jr. et al. |
| 5,905,859 A | 5/1999 | Holloway et al. |
| 5,915,087 A | 6/1999 | Hammond et al. |
| 5,918,018 A | 6/1999 | Gooderum et al. |
| 5,918,019 A | 6/1999 | Valencia |
| 5,940,393 A | 8/1999 | Duree et al. |
| 5,950,195 A | 9/1999 | Stockwell et al. |
| 5,950,519 A | 9/1999 | Anatoli |
| 5,960,204 A | 9/1999 | Yinger et al. |
| 5,961,593 A | 10/1999 | Gabber et al. |
| 5,974,454 A | 10/1999 | Apfel et al. |
| 5,996,016 A | 11/1999 | Thalheimer et al. |
| 6,003,084 A | 12/1999 | Green et al. |
| 6,006,259 A | 12/1999 | Adelman et al. |
| 6,006,272 A | 12/1999 | Aravamudan et al. |
| 6,011,579 A | 1/2000 | Newlin |
| 6,012,088 A | 1/2000 | Li et al. |
| 6,012,100 A | 1/2000 | Frailong et al. |
| 6,016,318 A | 1/2000 | Tomoike |
| 6,016,504 A | 1/2000 | Arnold et al. |
| 6,016,512 A | 1/2000 | Huitema |
| 6,023,510 A | 2/2000 | Epstein |
| 6,023,764 A | 2/2000 | Curtis |
| 6,032,118 A | 2/2000 | Tello et al. |
| 6,041,342 A | 3/2000 | Yamaguchi |
| 6,052,788 A | 4/2000 | Wesinger et al. |
| 6,055,236 A | 4/2000 | Nessett et al. |
| 6,055,518 A | 4/2000 | Franklin et al. |
| 6,055,574 A | 4/2000 | Smorodinsky et al. |
| 6,055,575 A | 4/2000 | Paulsen et al. |
| 6,058,250 A | 5/2000 | Harwood et al. |
| 6,061,346 A | 5/2000 | Nordman |
| 6,061,736 A | 5/2000 | Rochberger et al. |
| 6,065,049 A | 5/2000 | Beser et al. |
| 6,070,245 A | 5/2000 | Murphy |
| 6,073,175 A | 6/2000 | Tavs et al. |
| 6,079,020 A | 6/2000 | Liu |
| 6,081,900 A | 6/2000 | Subramaniam et al. |
| 6,092,200 A | 7/2000 | Muniyappa et al. |
| 6,101,182 A | 8/2000 | Sistanizadeh et al. |
| 6,105,027 A | 8/2000 | Schneider et al. |
| 6,111,883 A | 8/2000 | Terada et al. |
| 6,119,171 A | 9/2000 | Alkhatib |
| 6,119,234 A | 9/2000 | Aziz et al. |
| 6,131,121 A | 10/2000 | Mattaway et al. |
| 6,147,976 A | 11/2000 | Shand et al. |
| 6,148,342 A | 11/2000 | Ho |
| 6,151,628 A | 11/2000 | Xu et al. |
| 6,154,839 A | 11/2000 | Arrow et al. |
| 6,157,957 A | 12/2000 | Berthaud |
| 6,158,011 A | 12/2000 | Chen et al. |
| 6,167,449 A | 12/2000 | Arnold et al. |
| 6,168,409 B1 | 1/2001 | Fare |
| 6,173,399 B1 | 1/2001 | Gilbrech |
| 6,175,622 B1 | 1/2001 | Chiniwala et al. |
| 6,175,867 B1 | 1/2001 | Taghadoss |
| 6,178,409 B1 | 1/2001 | Weber et al. |
| 6,178,505 B1 | 1/2001 | Schneider et al. |
| 6,179,102 B1 | 1/2001 | Weber et al. |
| 6,182,072 B1 | 1/2001 | Leak et al. |
| 6,182,141 B1 | 1/2001 | Blum et al. |
| 6,182,227 B1 | 1/2001 | Blair et al. |

(56) References Cited

U.S. PATENT DOCUMENTS

| | | |
|---|---|---|
| 6,189,102 B1 | 2/2001 | Beser |
| 6,195,677 B1 | 2/2001 | Utsumi |
| 6,199,112 B1 | 3/2001 | Wilson |
| 6,202,081 B1 | 3/2001 | Naudus |
| 6,222,842 B1 | 4/2001 | Sasyan et al. |
| 6,223,287 B1 | 4/2001 | Douglas et al. |
| 6,225,993 B1 | 5/2001 | Lindblad et al. |
| 6,226,748 B1 | 5/2001 | Bots et al. |
| 6,226,751 B1 | 5/2001 | Arrow et al. |
| 6,233,618 B1 | 5/2001 | Shannon |
| 6,243,360 B1 | 6/2001 | Basilico |
| 6,243,749 B1 | 6/2001 | Sitaraman et al. |
| 6,243,754 B1 | 6/2001 | Guerin et al. |
| 6,246,670 B1 | 6/2001 | Karlsson et al. |
| 6,256,671 B1 | 7/2001 | Strentzsch et al. |
| 6,262,987 B1 | 7/2001 | Mogul |
| 6,263,445 B1 | 7/2001 | Blumenau |
| 6,266,699 B1 | 7/2001 | Sevcik |
| 6,269,099 B1 | 7/2001 | Borella et al. |
| 6,286,047 B1 | 9/2001 | Ramanathan et al. |
| 6,298,341 B1 | 10/2001 | Mann et al. |
| 6,298,383 B1 | 10/2001 | Gutman et al. |
| 6,301,223 B1 | 10/2001 | Hrastar et al. |
| 6,308,213 B1 | 10/2001 | Valencia |
| 6,308,274 B1 | 10/2001 | Swift |
| 6,311,207 B1 | 10/2001 | Mighdoll et al. |
| 6,314,463 B1 | 11/2001 | Abbott et al. |
| 6,324,161 B1 | 11/2001 | Kirch |
| 6,330,562 B1 | 12/2001 | Boden et al. |
| 6,332,158 B1 | 12/2001 | Risley et al. |
| 6,333,272 B1 | 12/2001 | McMillin et al. |
| 6,335,966 B1 | 1/2002 | Toyoda |
| 6,338,082 B1 | 1/2002 | Schneider |
| 6,345,361 B1 | 2/2002 | Jerger et al. |
| 6,353,614 B1 | 3/2002 | Borella et al. |
| 6,353,886 B1 | 3/2002 | Howard et al. |
| 6,366,912 B1 | 4/2002 | Wallent et al. |
| 6,367,009 B1 | 4/2002 | Davis et al. |
| 6,408,336 B1 | 6/2002 | Schneider et al. |
| 6,421,732 B1 | 7/2002 | Alkhatib et al. |
| 6,425,003 B1 | 7/2002 | Herzog et al. |
| 6,426,955 B1 | 7/2002 | Gossett et al. |
| 6,430,155 B1 | 8/2002 | Davie et al. |
| 6,430,176 B1 | 8/2002 | Christie |
| 6,430,610 B1 | 8/2002 | Carter |
| 6,434,600 B2 | 8/2002 | Waite et al. |
| 6,438,127 B1 | 8/2002 | Le Goff et al. |
| 6,449,272 B1 | 9/2002 | Chuah et al. |
| 6,449,657 B2 | 9/2002 | Stanbach |
| 6,453,034 B1 | 9/2002 | Donovan et al. |
| 6,487,598 B1 | 11/2002 | Valencia |
| 6,487,663 B1 | 11/2002 | Jaisimha |
| 6,490,290 B1 | 12/2002 | Zhang et al. |
| 6,496,491 B2 | 12/2002 | Chuah et al. |
| 6,496,867 B1 | 12/2002 | Beser et al. |
| 6,499,108 B1 | 12/2002 | Johnson |
| 6,502,135 B1 | 12/2002 | Munger et al. |
| 6,505,232 B1 | 1/2003 | Mighdoll et al. |
| 6,510,154 B1 | 1/2003 | Mayes et al. |
| 6,546,003 B1 | 4/2003 | Farris |
| 6,549,516 B1 | 4/2003 | Albert et al. |
| 6,557,037 B1 | 4/2003 | Provino |
| 6,560,634 B1 | 5/2003 | Broadhurst |
| 6,564,261 B1 | 5/2003 | Gudjonsson et al. |
| 6,571,296 B1 | 5/2003 | Dillon |
| 6,571,338 B1 | 5/2003 | Shaio et al. |
| 6,581,166 B1 | 6/2003 | Hirst et al. |
| 6,590,588 B2 | 7/2003 | Lincke et al. |
| 6,591,306 B1 | 7/2003 | Redlich |
| 6,606,660 B1 | 8/2003 | Bowman-Amuah |
| 6,606,708 B1 | 8/2003 | Shifrin et al. |
| 6,609,196 B1 | 8/2003 | Dickinson, III et al. |
| 6,615,357 B1 | 9/2003 | Boden et al. |
| 6,618,761 B2 | 9/2003 | Munger et al. |
| 6,636,505 B1 | 10/2003 | Wang et al. |
| 6,640,302 B1 | 10/2003 | Subramaniam et al. |
| 6,671,702 B2 | 12/2003 | Kruglikov et al. |
| 6,687,551 B2 | 2/2004 | Steindl |
| 6,687,746 B1 | 2/2004 | Shuster et al. |
| 6,687,823 B1 | 2/2004 | Al-Salqan et al. |
| 6,693,878 B1 | 2/2004 | Daruwalla et al. |
| 6,701,437 B1 | 3/2004 | Hoke et al. |
| 6,714,970 B1 | 3/2004 | Fiveash et al. |
| 6,717,949 B1 | 4/2004 | Boden et al. |
| 6,751,729 B1 | 6/2004 | Giniger et al. |
| 6,751,738 B2 | 6/2004 | Wesinger, Jr. et al. |
| 6,752,166 B2 | 6/2004 | Lull et al. |
| 6,754,212 B1 | 6/2004 | Terada et al. |
| 6,757,740 B1 | 6/2004 | Parekh et al. |
| 6,760,766 B1 | 7/2004 | Sahlqvist |
| 6,785,728 B1 | 8/2004 | Schneider et al. |
| 6,795,917 B1 | 9/2004 | Ylonen |
| 6,801,509 B1 | 10/2004 | Chuah et al. |
| 6,804,783 B1 | 10/2004 | Wesinger, Jr. et al. |
| 6,813,777 B1 | 11/2004 | Weinberger et al. |
| 6,826,616 B2 | 11/2004 | Larson et al. |
| 6,829,242 B2 | 12/2004 | Davison et al. |
| 6,834,271 B1 | 12/2004 | Hodgson et al. |
| 6,839,759 B2 | 1/2005 | Larson et al. |
| 6,917,600 B1 | 7/2005 | Chuah et al. |
| 6,930,998 B1 | 8/2005 | Sylvain |
| 6,937,597 B1 | 8/2005 | Rosenberg et al. |
| 6,959,184 B1 | 10/2005 | Byers et al. |
| 6,978,364 B1 | 12/2005 | Balaz et al. |
| 7,010,604 B1 | 3/2006 | Munger et al. |
| 7,028,182 B1 | 4/2006 | Killcommons |
| 7,039,713 B1 | 5/2006 | Van Gunter et al. |
| 7,065,784 B2 | 6/2006 | Hopmann et al. |
| 7,072,964 B1 | 7/2006 | Whittle et al. |
| 7,100,195 B1 | 8/2006 | Underwood |
| 7,103,770 B2 | 9/2006 | Conrath |
| RE39,360 E | 10/2006 | Aziz et al. |
| 7,133,930 B2 | 11/2006 | Munger et al. |
| 7,167,904 B1 | 1/2007 | Devarajan et al. |
| 7,188,175 B1 | 3/2007 | McKeeth |
| 7,188,180 B2 | 3/2007 | Larson et al. |
| 7,197,563 B2 | 3/2007 | Sheymov et al. |
| 7,203,190 B1 | 4/2007 | Ruban et al. |
| 7,209,559 B2 | 4/2007 | Rodriguez et al. |
| 7,225,249 B1 | 5/2007 | Barry et al. |
| 7,249,377 B1 | 7/2007 | Lita et al. |
| 7,275,113 B1 | 9/2007 | Araujo |
| 7,307,990 B2 | 12/2007 | Rosen et al. |
| 7,353,841 B2 | 4/2008 | Kono et al. |
| 7,418,504 B2 | 8/2008 | Larson et al. |
| 7,461,334 B1 | 12/2008 | Lu et al. |
| 7,490,151 B2 | 2/2009 | Munger et al. |
| 7,493,403 B2 | 2/2009 | Shull et al. |
| 7,584,500 B2 | 9/2009 | Dillon et al. |
| 7,764,231 B1 | 7/2010 | Karr et al. |
| 7,852,861 B2 | 12/2010 | Wu et al. |
| 7,921,211 B2 | 4/2011 | Larson et al. |
| 7,933,990 B2 | 4/2011 | Munger et al. |
| 8,051,181 B2 | 11/2011 | Larson et al. |
| 8,504,696 B2 | 8/2013 | Larson et al. |
| 8,504,697 B2 | 8/2013 | Larson et al. |
| 2001/0049741 A1 | 12/2001 | Skene et al. |
| 2002/0002675 A1 | 1/2002 | Bush |
| 2002/0004826 A1 | 1/2002 | Waite et al. |
| 2002/0004898 A1 | 1/2002 | Droge |
| 2002/0006132 A1 | 1/2002 | Chuah et al. |
| 2003/0005132 A1 | 1/2003 | Nguyen et al. |
| 2003/0169766 A1 | 9/2003 | Ogawa |
| 2003/0196122 A1 | 10/2003 | Wesinger, Jr. et al. |
| 2004/0199493 A1 | 10/2004 | Ruiz et al. |
| 2004/0199520 A1 | 10/2004 | Ruiz et al. |
| 2004/0199608 A1 | 10/2004 | Rechterman et al. |
| 2004/0199620 A1 | 10/2004 | Ruiz et al. |
| 2005/0055306 A1 | 3/2005 | Miller et al. |
| 2005/0108517 A1 | 5/2005 | Dillon et al. |
| 2006/0059337 A1 | 3/2006 | Poyhonen et al. |
| 2006/0123134 A1 | 6/2006 | Munger et al. |
| 2007/0208869 A1 | 9/2007 | Adelman et al. |
| 2007/0214284 A1 | 9/2007 | King et al. |

(56) References Cited

U.S. PATENT DOCUMENTS

| | | | |
|---|---|---|---|
| 2007/0266141 | A1 | 11/2007 | Norton |
| 2008/0005792 | A1 | 1/2008 | Larson et al. |
| 2008/0144625 | A1 | 6/2008 | Wu et al. |
| 2008/0235507 | A1 | 9/2008 | Ishikawa et al. |
| 2009/0193498 | A1 | 7/2009 | Agarwal et al. |
| 2009/0193513 | A1 | 7/2009 | Agarwal et al. |
| 2009/0199258 | A1 | 8/2009 | Deng et al. |
| 2009/0199285 | A1 | 8/2009 | Agarwal et al. |

FOREIGN PATENT DOCUMENTS

| | | |
|---|---|---|
| EP | 0814589 | 12/1997 |
| EP | 836306 | 4/1998 |
| EP | 0858189 | 8/1998 |
| EP | 0887979 | 12/1998 |
| GB | 2316841 | 3/1998 |
| GB | 2317792 | 4/1998 |
| GB | 2334181 | 8/1999 |
| GB | 2340702 | 2/2000 |
| JP | 62-214744 | 9/1987 |
| JP | 04-117826 | 4/1992 |
| JP | 04-363941 | 12/1992 |
| JP | 06-152655 | 5/1994 |
| JP | 07-297817 | 11/1995 |
| JP | 09-018473 | 1/1997 |
| JP | 09-018492 | 1/1997 |
| JP | 09-034816 | 2/1997 |
| JP | 09-214556 | 8/1997 |
| JP | 09-266475 | 10/1997 |
| JP | 09-270803 | 10/1997 |
| JP | 09-275404 | 10/1997 |
| JP | 10-32610 | 2/1998 |
| JP | 10-070531 | 3/1998 |
| JP | 10-70576 | 3/1998 |
| JP | 10-111848 | 4/1998 |
| JP | 10-126440 | 5/1998 |
| JP | 10-215244 | 8/1998 |
| JP | 10-243021 | 9/1998 |
| JP | 11-167536 | 6/1999 |
| JP | 11-261704 | 9/1999 |
| JP | 11-355271 | 12/1999 |
| JP | 11-355272 | 12/1999 |
| WO | WO9827783 | 6/1998 |
| WO | WO 98/40990 | 9/1998 |
| WO | WO9843396 | 10/1998 |
| WO | WO9855930 | 12/1998 |
| WO | WO9859470 | 12/1998 |
| WO | WO9911019 | 3/1999 |
| WO | WO9938081 | 7/1999 |
| WO | WO9948303 | 9/1999 |
| WO | WO 0014938 | 3/2000 |
| WO | WO0017775 | 3/2000 |
| WO | WO0070458 | 11/2000 |
| WO | WO01/61922 | 2/2001 |
| WO | WO0116766 | 3/2001 |
| WO | WO0150688 | 7/2001 |

OTHER PUBLICATIONS

Notice of Allowance dated Aug. 9, 2013 from Corresponding U.S. Appl. No. 13/474,397.
Office Action dated Aug. 19, 2013 from Corresponding U.S Appl. No. 13/903,788.
Office Action dated Oct. 1, 2013 from Corresponding U.S. Appl. No. 13/911,813.
Extended European Search Report dated Mar. 26, 2012 from Corresponding European Application Number 11005793.2.
Bergadano, et al., "Secure WWW Transactions Using Standard HTTP and Java Applets," Proceedings of the 3rd USENIX Workshop on Electronic Commerce, 1998.
Alexander Invalidity Expert Report dtd May 22, 2012 with Exhibits.
Deposition of Peter Alexander dtd Jul. 27, 2012.
Cisco '151 Comments by Third Party Requester dtd Aug. 17, 2012 with Exhibits.
Cisco '151 Petition to Waive Page Limit Requirement for Third Party Comments dtd August Aug. 17, 2012.
Deposition of Stuart Stubblebine dtd Aug. 22, 2012.
Defendants' Motion for Reconsideration of the Construction of the Term "Secure Communication Link," 7 pages, Jun. 2012.
Green, "Cisco Leverages Altiga Technology for VPN's," 2 pages, 2000 http://www.crn.com/news/channel-programs/18807923/cisco-leverages-altiga-technology-for-vpns.htm.
Altiga Networks Archived at http://web.archive.org/web/20000823023437/http:/www.altiga.com/products/ 1999 and Retrieved by the Wayback Machine.
Kiuchi, "C-HTTP The Development of a Secure, Closed HTTP-Based Network on the Internet," Department of Epidemiology and Biostatistics, Faculty of Medicine, University of Tokyo, Japan.
Lee et al., "Uniform Resource Locators (URL)," Network Working Group, RFC 1738, Dec. 1994 (25 pages).
VPN 3000 Concentrator Series, User Guide; Release 2.5 Jul. 2000 (489 pages).
VPN 3000 Concentrator Series, Getting Started; Release 2.5 Jul. 2000 (122 pages).
Fratto, Altiga Concentrates on VPN Security (Hardware Review Evaluation), Network Computing, Mar. 22, 1999 (2 pages).
Response to RFP: Altiga, Network World Fusion, May 10, 1999 (7 pages).
Altiga Proves Multi-Vendor Interoperability for Seamless VPN Deployment; VPN Workshop Marks Significant Development in the VPN Market, Jul. 12, 1999 (2 pages).
Altiga VPN Concentrator Series (C50) Versus Nortel Networks Contivity Extranet Switch 4000 and 4500, VPN Tunneling competitive Evaluation, 1999 (6 pages).
VPN 3000 Client User Guide, Release 2.5, Jul. 2000 (94 pages).
Digital Certificates Design Specification for Release 2.0, May 17, 1999 (21 pages).
Altiga IPSec Client Architecture, Revision 1.0, Apr. 5, 1999 (34 pages).
Altiga IPSec Functional Specification, Revision 2.1, (17 pages).
Altiga Product Requirements, Revision 1.7, May 26, 1998 (17 pages).
Altiga Network Lists Feature Functional Specification, Revision 1.0, (7 pages).
Altiga Split Tunneling Functional/Design Specification, (15 pages).
Altiga Digital Certificate Support for IPSec Client V2.1 Functional Specification, Aug. 12, 1999 (24 pages).
Altiga IPSec LAN to LAN Tunnel Autodiscovery Functional Specification, (5 pages).
Altiga Split Tunneling Testplan, Revision 1.0, (8 pages).
Altiga VPN Concentrator Getting Started, Revision 1, Mar. 1999 (116 pages).
Altiga VPN Concentrator Getting Started, Version 2, Jun. 1999 (102 pages).
Altiga VPN Concentrator Getting Started, Version 3, Dec. 1999 (130 pages).
Altiga VPN Concentrator Getting Started, Version 4, Mar. 2000 (138 pages).
Altiga VPN Concentrator User Guide, Revision 1, Mar. 1999 (304 pages).
Altiga VPN Concentrator User Guide, Revision 1.1, Mar. 1999 (304 pages).
Altiga VPN Concentrator User Guide, Version 3, Jun. 1999 (478 pages).
Altiga VPN Concentrator User Guide, Version 4, Dec. 1999 (472 pages).
Altiga VPN Concentrator User Guide, Version 5, Mar. 2000 (606 pages).
Altiga VPN Client Installation and User Guide, Version 2, Jul. 1999 (92 pages).
Altiga VPN Concentrator VPN Client Installation and User Guide, Version 3, Dec. 1999 (113 pages).
Altiga VPN Concentrator VPN Client Installation and User Guide, Version 4, Mar. 2000 (118 pages).

(56) References Cited

OTHER PUBLICATIONS

Altiga Networks VPN Concentrator and VPN Client, as well as their Public Demonstrations and Testing, are also Described in Marketing Materials and Publications (4 pages).
Eastlake, "Domain Name System Security Extensions," Network Working Group, RFC: 2535 pp. 2-11 (Mar. 1999).
Press Release; VirnetX and Aastra Sign a Patent License Agreement, 4 pages, May 2012, Printed from Website: http://virnetx.com/virnetx-and-aastra-sign-a-patent-license-agreement/.
Press Release; VirnetX and Mitel Networks Corporation Sign a Patent License Agreement, 5 pages, Jul. 2012, Printed from Website: http://virnetx.com/virnetx-and-mitel-networks-corporation-sign-a-patent-license-agreement/.
Press Relese; Virnetx and NEC Corporation and NEC Corporation of America Sign a Patent License Agreement, 5 pages, Aug. 2012, Printed from Website: http://virnetx.com/vimetx-and-neo-corporation-and-nec-corporation-of-america-sign-a-patent-license-agreement/.
Supplemental Declaration of Angelos D. Keromytis, Ph.D from Control No. 95001789 pp. 1-18, dated Dec. 20, 2012.
Supplemental Declaration of Angelos D. Keromytis, Ph.D from Control No. 95001851 pp. 1-13, dated Dec. 30, 2012.
Supplemental Declaration of Angelos D. Keromytis, Ph.D from Control No. 95001788 pp. 1-18, dated Dec. 18, 2012.
Supplemental Declaration of Angelos D. Keromytis, Ph.D from Control No. 95001856 pp. 1-13, dated Dec. 30, 2012.
*VirnetX* vs *Apple* Transcript of Trial, Afternoon Session, 12:05 p.m., dated Nov. 5, 2012.
Assignment for U.S. Appl. No. 95/047,83 12 pages.
U.S. Appl. No. 09/504,783, 1500 pages.
Assignment for U.S. Appl. No. 10/714,849, 10 pages.
U.S. Appl. No. 10/714,849, 1170 pages.
Assignment for U.S. Appl. No. 10/259,494, 19 pages.
U.S. Appl. No. 10/259,454, 1359 pages.
U.S. Appl. No. 11/840,560, 12 pages.
Assignment for U.S. Appl. No. 11/840,560, 3 pages.
iPhone User Guide for iPhone OS 3.1 Software, 217 pages, 2009.
iPhone User Guide for iOS 4.2 and 4.3 Software, 274 pages, 2011.
iPhone User Guide for iPhone and iPhone 3G, 154 pages, 2008.
iPhone User Guide for iOS 5.0 Software, 163 pages, 2011.
iPad User Guide for iOS 5.0 Software, 141 pages, 2011.
iPad User Guide for iOS 4,2 Software, 181 pages, 2010.
iPad User Guide for iOS 4.3 Software, 198 pages, 2011.
iPad User Guide, 154 pages, 2010.
iPod Touch User Guide for iOS 5.0 Software, 143 pages, 2011.
iPod Touch User Guide, 122 pages, 2008.
iPod Touch User Guide for iPhone OS 3.0 Software, 153 pages, 2009.
iPod Touch User Guide for iPhone OS 3.1 Software, 169 pages, 2009.
iPod Touch User Guide for iOS 4.3 Software, 230 pages, 2011.
iPod Touch Features Guide, 98 pages, 2008.
VPN Server Configuration for iOS; Networking & Internet Enterprise Deployment, 12 pages, 2011.
iPhone Configuration Utility User Guide, 26 pages, 2010.
iPhone Configuration Utility; Networking & Internet: Enterprise Deployment, 26 pages, 2011.
iPhone Configuration Utility; Networking>Internet & Web, 24 pages, 2010.
iOS Configuration Profile Reference; Networking & Internet: Enterprise Deployment, 24 pages, 2011.
iPhone OS Enterprise Deployment Guide; Second Edition, for Version 3.1 or Later, 91 pages, 2009.
iPhone OS; Enterprise Deployment Guide; Second Edition, for Version 3.2 or Later, 90 pages, 2010.
CFHost Reference; Developer, 20 pages, 2008.
CFNetwork Programming Guide; Developer, 60 pages, 2011.
CFStream Socket Additions; Developer, 22 pages, 2010.
Mac OS X Devloper Library; CFHostSample.c, 1 page.
Mac OS X Developer Library; CFHostSample, 1 page, 2004.
Mac OS X Developer Library; Document Revision History, 1 page, 2004.
Apple Push Notification Service; Distribution Service, Version 1.0, 6 pages, 2009.
iOS Human Interface Guidelines; Developer, 184 pages, 2012.
Networking & Internet Starting Point, 3 pages, 2011.
Server Admin. 10.5 Help; Viewing a VPN Overview, 1 page.
iOS: Supported Protocols for VPN, 2 pages, 2010.
IPhone in Business Virtual Private Networks (VPN), 3 pages, 2010.
iPhone and iPad in Business Deployment Scenarios, 26 pages, 2011.
Deploying iPhone and iPad Virtual Private Networks, 3 pages, 2011.
Deploying iPhone and iPad; Security Overview, 6 pages, 2011.
Pad in Business; "Ready for Work," 2012, 5 pages.
iOS: Using FaceTime, 2 pages, 2011, Printed from website http://support.apple.com/kb/HT4317.
MobileMe: "Secure Chat" is Unavailable in OS X Lion, 2 pages, 2012, Printed from Website: http://support.apple.com/kb/TS3902.
iPhone 4 and iPod Touch (4th Generation): Using FaceTime, 2 pages, 2010, Printed from Website: http://support.apple.com/kb/HT4319.
IPhone; "Picking Up Where Amazing Left Off," 11 pp., 2012, Printed from Website: http://www.apple.com/iPhone/features/facetime.
FaceTime for Mac; "Say Hello to FaceTime for Mac," 4 pages, 2012, Printed from Website: http://www.apple.com/mac/facetime.
iPad; "Your New Favorite Way to do Just About Everything," 8 pages, 2012, Printed from Website http://www.apple.com/ipad/built-in-apps/.
iPod Touch; FaceTime, "Oh, I see what you're saying," 2 pages.
Apple Press Info; Apple Presents iPhone 4, Printed from Website: http://www.apple.com/pr/library/apple-presents-iphone.
iPod Touch; FaceTime, "Oh I See What You're Saying,", 3 pages, 2012, Printed from Website: http://www.apple.com/iPodtouch/built-in-apps/facetime.htm.
IOS 4, The World's Most Advanced Mobile Operating System, 5 pages, Printed from Website: http://www.apple.com/iphone/ios4.
Apple Press Info; Apple Reinvents the Phone with iPhone, 3 pages, 2007, Printed from Website: http://www.apple.com/pr/library/2007/01/09Apple-reinvents-the-phone.
Apple Press Info; Apple Announces the New iPhone 3Gs—The Fastest, Most Powerful iPhone Yet, 3 pages, 2009, Printed from the Website: http://www.apple.com/pr/library/2009/06/08Apple-Announces-the-new-iphone3GS.
Apple Press Info; Apple Launches iPhone 4S, ios 5 & iCloud, iPhone 4S Features Dual-Core A5 Chip, All New Camera, full 1080p HD Video Recording & Introduces Siri 2011, 2 pages, Printed from website: http://www.apple.com/pr/library/2011/10/04Apple-Launches-iPhone-4S-iOS-5-iCloud.html.
Apple Press Info; Apple Introduces New iPod Touch, Features Retina Display, A4 Chip, FaceTime Video Calling, HD Video Recording & Game Center, 2 pages, 2010, Printed from Website http://www.apple.com/pr/library/2010/09/01Apple-Introduces-New-iPod-touch.html.
Apple Press Info; Apple Launches iPad, Magical & Revolutionary Device at an Unbelievable Price, 2 pages, 2010, Printed from Website: http://www.apple.com/pr/library/2010/01/27Apple-Launches-iPad.html.
Apple Press Info; Apple Launces New iPad, New iPad Features Retina Display, A5X Chip, 5 Megapixel iSight Camera & Ultrafast 4G LTE, 2012, 3 pages, Printed from the Website: http://www.apple.com/pr/library/2012/03/07Apple-Launches-New-iPad.html.
FaceTime; "Phone Calls Like You've Never Seen Before," 3 pages.
Apple Press Info; Apple Brings FaceTime to the Mac, 1 pages, Printed from Website https://www.apple.com/pr/library/2010/10/20Apple-Brings-FaceTime-to-the-Mac.html.
iPad at Work: "Mobile Meetings Made Easy," 4 pages, 2011.
IPad—Technical Specifications, 49 pages, Printed from Website: http://support.apple.com/kb/sp58C.
Stirling Design, 8 pages, 2008.
Quick Guide: SSL VPN Technical Primer, 11 pages, 2010.
Silva, "Secure iPhone Access to Corporate Web Applications," Technical Brief, 10 pages.

(56) References Cited

OTHER PUBLICATIONS

Defendant Apple Inc.'s Third Supplemental Responses to VirnetX Inc.'s First Request for Admission to Apple Inc. dated, Apr. 13, 2012, 207 pages.
Apple Support Communities, 4 pages, Printed from Website https://discussions.apple.com/thread/486096?start=0&tstart=0.
VirnetX—Products; License and Service Offerings, 1 page.
VirnetX Contact Information, 4 pages, 2011
VirnetX Launches Secure Domain Name Initiative; 4G/LTE Security, 1 page, 2010.
VirnetX Gabriel Connection; Enabling Safe Network Neighborhoods, 2 pages, 2012.
Baugher et al., "The Secure Real-Time Transport Protocol (SRTP)," Network Working Group, RFC:3711, 39 pages, 2004.
Jennings et al., "Resource Location and Discovery (Reload) Draft-Bryan-P2PSIP-Reload-04," Internet-Draft, Dec. 12, 2008, pp. 1-127.
Barnes et al., "Verification Involving PSTN Reachability: Requirements and Architecture Overview," Internet Draft, 27 pages, 2012.
April Inc. Form 10-K (Annual Report) filed Dec. 1, 2005 for the Period Ending Sep. 24, 2005, Edgar Online, 1400 pages 2011.
Phone, Facetime; "Be in Two Places at Once," 3 pages, Printed from the Website http://www.apple.com/ios/facetime/.
Apple Press Info; Apple Presents iPhone 4, All-New Design with FaceTime Video Calling, Retina, Display, 5 Megapixel Camera & HD Video Recording, 3 pages, 2010.
NYSE AMEX:VHC; Cowen and Co. 39th Annual Technology Media & Telecom Conference, 36 pages, Jun. 2, 2011.
Pindyck et al., "Market Power: Monopoly and Monopsony," Microeconomics, Sixth Edition, pp. 370-371.
Press Release; IpCapital Group Completes VirnetX IP Licensing Evaluation, 3 pages.
Microsoft Real-Time Communications: Protocols and Technologies, Microsoft TechNet, 22 pages, 2010.
Filing Receipt dated Sep. 23, 2011 for U.S. Appl. No. 13/223,259.
Email Communications Regarding Apple Product Innovations, 6 pages, 2010.
Mathy et al., "Traversal Using Relays Around NAT (TURN): Relay Extensions to Session Traversal Utilities for NAT (STUN)," Internet Engineering Task Force (IETF), RFC: 5766, 67 pages, 2010.
Egevang et al., "The IP Network Address Translator (NAT)," Network Working Group, RFC: 1631, 10 pages, 1994.
Srisuresh et al., "IP Network Address Translator (NAT) Terminology and Considerations," Network Working Group, RFC:2663, 30 pages, 1999.
Sisalem, et al., "Introduction to Cryptographic Mechanisms," SIP Security, 356 pages, 2009.
Curriculum Vitae, Mark T Jones, 9 pages.
Curriculum Vitae, Roy Weinstein, 5 pages.
How to Configure IPSec Tunneling in Windows 2000, 8 pages.
Press Relese; Virnetx and NEC Corporation and NEC Corporation of America Sign a Patent License Agreement, 5 pages, Aug. 2012, Printed from Website: http://virnetx.com/virnetx-and-nec-corporation-and-nec-corporation-of-america-sign-a-patent-license-agreement/.
iPhone, FaceTime; "Be in Two Places at Once," 3 pages, Printed from Website: http://www.apple.com/ios/facetime/.
iPhone, "It Does Everything Better,"6 pages, Printed from Website: http://www.apple.com/iPhone/built-in-apps.
My Apple ID, "What's an Apple ID," 1 pages, Printed from Website: https://appleid.apple.com/cgi-bin/webobjects/myappleid.woa.
Rosenberg et al., "Session Initiation Protocol (SIP): Locating SIP Servers," Network Working Group, RFC: 3263, 17 pages, 2002.
Reexamination Certificate No. 6,502,135 issued Jun. 6, 2011, 11 pages.
U.S. Appl. No. 95/001,269.
Chatterjee et al., "Bargaining Under Incomplete Information," Operations Research, 31:835-851, 1983.
Nash, "The Bargaining Problem," Econometrica, 18:155-162, 1950.
Nash, "Two-Person Cooperative Games," Econometrica, 21:128-140, 1953.
Choi et al., "An Analytical Solution to Reasonable Royalty Rate Calculations," IDEA: The Journal of Law and Technology, 13 pages, 2001.
The Prize in Economics 1994—Press Release dated Oct. 11, 1994, 4 pages, Printed from Website: http://www.nobelprize.org/nobel_prizes/economics/laureates/1994/press.html.
Putnam et al., "Bargaining and the Construction of Economically Consistent Hypothetical License Negotiations," The Licensing Journal, pp. 8-15, 2004.
Scherling et al., "Rational Reasonable Royalty Damages: A Return to the Roots," Landslide, vol. 4, 4 pages, 2011.
Jarosz et al., "Application of Game Theory to Intellectual Property Royalty Negotiations," Chapter 17, pp. 241-265.
Goldscheider, Licensing Best Practices; Strategic, Territorial, and Technology Issues, 2 pages, 2006.
iPhone Configuration Utility, 19 pages, 2012.
VPN Server Configuration for iOS Devices, 6 pages, 2012.
Samuelson et al,, Economics, Fourteenth Edition, pp. 258-259, 1992.
Stigler et al., The Theory of Price, Forth Edition, pp. 215-216, 1987.
Truett et al., "Joint Profit Maximization, Negotiation, and the Determinacy of Price in Bilateral Monopoly," Journal of Economic Education, pp. 260-270.
Binmore et al., "Noncooperative Models of Bargaining," The Handbook of Game Theory, 1:(7)181- 225,1992.
Spindler et al., "Endogenous Bargaining Power in Bilateral Monopoly and Bilateral Exchange," Canadian Journal of Economics—Revue Canadienne D Economie, pp. 464-474, 1974.
Myerson, "Game Theory; Analysis or Conflict," Harvard University Press, pp. 375-392.
Binmore, "The Nash Bargaining Solution in Economic Modelling," The Rand Journal of Economics, 17:176-188, 1996.
Rubinstein et al., "On the Interpretation of the Nash Bargaining Solution and its Extension to Non-Expected Utility Preferences," Econometrica, 60:1171-1186, 1992.
Greenleaf et al., "Guarantees in Auctions: The Auction House as Negotiator and Managerial Decision Maker," Management Science, 39:1130-1145, 1993.
Chan, "Trade Negotiations in a Nash Bargaining Model," Journal of International Economics, 25:253-363, 1987.
Lemley et al., "Patent Holdup and Royalty Stacking," Texas Law Review, 85:1991-2049.
Cauley, "Winning the Patent Damages Case; A Litigator's Guide to Economic Models and Other Damage Strategies," Oxford Press, pp. 29-30, 2044.
Degnan et al., "A Survey of Licensed Royalties," Les Nouvelles, pp. 91, 93, 94, 1997.
Kahn, "The Review of Economics and Statistics," pp. 157-164, 1993.
Microsoft Company Information; Including Stocks and Financial Information, 83 pages.
Apple Press Info: Apple Updates MacBook Pro with Next Generation Processors, Graphics & Thunderbolt I/O Technology, 3 pages, Printed from Website: http://www.apple.com/pr/library/2011/02/24Apple-Updates-MacBook-Pro-with-Next-Generation-Processors-Graphics-Thunderbolt-I-O-Technology.html.
Apple Press Info: Apple to Ship Mac OS X Snow Leopard on Aug. 28, 2 pages, Printed from the Website: http://www.apple.com/pr/library/2009/08/24/apple-to-ship-mac-os-x.
iPad, Facetime; "Once Again, iPad gets the World Talking," 3 pages, Printed from the Website: http://www.apple.com/ipad/built-in-apps/facetime/html.
Apple iOS: Setting up VPN, 2 pages, Printed from Website: http/support.apple.com/kb/HT1424.
Apple iPhone User Guide for iOS 5.1 Software, 179 pages, 2012.
Apple, Communicating with HTTP Servers, CFNetworking Programming Guide, 6 pages, 2011, Printed from the Website: https://developer.apple.com/library/ios/documentation/networking/conceptual/CFNetwork/CFHT.
VirnetX, Gabriel Connection Technology™ White Paper, 7 pages, 2012.

(56) References Cited

OTHER PUBLICATIONS

VirnetX, Technology, 4 pages, 2012.
Inter Partes Reexamination Certificate dated Jun. 7, 2011 for U.S. Pat. No. 6,502,135.
Proceedings of The Symposium on Network and Distributed System Security, 7 pages, Feb. 22-23, 1996.
In-Q-Tel; Corporate Overview, 2 pages, 2004.
Davies, Supervisor of Translation: Tadahiro Uezono, Security for Computer Networks, Japan, Nikkei-McGraw-Hill Inc., First Edition, First Copy, p. 126-129 (Dec. 5, 1985)—(English Version and Japanese Version Submitted).
Comer, "Translated by Jun Murai and Hiroyuki Kusumoto, Internetworking with TCP/IP vol. 1: Principles, Protocols, and Architecture, Third Edition," Japan Kyoritsu Shuppan Co., Ltd., First Edition, First Copy, p. 161-193 (Aug. 10, 1997) (English Version and Japanese Version Submitted).
Lynch et al., Supervisor of Translation: Jun Murai, "Internet System Handbook," Japan Impress Co. Ltd. First Edition p. 152-157 and p. 345-351 (Aug. 11, 1996) (English Version and Japanese Version Submitted).
Office Action dated Dec. 27, 2012 from Corresponding Canadian Patent Application No. 2723504.
Office Action dated Dec. 5, 2012 from Corresponding Japanese Patent Application No. 2011-081417.
Office Action dated Dec. 13, 2012 from Corresponding Japanese Patent Application No. 2011-085052.
Office Action dated Dec. 13, 2012 from Corresponding Japanese Patent Application No. 2011-083415.
U.S. Appl. No. 09/399,753, filed Sep. 22, 1998, Graig Miller et al.
U.S. Appl. No. 60/151,563, filed Aug. 31, 1999, Bryan Whittles.
U.S. Appl. No. 60/134,547, filed May 17, 1999, Victory Sheymov.
Alan O. Frier et al., "The SSL Protocol Version 3.0", Nov. 18, 1996, printed from http://www.netscape.com/eng/ss13/ draft302.txt on Feb. 4, 2002, 56 pages.
August Bequai, "Balancing Legal Concerns Over Crime and Security in Cyberspace", Computer & Security, vol. 17, No. 4, 1998, pp. 293-298.
D. B. Chapman et al., "Building Internet Firewalls", Nov. 1995, pp. 278-375.
D. Clark, "US Calls for Private Domain-Name System", Computer, IEEE Computer Society, Aug. 1, 1998, pp. 22-25.
Davila J et al, "Implementation of Virtual Private Networks at the Transport Layer", Information Security, Second International Workshop, ISW'99. Proceedings (Lecture Springer-Verlag Berlin, Germany, [Online] 1999, pp. 85-102, XP002399276, ISBN 3-540-666.
Dolev, Shlomi and Ostrovsky, Rafil, "Efficient Anonymous Multicast and Reception" (Extended Abstract), 16 pages.
Donald E. Eastlake, 3rd, "Domain Name System Security Extensions", Internet Draft, Apr. 1998, pp. 1-51.
F. Halsall, "Data Communications, Computer Networks and Open Systems", Chapter 4, Protocol Basics, 1996, pp. 198-203.
Glossary for the Linux FreeS/WAN project, printed from http://liberty.freeswan.org/freeswan_trees/freeswan-1.3/ doc/glossary. html on Feb. 21, 2002, 25 pages.
J. Gilmore, "Swan: Securing the Internet against Wiretapping", printed from http://liberty.freeswan.org/freeswan _trees/freeswan-1.3/doc/rationale.html on Feb. 21, 2002, 4 pages.
James E. Bellaire, "New Statement of Rules—Naming Internet Domains", Internet Newsgroup, Jul. 30, 1995, 1 page.
Jim Jones et al., "Distributed Denial of Service Attacks: Defenses", Global Integrity Corporation, 2000, pp. 1-14.
Laurie Wells (Lancasterbibelmail MSN COM); "Subject: Security Icon" USENET Newsgroup, Oct. 19, 1998, XP002200606, 1 page.
Linux FreeS/WAN Index File, printed from http://liberty.freewan.org/freeswan_trees/freeswan-1.3/doc/ on Feb. 21, 2002, 3 Pages.
P. Srisuresh et al., "DNS extensions to Network address Translators (DNS_ALG)", Internet Draft, Jul. 1998, pp. 1-27.
Reiter, Michael K. And Rubin, Aviel D. (AT&T Labs—Research), "Crowds: Anonymity for Web Transactions", pp. 1-23.
RFC 2401 (dated Nov. 1998) Security Architecture for the Internet Protocol (RTP).
RFC 2543-SIP (dated Mar. 1999): Session Initiation Protocol (SIP or SIPS).
Rich Winkel, "CAQ: Networking With Spooks: The NET & The Control of Information", Internet Newsgroup, Jun. 21, 1997, 4 pages.
Rubin, Aviel D., Geer, Daniel, and Ranum, Marcus J. (Wiley Computer Publishing), "Web Security Sourcebook", pp. 82-94.
Search Report (dated Aug. 20, 2002), International Application No. PCT/US01/04340.
Search Report (dated Aug. 23, 2002), International Application No. PCT/US01/13260.
Search Report (dated Oct. 7, 2002), International Application No. PCT/US01/13261.
Search Report, IPER (dated Nov. 13, 2002), International Application No. PCT/US01/04340.
Search Report, IPER (dated Feb. 6, 2002), International Application No. PCT/US01/13261.
Search Report, IPER (dated Jan. 14, 2003), International Application No. PCT/US01/13260.
Shankar, A.U. "A verified sliding window protocol with variable flow control". Proceedings of ACM SIGCOMM conference on Communications architectures & protocols. pp. 84-91, ACM Press, NY, NY 1986.
Shree Murthy et al., "Congestion-Oriented Shortest Multi-path Routing", Proceedings of IEEE INFOCOM, 1996, pp. 1028-1036.
W. Stallings, "Cryptography and Network Security", 2nd, Edition, Chapter 13, IP Security, Jun. 8, 1998, pp. 399-440.
Microsoft Corporation's Fourth Amended Invalidity Contentions dated Jan. 5, 2009, *VirnetX Inc. and Science Applications International Corp. v. Microsoft Corporation*.
Appendix A of the Microsoft Corporation's Fourth Amended Invalidity Contentions dated Jan. 5, 2009.
Concordance Table for the References Cited in Tables on pp. 6-15, 71-80 and 116-124 of the Microsoft Corporation's Fourth Amended Invalidity Contentions dated Jan. 5, 2009.
I. P. Mockapetris, "DNS Encoding of Network Names and Other Types," Network Working Group, RFC 1101 (Apr. 1989) RFC1101, DNS SRV).
R. Atkinson, "An Internetwork Authentication Architecture," Naval Research Laboratory, Center for High Assurance Computing Systems (Aug. 5, 1993). (Atkinson NRL, KX Records).
Henning Schulzrinne, *Personal Mobility for Multimedia Services in the Internet*, Proceedings of the Interactive Distributed Multimedia Systems and Services European Workshop at 143 (1996). (Schulzrinne 96).
Microsoft Corp., *Microsoft Virtual Private Networking: Using Point-to-Point Tunneling Protocol for Low-Cost, Secure, Remote Access Across the Internet* (1996) (printed from 1998 PDC DVD-ROM). (Point to Point, Microsoft Prior Art VPN Technology).
"Safe Surfing: How to Build a Secure World Wide Web Connection," IBM Technical Support Organization, (Mar. 1996). (Safe Surfing, Website Art).
Goldschlag, et al., "Hiding Routing Information," Workshop on Information Hiding, Cambridge, UK (May 1996). (Goldschlag II, Onion Routing).
"IPSec Minutes From Montreal", IPSEC Working Group Meeting Notes, http://www.sandleman.ca/ipsec/1996/08/msg00018.html (Jun. 1996). (IPSec Minutes, FreeS/WAN).
J. M. Galvin, "Public Key Distribution with Secure DNS," Proceedings of the Sixth USENIX UNIX Security Symposium, San Jose, California, Jul. 1996. (Galvin, DNSSEC).
J. Gilmore, et al. "Re: Key Management, anyone? (DNS Keying)," IPSec Working Group Mailing List Archives (Aug. 1996). (Gilmore DNS, FreeS/WAN).
H. Orman, et al. "Re: Re: DNS? was Re: Key Management, anyone?" IETF IPSec Working Group Mailing List Archive (Aug. 1996-Sep. 1996). (Orman DNS, FreeS/WAN).
Arnt Gulbrandsen & Paul Vixie, *A DNS RR for specifying the location of services (DNS SRV)*, IETF RFC 2052 (Oct. 1996). (RFC 2052, DNS SRV).

(56) References Cited

OTHER PUBLICATIONS

Freier, et al. "The SSL Protocol Version 3.0," Transport Layer Security Working Group (Nov. 18, 1996). (SSL, Underlying Security Technology).
M. Handley, H. Schulzrinne, E. Schooler, Internet Engineering Task Force, Internet Draft, (Dec. 2, 1996). (RFC 2543 Internet Draft 1).
M.G. Reed, et al. "Proxies for Anonymous Routing," 12th Annual Computer Security Applications Conference, San Diego, CA, Dec. 9-13, 1996. (Reed, Onion Routing).
Kenneth F. Alden & Edward P. Wobber, *The AltaVista Tunnel: Using the Internet to Extend Corporate Networks*, Digital Technical Journal (1997) (Alden, AltaVista).
Automotive Industry Action Group, "ANX Release 1 Document Publication," AIAG (1997). (AIAG, ANX).
Automotive Industry Action Group, "ANX Release 1 Draft Document Publication," AIAG Publications (1997). (AIAG Release, ANX).
Aventail Corp. "Aventail VPN Data Sheet," available at http://www.archive.org/web/19970212013043/www.aventail.com/prod/vpndata.html (1997). (Data Sheet, Aventail).
Aventail Corp., "Directed VPN Vs. Tunnel," available at http://web.archive.org/web/19970620030312/www.aventail.com/educate/directvpn,html (1997). (Directed VPN, Aventail).
Aventail Corp., "Managing Corporate Access to the Internet," Aventail AutoSOCKS White Paper available at http://web.archive.org/199706200300312/www.aventail.com/educate/whitepaper/ipmw.html (1997). (Corporate Access, Aventail).
Aventail Corp., "VPN Server V2.0 Administration Guide," (1997). (VPN, Aventail).
Goldschlag, et al. *"Privacy on the Internet,"* Naval Research Laboratory, Center for High Assurance Computer Systems (1997). (Goldschtag I, Onion Routing).
Microsoft Corp., *Installing Configuring and Using PPTP with Microsoft Clients and Servers* (1997). (Using PPTP, Microsoft Prior Art VPN Technology).
Microsoft Corp., *IP Security for Microsoft Windows NT Server 5.0* (1997) (printed from 1998 PDC DVD-ROM). (IP Security, Microsoft Prior Art VPN Technology).
Microsoft Corp., *Microsoft Windows NT Active Directory: An Introduction to the Next Generation Directory Services* (1997) (printed from 1998 PDC DVD-ROM). (Directory, Microsoft Prior Art VPN Technology).
Microsoft Corp., *Routing and Remote Access Service for Windows NT Server New Opportunities Today and Looking Ahead* (1997) (printed from 1998 PDC DVD-ROM). Routing, Microsoft Prior Art VPN Technology).
Microsoft Corp., *Understanding Point-to-Point Tunneling Protocol PPTP* (1997) (printed from 1998 PDC DVD-ROM). (Understanding PPTP, Microsoft Prior Art VPN Technology).
J. Mark Smith et.al., *Protecting a Private Network: The AltaVista Firewall*, Digital Technical Journal (1997). (Smith, AltaVista).
Naganand Doraswamy *Implementation of Virtual Private Networks (VPNs) with IPSecurity*, <draft-ietf-ipsec-vpn-00.txt> (Mar. 12, 1997). (Doraswamy).
M. Handley, H. Schulzrinne, E. Schooler, Internet Engineering Task Force, Internet Draft, (Mar. 27, 1997). (RFC 2543 Internet Draft 2).
Aventail Corp., "Aventail and Cybersafe to Provide Secure Authentication for Internet and Intranet Communication," Press Release, Apr. 3, 1997. (Secure Authentication, Aventail).
D. Wagner, et al. "Analysis of the SSL 3.0 Protocol," (Apr. 15, 1997). (Analysis, Underlying Security Technologies).
Automotive Industry Action Group, "ANXO Certification Authority Service and Directory Service Definition for ANX Release 1," AIAG Telecommunications Project Team and Bellcore (May 9, 1997). (AIAG Definition, ANX).
Automotive Industry Action Group, "ANXO Certification Process and ANX Registration Process Definition for ANX Release 1," AIAG Telecommunications Project Team and Bellcore (May 9, 1997). (AIAG Certification, ANX).

Aventail Corp., "Aventail Announces the First VPN Solution to Assure Interoperability Across Emerging Security Protocols," Jun. 2, 1997. (First VPN, Aventail).
Syverson, et al. "Private Web Browsing," Naval Research Laboratory, Center for High 8 Assurance Computer Systems (Jun. 2, 1997). (Syverson, Onion Routing).
Bellcore, "Metrics, Cnteria, and Measurement Technique Requirements for ANX Release 1," AIAG Telecommunications Project Team and Bellcore (Jun. 16, 1997). (AIAG Requirements, ANX).
M. Handley, H. Schulzrinne, E. Schooler, Internet Engineering Task Force, Internet Draft, (Jul. 31, 1997). (RFC 2543 Internet Draft 3).
R. Atkinson, "Key Exchange Delegation Record for the DNS," Network Working Group, RFC 2230 (Nov. 1997). (RFC 2230, KX Records).
M. Handley, H. Schulzrinne, E. Schooler, Internet Engineering Task Force, Internet Draft, (Nov. 11, 1997). (RFC 2543 Internet Draft 4).
1998 Microsoft Professional Developers Conference DVD ("1998 PDC DVD-ROM") (including screenshots captured there from and produced as MSFTVX 00018827-00018832). (Conference, Microsoft Prior Art VPN Technology).
Microsoft Corp., *Virtual Private Networking an Overview* (1998) (printed from 1998 PDC DVD-ROM) (Overview, Microsoft Prior Art VPN Technology).
Microsoft Corp., *Windows NT 5.0 Beta Has Public Premiere at Seattle Mini-Camp Seminar attendees get first look at the performance and capabilities of Windows NT 5.0* (1998) (available at http://www.microsoft.com/presspass/features/1998/10-19nt5.mspxpftrue). (NT Beta, Microsoft Prior Art VPN Technology).
"What ports does SSL use" available at stason.org/TULARC/security/ssl-talk/3-4-What-ports-does-ssl-use.html (1998). (Ports, DNS SRV).
Aventail Corp., "Aventail VPN V2.6 Includes Support for More Than Ten Authentication Methods Making Extranet VPN Development Secure and Simple," Press Release, Jan. 19, 1998. (VPN V2.6, Aventail).
R. G. Moskowitz, "Network Address Translation Issues with IPsec," Internet Draft, Internet Engineering Task Force, Feb. 6, 1998. (Moskowitz).
H. Schulzrinne, et al, "Internet Telephony Gateway Location," Proceedings of IEEE INfocom '98, The Conference on Computer Communications, vol. 2 (Mar. 29-Apr. 2, 1998). (Gateway, Schulzrinne).
C. Huitema, 45 al. "Simple Gateway Control Protocol," Version 1.0 (May 5, 1998). (SGCP).
DISA "Secret Internet Protocol Router Network," SIPRNET Program Management Office (D3113) DISN Networks, DISN Transmission Services (May 8, 1998). DISA, SIPRNET).
M. Handley, H. Schulzrinne, E. Schooler, Internet Engineering Task Force, Internet Draft, (May 14, 1998). (RFC 2543 Internet Draft 5).
M. Handley, H. Schulzrinne, E. Schooler, Internet Engineering Task Force, Internet Draft, (Jun. 17, 1998). (RFC 2543 Internet Draft 6).
D. McDonald, et al. "PF_Key Key Management API, Version 2," Network Working Group, RFC 2367 (Jul. 1998). (RFC 2367).
M. Handley, H. Schulzrinne, E. Schooler, Internet Engineering Task Force, Internet Draft, (Jul. 16, 1998). (RFC 2543 Internet Draft 7).
M. Handley, H. Schulzrinne, E. Schooler, Internet Engineering Task Force, Internet Draft, (Aug. 7, 1998). (RFC 2543 Internet Draft 8).
Microsoft Corp., *Company Focuses on Quality and Customer Feedback* (Aug. 18, 1998). (Focus, Microsoft Prior Art VPN Technology).
M. Handley, H. Schulzrinne, E. Schooler, Internet Engineering Task Force, Internet Draft, (Sep. 18, 1998). (RFC 2543 Internet Draft 9).
Atkinson, et al. "Security Architecture for the Internet Protocol," Network Working Group, RFC 2401 (Nov. 1998). (RFC 2401, Underlying Security Technologies).
M. Handley, H. Schulzrinne, E. Schooler, Internet Engineering Task Force, Internet Draft, (Nov. 12, 1998). (RFC 2543 Internet Draft 10).
Donald Eastlake, *Domain Name System Security Extensions*, IETF DNS Security Working Group (Dec. 1998). (DNSSEC-7).
M. Handley, H. Schulzrinne, E. Schooler, Internet Engineering Task Force, Internet Draft, (Dec. 15, 1998). (RFC 2543 Internet Draft 11).

(56) References Cited

OTHER PUBLICATIONS

Aventail Corp., "Aventail Connect 3.1/2.6 Administrator's Guide," (1999). (Aventail Administrator 3.1, Aventail).
Aventail Corp., "Aventail Connect 3.1/2.6 User's Guide," (1999). (Aventail User 3.1, Aventail).
Aventail Corp., "Aventail ExtraWeb Server v3.2 Administrator's Guide," (1999). (Aventail ExtraWeb 3.2, Aventail).
Kaufman et al, "Implementing IPsec," (Copyright 1999). (Implementing IPSEC, VPN References).
Network Solutions, Inc. "Enabling SSL," NSI Registry (1999). (Enabling SSL, Underlying Security Technologies).
Check Point Software Technologies Ltd. (1999) (Check Point, Checkpoint FW).
Arnt Gulbrandsen & Paul Vixie, *A DNS RR for specifying the location of services (DNS SRV)*,<draft-ietf-dnsind-frc2052bis-02.txt> (Jan. 1999). (Gulbrandsen 99, DNS SRV).
C. Scott, et al. *Virtual Private Networks*, O'Reilly and Associates, Inc., 2nd ed. (Jan. 1999). Scott VPNs).
M. Handley, H. Schulzrinne, E. Schooler, Internet Engineering Task Force, Internet Draft, (Jan. 15, 1999). (RFC 2543 Internet Draft 12).
Goldschlag, et al., "Onion Routing for Anonymous and Private Internet Connections," Naval Research Laboratory, Center for High Assurance Computer Systems (Jan. 28, 1999). (Goldschlag III, Onion Routing).
H. Schulzrinne, "Internet Telephony: architecture and protocols—an IETF perspective," Computer Networks, vol. 31, No. 3 (Feb. 1999). (Telephony, Schulzrinne).
M. Handley, et al. "SIP: Session Initiation Protocol," Network Working Group, RFC 2543 and Internet Drafts (Dec. 1996-Mar. 1999). (Handley, RFC 2543).
FreeS/WAN Project, *Linux FreeS/WAN Compatibility Guide* (Mar. 4, 1999). (FreeS/WAN Compatibility Guide, FreeS/WAN).
Telcordia Technologies, "ANX Release 1 Document Corrections," AIAG (May 11, 1999). (Telcordia, ANX).
Ken Hornstein & Jeffrey Altman, *Distributing Kerberos KDC and Realm Information with DNS* <draft-eitf-cat-krb-dns-locate-oo.txt> (Jun. 21, 1999). (Hornstein, DNS SRV).
Bhattacharya, et al., "An LDAP Schema for Configuration and Administration of IPSec Based Virtual Private Networks (VPNs)", IETF Internet Draft (Oct. 1999). (Bhattcharya LDAP VPN).
B. Patel, et al. "DHCP Configuration of IPSEC Tunnel Mode," IPSEC Working Group, Internet Draft 02 (Oct. 15, 1999). (Patel).
Goncalves, et al. *Check Point Fire Wall—1 Administration Guide*, McGraw-Hill Companies (2000). (Gonsalves, Checkpoint FW).
"Building a Microsoft VPN: A Comprehensive Collection of Microsoft Resources," FirstVPN, (Jan 2000). (FirstVPN Microsoft).
Gulbrandsen, Vixie, & Esibov, *A DNS RR for specifying the location of services (DNS SRV)*, IETF RFC 2782 (Feb. 2000). (RFC 2782, DNS SRV).
MITRE Organization, "Technical Description," Collaborative Operations in Joint Expeditionary Force Experiment (JEFX) 99 (Feb. 2000). (MITRE, SIPRNET).
H. Schulzrinne, et al. "Application-Layer Mobility Using SIP," Mobile Computing and Communications Review, vol. 4, No. 3. pp. 47-57 (Jul. 2000). (Application, SIP).
Kindred et al, "Dynamic VPN Communities: Implementation and Experience," DARPA Information Survivability Conference and Exposition II (Jun. 2001). (DARPA, VPN Systems).
ANX 101: Basic ANX Service Outline. (Outline, ANX).
ANX 201: Advanced ANXx Service. (Advanced, ANX).
Appendix A: Certificate Profile for ANX IPsec Certificates. (Appendix, ANX).
Assured Digital Products. (Assured Digital).
Aventail Corp., "Aventail AutoSOCKS the Client Key to Network Security," Aventail Corporation White Paper. (Network Security, Aventail).
Cindy Moran, "DISN Data Networks: Secret Internet Protocol Router Network (SIPRNet)." (Moran, SIPRNET).
Data Fellows F-Secure VPN+ (F-Secure VPN+).

Interim Operational Systems Doctrine for the Remote Access Security Program (RASP) Secret Dial-In Solution. (RASP, SIPRNET).
*Onion Routing*, "Investigation of Route Selection Algorithms," available at http://www.onion-router.net/Archives/Route/index.html. (Route Selection, Onion Routing).
Secure Computing, "Bullet-Proofing an Army Net," Washington Technology. (Secure, SIPRNET).
Sparta "Dynamic Virtual Private Network." (Sparta, VPN Systems).
Standard Operation Procedure for Using the 1910 Secure Modems. (Standard, SIPRNET).
Publically available emails relating to FreeS/WAN (MSFTVX00018833-MSFTVX00019206). (FreeS/WAN emails, FreeS/WAN).
Kaufman et al., "Implementing IPsec," (Copyright 1999) (Implementing IPsec).
Network Associates *Gauntlet Firewall for Unix User's Guide Version 5.0* (1999). (Gauntlet User's Guide—Unix, Firewall Products).
Network Associates *Gauntlet Firewall for Windows NT Getting Started Guide Version 5.0* (1999) (Gauntlet Getting Started Guide—NT, Firewall Products).
Network Associates *Gauntlet Firewall for Unix Getting Started Guide Version 5.0* (1999) (Gauntlet Unix Getting Started Guide, Firewall Products).
Network Associates *Release Notes Gauntlet Firewall for Unix 5.0* (Mar. 19, 1999) (Gauntlet Unix Release Notes, Firewall Products).
Network Associates *Gauntlet Firewall for Windows NT Administrator's Guide Version 5.0* (1999) (Gauntlet NT Administrator's Guide, Firewall Products).
Trusted Information Systems, Inc. *Gauntlet Internet Firewall Firewall-to-Firewall Encryption Guide Version 3.1* (1996) (Gauntlet Firewall-to-Firewall, Firewall Products).
Network Associates *Gauntlet Firewall Global Virtual Private Network User's Guide for Windows NT Version 5.0* (1999) (Gauntlet NT GVPN, GVPN).
Network Associates *Gauntlet Firewall for UNIX Global Virtual Private Network User's Guide Version 5.0* (1999) (Gauntlet Unix GVPN, GVPN).
Dan Sterne *Dynamic Virtual Private Networks* (May 23, 2000) (Sterne DVPN, DVPN).
Darrell Kindred *Dynamic Virtual Private Networks (DVPN)* (Dec. 21, 1999) (Kindred DVPN, DVPN).
Dan Sterne et al. *TIS Dynamic Security Perimeter Research Project Demonstration* (Mar. 9, 1998) (Dynamic Security Perimeter, DVPN).
Darrell Kindred *Dynamic Virtual Private Networks Capability Description* (Jan. 5, 2000) (Kindred DVPN Capability, DVPN) 11.
Oct. 7, and 28, 1997 email from Domenic J. Turchi Jr. (SPARTA00001712-1714, 1808-1811) (Turchi DVPN email, DVPN).
James Just & Dan Sterne *Security Quickstart Task Update* (Feb. 5, 1997) (Security Quickstart, DVPN).
Virtual Private Network Demonstration dated Mar. 21, 1998 (SPARTA00001844-54) (DVPN Demonstration, DVPN).
GTE Internetworking & BBN Technologies DARPA *Information Assurance Program Integrated Feasibilit Demonstration (IFD) 1.1 Plan* (Mar. 10, 1998) (IFD 1.1, DVPN).
Microsoft Corp. Windows NT Server Product Documentation: Administration Guide—Connection Point Services, available at http://www.microsoft.com/technet/archive/winntas/proddocs/inetconctservice/cpsops.mspx (Connection Point Services) (Although undated, this reference refers to the operation of prior art versions of Microsoft Windows. Accordingly, upon information and belief, this reference is prior art to the patents-in-suit.).
Microsoft Corp. Windows NT Server Product Documentation: Administration Kit Guide—Connection Manager, available at http://www.microsoft.com/technet/archive/winntas/proddocs/inetconctservice/cmak.mspx (Connection Manager) (Although undated, this reference refers to the operation of prior art versions of Microsoft Windows such as Windows NT 4.0. Accordingly, upon information and belief, this reference is prior art to the patents-in-suit.).

(56) References Cited

OTHER PUBLICATIONS

Microsoft Corp. Autodial Heuristics, available at http://support.microsoft.com/kb/164249 (Autodial Heuristics) (Although undated, this reference refers to the operation of prior art versions of Microsoft Windows such as Windows NT 4.0. Accordingly, upon information and belief, this reference is prior art to the patents-in-suit.).
Microsoft Corp., Canplo: Distributed Component Object Model, (1996) available at http://msdn2.microsoft.com/en-us/library/ms809332(printer).aspx (Cariplo I).
Marc Levy, COM Internet Services (Apr. 23, 1999), available at http://msdn2.microsoft.com/en-us/library/ms809302(printer).aspx (Levy).
Markus Horstmann and Mary Kirtland, DCOM Architecture (Jul. 23, 1997), available at http://msdn2.microsoft.com/en-us/library/ms809311(printer).aspx (Horstmann).
Microsoft Corp., DCOM: A Business Overview (Apr. 1997), available at http://msdn2.microsoft.com/en-us/library/ms809320(printer).aspx (DCOM Business Overview I).
Microsoft Corp., DCOM Technical Overview (Nov. 1996), available at http://msdn2.microsoft.com/en-us/library/ms809340(printer).aspx (DCOM Technical Overview I).
Microsoft Corp., DCOM Architecture White Paper (1998) available in PDC DVD-ROM (DCOM Architecture).
Microsoft Corp, DCOM—The Distributed Component Object Model, A Business Overview White Paper (Microsoft 1997) available in PDC DVD-ROM (DCOM Business Overview II).
Microsoft Corp., DCOM—Cariplo Home Banking Over the Internet White Paper Microsoft 1996) available in PDC DVD-ROM (Cariplo II).
Microsoft Corp., DCOM Solutions in Action White Paper (Microsoft 1996) available in PDC DVD-ROM (DCOM Solutions in Action).
Microsoft Corp., DCOM Technical Overview White Paper (Microsoft 1996) available 12 in PDC DVD-ROM (DCOM Technical Overview II).
125. Scott Suhy & Glenn Wood, DNS and Microsoft Windows NT 4.0, (1996) available at http://msdn2.microsoft.com/en-us/library/ms810277(printer).aspx (Suhy).
126. Aaron Skonnard, *Essential Winlnet* 313-423 (Addison Wesley Longman 1998) (Essential Winlnet).
Microsoft Corp. Installing, Configuring, and Using PPTP with Microsoft Clients and Servers, (1998) available at http://msdn2.microsoft.com/enus/library/ms811078(printer).aspx (Using PPTP).
Microsoft Corp., Internet Connection Services for MS RAS, Standard Edition, http://www.microsoft.com/techneUarchive/winntas/proddocs/inetconctservice/bcgstart.mspx (Internet Connection Services I).
Microsoft Corp., Internet Connection Services for RAS, Commercial Edition, available at http://www.microsoft.com/technet/archive/winntas/proddocs/inetconctservice/bcgstrtc.mspx (Internet Connection Services II).
Microsoft Corp., Internet Explorer 5 Corporate Deployment Guide—Appendix B: Enabling Connections with the Connection Manager Administration Kit, available at http://www.microsoft.com/technet/prodtechnol/ie/deploy/deploy5/appendb.mspx (IE5 Corporate Development).
Mark Minasi, *Mastering Windows NT Server 4* 1359-1442 (6th ed., Jan. 15, 1999) (Mastering Windows NT Server).
*Hands on, Self-Paced Training for Supporting Version 4.0* 371-473 (Microsoft Press 1998) (Hands on).
Microsoft Corp., MS Point-to-Point Tunneling Protocol (Windows NT 4.0), available at http://www.microsoft.com/technet/archive/winntas/maintain/featusability/pptpwp3.mspx (MS PPTP).
Kenneth Gregg, et al., *Microsoft Windows NT Server Administrator's Bible* 173-206, 883-911, 974-1076 (IDG Books Worldwide 1999) (Gregg).
Microsoft Corp., Remote Access (Windows), available at http://msdn2.microsoft.com/enus/library/bb545687(Vs.85.printer).aspx (Remote Access).

Microsoft Corp., Understanding PPTP (Windows NT 4.0), available at http://www.microsoft.com/technet/archive/winntas/plan/pptpudst.mspx (Understanding PPTP NT 4) (Although undated, this reference refers to the operation of prior art versions of Microsoft Windows such as Windows NT 4.0. Accordingly, upon information and belief, this reference is prior art to the patents-in-suit.).
Microsoft Corp., Windows NT 4.0: Virtual Private Networking, available at http://www.microsoft.com/technet/archive/winntas/deploy/confeat/vpntwk.mspx (NT4 VPN) (Although undated, this reference refers to the operation of prior art versions of Microsoft Windows such as Windows NT 4.0. Accordingly, upon information and belief, this reference is prior art to the patents-in-suit.).
Anthony Northrup, *NT Network Plumbing: Routers, Proxies, and Web Services* 299-399 (IDG Books Worldwide 1998) (Network Plumbing).
Microsoft Corp., Chapter 1—Introduction to Windows NT Routing with Routing and Remote Access Service, available at http://www.microsoft.com/technet/archive/winntas/proddocs/rras40/rrasch01.mspx (Intro to RRAS) (Although undated, this reference refers to the operation of prior art versions of Microsoft Windows such as Windows NT 4.0. Accordingly, upon information and belief, this reference is prior art to the patents-in-suit.) 13.
Microsoft Corp., Windows NT Server Product Documentation: Chapter 5—Planning for Large-Scale Configurations, available at http://www.microsoft.com/technet/archive/winntas/proddocs/rras40/rrasch05.mspx (Large-Scale Configurations) (Although undated, this reference refers to the operation of prior art versions of Microsoft Windows such as Windows NT 4.0. Accordingly, upon information and belief, this reference is prior art to the patents-in-suit.).
F-Secure, *F-Secure NameSurfer*(May 1999) (from FSECURE 00000003) (NameSurfer 3).
F-Secure, *F-Secure VPN Administrator's Guide* (May 1999) (from FSECURE 00000003) F-Secure VPN 3).
F-Secure, *F-Secure SSH User's & Administrator's Guide* (May 1999) (from FSECURE 00000003) (SSH Guide 3).
F-Secure, *F-Secure SSH2.0 for Windows NT and 95* (May 1999) (from FSECURE 00000003) (SSH 2.0 Guide 3).
F-Secure, *F-Secure VPN+ Administrator's Guide* (May 1999) (from FSECURE 00000003) (VPN+ Guide 3).
F-Secure, *F-Secure VPN+ 4.1* (1999) (from FSECURE 00000006) (VPN+ 4.1 Guide 6).
F-Secure, *F-Secure SSH* (1996) (from FSECURE 00000006) (F-Secure SSH 6).
F-Secure, *F-Secure SSH 2.0 for Windows NT and 95* (1998) (from FSECURE 00000006) (F-Secure SSH 2.0 Guide 6).
F-Secure, *F-Secure SSH User's & Administrator's Guide* (Sep. 1998) (from FSECURE 00000009) (SSH Guide 9).
F-Secure, *F-Secure SSH 2.0 for Windows NT and 95* (Sep. 1998) (from FSECURE 00000009) (F-Secure SSH 2.0 Guide 9).
F-Secure, *F-Secure VPN+* (Sep. 1998) (from FSECURE 00000009) (VPN+ Guide 9).
F-Secure, *F-Secure Management Tools, Administrator's Guide* (1999) (from FSECURE 00000003) (F-Secure Management Tools).
F-Secure, *F-Secure Desktop, User's Guide* (1997) (from FSECURE 00000009) (FSecure Desktop User's Guide).
SafeNet, Inc., *VPN Policy Manager* (Jan. 2000) (VPN Policy Manager).
F-Secure, *F-Secure VPN+ for Windows NT 4.0* (1998) (from FSECURE 00000009) (FSecure Vpn+).
IRE, Inc., *SafeNet/Security Center Technical Reference Addendum* (Jun. 22, 1999) (Safenet Addendum).
IRE, Inc., *System Description for VPN Policy Manager and SafeNet/SoftPK* (Mar. 30, 2000) (VPN Policy Manager System Description).
IRE, Inc., *About SafeNet/VPN Policy Manager* (1999) (About Safenet VPN Policy Manager).
Trusted Information Systems, Inc., *Gauntlet Internet Firewall, Firewall Product Functional Summary* Jul. 22, 1996) (Gauntlet Functional Summary).
Trusted Information Systems, Inc., *Running the Gauntlet Internet Firewall, An Administrator's Guide to Gauntlet Version 3.0* (May 31, 1995) (Running the Gauntlet Internet Firewall).

(56) References Cited

OTHER PUBLICATIONS

Ted Harwood, *Windows NT Terminal Server and Citrix Metaframe* (New Riders 1999) (Windows NT Harwood) 79.
Todd W. Mathers and Shawn P. Genoway, *Windows NT Thing Client Solutions: Implementing Terminal Server and Citrix MetaFrame* (Macmillan Technical Publishing 1999) (Windows NT Mathers).
Bernard Aboba et al., *Securing L2TP using IPSEC* (Feb. 2, 1999). 156.
*Finding Your Way Through the VPN Maze* (1999) ("PGP").
Linux FreeS/WAN Overview (1999) (Linux FreeS/WAN Overview).
TimeStep, *The Business Case for Secure VPNs* (1998) ("TimeStep").
WatchGuard Technologies, Inc., *WatchGuard LiveSecurity for MSS Powerpoint* (Feb. 14 2000).
WatchGuard Technologies, Inc., *MSS Version 2.5, Add-On for WatchGuard SOHO Releaset Notes* (Jul. 21, 2000).
WatchGuard Technologies, Inc., *MSS Firewall Specifications* (1999).
WatchGuard Technologies, Inc., *Request for Information, Security Services* (2000).
WatchGuard Technologies, Inc., *Protecting the Internet Distributed Enterprise, White Paper* (Feb. 2000).
Air Force Research Laboratory, *Statement of Work for Information Assurance System Architecture and Integration*, PR No. N-8-6106 (Contract No. F30602-98-C-0012) Jan. 29, 1998).
Technologies, Inc., *WatchGuard Firebox System Powerpoint* (2000).
GTE Internetworking & BBN Technologies DARPA *Information Assurance Program Integrated Feasibility Demonstration IFD 1.2 Report*, Rev. 1.0 (Sep. 21, 1998).
BBN Information Assurance Contract, *TIS Labs Monthly Status Report* (Mar. 16-Apr. 30, 1998).
DARPA, *Dynamic Virtual Private Network (VPN) Powerpoint.*
GTE Internetworking, *Contractor's Program Progress Report* (Mar. 16-Apr. 30, 1998).
Darrell Kindred, *Dynamic Virtual Private Networks (DVPN) Countermeasure Characterization* (Jan. 30, 2001).
*Virtual Private Networking Countermeasure Characterization* (Mar. 30, 2000).
*Virtual Private Network Demonstration* (Mar. 21, 1998).
Information Assurance/NAI Labs, *Dynamic Virtual Private Networks (VPNs) and Integrated Security Management* (2000).
Information Assurance/NAI Labs, *Create/Add DVPN Enclave* (2000).
NAI Labs, *IFE 3.1 Integration Demo* (2000).
Information Assurance, *Science Fair Agenda* (2000).
Darrell Kindred et al., *Proposed Threads for IFE 3.1* (Jan. 13, 2000).
*IFE 3.1 Technology Dependencies* (2000).
*IFE 3.1 Topology* (Feb. 9, 2000).
Information Assurance, *Information Assurance Integration: IFE 3.1, Hypothesis & Thread Development* Jan. 10-11, 2000).
Information Assurance/NAI Labs, *Dynamic Virtual Private Networks Presentation* (2000).
Information Assurance/NAI Labs, *Dynamic Virtual Private Networks Presentation v.2* (2000).
Information Assurance/NAI Labs, Dynamic Virtual Private Networks Presentation v.3 (2000).
T. Braun et al., *Virtual Private Network Architecture*, Charging and Accounting Technology for the Internet (Aug. 1, 1999) (VPNA).
Network Associates Products—*PPG Total Network Security Suite, Dynamic Virtual Private Networks* (1999).
Microsoft Corporation, *Microsoft Proxy Server 2.0* (1997) (Proxy Server 2.0, Microsoft Prior Art VPN Technology).
David Johnson et. al., *A Guide to Microsoft Proxy Server 2.0* (1999) (Johnson, Microsoft Prior Art VPN Technology).
Microsoft Corporation, *Setting Server Parameters* (1997 (copied from Proxy Server 2.0 CD labeled MSFTVX00157288) (Setting Server Parameters, Microsoft Prior Art VPN Technology).
Kevin Schuler, *Microsoft Proxy Server 2* (1998) (Schuler, Microsoft Prior Art VPN Technology).
Erik Rozell et. al., *MCSE Proxy Server 2 Study Guide* (1998) (Rozell, Microsoft Prior 15 Art VPN Technology).
M. Shane Stigler & Mark A Linsenbardt, *IIS 4 and Proxy Server 2* (1999) (Stigler, Microsoft Prior Art VPN Technology).
David G. Schaer, *MCSE Test Success: Proxy Server 2*(1998) (Schaer, Microsoft Prior Art VPN Technology).
John Savill, *The Windows NT and Windows 2000 Answer Book* (1999) (Savill, Microsoft Prior Art VPN Technology).
File History for U.S. Appl. No. 09/653,201, Applicant(s): Whittle Bryan, et al., filed Aug. 31, 2000.
*AutoSOCKS v2. 1*, Datasheet, http://web.archive.org/web/19970212013409/www.aventail.com/prod/autoskds.html.
Ran Atkinson, *Use of DNS to Distribute Keys*, Sep. 7, 1993, http://ops.ietf.org/lists/namedroppers/namedroppers, 1 99x/msg00945.html.
FirstVPN Enterprise Networks, Overview.
Chapter 1: Introduction to Firewall Technology, Administration Guide; Dec. 19, 2007, http://www.books24x7.com/book/id_762/viewer_rasp?bookid=762&chunked=41065062.
The TLS Protocol Version 1.0; Jan. 1999; p. 65 of 71.
Elizabeth D. Zwicky, et al., Building Internet Firewalls, 2nd Ed.
Virtual Private Networks—Assured Digital Incorporated—ADI 4500; http://web.archive.org/web/19990224050035/www.assured-digital.com/products/prodvpn/adia-4500.htm.
Accessware—The Third Wave in Network Security, Conclave from Internet Dynamics; http://web.archive.org/web/11980210013830/interdyn.com/Accessware.html.
Extended System Press Release, Sep. 2, 1997; *Extended VPN Uses the Internet to Create Virtual Private Networks*, www.extendedsystems.com.
Socks Version 5; Executive Summary; http://web.archive.org/web/199970620031945/www.aventail.com/educate/whitepaper/sockswp.html.
Internet Dynamics First to Ship Integrated Security Solutions for Enterprise Intranets and Extranets; Sep. 15, 1997; http://web.archive.org/web/19980210014150/interdyn.com.
Emails from various individuals to Linux IPsec re: DNS-LDAP Splicing.
Fasbender, A., et al., Variable and Scalable Security: Protection of Location Information in Mobile IP, IEEE VTS, 46th, 1996, 5 pp.
David Kosiur, "Building and Managing Virtual Private Networks" (1998).
Request for Inter Partes Reexamination of U.S. Pat. No. 6,502,135, dated Nov. 25, 2009.
Request for Inter Partes Reexamination of U.S. Pat. No. 7,188,180, dated Nov. 25, 2009.
Yuan Dong Feng, "A novel scheme combining interleaving technique with cipher in Rayleigh fading channels," Proceedings of the International Conference on Communication technology, 2:S47-02-1-S47-02-4 (1998).
Davies and Price, edited by Tadahiro Uezono, "Network Security", Japan, Nikkei McGraw-Hill, Dec. 5, 1958, First Edition, first copy, p. 102-108.
Davies et al., "An Introduction to Data Security in Teleprocessing and Electronic Funds Transfer," Security for Computer Networks, Second Edition, pp. 98-101 (1989).
Baumgartner et al, "Differentiated Services: A New Approach for Quality of Service in the Internet," International Conference on High Performance Networking, 255-273 (1998).
Chapman et al., "Domain Name System (DNS)," 278-296 (1995).
Davila et al., "Implementation of Virtual Private Networks at the Transport Layer," M. Mambo, Y. Zheng (Eds), Information Security (Second International) Workshop, ISW' 99. Lecture Notes in Computer Science (LNCS), vol. 1729; 85-102 (1999).
De Raadt et al., "Cryptography in OpenBSD," 9 pages (1999).
Eastlake, "Domain Name System Security Extensions," Internet Citation, Retrieved from the Internet: URL:ftp://ftp.inet.no/pub/ietf/internet-drafts/draft-ietf-dnssec-secext2-05.txt (1998).

(56) References Cited

OTHER PUBLICATIONS

Gunter et al., "An Architecture for Managing QoS-Enabled VRNs Over the Internet," Proceedings 24th Conference on Local Computer Networks. LCN' 99 IEEE Comput. Soc Los Alamitos, CA, pp. 122-131 (1999).
Shimizu, "Special Feature: Mastering the Internet with Windows 2000", Internet Magazine, 63:296-307 (2000).
Stallings, "Cryptography and Network Security," Principals and Practice, 2nd Edition, pp. 399-440 (1999).
Takata, "U.S. Vendors Take Serious Action to Act Against Crackers—A Tracking Tool and a Highly Safe DNS Software are Released", Nikkei Communications, 257:87(1997).
Wells, Email (Lancastert1be@mail.msn.com), Subject: "Security Icon," (1998).
Microsoft Corporation's Fifth Amended Invalidity Contentions dated Sep. 18, 2009, *VirnetX Inc. and Science Applications International Corp. v. Microsoft Corporation* and invalidity claim charts for U.S. Pat. No. 7,188,180 and 6,839,759.
The IPSEC Protocol as described in Atkinson, et al., "Security Architecture for the Internet Protocol," Network Working Group, RFC 2401 (Nov. 1998) ("RFC 2401"); http://web.archive.org/web/19991007070353/http://www.imib.med.tu-dresden.de/imib/Internet/Literatur/ipsec-docu_eng.html.
S. Kent and R. Atkinson, "IP Authentication Header," RFC 2402 (Nov. 1998); http://web.archive.org/web/19991007070353/http://www.imib.med.tu-dresden.de/imib/Internet/Literatur/ipsec-docu_eng.html.
C. Madson and R. Glenn, "The Use of HMAC-MD5-96 within ESP and AH," RFC 2403 (Nov. 1998); http://web.archive.org/web/19991007070353/http://www.imib.med.tu-dresden.de/imib/Internet/Literatur/ipsec-docu_eng.html.
C. Madson and R. Glenn, "The Use HMAC-SHA-1-96 within ESP and AH," RFC 2404 (Nov. 1998); http://web.archive.org/web/19991007070353/http://www.imib.med.tu-dresden.de/imib/Internet/Literatur/ipsec-docu_eng.html.
C. Madson and N. Doraswamy, "The ESP DES-CBC Cipher Algorithm With Explicit IV", RFC 2405 (Nov. 1998); http://web.archive.org/web/19991007070353/http://www.imib.med.tu-dresden.de/imib/Internet/Literatur/ipsec-docu_eng.html.
S. Kent and R. Atkinson, "IP Encapsulating Security Payload (ESP)," RFC 2406 (Nov. 1998); http://web.archive.org/web/19991007070353/http://www.imib.med.tu-dresden.de/imib/Internet/Literatur/ipsec-docu_eng.html.
Derrell Piper, "The Internet IP Security Domain of Interpretation for ISAKMP," RFC 2407 (Nov. 1998); http://web.archive.org/web/19991007070353/http://www.imib.med.tu-dresden.de/imib/Internet/Literatur/ipsec-docu_eng.html.
Douglas Maughan, et al, "Internet Security Association and Key Management Protocol (ISAKMP)," RFC 2408 (Nov. 1998); http://web.archive.org/web/19991007070353/http://www.imib.med.tu-dresden.de/imib/Internet/Literatur/ipsec-docu_eng.html.
D. Harkins and D. Carrell, "The Internet Key Exchange (IKE)," RFC 2409 (Nov. 1998); http://web.archive.org/web/19991007070353/http://www.imib.med.tu-dresden.de/imib/Internet/Literatur/ipsec-docu_eng.html.
R. Glenn and S. Kent, "The NULL Encryption Algorithm and Its Use With IPsec." RFC 2410 (Nov. 1998); http://web.archive.org/web/19991007070353/http://www.imib.med.tu-dresden.de/imib/Internet/Literatur/ipsec-docu_eng.html.
R. Thayer, et al., "IP Security Document Roadmap," RFC 2411 (Nov. 1998); http://web.archive.org/web/19991007070353/http://www.imib.med.tu-dresden.de/imib/Internet/Literatur/ipsec-docu_eng.html.
Hilarie K. Orman, "The OAKLEY Key Determination Protocol," RFC 2412 (Nov. 1998) in combination with J.M. Galvin, "Public Key Distribution with Secure DNS," Proceedings of the Sixth USENIX UNIX Security Symposium, San Jose California (Jul. 1996) ("Galvin").
DNS-related correspondence dated Sep. 7, 1993 to Sep. 20, 1993. (Pre KX, KX Records).

Aventail Corp., "AutoSOCKS v. 2.1 Datasheet," available at http://www.archive.org/web/19970212013409/www.aventail.com/prod/autosk2ds.html (1997). (AutoSOCKS, Aventail).
Aventail Corp., "Socks Version 5," Aventail Whitepaper, available at http://web.archive.org/web/19970620030312/www.aventail.com/educate/whitepaper/soc kswp.html (1997). (Socks, Aventail).
Goncalves, et al. *Check Point Fire Wall-1 Administration Guide*, McGraw-Hill Companies (2000). (Goncalves, Checkpoint FW).
F-Secure, *F-Secure Evaluation Kit* (May 1999) (FSECURE 00000003) (Evaluation Kit 3).
F-Secure, *F-Secure Evaluation Kit* (Sep. 1998) (FSECURE 00000009) (Evaluation Kit 9).
IRE, Inc., *SafeNet/Soft-PK Version 4* (Mar. 28, 2000) (Soft-PK Version 4).
IRE/SafeNet Inc., *VPN Technologies Overview* (Mar. 28, 2000) (Safenet VPN Overview).
IRE, Inc., *SafeNet/VPN Policy Manager Quick Start Guide Version 1* (1999) (SafeNet VPN Policy Manager).
PCT International Search Report for related PCT Application No. PCT/US01/13261, 8 pages.
PCT International Search Report for related PCT Application No. PCT/US99/25323, 3 pages.
PCT International Search Report for related PCT Application No. PCT/US99/25325, 3 pages.
Deposition Transcript for Gary Tomlinson dated Feb. 27, 2009.
Trial Transcript, *VirnetX* vs. *Microsoft Corporation* dated Mar. 8, 2010, 8:45 AM.
Trial Transcript, *VirnetX* vs. *Microsoft Corporation* dated Mar. 8, 2010, 1:30 PM.
Trial Transcript, *VirnetX* vs. *Microsoft Corporation* dated Mar. 9, 2010, 9:00 AM.
Trial Transcript, *VirnetX* vs. *Microsoft Corporation* dated Mar. 9, 2010, 1:30 PM.
Trial Transcript, *VirnetX* vs. *Microsoft Corporation* dated Mar. 10, 2010, 9:00 AM.
Trial Transcript, *VirnetX* vs. *Microsoft Corporation* dated Mar. 10, 2010, 1:00 PM.
Trial Transcript, *VirnetX* vs. *Microsoft Corporation* dated Mar. 11, 2010, 9:00 AM.
Trial Transcript, *VirnetX* vs. *Microsoft Corporation* dated Mar. 11, 2010, 1:30 PM.
Trial Transcript, *VirnetX* vs. *Microsoft Corporation* dated Mar. 12, 2010, 9:00 AM.
Trial Transcript, *VirnetX* vs. *Microsoft Corporation* dated Mar. 12, 2010, 1:15 PM.
Trial Transcript, *VirnetX* vs. *Microsoft Corporation* dated Mar. 15, 2010, 9:00 AM.
Trial Transcript, *VirnetX* vs. *Microsoft Corporation* dated Mar. 15, 2010, 12:35 PM.
European Search Report dated Jan. 24, 2011 from corresponding European Application No. 10011949.4.
European Search Report dated Mar. 17, 2011 from corresponding European Application No. 10184502.2.
Hollenbeck et al., Registry Registrar Protocol (RRP) Version 1.1.0; Internet Engineering Task Force, 34 pages (1999).
Tannenbaum, "Computer Networks," pp. 202-219 (1996).
Defendants' Preliminary Joint Invalidity Contentions dated Jul. 1, 2011.
Appendix B: DNS References to Defendants' Preliminary Joint Invalidity Contentions dated Jul. 1, 2011.
Appendix A to Defendants' Preliminary Joint Invalidity Contentions dated Jul. 1, 2011.
Exhibit 1, IETF RFC 2065: Domain Name System Security Extensions; Published Jan. 1997 vs. Claims of the '211 Patent.
Exhibit 2, IETF RFC 2065: Domain Name System Security Extensions; Published Jan. 1997 vs. Claims of the '504 Patent.
Exhibit 3, RFC 2543 vs. Claims of the '135 Patent.
Exhibit 4, RFC 2543 vs. Claims of the '211 Patent.
Exhibit 5, RFC 2543 vs. Claims of the '504 Patent.
Exhibit 6, SIP Draft v.2 vs. Claims of the '135 Patent.
Exhibit 7, SIP Draft v.2 vs. Claims of the '211 Patent.
Exhibit 8, SIP Draft v.2 vs. Claims of the '504 Patent.
Exhibit 9, H.323 vs. Claims of the '135 Patent.

(56) References Cited

OTHER PUBLICATIONS

Exhibit 10, H.323 vs. Claims of the '211 Patent.
Exhibit 11, H.323 vs. Claims of the '504 Patent.
Exhibit 12, SSL 3.0 vs. Claims of the '135 Patent.
Exhibit 13, SSL 3.0 vs. Claims of the '211 Patent.
Exhibit 14, SSL 3.0 vs. Claims of the '504 Patent.
Exhibit 15, RFC 2487 vs. Claims of the '135 Patent.
Exhibit 16, RFC 2487 vs. Claims of the '211 Patent.
Exhibit 17, RFC 2487 vs. Claims of the '504 Patent.
Exhibit 18, RFC 2595 vs. Claims of the '135 Patent.
Exhibit 19, RFC 2595 vs. Claims of the '211 Patent.
Exhibit 20, RFC 2595 vs. Claims of the '504 Patent.
Exhibit 21, iPass vs. Claims of the '135 Patent.
Exhibit 22, iPASS vs. Claims of the '211 Patent.
Exhibit 23, iPASS vs. Claims of the '504 Patent.
Exhibit 24, "US '034" vs. Claims of the '135 Patent.
Exhibit 25, U.S. Pat. No. 6,453,034 ("US '034") vs. Claims of the '211 Patent.
Exhibit 26, U.S. Pat. No. 6,453,034 ("US '034") vs. Claims of the '504 Patent.
Exhibit 27, US '287 vs. Claims of the '135 Patent.
Exhibit 28, US '287 vs. Claims of the '211 Patent.
Exhibit 29, US '287 vs. Claims of the '504 Patent.
Exhibit 30, Overview of Access VPNs vs. Claims of the '135 Patent.
Exhibit 31, Overview of Access VPNs vs. Claims of the '211 Patent.
Exhibit 32, Overview of Access VPNs vs. Claims of the '504 Patent.
Exhibit 34, RFC 1928 vs. Claims of the '135 Patent.
Exhibit 35, RFC 1928 vs. Claims of the '211 Patent.
Exhibit 36, RFC 1928 vs. Claims of the '504 Patent.
Exhibit 37, RFC 2661 vs. Claims of the '135 Patent.
Exhibit 38, RFC 2661 vs. Claims of the '211 Patent.
Exhibit 39, RFC 2661 vs. Claims of the '504 Patent.
Exhibit 40, SecureConnect vs. Claims of the '135 Patent.
Exhibit 41, SecureConnect vs. Claims of the '211 Patent.
Exhibit 42, SecureConnect vs. Claims of the '504 Patent.
Exhibit 43, SFS-HTTP vs. Claims of the '135 Patent.
Exhibit 44, SFS-HTTP vs. Claims of the '211 Patent.
Exhibit 45, SFS-HTTP vs. Claims of the '504 Patent.
Exhibit 46, US '883 vs. Claims of the '135 Patent.
Exhibit 47, US '883 vs. Claims of the '211 Patent.
Exhibit 48, US '883 vs. Claims of the '504 Patent.
Exhibit 49, US '132 vs. Claims of the '135 Patent.
Exhibit 50, US '132 vs. Claims of the '211 Patent.
Exhibit 51, US '132 vs. Claims of the '504 Patent.
Exhibit 52, US '213 vs. Claims of the '135 Patent.
Exhibit 53, US '213 vs. Claims of the '211 Patent.
Exhibit 54, US '213 vs. Claims of the '504 Patent.
Exhibit 55, B&M VPNs vs. Claims of the '135 Patent.
Exhibit 56, B&M VPNs vs. Claims of the '211 Patent.
Exhibit 57, B&M VPNs vs. Claims of the '504 Patent.
Exhibit 58, BorderManager vs. Claims of the '135 Patent.
Exhibit 59, BorderManager vs. Claims of the '211 Patent.
Exhibit 60, BorderManager vs. Claims of the '504 Patent.
Exhibit 61, Prestige 128 Plus vs. Claims of the '135 Patent.
Exhibit 62, Prestige 128 Plus vs. Claims of the '211 Patent.
Exhibit 63, Prestige 128 Plus vs. Claims of the '504 Patent.
Exhibit 64, Rfc 2401 vs. Claims of the '135 Patent.
Exhibit 65, RFC 2401 vs. Claims of the '211 Patent.
Exhibit 66, RFC 2401 vs. Claims of the '504 Patent.
Exhibit 67, RFC 2486 vs. Claims of the '135 Patent.
Exhibit 68, RFC 2486 vs. Claims of the '211 Patent.
Exhibit 69, RFC 2486 vs. Claims of the '504 Patent.
Exhibit 70, Understanding IPSec vs. Claims of the '135 Patent.
Exhibit 71, Understanding IPSec vs. Claims of the '211 Patent.
Exhibit 72, Understanding IPSec vs. Claims of the '504 Patent.
Exhibit 73, US '820 vs. Claims of the '135 Patent.
Exhibit 74, US '820 vs. Claims of the '211 Patent.
Exhibit 75, US '820 vs. Claims of the '504 Patent.
Exhibit 76, US '019 vs. Claims of the '211 Patent.
Exhibit 77, US '019 vs. Claims of the '504 Patent.
Exhibit 78, US '049 vs. Claims of the '135 Patent.
Exhibit 79, US '049 vs. Claims of the '211 Patent.
Exhibit 80, US '049 vs. Claims of the '504 Patent.
Exhibit 81, US '748 vs. Claims of the '135 Patent.
Exhibit 82, US '261 vs. Claims of the '135 Patent.
Exhibit 83, US '261 vs. Claims of the '211 Patent.
Exhibit 84, US '261 vs. Claims of the '504 Patent.
Exhibit 85, US '900 vs. Claims of the '135 Patent.
Exhibit 86, US '900 vs. Claims of the '211 Patent.
Exhibit 87, US '900 vs. Claims of the '504 Patent.
Exhibit 88, US '671 vs. Claims of the '135 Patent.
Exhibit 89, US '671 vs. Claims of the '211 Patent.
Exhibit 90, US '671 vs. Claims of the '504 Patent.
Exhibit 91, JP '704 vs. Claims of the '135 Patent.
Exhibit 92, JP '704 vs. Claims of the '211 Patent.
Exhibit 93, JP '704 vs. Claims of the '504 Patent.
Exhibit 94, GB '841 vs. Claims of the '135 Patent.
Exhibit 95, GB '841 vs. Claims of the '211 Patent.
Exhibit 96, GB '841 vs. Claims of the '504 Patent.
Exhibit 97, US '318 vs. Claims of the '135 Patent.
Exhibit 98, US '318 vs. Claims of the '211 Patent.
Exhibit 99, US '318 vs. Claims of the '504 Patent.
Exhibit 100, VPN/VLAN vs. Claims of the '135 Patent.
Exhibit 101, Nikkei vs. Claims of the '135 Patent.
Exhibit 102, Nikkei vs. Claims of the '211 Patent.
Exhibit 103, Nikkei vs. Claims of the '504 Patent.
Exhibit 104, Special Anthology vs. Claims of the '135 Patent.
Exhibit 105, Omron vs. Claims of the '135 Patent.
Exhibit 106, Gauntlet System vs. Claims of the '135 Patent.
Exhibit 107, Gauntlet System vs. Claims of the '151 Patent.
Exhibit 108, Gauntlet System vs. Claims of the '180 Patent.
Exhibit 109, Gauntlet System vs. Claims of the '211 Patent.
Exhibit 110, Gauntlet System vs. Claims of the '504 Patent.
Exhibit 111, Gauntlet System vs. Claims of the '759 Patent.
Exhibit 112, IntraPort System vs. Claims of the '135 Patent.
Exhibit 113, IntraPort System vs. Claims of the '151 Patent.
Exhibit 114, IntraPort System vs. Claims of the '180 Patent.
Exhibit 115, IntraPort System vs. Claims of the '211 Patent.
Exhibit 116, IntraPort System vs. Claims of the '504 Patent.
Exhibit 117, IntraPort System vs. Claims of the '759 Patent.
Exhibit 118, Altiga VPN System vs. Claims of the '135 Patent.
Exhibit 119, Altiga VPN System vs. Claims of the '151 Patent.
Exhibit 120, Altiga VPN System vs. Claims of the '180 Patent.
Exhibit 121, Altiga VPN System vs. Claims of the '211 Patent.
Exhibit 122, Altiga VPN System vs. Claims of the '504 Patent.
Exhibit 123, Altiga VPN System vs. Claims of the '759 Patent.
Exhibit 124, Kiuchi vs. Claims of the '135 Patent.
Exhibit 125, Kiuchi vs. Claims of the '151 Patent.
Exhibit 126, Kiuchi vs. Claims of the '180 Patent.
Exhibit 127, Kiuchi vs. Claims of the '211 Patent.
Exhibit 128, Kiuchi vs. Claims of the '504 Patent.
Exhibit 129, Kiuchi vs. Claims of the '759 Patent.
Exhibit 130, Overview of Access VPNs and Tunneling Technologies ("Overview") vs. Claims of the '135 Patent.
Exhibit 131, Overview of Access VPNs and Tunneling Technologies ("Overview") vs. Claims of the '151 Patent.
Exhibit 132, Overview of Access VPNs and Tunneling Technologies ("Overview")vs. Claims of the '180 Patent.
Exhibit 133, Overview of Access VPNs and Tunneling Technologies ("Overview") vs. Claims of the '211 Patent.
Exhibit 134, Overview of Access VPNs and Tunneling Technologies ("Overview") vs. Claims of the '504 Patent.
Exhibit 135, Overview vs. Claims of the '759 Patent.
Exhibit 136, RFC 2401 vs. Claims of the '759 Patent.
Exhibit 137, Schulzrinne vs. Claims of the '135 Patent.
Exhibit 138, Schulzrinne vs. Claims of the '151 Patent.
Exhibit 139, Schulzrinne vs. Claims of the '180 Patent.
Exhibit 140, Schulzrinne vs. Claims of the '211 Patent.
Exhibit 141, Schulzrinne vs. Claims of the '504 Patent.
Exhibit 142, Schulzrinne vs. Claims of the '759 Patent.
Exhibit 143, Solana vs. Claims of the '135 Patent.
Exhibit 144, Solana vs. Claims of the '151 Patent.
Exhibit 145, Solana vs. Claims of the '180 Patent.

(56) References Cited

OTHER PUBLICATIONS

Exhibit 146, Solana vs. Claims of the '211 Patent.
Exhibit 147, Solana vs. Claims of the '504 Patent .
Exhibit 148, Solana vs. Claims of the '759 Patent.
Exhibit 149, Atkinson vs. Claims of the '135 Patent.
Exhibit 150, Atkinson vs. Claims of the '151 Patent.
Exhibit 151, Atkinson vs. Claims of the '180 Patent.
Exhibit 152, Atkinson vs. Claims of the '211 Patent.
Exhibit 153, Atkinson vs. Claims of the '504 Patent.
Exhibit 154, Atkinson vs. Claims of the '759 Patent.
Exhibit 155, Marino vs. Claims of the '135 Patent.
Exhibit 156, Marino vs. Claims of the '151 Patent.
Exhibit 157, Marino vs. Claims of the '180 Patent.
Exhibit 158, Marino vs. Claims of the '211 Patent.
Exhibit 159, Marino vs. Claims of the '504 Patent.
Exhibit 160, Marino vs. Claims of the '759 Patent.
Exhibit 161, Aziz ('646) vs. Claims of the '759 Patent.
Exhibit 162, Wesinger vs. Claims of the '135 Patent.
Exhibit 163, Wesinger vs. Claims of the '151 Patent.
Exhibit 164, Wesinger vs. Claims of the '180 Patent.
Exhibit 165, Wesinger vs. Claims of the '211 Patent.
Exhibit 166, Wesinger vs. Claims of the '504 Patent.
Exhibit 167, Wesinger vs. Claims of the '759 Patent.
Exhibit 168, Aziz ('234) vs. Claims of the '135 Patent.
Exhibit 169, Aziz ('234) vs. Claims of the '151 Patent.
Exhibit 170, Aziz ('234) vs. Claims of the '180 Patent.
Exhibit 171, Aziz ('234) vs. Claims of the '211 Patent.
Exhibit 172, Aziz ('234) vs. Claims of the '504 Patent.
Exhibit 173, Aziz ('234) vs. Claims of the '759 Patent.
Exhibit 174, Schneider vs. Claims of the '759 Patent.
Exhibit 175, Valencia vs. Claims of the '135 Patent.
Exhibit 176, Valencia vs. Claims of the '151 Patent.
Exhibit 177, Valencia vs. Claims of the '180 Patent.
Exhibit 178, Valencia vs. Claims of the '211 Patent.
Exhibit 179, Valencia vs. Claims of the '504 Patent.
Exhibit 180, RFC 2401 in Combination with U.S. Pat. No. 6,496,867 vs. Claims of the '180 Patent.
Exhibit 181, Davison vs. Claims of the '135 Patent.
Exhibit 182, Davison vs. Claims of the '151 Patent.
Exhibit 183, Davison vs. Claims of the '180 Patent.
Exhibit 184, Davison vs. Claims of the '211 Patent.
Exhibit 185, Davison vs. Claims of the '504 Patent.
Exhibit 186, Davison vs. Claims of the '759 Patent.
Exhibit 187, AutoSOCKS v2.1 vs. Claims of the '135 Patent.
Exhibit 188, AutoSOCKS v2.1 vs. Claims of the '151 Patent.
Exhibit 189, AutoSOCKS v2.1 Administrator's Guide vs. Claims of the '180 Patent.
Exhibit 190, AutoSOCKS vs. Claims of the '759 Patent.
Exhibit 191, Aventail Connect 3.01/2.51 vs. Claims of the '135 Patent.
Exhibit 192, Aventail Connect v3.01/2.51 vs. Claims of the '151 Patent.
Exhibit 193, Aventail Connect 3.01/2.51 vs. Claims of the '180 Patent.
Exhibit 194, Aventail Connect 3.01/2.51 vs. Claims of the '759 Patent.
Exhibit 195, Aventail Connect 3.1/2.6 Administrator's Guide vs. Claims of the '135 Patent.
Exhibit 196, Aventail Connect 3.1/2.6 Administrator's Guide vs. Claims of the '151 Patent.
Exhibit 197, Aventail Connect 3.1/2.6 vs. Claims of the '180 Patent.
Exhibit 198, Aventail Connect 3.1/2.6 vs. Claims of the '759 Patent.
Exhibit 199, BinGO! User's User's Guide/Extended Features Reference vs. Claims of the '151 Patent.
Exhibit 200, BinGO! User's User's Guide/Extended Features Reference vs. Claims of the '135 Patent.
Exhibit 201, BinGO! vs. Claims of the '180 Patent.
Exhibit 202, BinGO! vs. Claims of the '759 Patent.
Exhibit 203, Broadband Forum Technical Report TR-025 (Issue 1.0/5.0) vs. Claims of the '135 Patent.
Exhibit 204, Domain Name System (DNS) Security vs. Claims of the '211 Patent.
Exhibit 205, Domain Name System (DNS) Security vs. Claims of the '504 Patent.
Exhibit 206, RFC 2230, Key Exchange Delegation Record for the DNS vs. Claims of the '211 Patent.
Exhibit 207, RFC 2230, Key Exchange Delegation Record for the DNS vs. Claims of the '504 Patent.
Exhibit 208, RFC 2538, Storing Certificates in the Domain Name System (DNS) vs. Claims of the '211 Patent.
Exhibit 209, RFC 2538, Storing Certificates in the Domain Name System (DNS) vs. Claims of the '504 Patent.
Exhibit 210, IETF RFC 2065: Domain Name System Security Extensions; Published Jan. 1997 vs. Claims of the '504 Patent.
Exhibit 211, IETF RFC 2065: Domain Name System Security Extensions; Published Jan. 1997 vs. Claims of the '211 Patent.
Exhibit 212, RFC 2486, RFC 2661, RFC 2401, and Internet-Draft, "Secure Remote Access with L2TP" vs. Claims of the '135 Patent.
Exhibit 213, U.S. Pat. No. 7,100,195 in Combination with RFC 2401 and U.S. Pat. No. 6,496,867 vs. Claims of the '135 Patent.
Exhibit 214, U.S. Pat. No. 7,100,195 in Combination with RFC 2401 and U.S. Pat. No. 6,496,867 vs. Claims of the '151 Patent.
Exhibit 215, U.S. Pat. No. 6,643,701 vs. Claims of the '135 Patent.
Exhibit 216, U.S. Pat. No. 6,643 701 vs. Claims of the '151 Patent.
Exhibit 217, U.S. Pat. No. 6,496,867 in Combination with RFC 2401 vs. Claims of the '151 Patent.
Exhibit 218, U.S. Pat. No. 6,496,867 in Combination with RFC 2401 vs. Claims of the '135 Patent.
Exhibit 219, U.S. Pat. No. 6,496,867 vs. Claims of the '211 Patent.
Exhibit 220, U.S. Pat. No. 6,496,867 vs. Claims of the '504 Patent.
Exhibit 221, RFC 2486, RFC 2661, RFC 2401, and Internet-Draft, "Secure Remote Access with L2TP" vs. Claims of the '151 Patent.
Exhibit 222, U.S. Pat. No. 6,557,037 vs. Claims of the '211 Patent.
Exhibit 223, U.S. Pat. No. 6,557,037 vs. Claims of the '504 Patent.
Exhibit 224, RFC 2230, Key Exchange Delegation Record for the DNS vs. Claims of the '135 Patent.
Exhibit 225, RFC 2230, Key Exchange Delegation Record for the DNS vs. Claims of the '151 Patent.
Exhibit Cisco-1, Cisco's Prior Art Systems vs. Claims of the '135 Patent.
Exhibit Cisco-2, Cisco's Prior Art Systems vs. Claims of the '151 Patent.
Exhibit Cisco-3, Cisco's Prior Art Systems vs. Claims of the '180 Patent.
Exhibit Cisco-4, Cisco's Prior Art Systems vs. Claims of the '211 Patent.
Exhibit Cisco-5, Cisco's Prior Art Systems vs. Claims of the '504 Patent.
Exhibit Cisco-6, Cisco's Prior Art Systems vs. Claims of the '759 Patent.
Exhibit Cisco-7, Cisco's Prior Art PIX System vs. Claims of the '759 Patent.
Exhibit A: U.S. Pat. No. 6,502,135.
Exhibit A: U.S. Pat. No. 7,490,151.
Exhibit B: Certificate of Service to Request for Inter Partes Reexamination Under 35 U.S.C. § 311 (U.S. Pat. No. 6,502,135).
Exhibit B: Certificate of Service to Request for Inter Partes Reexamination Under 35 U.S.C. § 311 (U.S. Pat. No. 7,490,151).
Exhibit B-1: File History of U.S. Pat. No. 6,502,135.
Exhibit B-2: Reexamination Record No. 95/001,269.
Exhibit C1: Claim Chart—Aventail Connect v3.1 (U.S. Pat. No. 6,502,135).
Exhibit C2: Claim Chart Aventail Connect V3.01 (U.S. Pat. No. 6,502,135).
Exhibit C-1: U.S. Pat. No. 7,010 604.
Exhibit C2: Claim Chart Aventail Autosocks (U.S. Pat. No. 7,490 151).
Exhibit C1: Claim Chart Aventail Connect v3.01 (U.S. Pat. No. 7,490,151).
Exhibit C-2: U.S. Appl. No. 60/106,261.
Exhibit C3: Claim Chart Aventail AutoSOCKS (U.S. Pat. No. 6,502 135).
Exhibit C3: Claim Chart BinGO (U.S. Pat. No. 7,490,151).

(56) References Cited

OTHER PUBLICATIONS

Exhibit C-3: U.S. Appl. No. 60/137,704.
Exhibit C4: Claim Chart Wang (U.S. Pat. No. 6,502,135).
Exhibit C4: Claim Chart Beser (U.S. Pat. No. 7,490,151).
own Exhibit C5: Claim Chart Beser (U.S. Pat. No. 6,502,135).
Exhibit C5: Claim Chart Wang (U.S. Pat. No. 7,490,151).
Exhibit C6: Claim Chart BinGO (U.S. Pat. No. 6,502,135).
Exhibit D: Memorandum Opinion in *VirnetX* v.*Microsoft*.
Exhibit D-1: Takahiro Kiuchi and Shigekoto Kaihara, "C-HTTP—The Development of a Secure, Closed HPPT-Based Network on the Internet," Published in the Proceedings of SNDSS 1996.
Exhibit D-10: D.E. Denning and G.M. Sacco, "Time-stamps in Key Distribution Protocols," Communications of the ACM, vol. 24, N.8, pp. 533-536. Aug. 1981.
Exhibit D-11: C.I. Dalton and J.F. Griffin, "Applying Military Grade Security to the Internet," Proceedings of the 8th Joint European Networking Conference (JENC 8), (May 12-15, 1997).
Exhibit D-12: Steven M. Bellovin and Michael Merritt, "Encrypted Key Exchange: Password-Based protocols Secure against Dictionary Attacks," 1992 IEEE Symposium on Security and Privacy (1992).
Exhibit D-2: U.S. Pat. No. 5,898 830.
Exhibit D-3: Eduardo Solana and Jurgen Harms, "Flexible Internet Secure Transactions Based on Collaborative Domains,", Security Protocols Workshop 1997, pp. 37-51.
Exhibit D-4: U.S. Pat. No. 6,119,234.
Exhibit D-5: Jeff Sedayao, "'Mosaic Will Kill My Network!'—Studying Network Traffic Patterns of Mosaic Use," in Electron. Proc. 2nd World Wide Web Conf.'94: Mosaic and the Web, Chicago, IL, Oct. 1994.
Exhibit D-6: M. Luby Juels and R. Ostrovsky, "Security of Blind Digital Signatures," Crypto '97, LNS 1294, pp. 150-164, Springer-Verlag, Berlin, 1997.
Exhibit D-8: David M. Martin, "A Framework for Local Anonymity in the Internet," Technical Report. Boston University, Boston, MA, USA (Feb 21, 1998).
Exhibit D-9: U.S. Pat. No. 7,764,231.
Exhibit E-1: Claim Charts Applying Kiuchi and Other References to Claims of the '135 Patent.
Exhibit E1: Declaration of Chris Hopen (U.S. Pat. No. 6,502,135).
Exhibit E1: Declaration of Chris Hopen (U.S. Pat. No. 7,490,151).
Exhibit E-2: Claim Charts Applying Wesinger and Other References to Claims of the '135 Patent.
Exhibit E2: Declaration of Michael Fratto (U.S. Pat. No. 6,502,135).
Exhibit E2: Declaration of Michael Fratto (U.S. Pat. No. 7,490,151).
Exhibit E-3: Claim Charts Applying Solana and Other References to Claims of the '135 Patent.
Exhibit E3: Declaration of James Chester (U.S. Pat. No. 6,502,135).
Exhibit E3: Declaration of James Chester (U.S. Pat. No. 7,490,151).
Exhibit E-4: Claim Charts Applying Aziz and Other References to Claims of the '135 Patent.
Exhibit X1: Aventail Connect Administrator's Guide v3.1/v2.6., pp. 1-20 (1996-1999).
Exhibit X10: U.S. Pat. No. 4,885,778.
Exhibit X11: U.S. Pat. No. 6,615,357.
Exhibit X2: Aventail Connect Administrator's Guide v3.01/v2.51., pp. 1-116 (1996-1999).
Exhibit X3: Aventail AutoSOCKS Administration & User's Guide v2.1 pp. 1-70 (1996-1999).
Exhibit X4: Reed et al., "Proxies for Anonymous Routine," 12th Annuary Computer Security Applications Conference, San Diego, CA, Dec. 9-13, pp. 1-10 (1996).
Exhibit X5 Wang, The Broadband Forum Technical Report, "TR-025—Core Network Architecture Recommendations for Access to Legacy Data Networks over ADSL," Issue 1.0; pp. 1-24 , v1.0 (1999).
Exhibit X6: U.S. Pat. No. 6,496,867.
Exhibit X7: BinGO! User's Guide Incorporating by Reference BinGO! Extended Feature Reference.
Exhibit X7: Kent et al., "Security Architecture for the Internet Protocol," Network Working Group Request for Comments (RFC) 2401, pp. 1-70 (1998).
Exhibit X8: U.S. Pat. No. 6,182,141.
Exhibit X9: BinGO! User's Guide v1.6 (1999).
Exhibit Y1: Aventail Extranet Server 3.0 Administrator's Guide.
Exhibit Y10: Hanks, S., et al., RFC1701, "Generic Routing Encapsulation (GRE)," 1994, Is Accessbile at http://www.ietf.org/rfc/rfc1701.txt.
Exhibit Y10: Socolofsky, T. et al., RFC 1180, "A TCP/IP Tutorial," Jan. 1991.
Exhibit Y11: Simpson, W., editor, RFC 1661, "The Point-to-Point Protocol (PPP)," Jul. 1994.
Exhibit Y11: Simpson, W., RFC1994, "PPP Challenge Handshake Authentication Protocol (CHAP)," 1996, http://www.ietf.org/rdc/rfc1994.txt.
Exhibit Y12: Meyer, G., RFC 1968, "The PPP Encryption Control Protocol (ECP)," Jun. 1996.
Exhibit Y12: Perkins, D., RFC1171, "The Point-To-Point Protocol for the Transmission of Multi-Protocol Datagrams over Point-To-Point Links," 1990, Is Accessible at http://www.ietf.org/rfc/rfc1171.txt.
Exhibit Y13: Kummert, H., RFC 2420, "The PPP Triple-DES Encryption Protocol (3DESE)," Sep. 1998.
Exhibit Y14: Townsley, W.M., et al., RFC 2661, "Layer Two Tunneling Protocol 'L2TP'," Aug. 1999.
Exhibit Y15: Pall, G.S., RFC 2118, "Microsoft Point-To-Point Encryption (MPPE) Protocol," Mar. 1997.
Exhibit Y16: Gross, G., et al., RFC 2364, "PPP Over AAL5," Jul. 1998.
Exhibit Y17: Srisuresh, P., RFC 2663, "IP Network Address Translator (NAT) Terminology and Considerations," Aug. 1999.
Exhibit Y18: Heinanen, J., RFC 1483, "Multiprotocol Encapsulation over ATM Adaptation Layer 5," Jul. 1993.
Exhibit Y2: Goldschlag et al., "Hiding Routing Information" (1996).
Exhibit Y3: U.S. Pat. No. 5,950,519.
Exhibit Y4: Ferguson, P. and Huston, G., "What Is a VPN", The Internet Protocol Journal, vol. 1., No. 1 (Jun. 1998 ("Ferguson").
Exhibit Y5: Mockapetris, P., RFC 1034, "Domain Names—Concepts and Facilities," Nov. 1987 ("RFC1034").
Exhibit Y6: Mockapetris, P., RFC 1035, "Domain Names—Implementation and Specification," Nov. 1987 ("RFC1035").
Exhibit Y8: Fielding, R., et al., RFC 2068, "Hypertext Transfer Protocol—HTTP/1.1," Jan. 1997.
Exhibit Y8: Woodburn, R.A., et al., RFC1241, "A Scheme for an Internet Encapsulation Protocol: Version 1," 1991.
Exhibit Y9: Leech, M., et al., RFC 1928, "Socks Protocol Version 5," Mar. 1996.
Exhibit Y9: Simpson, W., RFC1853, "IP in IP Tunneling," 1995, Is Accessible at http://www.ietf.org/rfc/rfc1583.txt.
Form PTO/SB/42, Listing Each Patent and Printed Publication Relied Upon to Provide a Substantial New Question of Patentability (U.S. Pat. No. 6,502,135).
Form PTO/SB/42, Listing Each Patent and Printed Publication Relied Upon to Provide a Substantial New Question of Patentability (U.S. Pat. No. 7,490,151).
Request for Inter Partes Reexamination (U.S. Pat. No. 6,502,135).
Request for Inter Partes Reexamination Transmittal Form (PTO/SB/58) (U.S. Pat. No. 6,502,135).
Request for Inter Partes Reexamination Transmittal Form (PTO/SB/58) (U.S. Pat. No. 7,490,151).
Request for Inter Partes Reexamination Under 35 U.S.C. § 311 (U.S. Pat. No. 6,502,135).
Request for Inter Partes Reexamination Under 35 U.S.C. § 311 (U.S. Pat. No. 7,490,151).
Transmittal Letter (U.S. Pat. No. 6,502,135).
Transmittal Letter (U.S. Pat. No. 7,490,151).
Joint Claim Construction and Prehearing Statement.
Exhibit A: Agreed Upon Terms; P.R. 4-3 Joint Claims Construction and Prehearing Statement.
Exhibit B: Disputed Claim Terms; P.R. 4-3 Joint Claim Construction and Prehearing Statement.

(56) References Cited

OTHER PUBLICATIONS

Exhibit C; VirnetX's Proposed Construction of Claim Terms and Supporting Evidence.
Exhibit D; Defendants' Intrinsic and Extrinsic Support; P.R. 4-3 Joint Claim Construction and Prehearing Statement.
Exhibit B-4; *VirnetX, Inc. v. Microsoft Corp.*, Case No. 6:07-cv-80, Microsoft's Motion for Partial Summary Judgment of Invalidity of U.S. Pat. No. 6,839,759 (E.D. Tex. Dec. 18, 2009).
Exhibit D-2; Kent et al., "Security Architecture for the Internet Protocol," Internet Engineering Task Force, Internet Draft, (Feb. 1998).
Exhibit D-3; Aziz et al., U.S. Pat. No. 5,548,646 to Aziz et al., "System for Signatureless Transmission and Reception of Data Packets Between Computer Networks," Filed Sep. 15, 1994 and issued Aug. 20, 1996.
Exhibit D-4; Yinger; U.S. Pat. No. 5,960,204 to Yinger et al., System and Method for Installing Applications on a Computer on an as needed basis, Filed on Oct. 28, 1996 and Issued Sep. 28, 1999.
Exhibit D-8; Barlow; U.S. Pat. No. 5,204,961 to Barlow, "Computer Network Operating with Multilevel Hierarchical Security with Selectable Common Trust Realms and Corresponding Security Protocols," Filed on Jun. 25, 1990 and Issued Apr. 20, 1993.
Exhibit D-12; RFC 1122, Braden, "Requirements for Internet Hosts—Communication Layers," RFC 1122 (Oct. 1989).
Exhibit D-13; RFC 791; Information Sciences Institute, "Internet Protocol," DARPA Internet Program Specification RFC 791 (Sep. 1981).
Exhibit D-14; Caronni et al., "SKIP—Securing the Internet," 5th International Workshops on Enabling Technologies: Infrastructure for Collaborative Enterprises (WET ICE '96) (Jun. 19-21, 1996).
Exhibit D-15; Maughan et al., "Internet Security Association and Key Management Protocol (ISAKMP)," IPSEC Work Group Draft (Jul. 26, 1997).
Exhibit E-1; Claim Charts Applying Kiuchi as a Primary Reference to the '759 Patent.
Exhibit E-2; Claim Charts Applying Kent as a Primary Reference to the '759 Patent.
Exhibit E-3; Claim Charts Applying Aziz as a Primary Reference to the '759 Patent.
Exhibit E-4; Claim Charts Applying Kent in view of Caronni as a Primary Combination of References to the '759 Patent.
Exhibit D-5; Edwards et al., "High Security Web Servers and Gateways," Computer Networks and ISDN System 29, pp. 927-938 (Sep. 1997).
Exhibit D-10; Lee et al., "Hypertext Transfer Protocol—HTTP/1.0," RFC 1945 (May 1996).
Exhibit E-3; Claim Charts Applying Blum to Claims of the '151 Patent.
Exhibit B-1, File History of U.S. Pat. No. 7,490,151.
Exhibit E-1, Claim Charts Applying Kiuchi, and Kiuchi and Martin to Claims of the '151 Patent.
Exhibit E-2, Claim Charts Applying Wesinger, and Wesinger and Martin to Claims of the '151 Patent.
Exhibit E-4, Claim Charts Applying Aziz and Edwards, and Aziz, Edwards, and Martin to Claims of the '151 Patent.
Exhibit E-6, Claim Charts Applying Wesinger and Edwards, and Wesinger, Edwards, and Martin to Claims of the '151 Patent.
*VirnetX Inc.*, V. *Mitel Networks Corp.*; Defendants' Joint Invalidity Contentions.
Exhibit 42, SecureConnect vs. Claims of the '504 Patent.
Exhibit 49, Chuah vs. Claims of the '135 Patent.
Exhibit 50, Chuah vs. Claims of the '211 Patent.
Exhibit 51, Chuah vs. Claims of the '504 Patent.
Exhibit 52, U.S. '648 vs. Claims of the '135 Patent.
Exhibit 53, U.S. '648 vs. Claims of the '211 Patent.
Exhibit 59, BorderManagervs. Claims of the '211 Patent.
Exhibit 60, BorderManagervs. Claims of the '504 Patent.
Exhibit 67, US '072 vs. Claims of the '135 Patent.
Exhibit 70 Understanding IPSec vs. Claims of the '135 Patent.
Exhibit 91, JP'704 vs. Claims of the '135 Patent.
Exhibit 92, JP'704 vs. Claims of the '211 Patent.
Exhibit 101 Nikkei vs. Claims of the '135 Patent.
Exhibit 106-A, Gauntlet System vs. Claims of the '135 Patent.
Exhibit 109-A, Gauntlet System vs. Claims of the '211 Patent.
Exhibit 110-A, Gauntlet System vs. Claims of the '504 Patent.
Exhibit 137, Schulzrinne vs. Claims of the '135 (Final) Patent.
Exhibit 140, Schulznnne vs. Claims of the '211 Patent.
Exhibit 141 Schulzrinne vs. Claims of the '504 Patent.
Exhibit 147, Solana vs. Claims of the '504 Patent.
Exhibit 168, Aziz vs. Claims of the '135 Patent.
Exhibit 171, U.S. '234 vs. Claims of the '211 Patent.
Exhibit 172, Aziz vs. Claims of the '504 Patent.
Exhibit 200, BinGO! User's Guide/Extended Features Reference vs. Claims of the '135 Patent.
Exhibit 212, RFC 2486, RFC 2661, RFC 2401 and Internet-Draft, Secure Remote Access with L2TP' vs. Claims of the '135 Patent.
Exhibit 218, U.S. Pat. No. 6,496,867 in combination with RFC 2401' vs. Claims of the '135 Patent.
Exhibit 228, U.S. 588 vs. Claims of the '211 Patent (Final).
Exhibit 229, U.S. 588 vs. Claims of the '504 Patent (Final).
Exhibit 230, Microsoft VPN vs. Claims of the '135 Patent (Final).
Exhibit 231, Microsoft VPN vs. Claims of the '211 Patent (Final).
Exhibit XX, Microsoft VPN vs. Claims of the '504 Patent.
Exhibit Cisco-1, Cisco's Prior Art System vs. Claims of the '135 Patent.
Exhibit Cisco-4, Cisco's Prior Art System vs. Claims of the '211 Patent.
Exhibit Cisco-5, Cisco's Prior Art System vs. Claims of the '504 Patent.
Exhibit 225, US '037 vs. Claims of the '135 Patent.
Exhibit 226, ITU-T Standardization Activities vs. Claims of the '135 Patent.
Exhibit 227, US '393 vs. Claims of the '135 Patent.
Exhibit 233, The Miller Application vs. Claim 13 of the '135 Patent.
Exhibit 234, Aventail Connect 3.1/2.6 Administrator's Guide ("Aventail Connect") vs. Claims of the '504 Patent.
Exhibit 235, Microsoft VPN vs. Claims of the '504 Patent.
Exhibit 24, U.S. Pat. No. 6,453,034 ('034 Patent) vs. Claims of the 135 Patent.
Exhibit 25, U.S. Pat. No. 6,453,034 ('034 Patent) vs. Claims of the 211 Patent.
Exhibit 26, U.S. Pat. No. 6,453,034 ('034 Patent) vs. Claims of the 504 Patent.
Exhibit 27, U.S. Pat. No. 6,223,287 ("287 Patent") vs. Claims of the 135 Patent.
Exhibit 28, U.S. Pat. No. 6,223,287 ("287 Patent") vs. Claims of the 211 Patent.
Exhibit 29, U.S. Pat. No. 6,223,287 ("287 Patent") vs. Claims of the 504 Patent.
Exhibit 106, Gaunlet System and Gaunlet References vs. Claims of the '135 Patent.
Exhibit 109, Gaunlet System and Gaunlet References vs. Claims of the '211 Patent.
Exhibit 110, Gauntlet System vs. Claims of the '504 Patent.
Exhibit 162, Wesingervs. Claims of the '135 Patent.
Exhibit 165, Wesingervs. Claims of the '211 Patent.
Exhibit 191, Aventail Connect 3.01/2.51 ("Aventail Connect") vs. Claims of the '135 Patent.
Exhibit 195, Aventail Connect 3.1/2.6 Administrator's Guide ("Aventail Connect") vs. Claims of the '135 Patent.
Exhibit 205, Domain Name System (DNS) Security ("DNS Security") vs. Claims of the '504 Patent.
Exhibit 210, Lendenmann vs. Claims of the '211 Patent.
Exhibit 211, Lendenmann vs. Claims of the '504 Patent.
Exhibit 213, U.S. Pat. No. 7,100,195 in combination with RFC 2401 and U.S. Patent No. 6,496,867 vs. Claims of the '135 Patent.
Exhibit 215, Aziz vs. Claims of the '135 Patent.
Cisco '180, Efiling Acknowledgment.
Exhibit A, U.S. Pat. No. 7,188,180.
Exhibit B1, File History of U.S. Pat. No. 7,188,180.
Exhibit B2, File History of U.S. Appl. No. 09/588,209.

(56) References Cited

OTHER PUBLICATIONS

Exhibit B3, File History of Reexamination Control No. 95/001,270, Reexamination of U.S. Pat. No. 7,188,180 requested by Microsoft Corp.
Exhibit D1, "Lendenmann": Rolf Lendenman, Understanding OSF DCE 1.1 for AIX and OS/2, IBM International Technical Support Organization (Oct. 1995).
Exhibit D5, "Schneier": Bruce Schneier, Applied Cryptography (1996).
Exhibit D6, RFC 793; Information Sciences Institute, "Transmission Control Protocol," DARPA Internet Program Specification RFC 793 (Sep. 1981).
Exhibit D7, "Schimpf; Brian C. Schimpf, Securing Web Access with DCE," Presented at Network and Distributed System Security (Feb. 10-11, 1997).
Exhibit D8, "Rosenberry"; Ward Rosenberry, David Kenney, and Gerry Fisher, Understanding DCE (1993).
Exhibit D9, Masys; Daniel R. Masys & Dixie B. Baker, "Protecting Clinical Data on Web Client Computers: The PCASSO Approach," Proceedings of the AMIA '98 Annual Symposium, Orlando, Florida (Nov. 7-11, 1998).
Exhibit E1, Claim Charts Applying Lendenmann as a Primary Reference to the '180 Patent.
Exhibit E2, Claim Charts Applying Kiuchi as a Primary Reference to the '180 Patent.
Exhibit E3, Claim Charts Applying Solana as a Primary Reference to the '180 Patent.
Exhibit E4, Claim Charts Applying Schimpf and Rosenberry as a Primary Reference to the '180 Patent.
Request for Inter Partes Reexamination of U.S. Pat. No. 7,188,180. Modified PTO Form 1449.
Request for Inter Partes Reexamination Transmittal Form No. 7,188,180.
Exhibit A; U.S. Pat. No. 7,921,211 with Terminal Disclaimer.
Exhibit B, Certificate of Service to Request for Inter Partes Reexamination Under 35 U.S.C. § 311 (U.S. Pat. No. 7,921,211).
Exhibit C1, Claim Chart—U.S. Pat. No. 7,921,211 Relative to Solana, Alone and in Conjunction with RFC 920, Reed and Beser.
Exhibit C2, Claim Chart—U.S. Pat. No. 7,921,211 Relative to Solana in view of RFC 2504 and Further in conjunction with RFC 920, Reed, and Beser.
Exhibit C3, Claim Chart—U.S. Pat. No. 7,921,211 Relative to Provino, Alone and in Conjunction with RFC 920, Reed, and Beser).
Exhibit C4, Claim Chart—U.S. Pat. No. 7,921,211 Relative to Provino in view of RFC 2230 and Further in Conjunction with RFC 920, Reed and Beser.
Exhibit C5, Claim Chart—U.S. Pat. No. 7,921,211 Relative to Provino in view of RFC 2504 and in Further Conjunction with RFC 920, Reed and Beser.
Exhibit C6, Claim Chart—U.S. Pat. No. 7,921,211 Relative to Beser, Alone and in Conjunction with RFC 920, RFC 2401, and Reed.
Exhibit C7, Claim Chart—U.S. Pat. No. 7,921,211 Relative to RFC 2230, Alone and in Conjunction with RFC 920, RFC 2401, Reed, and Beser.
Exhibit C8, Claim Chart—U.S. Pat. No. 7,921,211 Relative to RFC 2538, Alone and in Conjunction with RFC 920, RFC 2401, Reed, Beser, and RFC 2065.
Exhibit D1, Asserted Claim and Infringement Contentions by Plaintiff VirnetX, Inc. In *VirntX, Inc. v. Cisco Systems, Inc., Apple Inc., Aastra Technologies Ltd, NEC Corporation, NEC Corporation of America and Aastra USA, Inc.*, Civ. Act 6:2010cv00417 (E.D. Tex) .
Exhibit D2, Asserted Claims and Infringement Contentions by Plaintiff VimetX, Inc. against Apple based on U.S. Pat. No. 7,921. 211.
Exhibit X1, Solana, E. et al. "Flexible Internet Secure Transactions Based on Collaborative Domains".
Exhibit X2, U.S. Pat. No. 6,557,037.

Exhibit X4, Atkinson, R., IETF RFC 2230, "Key Exchange Delegation Record for the DNS" (Nov. 1997).
Exhibit X6, Kent, et al., IETF RFC 2401, "Security Architecture for the Internet Protocol" (Nov. 1998) Is Accessible at: http://www.ietf.org/rfc/rfc2401.txt.
Exhibit X7, Eastlake, D. et al., IETF RFC 2065, "Domain Name System Security Extensions" (Jan. 1997) Is Accessible at: http://www.ietf.org/rfc/rfc2065.txt.
Exhibit X9, Guttman, E. et al., IETF RFC 2504, "Users' Security Handbook" (Feb. 1999) Is Accessible at: http://www.ietf.org/rfc/rfc2504.txt.
Exhibit Y3, Braden, R., RFC 1123, "Requirements for Internet Hosts—Application and Support," Oct. 1989 ("RFC1123").
Exhibit Y4 Atkinson, R., RFC 1825, Securty Architecture for the Internet Protocol (Aug. 1995) Is Accessible at: http://www.ietf.org/rfc/rfc1825.txt.
Exhibit Y5, Housley, R. et al., RFC 2459, "Internet X.509 Public Key Infrastructure Certificate and CRL Profile" (Jan. 1999) Is accessible at: http://www.ietf.org/rfc/rfc2459.txt.
Exhibit A, U.S. Pat. No. 7,418,504.
Exhibit B, Certificate of Service to Request for Inter Partes Reexamination Under 35 U.S.C. § 311 (U.S. Pat. No. 7,418,504).
Exhibit C1, Claim Chart—U.S. Pat. No. 7,418,504 Relative to Solana, Alone and in Conjunction with RFC 920, Reed, and Beser.
Exhibit C2, Claim Chart—U.S. Pat. No. 7,418,504 Relative to Solana in view of RFC 2504 and Further in Conjunction with RFC 920, Reed, and Beser.
Exhibit C3, Claim Chart—U.S. Pat. No. 7,418,504 Relative to Provino, Alone and in Conjunction with RFC 920, Reed, and Beser.
Exhibit C4, Claim Chart—U.S. Pat. No. 7,418,504 Relative to Provino in View of RFC 2230 and Further in Conjunction with RFC 920, Reed and Beser.
Exhibit C5, Claim Chart—U.S. Pat. No. 7,418,504 Relative to Provino in View of RFC 2504 and in Further Conjunction with RFC 920, Reed, and Beser.
Exhibit C6, Claim Chart—U.S. Pat. No. 7,418,504 Relative to Beser, Alone and in Conjunction with RFC 920, RFC 2401, and Reed.
Exhibit C7, Claim Chart—U.S. Pat. No. 7,418,504 Relative to RFC 2230, Alone and in Conjunction with RFC 920, RFC 2401, Reed, and Beser.
Exhibit C8, Claim Chart—U.S. Pat. No. 7,418,504 Relative to RFC 2538, Alone and in Conjunction with RFC 920, RFC 2401, Reed, Beser, and RFC 2065.
Exhibit D1, Asserted Claims and Infringement Contentions by Plaintiff VirnetX Inc. in *VirnetX, Inc. v. Cisco Systems, Inc., Applce, Inc, Aastra Technologies Ltd., NEC Corporation, NEC Corporation of America and Aastra USA, Inc.*, Civ. Act. 6:2010cv00417 (E.D. Tex).
Exhibit D2, Asserted Claims and Infringement Contentions by Plaintiff VirnetX Inc. against Apple Inc. Based on the U.S. Pat. No. 7,418,504.
Exhibit X5, Eastlake, D., et al., IETF RFC 2538, "Storing Certificates in the Domain Name System (DNS)" (Mar. 1999).
Exhibit X6, Kent, S. IETF RFC 2401, Security Architecture for the Internet Protocol, (Nov. 1998) http://www.ietf.org/rfc/rfc2401.txt.
Exhibit X8, Postel, J. et al., IETF RFC 920, "Domain Requirements" (Oct. 1984) Is Accessible at http://www.ietf.org/rfc/rfc920.txt.
Exhibit X10, Reed, M. et al. "Proxies for Anonymous Routing," 12th Annual Computer Security Applications Conference, San Diego, CA, Dec. 9-13, 1996.
Request for Inter Partes Reexamination Transmittal form.
Transmittal Letter.
Request for Inter Partes Reexamination Under 35 U.S.C. § 311.
Exhibit D-7, "Thomas": Brian Thomas, Recipe for E-Commerce, IEEE Internet Computing, (Nov.-Dec. 1997).
Exhibit D-9, "Kent II": Stephen Kent & Randall Atkinson, "IP Encapsulating Security Payload (ESP)," Internet Engineering Task Force, Internet Draft (Feb. 1998).
Exhibit C1, Claim Chart—U.S. Pat. No. 7,921,211 Relative to Solana, Alone and in Conjunction with RFC 920, Reed and Beser (Came from Inval. Cisco dtd Nov. 18, 2011).

(56) References Cited

OTHER PUBLICATIONS

Exhibit C3, Claim Chart—U.S. Pat. No. 7,921,211 Relative to Provino, Alone and in Conjunction with RFC 920, Reed, and Beser.
Exhibit C6 Claim Chart—U.S. Pat. No. 7,921,211 Relative to Beser, Alone and in Conjunction with RFC 920, RFC 2401, and Reed.
Exhibit C7, Claim Chart—U.S. Pat. No. 7,921,211 Relative to RFC 2230, Alone and in Conjunction with RFC 920, Reed, and Beser.
211 Request for Inter Partes Reexamination.
Exhibit C1, Claim Chart—U.S. Pat. No. 7,418,504 Relative to Solana, Alone and in Conjunction with RFC 920, Reed and Beser.
Exhibit C5, Claim Chart—U.S. Pat. No. 7,418,504 Relative to Provino in View of RFC 2504 and in Further Conjunction with RFC 920, Reed and Beser.
Exhibit C6, U.S. Pat. No. 7,418,504 Relative to Beser, Alone and in Conjunction with RFC 920, RFC 2401, and Reed.
504 Request for Inter Partes Reexamination.
Defendants' Supplemental Joint Invalidity Contentions.
Exhibit 226, Securing Web Access with DCE vs. Claims of the '135 Patent.
Exhibit 227, Securing Web Access with DCE vs. Claims of the '151 Patent.
Exhibit 228, Understanding OSF DCE 1.1 for AIX and OS/2 vs. Claims of the '135 Patent.
Exhibit 229, Understanding OSF DCe 1.1 for AIX and OS/2 vs. Claims of the '151 Patent.
Exhibit 230, Understanding OSF DCE 1.1 for AIX and OS/2 vs. Claims of the '180 Patent.
Exhibit 231, Understanding OSF DCE 1.1 for AIX and OS/2 vs. Claims of the '211 Patent.
Exhibit 232, Understanding OSF DCE 1.1 for AIX and OS/2 vs. Claims of the '504 Patent.
Exhibit 233, Understanding OSF DCE 1.1 for AIX and OS/2 vs. Claims of the '759 Patent.
Exhibit 234, U.S. '648 vs. Claims of the '135 Patent.
Exhibit 235, U.S. '648 vs. Claims of the '211 Patent.
Exhibit 236, U.S. '648 vs. Claims of the '504 Patent.
Exhibit 237, U.S. '648 vs. Claims of the '135 Patent.
Exhibit 238, Gauntlet System vs. Claims of the '211 Patent.
Exhibit 239, Gauntlet System vs. Claims of the '504 Patent.
Exhibit 240, Gauntlet System vs. Claims of the '135 Patent.
Exhibit 241, U.S. '588 vs. Claims of the '211 Patent.
Exhibit 242, U.S. '588 vs. Claims of the '504 Patent.
Exhibit 243, Microsoft VPN vs. Claims of the '135 Patent.
Exhibit 244, Microsoft VPN vs. Claims of the '211 Patent.
Exhibit 245, Microsoft VPN vs. Claims of the '504 Patent.
Exhibit 246, ITU-T Standardization Activities vs. Claims of the '135 Patent.
Exhibit 247, U.S. '393 vs. Claims of the '135 Patent.
Exhibit 248, The Miller Application vs. Claim 13 of the '135 Patent.
Exhibit 249, Gauntlet System vs. Claims of the '151 Patent.
Exhibit 250, ITU-T Standardization Activities vs. Claims of the '151 Patent.
Exhibit 251, U.S. Pat. No. 5,940,393 vs. Claims of the '151 Patent.
Exhibit 252, Microsoft VPN vs. Claims of the '151 Patent.
Exhibit 253, U.S. Pat. No. 6,324,648 vs. Claims of the '151 Patent.
Exhibit 254, U.S. Pat. No. 6,857,072 vs. Claims of the '151 Patent.
Exhibit A, Aventail Press Release, May 2, 1997.
Exhibit B, InfoWorld, "Aventail Delivers Highly Secure, Flexible VPN Solution," InfoWorld, p. 64D, (1997).
Exhibit C, Aventail AutoSOCKS v2. Administrator's Guide.
Exhibit D, Aventail Press Release, Oct. 12, 1998.
Exhibit G, Aventail Press Release, May 26, 1999.
Exhibit H, Aventail Press Release, Aug. 9, 1999.
Exhibit J, Aventail ExtraNet Center 3.1: Security with Solid Management, Network Computing, Jun. 28, 1999.
Petition in Opposition to Patent Owner's Petition to Vacate Inter Partes ReExamination Determination on Certain Prior Art.
Exhibit B, Certificate of Service to Request for Inter Partes Reexamination Under U.S.C. § 311.
Exhibit C1, Claim Chart Aventail Connect v3.1.
Exhibit C2, Claim Chart Aventail Connect v3.01.
Exhibit C3, Claim Chart Aventail AutoSOCKS.
Exhibit C4, Claim Chart Wang.
Exhibit C5, Claim Chart Beser.
Exhibit C6, Claim Chart BINGO.
Exhibit X6, U.S. Pat. No. 6,496,867.
Exhibit X10, U.S. Pat. No. 4,885,778.
Exhibit X11, U.S. Pat. No. 6,615,357.
Exhibit Y3, U.S. Pat. No. 5,950,519.
Exhibit D, v3.1 Administrator's Guide.
Exhibit E-1, Claim Charts Applying Kiuchi to Various Claims of the '135 Patent.
Exhibit E-2, Claim Charts Applying Wesinger to Various Claims of the '135 Patent.
Exhibit E-3, Claim Charts Applying Solana to Various Claims of the '135.
Exhibit E-4, Claim Charts Applying Aziz to Various Claims of the '135 Patent.
Request for Inter Partes Reexamination.
PTO Form 1449 Date.
Exhibit C1, Claim Chart Aventail Connect v3.01.
Exhibit C2, Claim Chart Aventail AutoSOCKS.
Exhibit C3, Claim Chart BINGO.
own Exhibit C4, Claim Chart Beser.
Exhibit C5, Claim Chart Wang.
Exhibit B, Certificate of Service to Request for Inter Partes Reexamination Under 35 U.S.C. § 311.
Exhibit E-3, Claim Charts Applying Blum to Claims of the '151 Patent.
Exhibit E-5, Claim Charts Applying Kiuchi and Edwards, and Kiuchi, Edwards, and Martin to Claims of the '151 Patent.
Exhibit A, U.S. Pat. No. 6,839,759.
Exhibit C-1, U.S. Pat. No. 6,502,135.
Exhibit E-1, Claim Charts Applying Kiuchi, as Primary Reference to the '759 Patent.
Exhibit E-2, Claim Charts Applying Kent as a Primary Reference to the '759 Patent.
Exhibit E-3, Claim Charts Applying Aziz as a Primary Reference to the '759 Patent.
Exhibit E-4, Claim Charts Applying Kent in View of Caronni as a Primary Combination of References to the '759 Patent.
PTO Form 1449.
Certificate of Service to Request for Inter Partes Reexamination Under 35 U.S.C. § 311.
Exhibit D1, Asserted Claim and Infringement Contentions by Plaintiff VirnetX, Inc. in *VirnetX, Inc. v. Cisco Systems, Inc., Apple Inc., Aastra Technologies Ltd, NEC Corporation, NEC Corporation of America and Aastra USA, Inc.*, Civ. Act 6:2010cv00417 (E.D. Tex).
Exhibit D2, Asserted Claims and Infringement Contentions by Plaintiff VirnetX, Inc. against Apple based on U.S. Pat. No. 7,921,211.
Exhibit B1, File History of U.S. Pat. No. 7,418,504.
Exhibit B2, File History of U.S. Appl. No. 09/558,210.
Exhibit D-10, Gaspoz et al., "VPN on DCE: From Reference Configuration to Implementation," Bringing Telecommunication Services to the People—IS&N '95, Third International Conference on Intelligence in Broadband Services and Networks, Oct. 1995 Proceedings, Lecture Notes in Computer Science, vol. 998 (Springer, 1995).
Exhibit D-11, U.S. Pat. No. 6,269,099.
Exhibit D-11, U.S. Pat. No. 6,560,634.
Exhibit D-13, Pallen, "The World Wide Web," British Medical Journal, vol. 311 at 1554 (Dec. 1995).
Exhibit D-14, Rivest et al., "A Method for Obtaining Digital Signatures and Public-Key Cryptosystems," Communications of the ACM, 21:120-126 (Feb. 1978).
Exhibit D-15, U.S. Pat. No. 4,952,930.
Exhibit D-17, Pfaffenberger, Netscape Navigator 3.0: Surfing the Web and Exploring the Internet, Academic Press (1996).
Exhibit D-18, Gitter et al., "The DCE Security Service," Hewlett-Packard Journal, pp. 41-48 (Dec. 1995).
Exhibit D-6, U.S. Pat. No. 5,689,641.

(56) References Cited

OTHER PUBLICATIONS

Exhibit D-9, Lawton, "New Top-Level Domains Promise Descriptive Names," Sunworld Online, 1996.
Exhibit E-1, Catalog Listing by IBM for RS/6000 Redbooks Collection which includes a Link to the Lendenmann reference. The link to the Lendenmann reference was archived at archive.org on Dec. 7, 1998 and retrieved by the Wayback Machine.
Exhibit E-10, An Archived Version of the Lawton reference archived at archive.org on Feb. 19, 1999 and retrieved by the Wayback Machine.
Exhibit E-11, Abstracts of the Proceedings of the Symposium on Network and Distributed System Security, 1996, Archived at archive.org on Apr. 10, 1997, and retrieved by the Wayback Machine.
Exhibit E-12, 1996 Symposium on Network and Distributed System Security, Website Archived by archive.org (Apr. 10, 1997), Retrieved by the Wayback Machine at http://web.archive.org/web/19970410114853/http://computer.org/cspress/catalog/proc9.htm.
Exhibit E-13, Search Results for ISBN 0-12-553153-2 (Pfaffenberger) from www.isbnsearch.org.
Exhibit F-1, Claim Charts applying Lendenmann as a Primary Reference to the '504 Patent.
Exhibit F-2, Claim Charts applying Aziz as a Primary Reference to the '504 Patent.
Exhibit F-3, Claim Charts applying Kiuchi and Pfaffenberger as Primary References to the '504 Patent.
Exhibit E-2, First Page of U.S. Pat. No. 5,913,217 published Jun. 15, 1999 and citing a portion of the Lendenmann reference as a prior art reference.
Exhibit E-3, Request for Comments 2026, "The Internet Standards Process—Revision 3," Oct. 1996.
Exhibit E-4, First Page of U.S. Pat. No. 5,463,735, published Oct. 31, 1995 and citing RFC 793 as a prior art Reference.
Exhibit E-5, Catalog listing from Boston University Digital Common Website, listing the Martin reference with an issue date of Feb. 21, 1998.
Exhibit E-6, Technical Reports Archive Listing from Boston University Computer Science Department which includes a link to the Martin paper. The link to the Martin paper was archived at archive.org on Jan. 22, 1998 and Retrieved by the Wayback Machine.
Exhibit E-7, Boston University Computer Science Department Technical Reports Instructions, available at: http://www.cs.bu.edu/techreports/INTRUCTIONS.
Exhibit E-8, U. Möller, "Implementation eines Anonymisierungsverfahrens für WWW-Zugriffe," Diplomarbeit, Universität Hamburg (Jul. 16, 1999), citing to Martin at p. 77.
Exhibit E-9, First page of U.S. Pat. No. 5,737,423, published Apr. 7, 1998 and citing Schneier as Prior Art Reference.
Request for Inter Partes ReExamination; U.S. Pat. No. 7,418,504.
Request for Inter Partes ReExamination Transmittal Form; U.S. Pat. No. 7,418,504.
Exhibit C1, Claim Chart—U.S. Pat. 7,921,211 relative to Solana, alone and in conjunction with RFC 920, Reed and Beser.
Exhibit C6, Claim Chart—U.S. Pat. No. 7,921,211 relative to Beser, Alone and in conjunction with RFC 920, RFC 2401, and Reed.
Exhibit C7, Claim Chart—U.S. Pat. No. 7,921,211 relative to RFC 2230, alone and in conjunction with RFC 2401, Reed, and Beser.
Exhibit 237, U.S. '072 vs. Claims of the '135 Patent.
Petition in Opposition to Patent Owner's Petition to Vacate Inter Partes Reexamination.
Exhibit B1, File History of U.S. Pat. No. 7,921,211.
Exhibit B2, File History of U.S.Appl. No. 10/714,849.
Exhibit B4, *VirnetX, Inc. v. Microsoft Corp.*, Case No. 6:07-cv-80, Memorandum Opinion on Claim Construction (E.D. Tex. Jul. 30, 2009).
Exhibit D15, U.S. Pat. No. 4,952,930.
Exhibit F1, Claim Charts Applying Lendenmann as a Primary Reference to the '211 Patent.
Exhibit F2, Claim Charts Applying Aziz as a Primary Reference to the '211 Patent.
Exhibit F3, Claim Charts Applying Kiuchi and Pfaffenberger as Primary References to the '211 Patent.
Exhibit 2, Letter and attachment from Ramzi Khazen, Counsel for VirnetX, to Dnnitriy Kheyfits, Counsel for Cisco Systems (Jun. 23, 2011).
Exhibit P, Malkin, "Dial-In Virtual Private Networks Using Layer 3 Tunneling".
Exhibit Q, Ortiz, "Virtual Private Networks: Leveraging the Internet".
Exhibit R, Keromytix, "Creating Efficient Fail-Stop Cryptographic Protocols".
Transcript of Markman Hearing Dated Jan. 5, 2012.
Declaration of John P. J. Kelly, Ph.D.
Defendants' Responsive Claim Construction Brief; Exhibits A-P and 1-7.
Joint Claim Construction and Prehearing Statement Dated Nov. 8, 2011.
Exhibit A: Agreed Upon Terms Dated Nov. 8, 2011.
Exhibit B: Disputed Claim Terms Dated Nov. 8, 2011.
Exhibit C: VirnetX's Proposed Construction of Claim Terms and Supporting Evidence Dated Nov. 8, 2011.
Exhibit D: Defendant's Intrinsic and Extrinsic Support Dated Nov. 8, 2011.
Declaration of Austin Curry in Support of VirntX Inc.'s Opening Claim Construction Brief.
Declaration of Mark T. Jones Opening Claims Construction Brief.
VirnetX Opening Claim Construction Brief.
VirnetX Reply Claim Construction Brief.
European Search Report from corresponding EP Application No. 11005789.
European Search Report from corresponding EP Application No. 11005792.
ITU-T Recommendation H.323, "Infrastructure of Audiovisual Services—Systems and Terminal Equipment for Audiovisual Services. Packet-Based Multimedia Communications System," International Telecommunications Union, pp. 1-128, Feb. 1998.
ITU-T Recommendation H.225.0, "Infrastructure of Audiovisual Services—Transmission Multiplexing and Synchronization. Call Signaling Protocols and Media Stream Packetization for Packet-Based Multimedia Communication systems," International Telecommunication Union, pp. 1-155, Feb. 1998.
ItU-T Recommendation H.235, "Infrastructure of Audiovisual Services—Systems Aspects. Security and Encryption for H-Series (H.323 and other H.245-based) Multimedia Terminals," International Telecommunication Union, pp. 1-39, Feb. 1998.
ITU-T Recommendation H.245, "Infrastructure of Audiovisual Services—Communication Procedures. Control Protocol for Multimedia Communication," International Telecommunication Union, pp. 1-280, Feb. 1998.
Request for Inter Partes Reexamination Under 35 U.S.C. § 311 (U.S. Pat. No. 8,051,181).
Transmittal Letters (U.S. Pat. No. 8,051,181).
Exhibit X5, Droms, R., RFC 2131, "Dynamic Host Configuration Protocol," 1987.
Hopen Transcript dated Apr. 11, 2012.
VirnetX Claim Construction Opinion.
Declaration of Angelos D. Keromytic, Ph.D.
Declaration of Dr. Robert Dunham Short III.
Exhibit A-1, Verdict Form from *VirnetX, Inc. v. Microsoft Corp.*, No. 6:07-CV-80 (E.D. Tex.).
Exhibit A-3, Declaration of Jason Nieh, Ph.D. (Control No. 95/001,269).
Exhibit A-4, Redacted Deposition of Chris Hopen from *VirnetX, Inc. v. Cisco Systems, Inc.*, No. 6:07-CV 417 (E.D. Tex. Apr. 11, 2012.
Exhibit B-1, Excerpt from Deposition of Defense FY 2000/2001 Biennial Budget Estimates, Feb. 1999.
Exhibit B-2, Collection of Reports and Presentations on DARPA Projects.
Exhibit B-3, Maryann Lawlor, Transient Partnerships Stretch Security Policy Management, Signal Magazine (Sep. 2001) http://www.afcea.org/signal/articles/anmviewer.asp?a=494&print=yes.

(56) References Cited

OTHER PUBLICATIONS

Joel Snyder, Living in Your Own Private Idaho, Network World (Jan. 28, 1998) http://www.networkworld.com/intranet/0126review.html.
Time Greene, CEO's Chew the VPN Fat, CNN.com (Jun. 17, 1999), http://www.cnn.com/TECH/computing/9906/17/vpnfat.ent.idg/index.html?iref=allsearch.
Peter Alexander Invalidity Report.
Defendants' Second Supplemental Joint Invalidity Contentions.
Exhibit 118A, Altiga VPN System vs. Claims of the '135 Patent.
Exhibit 119A, Altiga VPN System vs. Claims of the '151 Patent.
Exhibit 120A, Altiga VPN System vs. Claims of the '180 Patent.
Exhibit 121A, Altiga VPN System vs. Claims of the '211 Patent.
Exhibit 122A, Altiga VPN System vs. Claims of the '504 Patent.
Exhibit 123A, Altiga VPN System vs. Claims of the '759 Patent.
Exhibit 12A, SSL 3.0 vs. Claims of the '135 Patent.
Exhibit 13A, SSL 3.0 vs. Claims of the '504 Patent.
Exhibit 14A, SSL 3.0 vs. Claims of the '211 Patent.
Exhibit 228A, Understanding OSF DCE 1. for AIX and OS/2 (APP_VX0556531-804) vs. Claims of the '135 Patent.
Exhibit 229A, Understanding OSF DCE 1.1 for AIX and OS/2 (APP_VX0556531-804) vs. Claims of the '151 Patent.
Exhibit 230A, Understanding OSF DCE 1.1 for AIX and OS/2 (APP_VX0556531-804) vs. Claims of the '180 Patent.
Exhibit 231A, Understanding OSF DCE 1.1 for AIX and OS/2 (APP_VX0556531-804) vs. Claims of the '211 Patent.
Exhibit 232A, Understanding OSF DCE 1.1 for AIX and OS/2 (APP_VX0556531-804) vs. Claims of the '504 Patent.
Exhibit 233A, Understanding OSF DCE 1.1 for AIX and OS/2 (APP_VX0556531-804) vs. Claims of the '759 Patent.
Exhibit 255, Schulzrinne vs. Claims of the '135 Patent.
Exhibit 256, Schulzrinne vs. Claims of the '504 Patent.
Exhibit 257, Schulzrinne vs. Claims of the '211 Patent.
Exhibit 258, Schulzrinne vs. Claims of the '151 Patent.
Exhibit 259, Schulzrinne vs. Claims of the '180 Patent.
Exhibit 260, Schulzrinne vs. Claims of the 'Patent.
Exhibit 261, SSL 3.0 vs. Claims of the '151 Patent.
Exhibit 262, SSL 3.0 vs. Claims of the '759 Patent.
Exhibit 263,Wang vs. Claims of the '135 Patent.
Wang vs. Claims of the '504 Patent.
Wang vs. Claims of the '211 Patent.
Exhibit 1, Alexander CV.pdf.
Exhibit 2, Materials Considered by Peter Alexander.
Exhibit 3, Cross Reference Chart.
Exhibit 4, RFC 2543 vs. Claims of the '135 Patent.
Exhibit 6, RFC 2543 vs. Claims of the '211 Patent.
Exhibit 7, The Schulzrinne Presentation vs. Claims of the '135 Patent.
Exhibit 8, The Schulzrinne Presentation vs. Claims of the '504 Patent.
Exhibit 9, The Schulzrinne Presentation vs. Claims of the '211 Patent.
Exhibit 10, The Schulzrinne Presentation vs. Claims of the '151 Patent.
Exhibit 11, The Schulzrinne Presentation vs. Claims of the '180 Patent.
Exhibit 12, The Schulzrinne Presentation vs. Claims of the '759 Patent.
Exhibit 13, SSL 3.0 vs. Claims of the '135 Patent.
Exhibit 15, SSL 3.0 vs. Claims of the '211 Patent.
Exhibit 16, SSL 3.0 vs. Claims of the '151 Patent.
Exhibit 17, SSL 3.0 vs. Claims of the '759 Patent.
Exhibit 18, Kiuchi vs. Claims of the '135 Patent.
Exhibit 19, Kiuchi vs. Claims of the '504 Patent.
Exhibit 20, Kiuchi vs. Claims of the '211 Patent.
Exhibit 21, Kiuchi vs. Claims of the '151 Patent.
Exhibit 22, Kiuchi vs. Claims of the '180 Patent.
Exhibit 23, Kiuchi vs. Claims of the '759 Patent.
Exhibit 24, U.S. Pat. No. 6,119,234 (hereinafter "Aziz") and RFC 2401 vs. Claims of the '135 Patent.
Exhibit 25, U.S. Pat. No. 6,119,234 (hereinafter "Aziz") and RFC 2401 vs. Claims of the '504 Patent.
Exhibit 26, U.S. Pat. No. 6,119,234 (hereinafter "Aziz") and RFC 2401 vs. Claims of the '211 Patent.
Exhibit 27, U.S. Pat. No. 6,119,234 (hereinafter "Aziz") and RFC 2401 vs. Claims of the '151 Patent.
Exhibit 28.
Exhibit 29, The Altiga System vs. Claims of the '135 Patent.
Exhibit 30, The Altiga System vs. Claims of the '504 Patent.
Exhibit 31, The Altiga System vs. Claims of the '211 Patent.
Exhibit 32, The Altiga System vs. Claims of the '759 Patent.
Exhibit 33, U.S. Pat. No. 6,496,867 ("Beser") and RFC and 2401[2] vs. Claims of the '135 Patent.
Exhibit 34, U.S. Pat. No. 6,496,867 ("Beser") and RFC 2401[2] vs. Claims of the '504 Patent.
Exhibit 35, U.S. Pat. No. 6,496,867 ("Beser") and RFC 2401 vs. Claims of the '211 Patent.
Exhibit 36, U.S. Pat. No. 6,496,867 ("Beser") and RFC 2401 vs. Claims of the '151 Patent.
Exhibit 37, U.S. Pat. No. 6,496,867 ("Beser") and RFC 2401 vs. Claims of the '180 Patent.
Exhibit 38, Kent vs. Claims of the '759 Patent.
Exhibit 39, RFC 2538, Storing Certificates in the Domain Name System (DNS) vs. Claims of the '504 Patent.
Exhibit 40, RFC 2538, Storing Certificates in the Domain Name System (DNS) vs. Claims of the '211 Patent.
Exhibit 41, Aziz ('646) vs. Claims of the '759 Patent.
Exhibit 42, The PIX Firewall vs. Claims of the '759 Patent.
Exhibit A-1, Kiuchi vs. Claims of the '135 Patent.
Exhibit B-1, Kiuchi vs. Claims of the '211 Patent.
Exhibit C-1, Kiuchi vs. Claims of the '504 Patent.
Exhibit D, Materials Considered.
Exhibit E, Expert Report of Stuart G. Stubblebine, Ph.D.
Exhibit F, Expert Report of Stuart G. Stubblebine, Ph.D.
Exhibit G, Opening Expert Report of Dr. Stuart Stubblebine Regarding Invalidity of the '135, '211, and '504 Patents.
Cisco Comments and Petition for Reexamination 95/001,679 dated Jun. 14, 2012.
Exhibit S, Declaration of Nathaniel Polish, Ph.D.
Exhibit R, Excerpts from Patent Owner & Plaintiff VirnetX Inc.'s First Amended P.R. 3-1 and 3-2 Disclosure of Asserted Claims and Infringement Contentions.
Third Party Requester Comments dated Jun. 25, 2012—After Non Final Office Action (U.S. Appl. No. 95/001,788).
Reexam Affidavit/Declaration/Exhibit Filed by 3rd Party on Jun. 25, 2012 (95/001,788).
Request for Inter Partes Reexamination of U.S. Pat. No. 7,490,151 filed on Jul. 25, 2011, Requester Apple Inc.—Exhibit E3: Declaration of James Chester, 13 pages (2011).
Request for Inter Partes Reexamination of U.S. Pat. No. 7,490,151 filed on Jul. 25, 2011, Requester Apple Inc.—Exhibit A: Curriculum Vitae of James Chester, 4 pages.
Request for Inter Partes Reexamination of U.S. Pat. No. 7,490,151 filed on Jul. 25, 2011, Requester Apple Inc.—Exhibit E1: Declaration of Chris Hopen, 5 pages.
Request for Inter Partes Reexamination of U.S. Pat. No. 7,490,151 filed on Jul. 25, 2011, Requester Apple Inc.—Exhibit E2: Declaration of Michael Fratto, 51 pages (2011).
Request for Inter Partes Reexamination of U.S. Pat. No. 7,490,151 filed on Jul. 25, 2011, Requester Apple Inc.—Exhibit E: to Michael Fratto's Declaration, Fratto, "Aventail VPN 2.5: Not Your Father's Socks," Network Computing, vol. 8, No. 18 (Oct. 1, 1997), 3 pages.
Request for Inter Partes Reexamination of U.S. Pat. No. 7,490,151 filed on Jul. 25, 2011, Requester Apple Inc.—Exhibit F: to Michael Fratto's Declaration, Fratto, "Footloose and Fancy Free with Three Socks 5-Based Proxy Servers," Network Computing, vol. 9, Issue 11, 5 pages (Jun. 15, 1998).
Request for Inter Partes Reexamination of U.S. Pat. No. 7,490,151 filed on Jul. 25, 2011, Requester Apple Inc.—Exhibit H: to Michael Fratto's Declaration, PR Newswire, "Aventail Ships Directory-enabled Extranet Solution; Aventail Extranet Center v3.1 Available at www.aventail.com." (Aug. 9, 1998), 4 pages.

(56) References Cited

OTHER PUBLICATIONS

Request for Inter Partes Reexamination of U.S. Pat. No. 7,490,151 filed on Jul. 25, 2011, Requester Apple Inc.—Exhibit I: to Michael Fratto's Declaration, "Intranet Applications: Briefs," Network World, at p. 55 (Oct. 19, 1998), 2 pages.
Request for Inter Partes Reexamination of U.S. Pat. No. 6,502,135 filed on Jul. 11, 2011, Requester Apple Inc.—Exhibit E1: Declaration of Chris Hopen, 5 pages (2011).
Request for Inter Partes Reexamination of U.S. Pat. No. 6,502,135 filed on Jul. 11, 2011, Requester Apple Inc.—Exhibit E2: Declaration of Michael Fratto, 50 pages.
Request for Inter Partes Reexamination of U.S. Pat. No. 6,502,135 filed on Jul. 11, 2011, Requester Apple Inc.—Exhibit E3: Declaration of James Chester, 13 pages.
Request for Inter Partes Reexamination of U.S. Pat. No. 7,921,211 filed on Feb. 16, 2011, Requester Cisco Systems.,—Original Petition to Request Inter Partes Reexamination, 40 pages.
Request for Inter Partes Reexamination of U.S. Pat. No. 8,051,181 filed on Mar. 28, 2012, Requester Apple Inc.—Exhibit C2: Claim Chart—'181 Relative to Mattaway, 9 pages.
Request for Inter Partes Reexamination of U.S. Pat. No. 8,051,181 filed on Mar. 28, 2012, Requester Apple Inc.—Exhibit C6: Claim Chart—'181 Relative to Johnson, 10 pages.
Request for Inter Partes Reexamination of U.S. Pat. No. 8,051,181 filed on Mar. 28, 2012, Requester Apple Inc.—Exhibit C1: Claim Chart '181 Relative to Beser, 9 pages.
Request for Inter Partes Reexamination of U.S. Pat. No. 8,051,181 filed on Mar. 28, 2012, Requester Apple Inc.—Exhibit C3: Claim Chart—'181 Relative to Lendenmann, 9 pages.
Request for Inter Partes Reexamination of U.S. Pat. No. 8,051,181 filed on Mar. 28, 2012, Requester Apple Inc.—Exhibit C4: Claim Chart—'181 Relative to Provino, 9 pages.
Request for Inter Partes Reexamination of U.S. Pat. No. 8,051,181 filed on Mar. 28, 2012, Requester Apple Inc.—Exhibit C5: Claim Chart—'181 Relative to H.323, 9 pages.
IPR2013-00348; Inter Partes Review of U.S. Pat. No. 6,502,135 filed on Jun. 12, 2013, Petitioner Apple Inc.,—Petition for Inter Partes Review, 67 pages.
IPR2013-00348; Inter Partes Review of U.S. Pat. No. 6,502,135 filed on Jun. 12, 2013, Petitioner Apple Inc.,—Exhibit 1003: Declaration of Michael Fratto Regarding U.S. Pat. No. 6,502,135, 195 pages (2013).
IPR2013-00348; Inter Partes Review of U.S. Pat. No. 6,502,135 filed on Jun. 12, 2013, Petitioner Apple Inc.,—Exhibit 1004: Fratto CV, 3 pages.
IPR2013-00348; Inter Partes Review of U.S. Pat. No. 6,502,135 filed on Jun. 12, 2013, Petitioner Apple Inc.,—Exhibit 1005: Declaration of Chris Hopen Regarding Prior Art and U.S. Pat. No. 6,502,135, 25 pages (2013).
IPR2013-00348; Inter Partes Review of U.S. Pat. No. 6,502,135 filed on Jun. 12, 2013, Petitioner Apple Inc.,—Exhibit 1006: Declaration of James Chester, 26 pages (2013).
IPR2013-00348; Inter Partes Review of U.S. Pat. No. 6,502,135 filed on Jun. 12, 2013, Petitioner Apple Inc.,—Exhibit 1019: Tittel, E., et al., Windows NT Server 4 for Dummies, Ch. 12, pp. 191-210 (1999).
IPR2013-00348; Inter Partes Review of U.S. Pat. No. 6,502,135 filed on Jun. 12, 2013, Petitioner Apple Inc.,—Exhibit 1020: Microsoft Windows 98 ResourceKit, 114 pages (1998).
IPR2013-00348; Inter Partes Review of U.S. Pat. No. 6,502,135 filed on Jun. 12, 2013, Petitioner Apple Inc.,—Exhibit 1024: Ole, The Internet Protocol Journal, 1(2):1-48 (1998).
IPR2013-00348; Inter Partes Review of U.S. Pat. No. 6,502,135 filed on Jun. 12, 2013, Petitioner Apple Inc.,—Exhibit 1029: Rescorla, E., et al., RFC 2660, "The Secure HyperText Transfer Protocol," 45 pages (Aug. 1999).
IPR2013-00348; Inter Partes Review of U.S. Pat. No. 6,502,135 filed on Jun. 12, 2013, Petitioner Apple Inc.,—Exhibit 1030: Lloyd, PPP Authentication Protocols, 15 pages (1992).
IPR2013-00348; Inter Partes Review of U.S. Pat. No. 6,502,135 filed on Jun. 12, 2013, Petitioner Apple Inc.,—Exhibit 1032: Dierks, "The TLS Protocol Version 1.0," 75 pages (1999).
IPR2013-00348; Inter Partes Review of U.S. Pat. No. 6,502,135 filed on Jun. 12, 2013, Petitioner Apple Inc.,—Exhibit 1040: Adams, C., et al., RFC 2510, "Internet X.509 Public Key Infrastructure Certificate Management Protocols," 68 pages (Mar. 1999).
IPR2013-00348; Inter Partes Review of U.S. Pat. No. 6,502,135 filed on Jun. 12, 2013, Petitioner Apple Inc.,—Exhibit 1042: Record of Publication Ex:1015 on IEEE, 2 pages (1996).
IPR2013-00348; Inter Partes Review of U.S. Pat. No. 6,502,135 filed on Jun. 12, 2013, Petitioner Apple Inc.,—Exhibit 1043: Record of Publication of Reed (Ex. 1015) on ACM Digital Library, 2 pages (1996).
IPR2013-00348; Inter Partes Review of U.S. Pat. No. 6,502,135 filed on Jun. 12, 2013, Petitioner Apple Inc.,—Exhibit 1044: Record of Publication Ex:1015 on $12^{th}$ ACSAC, 4 pages (1996).
IPR2013-00348; Inter Partes Review of U.S. Pat. No. 6,502,135 filed on Jun. 12, 2013, Petitioner Apple Inc.,—Exhibit 1045: Memorandum Opinion dated Jul. 30, 2009, 35 pages.
IPR2013-00348; Inter Partes Review of U.S. Pat. No. 6,502,135 filed on Jun. 12, 2013, Petitioner Apple Inc.,—Exhibit 1047: Defendant's Responsive Claim Construction Brief, 37 pages (2011).
IPR2013-00348; Inter Partes Review of U.S. Pat. No. 6,502,135 filed on Jun. 12, 2013, Petitioner Apple Inc.,—Exhibit 1049: Memorandum Opinion and Order dated Apr. 25, 2012, 31 pages.
IPR2013-00348; Inter Partes Review of U.S. Pat. No. 6,502,135 filed on Jun. 12, 2013, Petitioner Apple Inc.,—Exhibit 1051: Nieh Declaration, 8 pages (2010).
IPR2013-00348; Inter Partes Review of U.S. Pat. No. 6,502,135 filed on Jun. 12, 2013, Petitioner Apple Inc.,—Exhibit 1057: CV Chris Hopen, 1 page.
IPR2013-00348; Inter Partes Review of U.S. Pat. No. 6,502,135 filed on Jun. 12, 2013, Petitioner Apple Inc.,—Exhibit 1061: Network World Article, 1 page (1998).
IPR2013-00348; Inter Partes Review of U.S. Pat. No. 6,502,135 filed on Jun. 12, 2013, Petitioner Apple Inc.,—Exhibit 1063: Malkin, G., RFC 2453, "RIP Version 2," 37 pages (Nov. 1998).
IPR2013-00348; Inter Partes Review of U.S. Pat. No. 6,502,135 filed on Jun. 12, 2013, Petitioner Apple Inc.,—Exhibit 1064:, J Moy, OSPF Version 2, 244 pages, (1998).
IPR2013-00349; Inter Partes Review of U.S. Pat. No. 6,502,135 filed on Jun. 12, 2013, Petitioner Apple Inc.,—Petition for Inter Partes Review, 73 pages.
IPR2013-00349 Inter Partes Review of U.S. Pat. No. 6,502,135 filed on Jun. 12, 2013, Petitioner Apple Inc.,—Exhibit 1003: Declaration of Michael Fratto Regarding U.S. Pat. No. 6,502,135, 256 pages (2013).
IPR2013-00349 Inter Partes Review of U.S. Pat. No. 6,502,135 filed on Jun. 12, 2013, Petitioner Apple Inc.,—Exhibit 1005: Declaration of Chris Hopen Regarding Prior Art and U.S. Pat. No. 6,502,135, 25 pages (2013).
IPR2013-00349 Inter Partes Review of U.S. Pat. No. 6,502,135 filed on Jun. 12, 2013, Petitioner Apple Inc.,—Exhibit 1006: Declaration of James Chester, 26 pages (2013).
IPR2013-00354; Inter Partes Review of U.S. Pat. No. 7,490,151 filed on Jun. 17, 2013, Petitioner Apple Inc.,—Petition for Inter Partes Review, 73 pages.
IPR2013-00354; Inter Partes Review of U.S. Pat. No. 7,490,151 filed on Jun. 14, 2013, Petitioner Apple Inc.,—Exhibit 1003: Declaration of Michael Fratto Regarding U.S. Pat. No. 7,490,151, 322 pages (2013).
IPR2013-00354; Inter Partes Review of U.S. Pat. No. 7,490,151 filed on Jun. 14, 2013, Petitioner Apple Inc.,—Exhibit 1005: Declaration of Chris Hopen Regarding Prior Art and U.S. Pat. No. 7,490,151, 23 pages (2013).
IPR2013-00354; Inter Partes Review of U.S. Pat. No. 7,490,151 filed on Jun. 14, 2013, Petitioner Apple Inc.,—Exhibit 1006: Declaration of James Chester, 26 pages (2013).
IPR2013-00354; Inter Partes Review of U.S. Pat. No. 7,490,151 filed on Jun. 14, 2013, Petitioner Apple Inc.,—Exhibit 1048: VirnetX, Inc., Inc. vs. Cisco Systems, Inc., et al., VirnetX Reply Claim Construction Brief of Dec. 19, 2011, 13 pages.

(56) References Cited

OTHER PUBLICATIONS

IPR2013-00375; Inter Partes Review of U.S. Pat. No. 6,502,135 filed on Jun. 23, 2013, Petitioner New Bay Capital, LLC.,—Petition for Inter Partes Review of U.S. Pat. No. 6,502,135.
IPR2013-00375; Inter Partes Review of U.S. Pat. No. 6,502,135 filed on Jun. 23, 2013, Petitioner New Bay Capital, LLC.,—Exhibit 1002: The 1996 Symposium on Network and Distributed Systems Security (SNDSS'96), Hypermedia Proceedings, Slides, and Summary Report, 57 pages (1996).
IPR2013-00375; Inter Partes Review of U.S. Pat. No. 6,502,135 filed on Jun. 23, 2013, Petitioner New Bay Capital, LLC.,—Exhibit 1005: Windows Sockets, An Open Interface for Network Programming under Microsoft Windows, Version 1.1, 124 pages (1993).
IPR2013-00375; Inter Partes Review of U.S. Pat. No. 6,502,135 filed on Jun. 23, 2013, Petitioner New Bay Capital, LLC.,—Exhibit 1006: eCos Reference Manual, Chapter 38. TCP/IP Library Reference, downloaded from Http://www.ecos.sourceware.org/docs, 3 pages (Mar. 13, 1997).
IPR2013-00375; Inter Partes Review of U.S. Pat. No. 6,502,135 filed on Jun. 23, 2013, Petitioner New Bay Capital, LLC.,—Exhibit 1009: Declaration of Russell Housley Regarding U.S. Pat. No. 6,502,135, 105 pages (Jun. 22, 2003).
IPR2013-00375; Inter Partes Review of U.S. Pat. No. 6,502,135 filed on Jun. 23, 2013, Petitioner New Bay Capital, LLC.,—Exhibit 1012: *VirnetX Inc.*, vs. *Apple*; Transcript of Pretrial Conference on Oct. 18, 2012, 216 pages.
IPR2013-00375; Inter Partes Review of U.S. Pat. No. 6,502,135 filed on Jun. 23, 2013, Petitioner New Bay Capital, LLC.,—Exhibit 1013: *VirnetX, Inc.*, vs. *Apple*: Trial Transcript (Morning Session) of Oct. 31, 2012, 128 pages.
IPR2013-00375; Inter Partes Review of U.S. Pat. No. 6,502,135 filed on Jun. 23, 2013, Petitioner New Bay Capital, LLC.,—Exhibit 1014: Trial Transcript (Morning Session) of Nov. 1, 2012, 146 pages.
IPR2013-00375; Inter Partes Review of U.S. Pat. No. 6,502,135 filed on Jun. 23, 2013, Petitioner New Bay Capital, LLC.,—Exhibit 1015: *VirnetX Inc.*, vs. *Apple*; Memorandum Opinion and Order dated Feb. 26, 2013, 47 pages.
IPR2013-00375; Inter Partes Review of U.S. Pat. No. 6,502,135 filed on Jun. 23, 2013, Petitioner New Bay Capital, LLC.,—Exhibit 1018: Virnetx Reply Claim Construction, 13 pages (2011).
IPR2013-00376; Inter Partes Review of U.S. Pat. No. 7,490,151 filed on Jun. 23, 2013, Petitioner New Bay Capital, LLC.—Petition for Inter Partes Review of U.S. Pat. No. 7,490,151, 68 pages.
IPR2013-00378; Inter Partes Review of U.S. Pat. No. 7,921,211 filed on Jun. 23, 2013, Petitioner New Bay Capital, LLC.,—Petition for Inter Partes Review of U.S. Pat. No. 7,921,211.
IPR2013-00378; Inter Partes Review of U.S. Pat. No. 7,921,211 filed on Jun. 23, 2013, Petitioner New Bay Capital, LLC.,—Exhibit 1004: Declaration of Russell Housley Regarding U.S. Pat. No. 7,418,504, 98 pages (2013).
IPR2013-00378; Inter Partes Review of U.S. Pat. No. 7,921,211 filed on Jun. 23, 2013, Petitioner New Bay Capital, LLC.,—Exhibit 1009: *VirnetX, Inc.*, vs. *Mitel Networks Corp., et al.*, VirnetX Opening Claim Construction Brief, 28 pages (2012).
IPR2013-00378; Inter Partes Review of U.S. Pat. No. 7,921,211 filed on Jun. 23, 2013, Petitioner New Bay Capital, LLC.,—Exhibit 1010: The American Heritage Dictionary of the English Language, Third Edition, 4 pages (1996).
IPR2013-00393; Inter Partes Review of U.S. Pat. No. 7,418,504 filed on Jul. 1, 2013, Petitioner Apple Inc.,—Petition for Inter Partes Review of U.S. Pat. No. 7,418,504, 62 pages.
IPR2013-00393; Inter Partes Review of U.S. Pat. No. 7,418,504 filed on Jul. 1, 2013, Petitioner Apple Inc.,—Exhibit 1003: Declaration of Michael Fratto, 182 pages (2013).
IPR2013-00393; Inter Partes Review of U.S. Pat. No. 7,418,504 filed on Jul. 1, 2013, Petitioner Apple Inc.,—Exhibit 1005: Declaration of Chris Hopen, 25 pages (2013).
IPR2013-00393; Inter Partes Review of U.S. Pat. No. 7,418,504 filed on Jul. 1, 2013, Petitioner Apple Inc.,—Exhibit 1006: Declaration of James Chester, 26 pages (2013).
IPR2013-00393; Inter Partes Review of U.S. Pat. No. 7,418,504 filed on Jul. 1, 2013, Petitioner Apple Inc.,—Exhibit 1065: Yeager, Web Server Technology, 54 pages (1996).
IPR2013-00393; Inter Partes Review of U.S. Pat. No. 7,418,504 filed on Jul. 1, 2013, Petitioner Apple Inc.,—Exhibit 1066: Microsoft Internet Explorer 5 Resource Kit, 21 pages (1999).
IPR2013-00393; Inter Partes Review of U.S. Pat. No. 7,418,504 filed on Jul. 1, 2013, Petitioner Apple Inc.,—VirnetX Exhibit 2015: ITU-T Recommendation X.500, "Series Data Networks," 32 pages (2008).
IPR2013-00394; Inter Partes Review of U.S. Pat. No. 7,418,504 filed on Jul. 1, 2013, Petitioner Apple Inc.,—Petition for Inter Partes Review of U.S. Pat. No. 7,418,504, 73 pages.
IPR2013-00394; Inter Partes Review of U.S. Pat. No. 7,418,504 filed on Jul. 1, 2013, Petitioner Apple Inc.,—Exhibit 1003: Declaration of Michael Fratto, 203 pages (2013).
IPR2013-00394; Inter Partes Review of U.S. Pat. No. 7,418,504 filed on Jul. 1, 2013, Petitioner Apple Inc.,—Exhibit 1005: Hopen Declaration, 25 pages (2013).
IPR2013-00394; Inter Partes Review of U.S. Pat. No. 7,418,504 filed on Jul. 1, 2013, Petitioner Apple Inc.,—Exhibit 1006: Chester Declaration, 26 pages (2013).
IPR2013-00397; Inter Partes Review of U.S. Pat. No. 7,921,211 filed on Jul. 1, 2013, Petitioner Apple Inc.,—Petition for Inter Partes Review, 63 pages (2013).
IPR2013-00397; Inter Partes Review of U.S. Pat. No. 7,921,211 filed on Jul. 1, 2013, Petitioner Apple Inc.,—Exhibit 1003: Declaration of Michael Fratto, 184 pages (2013).
IPR2013-00397; Inter Partes Review of U.S. Pat. No. 7,921,211 filed on Jul. 1, 2013, Petitioner Apple Inc.,—Exhibit 1005: Declaration of Chris Hopen, 25 pages (2013).
IPR2013-00397; Inter Partes Review of U.S. Pat. No. 7,921,211 filed on Jul. 1, 2013, Petitioner Apple Inc.,—Exhibit 1006: Declaration of James Chester, 26 pages (2013).
IPR2013-00398; Inter Partes Review of U.S. Pat. No. 7,921,211 filed on Jul. 1, 2013, Petitioner Apple Inc., Petition for Inter Partes Review, 74 pages.
IPR2013-00398; Inter Partes Review of U.S. Pat. No. 7,921,211 filed on Jul. 1, 2013, Petitioner Apple Inc., Exhibit 1003: Declaration of Michael Fratto regarding U.S. Pat. No. 7,921,211, 204 pages (2013).
IPR2013-00398; Inter Partes Review of U.S. Pat. No. 7,921,211 filed on Jul. 1, 2013, Petitioner Apple Inc., Exhibit 1005: Declaration of Chris Hopen, 25 pages (2013).
IPR2013-00398; Inter Partes Review of U.S. Pat. No. 7,921,211 filed on Jul. 1, 2013, petitioner Apple Inc., Exhibit 1006: Declaration of James Chester, 26 pages (2013).
IPR2014-00176; Inter Partes Review of U.S. Pat. No. 7,418,504 filed on Nov. 20, 2013, Petitioner RPX Corporation; Petition for Inter Partes Review, 60 pages.
IPR2014-00176; Inter Partes Review of U.S. Pat. No. 7,418,504 filed on Nov. 20, 2013, Petitioner RPX Corporation; Exhibit 1003; Declaration of Michael Fratto Regarding U.S. Pat. No. 7,418,504, 242 pages (2013).
IPR2014-00176; Inter Partes Review of U.S. Pat. No. 7,418,504 filed on Nov. 20, 2013, Petitioner RPX Corporation; Exhibit 1005; Declaration of Christ Hopen, 25 pages (2013).
IPR2014-00176; Inter Partes Review of U.S. Pat. No. 7,418,504 filed on Nov. 20, 2013, Petitioner RPX Corporation; Exhibit 1006; Declaration of James Chester, 26 pages (2013).
IPR2014-00174; Inter Partes Review of U.S. Pat. No. 7,418,504 filed on Nov. 20, 2013, Petitioner RPX Corporation; Petition for Inter Partes Review, 60 pages.
IPR2014-00174; Inter Partes Review of U.S. Pat. No. 7,418,504 filed on Nov. 20, 2013, Petitioner RPX Corporation; Exhibit 1003: Declaration of Michael Fratto Regarding U.S. Pat. No. 7,921,211, 242 pages (2013).
IPR2014-00174; Inter Partes Review of U.S. Pat. No. 7,418,504 filed on Nov. 20, 2013, Petitioner RPX Corporation; Exhibit 1005: Declaration of Chris Hopen, 25 pages (2013).

(56) References Cited

OTHER PUBLICATIONS

IPR2014-00174; Inter Partes Review of U.S. Pat. No. 7,418,504 filed on Nov. 20, 2013, Petitioner RPX Corporation; Exhibit 1006: Declaration of James Chester, 26 pages (2013).
IPR2014-00172; Inter Partes Review of U.S. Pat. No. 6,502,135 filed on Nov. 20, 2013, Petitioner RPX Corporation; Petition for Inter Partes Review, 67 pages.
IPR2014-00172; Inter Partes Review of U.S. Pat. No. 6,502,135 filed on Nov. 20, 2013, Petitioner RPX Corporation; Exhibit 1003:Declaration of Michael Fratto Regarding U.S. Pat. No. 6,502,135, 196 pages (2013).
IPR2014-00172; Inter Partes Review of U.S. Pat. No. 6,502,135 filed on Nov. 20, 2013, Petitioner RPX Corporation; Exhibit 1005: Declaration of Chris Hopen Regarding Prior Art and U.S. Pat. No. 6,502,135, 25 pages (2013).
IPR2014-00172; Inter Partes Review of U.S. Pat. No. 6,502,135 filed on Nov. 20, 2013, Petitioner RPX Corporation; Exhibit 1006: Declaration of James Chester, 26 pages (2013).
IPR2014-00171; Inter Partes Review of U.S. Pat. No. 6,502,135 filed on Nov. 20, 2013, Petitioner RPX Corporation; Petition for Inter Partes Review, 73 pages.
IPR2014-00171; Inter Partes Review of U.S. Pat. No. 6,502,135 filed on Nov. 20, 2013, Petitioner RPX Corporation; Exhibit 1003:Declaration of Michael Fratto Regarding U.S. Pat. No. 6,502,135, 286 pages (2013).
IPR2014-00171; Inter Partes Review of U.S. Pat. No. 6,502,135 filed on Nov. 20, 2013, Petitioner RPX Corporation; Exhibit 1005: Declaration of Chris Hopen Regarding Prior Art and U.S. Pat. No. 6,502,135, 25 pages (2013).
IPR2014-00171; Inter Partes Review of U.S. Pat. No. 6,502,135 filed on Nov. 20, 2013, Petitioner RPX Corporation; Exhibit 1006: Declaration of James Chester, 26 pages (2013).
IPR2014-00173; Inter Partes Review of U.S. Pat. No. 7,490,151 filed on Nov. 20, 2013, Petitioner RPX Corporation; Petition for Inter Partes Review, 72 pages.
IPR2014-00173; Inter Partes Review of U.S. Pat. No. 7,490,151 filed on Nov. 20, 2013, Petitioner RPX Corporation; Exhibit 1003:Declaration of Michael Fratto Regarding U.S. Pat. No. 6,502,135, 352 pages (2013).
IPR2014-00173; Inter Partes Review of U.S. Pat. No. 7,490,151 filed on Nov. 20, 2013, Petitioner RPX Corporation; Exhibit 1005: Declaration of Chris Hopen Regarding Prior Art and U.S. Pat. No. 7,490,151, 23 pages (2013).
IPR2014-00173; Inter Partes Review of U.S. Pat. No. 7,490,151 filed on Nov. 20, 2013, Petitioner RPX Corporation; Exhibit 1006: Declaration of James Chester, 26 pages (2013).
IPR2014-00175; Inter Partes Review of U.S. Pat. No. 7,921,211 filed on Nov. 20, 2013, Petitioner RPX Corporation; Petition for Inter Partes Review, 66 pages.
IPR2014-00175; Inter Partes Review of U.S. Pat. No. 7,921,211 filed on Nov. 20, 2013, Petitioner RPX Corporation; Exhibit 1003:Declaration of Michael Fratto Regarding U.S. Pat. No. 6,502,135, 209 pages (2013).
IPR2014-00175; Inter Partes Review of U.S. Pat. No. 7,921,211 filed on Nov. 20, 2013, Petitioner RPX Corporation; Exhibit 1005: Declaration of Chris Hopen Regarding Prior Art and U.S. Pat. No. 7,490,151, 25 pages (2013).
IPR2014-00175; Inter Partes Review of U.S. Pat. No. 7,921,211 filed on Nov. 20, 2013, Petitioner RPX Corporation; Exhibit 1006: Declaration of James Chester, 26 pages (2013).
IPR2014-00177; Inter Partes Review of U.S. Pat. No. 7,418,504 filed on Nov. 20, 2013, Petitioner RPX Corporation; Petition for Inter Partes Review, 63 pages.
IPR2014-00177; Inter Partes Review of U.S. Pat. No. 7,418,504 filed on Nov. 20, 2013, Petitioner RPX Corporation; Exhibit 1003:Declaration of Michael Fratto Regarding U.S. Pat. No. 6,502,135, 208 pages (2013).
IPR2014-00177; Inter Partes Review of U.S. Pat. No. 7,418,504 filed on Nov. 20, 2013, Apple Inc.; Exhibit 1005: Declaration of Chris Hopen Regarding Prior Art and U.S. Pat. No. 7,490,151, 25 pages (2013).
IPR2014-00177; Inter Partes Review of U.S. Pat. No. 7,418,504 filed on Nov. 20, 2013, Apple Inc.; Exhibit 1006: Declaration of James Chester, 26 pages (2013).
IPR2014-00237; Inter Partes Review of U.S. Pat. No. 8,504,697 filed on Nov. 20, 2013, Apple Inc.; Petition for Inter Partes Review, 72 pages.
IPR2014-00237; Inter Partes Review of U.S. Pat. No. 8,504,697 filed on Nov. 20, 2013, Apple Inc.; Exhibit 1003: Declaration of Michael Fratto Regarding U.S. Pat. No. 8,504,697, 201 pages.
IPR2014-00237; Inter Partes Review of U.S. Pat. No. 8,504,697 filed on Nov. 20, 2013, Apple Inc.; Exhibit 1015: Wedlund et al., "Mobility Support Using SIP,"pp. 76-82 (1999).
IPR2014-00237; Inter Partes Review of U.S. Pat. No. 8,504,697 filed on Nov. 20, 2013, Apple Inc; Exhibit 1013: Schulzrinne et al., A Transport Protocol for Real-Time Applications, RFC 1889, 75 pages (1996).
IPR2014-00237; Inter Partes Review of U.S. Pat. No. 8,504,697 filed on Nov. 20, 2013, Apple Inc; Exhibit 1014: Handley et al., Session Description Protocol, RFC 2327,42 pages (1998).
IPR2014-00237; Inter Partes Review of U.S. Pat. No. 8,504,697 filed on Nov. 20, 2013, Apple Inc; Exhibit 1066: WAP Architecture Version 30, 20 pages (1998).
IPR2014-00237; Inter Partes Review of U.S. Pat. No. 8,504,697 filed on Nov. 20, 2013, Apple Inc; Exhibit 1067: World Wide Web Consortium and Wirelss Application Protocol Forum Establish Formal Liaison Relationship, 3 pages (1999).
IPR2014-00237; Inter Partes Review of U.S. Pat. No. 8,504,697 filed on Nov. 20, 2013, Apple Inc; Exhibit 1068: Data Over Cable Interface Specifications, 189 pages (1997).
IPR2014-00237; Inter Partes Review of U.S. Pat. No. 8,504,697 filed on Nov. 20, 2013, Apple Inc; Exhibit 1069: Nikolich, Cable Modems Deliver Fast Net Access, LexisNexis, 2 pages (1999).
IPR2014-00237; Inter Partes Review of U.S. Pat. No. 8,504,697 filed on Nov. 20, 2013, Apple Inc; Exhibit 1070: Duffy, Cabletron Enters Cable Modem Fray, LexisNexis, 2 pages (1998).
IPR2014-00237; Inter Partes Review of U.S. Pat. No. 8,504,697 filed on Nov. 20, 2013, Apple Inc; Exhibit 1071: How it Works; Cable Modems, 2 pages (1999).
IPR2014-00237; Inter Partes Review of U.S. Pat. No. 8,504,697 filed on Nov. 20, 2013, Apple Inc; Exhibit 1072: Microsoft Press, Microsoft Computer Dictionary Fourth Edition, 9 pages (1999).
IPR2014-00237; Inter Partes Review of U.S. Pat. No. 8,504,697 filed on Nov. 20, 2013, Apple Inc; Exhibit 1075: IBM Session Initiation Protocol, 4 pages (2013).
IPR2014-00237; Inter Partes Review of U.S. Pat. No. 8,504,697 filed on Nov. 20, 2013, Apple Inc; Exhibit 1079: Shorter Oxford English Dictionary on Historical Principles, Fifth Edition, vol. 1 A-M, 3 pages (2002).
IPR2014-00238; Inter Partes Review of U.S. Pat. No. 8,504,697 filed on Nov. 20, 2013, Apple Inc; Petition for Inter Partes Review, 72 pages.
IPR2014-00238; Inter Partes Review of U.S. Pat. No. 8,504,697 filed on Nov. 20, 2013, Apple Inc; Exhibit 1003: Declaration of Michael Fratto Regarding U.S. Pat. No. 8,504,697, 240 pages (2013).
IPR2014-00238; Inter Partes Review of U.S. Pat. No. 8,504,697 filed on Nov. 20, 2013, Apple Inc; Exhibit 1005: Declaration of Chris Hopen Regarding Prior Art and U.S. Pat. No. 7,490,151,23 pages (2013).
IPR2014-00238; Inter Partes Review of U.S. Pat. No. 8,504,697 filed on Nov. 20, 2013, Apple Inc; Exhibit 1006: Declaration of James Chester, 26 pages (2013).
IPR2014-00401; Inter Partes Review of U.S. Pat. No. 7,188,180 filed on Feb. 4, 2014, Petitioner Microsoft Corporation.,—Petition for Inter Partes Review, 62 pages.
IPR2014-00401; Inter Partes Review of U.S. Pat. No. 7,188,180 filed on Feb. 4, 2014, Petitioner Microsoft Corporation.,—Exhibit 1005: Guillen et al., "An Architecture for Virtual Circuit/QoS Routing," Brussels University, 8 pages (1993).

(56) References Cited

OTHER PUBLICATIONS

IPR2014-00401; Inter Partes Review of U.S. Pat. No. 7,188,180 filed on Feb. 4, 2014, Petitioner Microsoft Corporation.,—Exhibit 1006: Kosiur, "Building and Managing Virtual Private Networks," Wiley Computer Publishing, ISBN: 0471295264 (1998).
IPR2014-00401; Inter Partes Review of U.S. Pat. No. 7,188,180 filed on Feb. 4, 2014, Petitioner Microsoft Corporation.,—Exhibit 1011: Guerin Declaration for 180 Patent (Provino) dated Jan. 10, 2014.
IPR2014-00401; Inter Partes Review of U.S. Pat. No. 7,188,180 filed on Feb. 4, 2014, Petitioner Microsoft Corporation.,—Exhibit 1015: Redacted Settlement Agreement dated May 14, 2010.
IPR2014-00403; Inter Partes Review of U.S. Pat. No. 7,987,274 filed on Feb. 4, 2014, Petitioner Microsoft Corporation.,—Petition for Inter Partes Review, 58 pages.
IPR2014-00403; Inter Partes Review of U.S. Pat. No. 7,987,274 filed on Feb. 4, 2014, Petitioner Microsoft Corporation.,—Exhibit 1002: Excerpts from the Prosecution History of U.S. Pat. No. 7,987,274 filed May 21, 2013.
IPR2014-00404; Inter Partes Review of U.S. Pat. No. 7,987,274 filed on Feb. 4, 2014, Petitioner Microsoft Corporation.,—Petition for Inter Partes Review, 58 pages.
IPR2014-00404; Inter Partes Review of U.S. Pat. No. 7,987,274 filed on Feb. 4, 2014, Petitioner Microsoft Corporation.,—Exhibit 1002: Excerpts from the Prosecution History of U.S. Pat. No. 7,987,274 dated Apr. 22, 2013.
IPR2014-00405; Inter Partes Review of U.S. Pat. No. 7,987,274 filed on Feb. 4, 2014, Petitioner Microsoft Corporation.,—Petition for Inter Partes Review, 66 pages.
IPR2014-00405; Inter Partes Review of U.S. Pat. No. 7,987,274 filed on Feb. 4, 2014, Petitioner Microsoft Corporation.,—Exhibit 1012: Order of Dismissal dated Jun. 10, 2010.
IPR2014-00405; Inter Partes Review of U.S. Pat. No. 7,987,274 filed on Feb. 4, 2014, Petitioner Microsoft Corporation.,—Exhibit 1013: Order of Dismissal dated May 25, 2010.
IPR2014-00405; Inter Partes Review of U.S. Pat. No. 7,987,274 filed on Feb. 4, 2014, Petitioner Microsoft Corporation., Exhibit 1024: Excerpt from Prosecution History of Reexam 95/001,972.
*VirnetX* v. *Microsoft*; Defendant's Preliminary Invalidity Contentions dated Nov. 14, 2013, 43 pages.
*VirnetX* v. *Microsoft*; Defendant's Preliminary Invalidity Contentions dated Nov. 14, 2013; Exhibit 37: SecureConnect vs. Claims of the '151 Patent, 4 pages.
*VirnetX* v. *Microsoft*, Defendant's Preliminary Invalidity Contentions dated Nov. 14, 2013; Exhibit 41: SFS-HTTP vs. Claims of the '151 Patent, 10 pages.
*VirnetX* v. *Microsoft*; Defendant's Preliminary Invalidity Contentions dated Nov. 14, 2013; Exhibit 48: U.S. '132 vs. Claims of the '151 Patent, 15 pages.
*VirnetX* v. *Microsoft*, Defendant's Preliminary Invalidity Contentions dated Nov. 14, 2013; Exhibit 55: B&M VPNs vs. Claims of the '151 Patent, 12 pages.
*VirnetX* v. *Microsoft*, Defendant's Preliminary Invalidity Contentions dated Nov. 14, 2013; Exhibit 59: BorderManager vs. Claims of the '151 Patent, 18 pages.
*VirnetX* vs. *Microsoft*; Defendant's Preliminary Invalidity Contentions dated Nov. 14, 2013; Exhibit 79: Valencia (019) vs. Claims of the '274 Patent, 12 pages.
*VirnetX* vs. *Microsoft*; Defendant's Preliminary Invalidity Contentions dated Nov. 14, 2013; Exhibit 85: U.S. '748 vs. Claims of the '151 Patent, 8 pages.
*VirnetX* vs. *Microsoft*; Defendant's Preliminary Invalidity Contentions dated Nov. 14, 2013; Exhibit 99: Araujo vs. Claims of the '135 Patent, 19 pages.
*VirnetX* vs. *Microsoft*; Defendant's Preliminary Invalidity Contentions dated Nov. 14, 2013; Exhibit 100: Araujo vs. Claims of the '151 Patent, 8 pages.
*VirnetX* vs. *Microsoft*; Defendant's Preliminary Invalidity Contentions dated Nov. 14, 2013; Exhibit 101: NetMeeting vs. Claims of the '135 Patent, 81 pages.
*VirnetX* vs. *Microsoft*; Defendant's Preliminary Invalidity Contentions dated Nov. 14, 2013; Exhibit 102: NetMeeting vs. Claims of the '151 Patent, 53 pages.
*VirnetX* vs. *Microsoft*; Defendant's Preliminary Invalidity Contentions dated Nov. 14, 2013; Exhibit 103: NetMeeting vs. Claims of the '180 Patent, 35 pages.
*VirnetX* vs. *Microsoft*; Defendant's Preliminary Invalidity Contentions dated Nov. 14, 2013; Exhibit 104: NetMeeting vs. Claims of the '211 Patent, 47 pages.
*VirnetX* vs. *Microsoft*; Defendant's Preliminary Invalidity Contentions dated Nov. 14, 2013; Exhibit 105: NetMeeting vs. Claims of the '274 Patent, 26 pages.
*VirnetX* vs. *Microsoft*; Defendant's Preliminary Invalidity Contentions dated Nov. 14, 2013; Exhibit 106: NetMeeting vs. Claims of the '504 Patent, 48 pages.
*VirnetX* vs. *Microsoft*; Defendant's Preliminary Invalidity Contentions dated Nov. 14, 2013; Exhibit 107: EverLink vs. Claims of the '151 Patent, 39 pages.
*VirnetX* vs. *Microsoft*; Defendant's Preliminary Invalidity Contentions dated Nov. 14, 2013; Exhibit 108: Special Anthology vs. Claims of the '135 Patent, 4 pages.
*VirnetX* vs. *Microsoft*; Defendant's Preliminary Invalidity Contentions dated Nov. 14, 2013; Exhibit 109: Gauntlet for IRIX vs. Claims of the '135 Patent, 62 pages.
*VirnetX* vs. *Microsoft*; Defendant's Preliminary Invalidity Contentions dated Nov. 14, 2013; Exhibit 110: Gauntlet for IRIX vs. Claims of the '211 Patent, 111 pages.
*VirnetX* vs. *Microsoft*; Defendant's Preliminary Invalidity Contentions dated Nov. 14, 2013; Exhibit 111: Gauntlet for IRIX vs. Claims of the '504 Patent, 119 pages.
*VirnetX* vs. *Microsoft*; Defendant's Preliminary Invalidity Contentions dated Nov. 14, 2013; Exhibit 112: Gauntlet System vs. Claims of the '135 Patent, 24 pages.
*VirnetX* vs. *Microsoft*; Defendant's Preliminary Invalidity Contentions dated Nov. 14, 2013; Exhibit 113: Gauntlet System vs. Claims of the '151 Patent, 23 pages.
*VirnetX* vs. *Microsoft*; Defendant's Preliminary Invalidity Contentions dated Nov. 14, 2013; Exhibit 108: Gauntlet System vs. Claims of the '180 Patent, 36 pages.
*VirnetX* vs. *Microsoft*; Defendant's Preliminary Invalidity Contentions dated Nov. 14, 2013; Exhibit 115: Gauntlet System vs. Claims of the '211 Patent, 67 pages.
*VirnetX* vs. *Microsoft*; Defendant's Preliminary Invalidity Contentions dated Nov. 14, 2013; Exhibit 116: Gauntlet Systems vs. Claims of the '504 Patent, 69 pages.
*VirnetX* vs. *Microsoft*; Defendant's Preliminary Invalidity Contentions dated Nov. 14, 2013; Exhibit 117: Gauntlet Systems vs. Claims of the '274 Patent, 16 pages.
*VirnetX* vs. *Microsoft*; Defendant's Preliminary Invalidity Contentions dated Nov. 14, 2013; Exhibit 123: IntraPort System vs. Claims of the '274 Patent, 24 pages.
*VirnetX* vs. *Microsoft*; Defendant's Preliminary Invalidity Contentions dated Nov. 14, 2013; Exhibit 129: Overview vs. Claims of the '274 Patent, 12 pages.
*VirnetX* vs. *Microsoft*; Defendant's Preliminary Invalidity Contentions dated Nov. 14, 2013; Exhibit 135: Schulzrinne vs. Claims of the '274 Patent, 14 pages.
*VirnetX* vs. *Microsoft*; Defendant's Preliminary Invalidity Contentions dated Nov. 14, 2013; Exhibit 141: Solana vs. Claims of the '274 Patent, 17 pages.
*VirnetX* vs. *Microsoft*; Defendant's Preliminary Invalidity Contentions dated Nov. 14, 2013; Exhibit 147: Atkinson vs. Claims of the '274 Patent, 15 pages.
*VirnetX* vs. *Microsoft*; Defendant's Preliminary Invalidity Contentions dated Nov. 14, 2013; Exhibit 153: Marino vs. Claims of the '274 Patent, 11 pages.
*VirnetX* vs. *Microsoft*; Defendant's Preliminary Invalidity Contentions dated Nov. 14, 2013; Exhibit 159: Valencia (213) vs. Claims of the '274 Patent, 13 pages.
*VirnetX* vs. *Microsoft*; Defendant's Preliminary Invalidity Contentions dated Nov. 14, 2013; Exhibit 166: Davison vs. Claims of the '274 Patent, 11 pages.

(56) References Cited

OTHER PUBLICATIONS

*VirnetX* vs. *Microsoft*; Defendant's Preliminary Invalidity Contentions dated Nov. 14, 2013; Exhibit 170: AutoSOCKS vs. Claims of the '274 Patent, 14 pages.
*VirnetX* vs. *Microsoft*; Defendant's Preliminary Invalidity Contentions dated Nov. 14, 2013; Exhibit 174: Aventail Connect 3.01/2.51 vs. Claims of the '274 Patent, 17 pages.
*VirnetX* vs. *Microsoft*; Defendant's Preliminary Invalidity Contentions dated Nov. 14, 2013; Exhibit 176: Aventail Connect 3.1/2.6 Administrator's Guide("Aventail Connect") vs. Claims of the '211 Patent, 56 pages.
*VirnetX* vs. *Microsoft*; Defendant's Preliminary Invalidity Contentions dated Nov. 14, 2013; Exhibit 179: Aventail Connect 3.1/2.6 vs. Claims of the '274 Patent, 19 pages.
*VirnetX* vs. *Microsoft*; Defendant's Preliminary Invalidity Contentions dated Nov. 14, 2013; Exhibit 183: BinGO! User's Guide/Extended Features Reference vs. Claims of the '274 Patent, 26 pages.
*VirnetX* vs. *Microsoft*; Defendant's Preliminary Invalidity Contentions dated Nov. 14, 2013; Exhibit 210: Cisco's Prior Art Systems vs. Claims of the '274 Patent, 19 pages.
*VirnetX* vs. *Microsoft*; Defendant's Preliminary Invalidity Contentions dated Nov. 14, 2013; Exhibit 213: Cisco's Prior Art PIX System vs. Claims of the '151 Patent, 37 pages.
*VirnetX* vs. *Microsoft*; Defendant's Preliminary Invalidity Contentions dated Nov. 14, 2013; Exhibit 214: Cisco's Prior Art PIX System vs. Claims of the '211 Patent, 104 pages.
*VirnetX* vs. *Microsoft*; Defendant's Preliminary Invalidity Contentions dated Nov. 14, 2013; Exhibit 244: Understanding OSF DCE 1.1 for AIX and OS/2 (APP_VX0556531-804) vs. Claims of the '274 Patent, 26 pages.
*VirnetX* vs. *Microsoft*; Defendant's Preliminary Invalidity Contentions dated Nov. 14, 2013; Exhibit 228: Abadi vs. Claims of the '135 Patent, 12 pages.
*VirnetX* vs. *Microsoft*; Defendant's Preliminary Invalidity Contentions dated Nov. 14, 2013; Exhibit 229: Abadi vs. Claims of the '180 Patent, 16 pages.
*VirnetX* vs. *Microsoft*; Defendant's Preliminary Invalidity Contentions dated Nov. 14, 2013; Exhibit 230: Abadi vs. Claims of the '151 Patent, 10 pages.
*VirnetX* vs. *Microsoft*; Defendant's Preliminary Invalidity Contentions dated Nov. 14, 2013; Exhibit 231: Abadi vs. Claims of the '274 Patent, 11 pages.
*VirnetX* vs. *Microsoft*; Defendant's Preliminary Invalidity Contentions dated Nov. 14, 2013; Exhibit 237: Kiuchi vs. Claims of the '274 Patent, 30 pages.
*VirnetX* vs. *Microsoft*; Defendant's Preliminary Invalidity Contentions dated Nov. 14, 2013; Exhibit 243: Aziz vs. Claims of the '274 Patent, 37 pages.
*VirnetX* vs. *Microsoft*; Defendant's Preliminary Invalidity Contentions dated Nov. 14, 2013; Exhibit 248: RFC 2543 vs. Claims of the '180 Patent, 48 pages.
*VirnetX* vs. *Microsoft*; Defendant's Preliminary Invalidity Contentions dated Nov. 14, 2013; Exhibit 249: RFC 2543 vs. Claims of the '274 Patent, 28 pages.
*VirnetX* vs. *Microsoft*; Defendant's Preliminary Invalidity Contentions dated Nov. 14, 2013; Exhibit 252: Wesinger vs. Claims of the '180 Patent, 42 pages.
*VirnetX* vs. *Microsoft*; Defendant's Preliminary Invalidity Contentions dated Nov. 14, 2013; Exhibit 253: Wesinger vs. Claims of the '274 Patent, 23 pages.
*VirnetX* vs. *Microsoft*; Defendant's Preliminary Invalidity Contentions dated Nov. 14, 2013; Exhibit 257: Provino vs. Claims of the '180 Patent, 17 pages.
*VirnetX* vs. *Microsoft*; Defendant's Preliminary Invalidity Contentions dated Nov. 14, 2013; Exhibit 258: U.S. Pat. No. 6,557,037 vs. Claims of the '504 Patent, 17 pages.
*VirnetX* vs. *Microsoft*; Defendant's Preliminary Invalidity Contentions dated Nov. 14, 2013; Exhibit 259: Provino vs. Claims of the '151 Patent, 13 pages.
*VirnetX* vs. *Microsoft*; Defendant's Preliminary Invalidity Contentions dated Nov. 14, 2013; Exhibit 261: Provino vs. Claims of the '274 Patent, 15 pages.
*VirnetX* vs. *Microsoft*; Defendant's Preliminary Invalidity Contentions dated Nov. 14, 2013; Exhibit 262: NT4 System vs. Claims of the '135 Patent, 22 pages.
*VirnetX* vs. *Microsoft*; Defendant's Preliminary Invalidity Contentions dated Nov. 14, 2013; Exhibit 263: NT4 System vs. Claims of the '151 Patent, 12 pages.
*VirnetX* vs. *Microsoft*; Defendant's Preliminary Invalidity Contentions dated Nov. 14, 2013; Exhibit 264: EverLink vs. Claims of the '274 Patent, 38 pages.
New Version of Windows 98 Improves the Business of Running a Home; Windows 98 Second Edition Makes it Easier for Families to Connect, Jun. 10, 1999.
Research Advances in Database and Information Systems Security, Kluwer Academic Publishers, Jul. 25-28, 1999.
Barkley et al., "Role Based Access Control for the World Wide Web," Abstract, pp. 1-11, Apr. 8, 1997.
Abadi et al., "Secure Web Tunneling," Computer Networks and ISDN Systems, 30:531-539 (1998).
Communications and Multimedia Security II; Proceedings of the IFIP TC6/TC11 International Conference on Communications and Multimedia Security at Essen, Germany, Sep. 23-24, 1996.
IEEE Computer Society, Seventh IEEE International Workshops on Enabling Technologies: Infrastructure for Collaborative Enterprises (WET ICE '98); Jun. 17-19, 1998.
Kahan, "WDAI: A Simple World Wide Web Distributed Authorization Infrastructure," Computer Networks, 31:1599-1609 (1999).
Norifusa, "Internet Security: Difficulties and Solutions," International Journal of Medical, 49:69-74 (1998).
Molva, "Internet Security Architecture," 31:787-804 (1999).
Ellermann, "IPv6 and Firewalls," Jun. 1996.
Herscovitz, "Secure Virtual Private Networks: The Future of Data Communications," International Journal of Network Management, 9:213-220 (1999).
Cheswick et al., "A DNS Filter and Switch for Packet-Filtering Gateways," Proceedings of the Sixth USENIX UNIX Security Symposium, 1996.
Farrow, "How DNS Can Divulge Sensitive Information," Network Magazine, 14(3):72 (1999).
Greenwald et al., "Designing an Academic Firewall: Policy, Practice, and Experience with SURF," Proceedings of the SNDSS, 1996.
Collins, "Designing Secure Intranets," Computing & Control Engineering Journal, pp. 185-192, 1998.
Lioy et al., "DNS Security," Terena Networking Conference, pp. 1-13, May 22-25, 2000.
Davidowicz, "Domain Name System (DNS) Security," pp. 1-22, (1999).
Gilmore et al., "Secure Remote Access to an Internal Web Server," IEEE Network, pp. 31-37 (1999).
Using NETBuilder Family Software, Version 11.0, Published Mar. 1998, http://www.3com.com/.
AccessBuilder 2000/4000/5000 Server Configuration Guide, Software Version 7.0, Published Apr. 1997, http://www.3com.com/.
Apple Remote Access 3.0, Apple Remote Access Client and Apple Remote Access Personal Server User's Manual (1997).
Macaire et al., "A Personal Naming and Directory Service for Mobile Internet Users," USENIX Workshop on Smartcard Technology, May 10-11, 1999.
Sidewinder Network Gateway Security, Administration Guide Version 7.0, Secure Computing Corporation, 812 pages (2007).
Zao et al., "Domain Based Internet Security Policy Management," pp. 41-53 (1999).
Aventail and Spyrus Join Forces to Deliver High-Assurance Extranet Security Solutions for the Enterprise, Business Wire, May 12, 1999.
Aventail Ships Directory-Enabled Extranet Solution; Aventail Extranet Center V3.1 Available at www.aventail.com, Business Wire, Aug. 9, 1999.
Mooi Choo Chuah et al., "Mobile Virtual Private Dial-Up Services," Bell Labs Technical Journal, (1999).
The Brick Extended Features Reference Manual, 288 pages (1999).

(56) References Cited

OTHER PUBLICATIONS

Bianca/Brick Software Reference Manual, Version 2.3, 331 pages (1999).
Bianca/Brick Software Reference Manual, Version 2.4, (1999).
Novell BorderManager; Installation and Setup, Version 3.5, 162 pages (1999).
Broadband Forum Technical Support, Core Network Architecture Recommendations for Access to Legacy Data Networks Over ADSL, Issue 1.0, 24 pages (1999).
Cabletron Routing Software; Routing Protocols Reference Guide, Cabletron Systems (1999).
Cisco Systems, Virtual Private Networks (VPN), Internetworking Technical Overview, (1999).
Cisco Systems, Cisco Access Product Family, 16 pages (1996).
Cisco, MPLS Virtual Private Networks, (1999).
WEBDAV: Distributed Authoring and Versioning Presentation vs. Greg Stein, Adobe Technical Seminar Series, May 1999.
Valencia et al., "Layer Two Tunneling Protocol "LSTP"," Internet Draft (1998).
Patel, "Securing L2TP Using IPSEC," Internet Draft (1999).
Srisuresh, "Secure Remote Access with L2TP," Internet Draft (1999).
IBM Corporation, AS/400 TCP/IP Autoconfiguration DNS and DHCP Support, 457 pages (1998) available at http://www.redbooks.ibm.com.
IBM Corporation, Inside the VPN Tunnel, IBM Technical Support, 23 pages (1999).
IBM Corporation, IBM Firewall for AS/400 V4R3: VPN and NAT Support, 361 pages (1999).
IBM Corporation, Software User's Guide, Version 3.2, (1998).
IBM Corporation, Software User's Guide Version 3.3, 678 pages (1999).
IBM Corporation, Using and Configuring Features, Version 3.2, 336 pages, (1998).
IBM Corporation, Software User's Guide, Version 3.4, 770 pages (1999).
IBM Corporation, A Comprehensive Guide to Virtual Private Networks, vol. I: IBM Firewall, Server and Client Solutions, 36 pages (1998) available at http://www.redbooks.ibm.com.
IBM Corporation, A Comprehensive Guide to Virtual Private Networks, vol. II: IBM Nways Router Solutions, 622 pages (1999) available at http://www.redbooks.ibm.com.
IBM Corporation, A Comprehensive Guide to Virtual Private Networks, vol. III: Cross-Platform Key and Policy Management, 665 pages (1999) available at http://www.redbooks.ibm.com.
Novell, BorderManager, Overview and Planning, Enterprise Edition 3, Version 3.5 (1999).
Zyxel Total Internet Access Solution; User's Guide, Version 2.20 (1999).
Raptor Integrated Enterprise Network Security System V6.0; Raptor Firewall Reference Guide (1998).
Reynolds et al., "Assigned Numbers," RFC 1700 (1994).
Blake et al., "An Architecture for Differentiated Services," RFC 2475 (1998).
Aboba et al., "The Network Access Identifier," RFC 2486 (1999).
Rosen et al., BGP/MPLS VPNs, RFC 2547 (1999).
Pall et al., "Microsoft Point-To-Point Encryption (MPPE) Protocol," RFC 3078 (2001).
Cisco Systems, Release Notes for the Cisco Secure VPN Client Versions 1.0/1.0a (1999).
Ascend Communications, Inc., SecureConnect Manager User's Guide (1998).
Kaminsky et al., "SFS-HTTP: Securing the Web with Self-Certifying URLs," (1999) available at http://www.pdos.lcs.mit.edu/"kaminsky/sfs-http.ps.
Timestep Corporation, Understanding the IPSec Protocol Suite (1998).
Level One, Level One User Manual (1999).
Stein et al., "Writing Apache Modules with Perl and C," ISBN:1-56592-567, 746 pages (1999).
Shea, "L2TP Implementation and Operation," The Addison-Wesley Networking Basics Series (2000).
McCormack et al., "An Authentication Framework for Web Access to Remote Hosts," National Institute of Standards and Technology (1998).
Harney et al., "Group Key Management Protocol (GKMP) Architecture," RFC 2094 (1997).
Sijben et al., "Bridging the Gap to IP Telephony," Bell Labs Technical Journal (1998).
Hoffman, "SMTP Service Extension for Secure SMTP over TLS," RFC 2487 (1999).
Newman, "Using TLS with IMAP, POP3 and ACAP," RFC 2595 (1999).
Using Internet VPN to Bring Job Sites and Branch Offices Online, Nikkei Communications (1997).
ANX CEP Interconnection Options, Bellcore/ANXO, Oct. 1, 1998.
Microsoft Claim Chart of U.S. Pat. No. 6,502,135; vs. Atkinson, "An Internetwork Authentication Architecture," Naval Research Laboratory, Center for High Assurance Computing Systems (Aug. 5, 1993).
Microsoft Claim Chart of U.S. Pat. No. 6,502,135; vs. Eastlake, Domain Name System Security Extensions, IETF DNS Security Working Group (Dec. 1998), available at http://www.watersprins.org/pub/id/draft-ietf-dnssec-secex2-07.txt.
Microsoft Claim Chart of U.S. Pat. No. 6,502,135; vs. Goldschlag et al., "Privacy on the Internet," Naval Research Laboratory, Center for High Assurance Computer Systems (1997).
Microsoft Claim Chart of U.S. Pat. No. 6,502,135; vs. Goldschlag et al., "Hiding Routing Information," Workshop on Information Hiding, Cambridge, UK (May 1996).
Microsoft Claim Chart of U.S. Pat. No. 6,502,135; vs. Goldschlag et al., "Onion Routing for Anonymous and Private Internet Connection," Naval Research Laboratory, Center for High Assurance Computer Systems (Jan. 28, 1999).
Microsoft Claim Chart of U.S. Pat. No. 6,502,135; vs. M.G. Reed et al., "Proxies for Anonymous Routing," $12^{th}$ Annual Computer Security Applications Conference, San Diego, CA Dec. 9-13, 1996.
Microsoft Claim Chart of U.S. Pat. No. 6,502,135; vs. Macdonald et al., "PF_KEY key Management API, Version 2," Network Working Group, RFC 2367 (Jul. 1998) ("RFC 2367").
Microsoft Claim Chart of U.S. Pat. No. 6,502,135; vs. Onion Routing, "Investigation of Route Selection Algorithms," available at http://www.onion-router.net/Archives/Route/index.html. ("Route Selection") Filed on Nov. 14, 2013.
Microsoft Claim Chart of U.S. Pat. No. 6,502,135; vs. Scott et al., Virtual Private Networks, O'Reilly and Associates, Inc., $2^{nd}$ ed (Jan. 1999) (Scott VPNs).
Microsoft Claim Chart of U.S. Pat. No. 6,502,135; vs. Syverson et al., "Private Web Browsing," Naval Research Laboratory, Center for High Assurance Computer Systems (Jun. 2, 1997) ("Syverson").
Microsoft Claim Chart of U.S. Pat. No. 6,502,135; vs. "IPSec Minutes From Montreal," IPSEC Working Group Meeting Notes, http://www.sandleman,ca/ipsec/1996/08/msg00018.html (Jun. 1996).
Microsoft Claim Chart of U.S. Pat. No. 6,502,135; vs. "Building a Microsoft VPN: A Comprehensive Collection of Microsoft Resources," FirstVPN, (Jan. 2000) ("First VPN Building a Microsoft VPN Publication").
Microsoft Claim Chart of U.S. Pat. No. 6,502,135; vs. Publicly Available DNS-Related Correspondence dated Sep. 7, 1993 to Sep. 20, 1993 ("DNS-Related Correspondence").
Microsoft Claim Chart of U.S. Pat. No. 6,502,135; vs. Assured Digital Incorporated Products ("ADI Products") Filed on Nov. 14, 2013.
Microsoft Claim Chart of U.S. Pat. No. 6,502,135; vs. DNS SRV references (1996, 1998, 1999, 2000).
Microsoft Claim Chart of U.S. Pat. No. 6,502,135; vs. U.S. Pat. No. 5,898,830 ("Wesinger '830 Patent") Filed on Nov. 14, 2013.
Microsoft Claim Chart of U.S. Pat. No. 6,502,135; vs. Global VPN ("GVPN") references (1999).
Microsoft Claim Chart of U.S. Pat. No. 6,502,135; vs. Kaufman et al., Implementing IPsec: Making Security Work on VPNs, Intranets, and Extranets, (Copyright 1999) ("Implementing IPsec").

(56) References Cited

OTHER PUBLICATIONS

Microsoft Claim Chart of U.S. Pat. No. 6,502,135; vs. Safe Surfing: How to Build a Secure World Wide Web Connection, IBM Int'l Technical Support Organization (Mar. 1996) ("Safe Surfing").
Microsoft Claim Chart of U.S. Pat. No. 6,502,135; vs. U.S. Appl. No. 60/134,547, (filed May 17, 1999) ("Sheymov").
Microsoft Claim Chart of U.S. Pat. No. 6,502,135; vs. Data Fellows F-Secure VPN ("F-Secure VPN+ Publication") Filed on Nov. 14, 2013.
Microsoft Claim Chart of U.S. Pat. No. 6,502,135; vs. U.S. Pat. No. 5,950,195 ("Stockwell '195 Patent") Filed on Nov. 14, 2013.
Microsoft Claim Chart of U.S. Pat. No. 6,502,135; vs. B. Patel et al., "DHCP Configuration of IPSEC Tunnel Mode," IPSEC Working Group, Internet Draft 02 (Oct. 15, 1999) ("Patel").
Microsoft Claim Chart of U.S. Pat. No. 6,502,135; vs. SSL VPNs ("SSL VPNs") references (1996, 1997, 1998).
Microsoft Claim Chart of U.S. Pat. No. 6,502,135; vs. Gauntlet Firewall ("Gauntlet FW") references (1995, 1996, 1999).
Microsoft Claim Chart of U.S. Pat. No. 6,502,135; vs. U.S. Pat. No. 6,119,171 ("'171 patent") Filed on Nov. 14, 2013.
Microsoft Claim Chart of U.S. Pat. No. 6,502,135; vs. Caronni et al., U.S. Pat. No. 5,822,434 Oct. 13, 1998 (filed Jun. 18, 1996) ('434 patent).
Microsoft Claim Chart of U.S. Patent No. 6,502,135; vs. RFC 2230 (Nov. 1997) U.S. Pat. No. 5,511,122 (Apr. 23, 1996).
Microsoft Claim Chart of U.S. Pat. No. 6,502,135; vs. Check Point FW as described in: Goncalves et al., Check Point Firewall-1 Administration Guide, McGraw-Hill Companies (2000) available at http://www.books24x7.com/book/id_762/viewer_r.asp?bookid=762&chunkid=410651062 (Goncalves, Check Point FW); Check Point Software Technologies Ltd. (1999) (Check Point FW).
Microsoft Claim Chart of U.S. Pat. No. 6,502,135; vs. CIS/DCOM as described in: Microsoft Corp., Cariplo: Distributed Component Object Model, references (1996-1999).
Microsoft Claim Chart of U.S. Pat. No. 6,502,135; vs. Bhattacharya et al., "An LDAP Schema for Configuration and Administration of IPSec Based Virtual Private Networks (VPNs)", IETF Internet Draft (Oct. 1999) ("LDAP Schema for IPSec based VPNs publication").
Microsoft Claim Chart of U.S. Pat. No. 6,502,135; vs. Onion Routing references (1996, 1997, 1999.
Microsoft Claim Chart of U.S. Pat. No. 6,502,135; vs. Aventail references (1997-1999).
Microsoft Claim Chart of U.S. Pat. No. 6,502,135; vs. C. Huitema et al., "Simple Gateway Control Protocol," Version 1.0 (May 5, 1998) ("SGCP").
Microsoft Claim Chart of U.S. Pat. No. 6,502,135; vs. Microsoft VPN Technology references (1997-1999).
Microsoft Claim Chart of U.S. Pat. No. 6,502,135; vs. Dynamic VPN ("DVPN") references (1997-2001).
Microsoft Claim Chart of U.S. Pat. No. 6,502,135; vs. R.G. Moskowitz, "Network Address Translation Issues with IPsec," Internet Draft, Internet Engineering Task Force, Feb. 6, 1998 ("Moskowitz").
Microsoft Claim Chart of U.S. Pat. No. 6,502,135; vs. F-Secure VPN and F-Secure VPN references (1996, 1998, 1999).
Microsoft Claim Chart of U.S. Pat. No. 6,502,135; vs. Atkinson et al., "Security Architecture for the Internet Protocol," Network Working Group, RFC 2401 (Nov. 1998) ("RFC 2401").
Microsoft Claim Chart of U.S. Pat. No. 6,502,135; vs. RFC 2543 and Internet Drafts (1999).
Microsoft Claim Chart of U.S. Pat. No. 6,502,135; vs. AltaVista Tunnel and/or the AltaVista Firewall references (1997, 1998).
Microsoft Claim Chart of U.S. Pat. No. 6,502,135; vs. Henning Schulzrinne, Personal Mobility for Multimedia Services in the Internet, Proceedings of the European Workshop on Interactive Distributed Multimedia Systems and Services (1996) ("Schulzrinne 96").
Microsoft Claim Chart of U.S. Pat. No. 6,502,135; vs. Schulzrinne U.S. Pat. No. 6,937,597 (Aug. 30, 2005).

Microsoft Claim Chart of U.S. Pat. No. 6,502,135; vs. J.M. Galvin, "Public Key Distribution with Secure DNS," Proceedings of the Sixth USENIX UNIX Security Symposium, San Jose, California (Jul. 1996) ("Galvin").
Microsoft Claim Chart of U.S. Pat. No. 6,502,135; vs. Naganand Doraswamy, Implementation of Virtual Private Network (VPNs) with IP Secrity [sic] <draft-ietf-ipsec-vpn-00.txt> (Mar. 12, 1997) ("Doraswamy").
Microsoft Claim Chart of U.S. Pat. No. 6,502,135; vs. FreeS/WAN references (1996).
Microsoft Claim Chart of U.S. Pat. No. 6,502,135; vs. H. Orman et al., Re: 'Re: DNS? Was Re: Key Management, Anyone?, IETF IPSec Working Group Mailing List Archive (Aug. 1996-Sep. 1996) ("Orman DNS"); J. Gilmore et al., Re: Key Management, anyone? (DNS keying) IETF IPSec Working Group Mailing List Archive (Aug. 1996-Sep. 1996).
Microsoft Claim Chart of U.S. Pat. No. 6,502,135; vs. the Automotive Network exchange (ANX) references (1997, 1999).
Microsoft Claim Chart of U.S. Pat. No. 6,502,135; vs. The Defense Information Systems Agency, Secret Internet Protocol router Network (SIPRNET) references (1998, 2000).
Microsoft Claim Chart of U.S. Pat. No. 6,839,759; vs. U.S. Appl. No. 09/399,753 ("the Miller Application") as published in U.S. Pub. No. 2005/0055306 (Priority Date: Sep. 22, 1998).
Microsoft Claim Chart of U.S. Pat. No. 6,839,759; vs. R. Atkinson, "An Internetwork Authentication Architecture," Naval Research Laboratory, Center for High Assurance Computing Systems (Aug. 5, 1993) ("Atkinson NRL").
Microsoft Claim Chart of U.S. Pat. No. 6,839,759; vs. Donald Eastlake, Domain Name System Security Extensions, IETF DNS Security Working Group (Dec. 1998), available at http://www.watersprings.org/pub/id/draft-ietf-dnssec-secext2-07.txt ("DNS-SEC-7").
Microsoft Claim Chart of U.S. Pat. No. 6,839,759; vs. Goldschlag et al., "Privacy on the Internet," Naval Research Laboratory, Center for High Assurance Computer Systems (1997) ("Goldschlag I").
Microsoft Claim Chart of U.S. Pat. No. 6,839,759; vs. Goldschlag et al., "Hiding Routing Information," Workshop on Information Hiding, Cambridge, UK (May 1996) ("Goldschlag II").
Microsoft Claim Chart of U.S. Pat. No. 6,839,759; vs. Goldschlag et al., "Onion Routing for Anonymous and Private Internet Connection," Naval Research Laboratory, Center for High Assurance Computer Systems (Jan. 28, 1999) (Goldschlag III).
Microsoft Claim Chart of U.S. Pat. No. 6,839,759; vs. M.G. Reed, et al., "Proxies for Anonymous Routing," 12th Annual Computer Security Applications Conference, San Diego, CA Dec. 9-13, 1996 ("Reed").
Microsoft Claim Chart of U.S. Pat. No. 6,839,759; vs. D. MacDonald et al., "PF_KEY Key Management API, Version 2," Network Working Group, RFC 2367 (Jul. 1998) ("RFC 2367").
Microsoft Claim Chart of U.S. Pat. No. 6,839,759; vs. Onion Routing, "Investigation of Route Selection Algorithms," available at http://www.onion-router.net/Archives/Route/index.html ("Route Selection") Filed on Nov. 14, 2013.
Microsoft Claim Chart of U.S. Pat. No. 6,839,759; vs. Scott et al., Virtual Private Networks, O'Reilly and Associates, Inc., 2nd ed. (Jan. 1999) ("Scott VPNs").
Microsoft Claim Chart of U.S. Pat. No. 6,839,759; vs. Syverson et al., "Private Web Browsing," Naval Research Laboratory, Center for High Assurance Computer Systems (Jun. 2, 1997) ("Syverson").
Microsoft Claim Chart of U.S. Pat. No. 6,839,759; vs. SafeNet VPN Products ("SafeNet VPN Products,") (1999-2000).
Microsoft Claim Chart of U.S. Pat. No. 6,839,759; vs. "Building a Microsoft VPN: A Comprehensive Collection of Microsoft Resources," FirstVPN, (Jan. 2000) ("First VPN Building a Microsoft VPN publication").
Microsoft Claim Chart of U.S. Pat. No. 6,839,759; vs. Publicly Available DNS-Related Correspondence dated Sep. 7, 1993 to Sep. 20, 1993 ("DNS-related Correspondence").
Microsoft Claim Chart of U.S. Pat. No. 6,839,759; vs. DNS SRV references (1996, 1998, 1999, 2000).
Microsoft Claim Chart of U.S. Pat. No. 6,839,759; vs. U.S. Pat. No. 5,898,830 ("Wesinger '830 Patent").

(56) References Cited

OTHER PUBLICATIONS

Microsoft Claim Chart of U.S. Pat. No. 6,839,759; vs. Global VPN references (1999).
Microsoft Claim Chart of U.S. Pat. No. 6,839,759; vs. Kaufman et al., Implementing IPsec: Making Security Work on VPNs, Intranets, and Extranets, (Copyright 1999) ("Implementing IPsec").
Microsoft Claim Chart of U.S. Pat. No. 6,839,759; vs. PGP Security, Finding Your Way Through the VPN Maze (1999) ("PGP").
Microsoft Claim Chart of U.S. Pat. No. 6,839,759; vs. Safe Surfing: How to Build a Secure World Wide Web Connection, IBM Int'l Technical Support Organization (Mar. 1996) ("Safe Surfing").
Microsoft Claim Chart of U.S. Pat. No. 6,839,759; vs. U.S. Appl. No. 60/134,547, (filed May 17, 1999) ("Sheymov").
Microsoft Claim Chart of U.S. Pat. No. 6,839,759; vs. Data Fellows F-Secure VPN ("F-Secure VPN+ Publication") Filed on Nov. 14, 2013.
Microsoft Claim Chart of U.S. Pat. No. 6,839,759; vs. U.S. Pat. No. 5,950,195 ("Stockwell '195 Patent ") Filed on Nov. 14, 2013.
Microsoft Claim Chart of U.S. Pat. No. 6,839,759; vs. B. Patel et al., "DHCP Configuration of IPSEC Tunnel Mode,"IPSEC Working Group, Internet Draft 02 (Oct. 15, 1999) ("Patel").
Microsoft Claim Chart of U.S. Pat. No. 6,839,759; vs. SSL VPNs ("SSL VPNs") references (1996-1997).
Microsoft Claim Chart of U.S. Pat. No. 6,839,759; vs. Gauntlet Firewall ("Gauntlet FW") references (19995, 1996, 1999).
Microsoft Claim Chart of U.S. Pat. No. 6,839,759; vs. Caronni et al., U.S. Pat. No. 5,822,434 Oct. 13, 1998 (filed Jun. 18, 1996) ('434 patent).
Microsoft Claim Chart of U.S. Pat. No. 6,839,759; vs. U.S. Pat. No. 5,311,593 ("'593 patent") Filed on Nov. 14, 2013.
Microsoft Claim Chart of U.S. Pat. No. 6,839,759; RFC 2230 (Nov. 1997) U.S. Pat. No. 5,511,122 (Apr. 23, 1996).
Microsoft Claim Chart of U.S. Pat. No. 6,839,759; vs. Check Point FW as described in: Goncalves et al., Check Point FireWall-1 Administration Guide, McGraw-Hill Companies (2000) available at http://www.books24x7.com/book/id_762/viewer_r.asp?bookid=762&chunkid=410651062 (Goncalves, Check Point FW); Check Point Software Technologies Ltd. (1999) (Checkpoint FW).
Microsoft Claim Chart of U.S. Pat. No. 6,839,759; vs. CIS/DCOM references (1996, 1997, 1998, 1999).
Microsoft Claim Chart of U.S. Pat. No. 6,839,759; vs. Bhattacharya et al., "An LDAP Schema for Configuration and Administration of IPSec Based Virtual Private Networks (VPNs)", IETF Internet Draft (Oct. 1999) ("LDAP Schema for IPSec based VPNs publication").
Microsoft Claim Chart of U.S. Pat. No. 6,839,759; vs. Onion Routing references (1996, 1997, 1999).
Microsoft Claim Chart of U.S. Pat. No. 6,839,759; vs. Aventail references (1996, 1997, 1999).
Microsoft Claim Chart of U.S. Pat. No. 6,839,759; vs. C. Huitema et al., "Simple Gateway Control Protocol," Version 1.0 (May 5, 1998) ("SGCP").
Microsoft Claim Chart of U.S. Pat. No. 6,839,759; vs. Microsoft VPN Technology references (1997-1999).
Microsoft Claim Chart of U.S. Pat. No. 6,839,759; vs. Dynamic VPN ("DVPN") references (1997-2001).
Microsoft Claim Chart of U.S. Pat. No. 6,839,759; vs. R.G. Moskowitz, "Network Address Translation Issues with IPsec," Internet Draft, Internet Engineering Task Force, Feb. 6, 1998 ("Moskowitz").
Microsoft Claim Chart of U.S. Pat. No. 6,839,759; vs. Ted Harwood, Windows NT Terminal Server and Citrix MetaFrame (New Riders 1999) ("Windows NT Harwood").
Microsoft Claim Chart of U.S. Pat. No. 6,839,759; vs. Todd W. Mathers and Shawn P. Genoway, Windows NT Thin Client Solutions: Implementing Terminal Server and Citrix MetaFrame (Macmillan Technical Publishing 1999) ("Windows NT Mathers").
Microsoft Claim Chart of U.S. Pat. No. 6,839,759; vs. F-Secure VPN and F-Secure VPN+ references (1996-1999).
Microsoft Claim Chart of U.S. Pat. No. 6,839,759; vs. TimeStep, "The Business Case for Secure VPNs" (1998) ("TimeStep").
Microsoft Claim Chart of U.S. Pat. No. 6,839,759; vs. Atkinson et al., "Security Architecture for the Internet Protocol," Network Working Group, RFC 2401 (Nov. 1998) ("RFC 2401").
Microsoft Claim Chart of U.S. Pat. No. 6,839,759; vs. U.S. Pat. No. 6,079,020 ("VPNet '020 Patent") Filed on Nov. 14, 2013.
Microsoft Claim Chart of U.S. Pat. No. 6,839,759; vs. U.S. Pat. No. 6,173,399 ("VPNet '399 Patent") Filed on Nov. 14, 2013.
Microsoft Claim Chart of U.S. Pat. No. 6,839,759; vs. U.S. Pat. No. 6,226,748 ("VPNet '748 Patent") Filed on Nov. 14, 2013.
Microsoft Claim Chart of U.S. Pat. No. 6,839,759; vs. U.S. Pat. No. 6,226,751 ("VPNet '751 Patent") Filed on Nov. 14, 2013.
Microsoft Claim Chart of U.S. Pat. No. 6,839,759; vs. Aboba et al., "Securing L2TP using IPSEC," PPPEXT Working Group, Internet Draft (Feb. 2, 1999) ("L2TP/IPSEC").
Microsoft Claim Chart of U.S. Pat. No. 6,839,759; vs. AltaVista Tunnel and/or the AltaVista Firewall references (1997, 1998).
Microsoft Claim Chart of U.S. Pat. No. 6,839,759; vs. Henning Schulzrinne, Personal Mobility for Multimedia Services in the Internet, Proceedings of the European Workshop on Interactive Distributed Multimedia Systems and Services (1996) ("Schulzrinne 96").
Microsoft Claim Chart of U.S. Pat. No. 6,839,759; vs. U.S. Pat. No. 6,701,437 ("VPNet '437 Patent") Filed on Nov. 14, 2013.
Microsoft Claim Chart of U.S. Pat. No. 6,839,759; vs. WatchGuard references (2000).
Microsoft Claim Chart of U.S. Pat. No. 6,839,759; vs. J.M. Galvin, "Public Key Distribution with Secure DNS," Proceedings of the Sixth USENIX UNIX Security Symposium, San Jose, California (Jul. 1996) ("Galvin").
Microsoft Claim Chart of U.S. Pat. No. 6,839,759; vs. Naganand Doraswamy, Implementation of Virtual Private Network (VPNs) with IP Secrity [sic.] <draft-ietf-ipsec-vpn-00.txt> (Mar. 12, 1997) ("Doraswamy").
Microsoft Claim Chart of U.S. Pat. No. 6,839,759; vs. FreeS/WAN references (1996).
Microsoft Claim Chart of U.S. Pat. No. 6,839,759; vs. H. Orman et al., Re: 'Re: DNS? Was Re: Key Management, anyone?, IETF IPSec Working Group Mailing List Archive (Aug. 1996-Sep. 1996) ("Orman DNS"); J. Gilmore et al., Re: Key Management, anyone? (DNS keying) IETF IPSec Working Group Mailing List Archive (Aug. 1996-Sep. 1996).
Microsoft Claim Chart of U.S. Pat. No. 6,839,759; vs. The Defense Information Systems Agency, Secret Internet Protocol Router Network (SIPRNET) references (1998, 2000).
Microsoft Claim Chart of U.S. Pat. No. 7,188,180; vs. Donald Eastlake, Domain Name System Security Extensions, IETF DNS Security Working Group (Dec. 1998), available at http://www.watersprings.org/pub/id/draft-ietf-dnssec-secext2-07/txt ("DNS-SEC-7").
Microsoft Claim Chart of U.S. Pat. No. 7,188,180; vs. Goldschlag et al., "Privacy on the Internet," Naval Research Laboratory, Center for High Assurance Computer Systems (1997) ("Goldschlag I").
Microsoft Claim Chart of U.S. Pat. No. 7,188,180; vs. Goldschlag et al., "Hiding Routing Information," Workshop on Information Hiding, Cambridge, UK (May 1996) ("Goldschlag II").
Microsoft Claim Chart of U.S. Pat. No. 7,188,180; vs. Goldschlag et al., "Onion Routing for Anonymous and Private Internet Connection," Naval Research Laboratory, Center for High Assurance Computer Systems (Jan. 28, 1999) ("Goldschlag III").
Microsoft Claim Chart of U.S. Pat. No. 7,188,180; vs. M.G. Reed, et al. "Proxies for Anonymous Routing," 12th Annual Computer Security Applications Conference, San Diego, CA Dec. 9-13, 1996 ("Reed").
Microsoft Claim Chart of U.S. Pat. No. 7,188,180; vs. D. McDonald et al., "PF_KEY Key Management API, Version 2," Network Working Group, RFC 2367 (Jul. 1998) ("RFC 2367").
Microsoft Claim Chart of U.S. Pat. No. 7,188,180; vs. Onion Routing, "Investigation of Route Selection Algorithms," available at http://www.onion-router.net/Archives/Route/index.html ("Route Selection") Filed on Nov. 14, 2013.

(56) References Cited

OTHER PUBLICATIONS

Microsoft Claim Chart of U.S. Pat. No. 7,188,180; vs. Scott et al., Virtual Private Networks, O'Reilly and Associates, Inc., 2nd ed. (Jan. 1999) ("Scott VPNs").
Microsoft Claim Chart of U.S. Pat. No. 7,188,180; vs. Syverson et al., "Private Web Browsing," Naval Research Laboratory, Center of High Assurance Computer Systems (Jun. 2, 1997) ("Syverson").
Microsoft Claim Chart of U.S. Pat. No. 7,188,180; vs. "IPSec Minutes from Montreal," IPSEC Working Group Meeting Notes, http://sandleman.ca/ipsec/1996/08/msg00018.html (Jun. 1996).
Microsoft Claim Chart of U.S. Pat. No. 7,188,180; vs. "Building a Microsoft VPN: A Comprehensive Collection of Microsoft Resources," FirstVPN, (Jan. 2000) ("First VPN Building a Microsoft VPN publication").
Microsoft Claim Chart of U.S. Pat. No. 7,188,180; vs. DNS SRV references (1996, 1998, 1999, 2000).
Microsoft Claim Chart of U.S. Pat. No. 7,188,180; vs. U.S. Pat. No. 5,898,830 ("Wesigner '830 Patent") Filed on Nov. 14, 2013.
Microsoft Claim Chart of U.S. Pat. No. 7,188,180; vs. Kaufman et al., Implementing IPsec: Making Security Work on VPNS, Intranets, and Extranets (Copyright 1999) ("Implementing IPsec").
Microsoft Claim Chart of U.S. Pat. No. 7,188,180; vs. Safe Surfing: How to Build a Secure World Wide Web Connection, IBM Int'l Technical Support Organization (Mar. 1996) ("Safe Surfing").
Microsoft Claim Chart of U.S. Pat. No. 7,188,180; vs. U.S. Appl. No. 60/134,547, (filed May 17, 1999) ("Sheymov").
Microsoft Claim Chart of U.S. Pat. No. 7,188,180; vs. Data Fellows F-Secure VPN (F-Secure VPN+ Publication) Filed on Nov. 14, 2013.
Microsoft Claim Chart of U.S. Pat. No. 7,188,180; vs. U.S. Pat. No. 5,950,195 ("Stockwell '195 Patent") Filed on Nov. 14, 2013.
Microsoft Claim Chart of U.S. Pat. No. 7,188,180; vs. B. Patel et al., "DHCP Configuration of IPSEC Tunnel Mode," IPSEC Working Group, Internet Draft 02 (Oct. 15, 1999) ("Patel").
Microsoft Claim Chart of U.S. Pat. No. 7,188,180; vs. SSL VPNs ("SSL VPNs") references (1996, 1999).
Microsoft Claim Chart of U.S. Pat. No. 7,188,180; vs. Gauntlet Firewall ("Gauntlet FW") references (1995, 1996, 1999).
Microsoft Claim Chart of U.S. Pat. No. 7,188,180; vs. U.S. Pat. No. 6,199,171 ("'171 patent") Filed on Nov. 14, 2013.
Microsoft Claim Chart of U.S. Pat. No. 7,188,180; vs. Caronni et al., U.S. Pat. No. 5,822,434 Oct. 13, 1998 (filed Jun. 18, 1996) ("'434 patent").
Microsoft Claim Chart of U.S. Pat. No. 7,188,180; vs. U.S. Pat. No. 6,005,574 ("'574 patent") Filed on Nov. 14, 2013.
Microsoft Claim Chart of U.S. Pat. No. 7,188,180; vs. RFC 2230 (Nov. 1997) ("KX Records"); U.S. Pat. No. 5,511,122 (Apr. 23, 1996).
Microsoft Claim Chart of U.S. Pat. No. 7,188,180; vs. Check Point FW as described in: Goncalves et al., Check Point FireWall-1 Administration Guide, McGraw-Hill Companies (2000) available at http://www.books24x7.com/book/id_762/viewer_r.asp?bookid=762&chunkid=410651062 (Goncalves, Check Point FW); Check Point Software Technologies Ltd. (1999) (Checkpoint FW).
Microsoft Claim Chart of U.S. Pat. No. 7,188,180; vs. Battacharya et al., "An LDAP Schema for Configuration and Administration of IPSec Based Virtual Private Networks (VPNs)", IETF Internet Draft (Oct. 1999) ("LDAP Schema for IPSec based VPNs publication").
Microsoft Claim Chart of U.S. Pat. No. 7,188,180; vs. Onion Routing references (1996, 1997, 1999).
Microsoft Claim Chart of U.S. Pat. No. 7,188,180; vs. Aventail references (1997, 1999).
Microsoft Claim Chart of U.S. Pat. No. 7,188,180; vs. Microsoft VPN Technology references (1997-1999).
Microsoft Claim Chart of U.S. Pat. No. 7,188,180; vs. R.G. Moskowitz, "Network Address Translation Issues with IPsec," Internet Draft, Internet Engineering Task Force, Feb. 6, 1998 ("Moskowitz").
Microsoft Claim Chart of U.S. Pat. No. 7,188,180; vs. RFC 2543 and Internet Drafts (1999).
Microsoft Claim Chart of U.S. Pat. No. 7,188,180; vs. AltaVista Tunnel and/or the AltaVista Firewall references (1997); Birrell et al., U.S. Pat. No. 5,805,803, Sep. 8, 1998 (filed May 13, 1997).
Microsoft Claim Chart of U.S. Pat. No. 7,188,180; vs. Henning Schulzrinne, Personal Mobility for Multimedia Services in the Internet, Proceedings of the European Workshop on Interactive Distributed Multimedia Systems and Services (1996) ("Schulzrinne 96").
Microsoft Claim Chart of U.S. Pat. No. 7,188,180; vs. J. M. Gavin, "Public Key Distribution with Secure DNS," Proceedings of the Sixth USENIX UNIX Security Symposium, San Jose, California (Jul. 1996) ("Galvin").
Microsoft Claim Chart of U.S. Pat. No. 7,188,180; Naganand Doraswamy, Implementation of Virtual Private Networks (VPNs) with IP Secrity [sic.] <draft-ietf-ipsec-vpn-00.txt> (Mar. 12, 1997) ("Doraswamy").
Microsoft Claim Chart of U.S. Pat. No. 7,188,180; vs. FreeS/WAN references (1996).
Microsoft Claim Chart of U.S. Pat. No. 7,188,180; vs. H. Orman et al., Re: 'Re: DNS? Was Re: Key Management, anyone?, IETF IPSec Working Group Mailing List Archive (Sep. 1996-Sep. 1996) ("Orman DNS"); J. Gilmore et al., Re: Key Management, anyone? (DNS keying) IETF IPSec Working Group Mailing List Archive (Aug. 1996-Sep. 1996).
Microsoft Claim Chart of U.S. Pat. No. 7,188,180; vs. The Defense Information Systems Agency, Secret Internet Protocol Router Network (SIPRNET) references (1998, 2000).
Microsoft Claim Chart of U.S. Pat. No. 7,188,180; vs. Dynamic VPN ("DVPN") reference (1997-2001).
Pereira, "Extended Authentication Within ISAKMP/Oakley," IP Security Working Group, Internet Draft (1998).
Patel et al., "Revised SA Negotiation Mode for ISAKMP/Oakley," IP Security Working Group, Internet Draft (1997).
Pereira et al., "The ISAKMP Configuration Method," IP Security Working Group (1998).
Piper, "A GSS-API Authentication Mode for ISAKMP/Oakley," Internet Draft (1997).
Rescorla, "HTTP Over TLS," Internet Draft (1999).
Lottor, "Domain Administrators Operations Guide," RFC 1033 (1987).
Everhart et al., "New DNS RR Definitions," RFC 1183 (1990).
Hardcastle-Kille, X.500 and Domains, RFC 1279 (1991).
Manning, "DNS NSAP RRS," RFC 1348 (1992).
Huitema, "An Experiment in DNS Based IP Routing," RFC 1383 (1992).
Eastlake, "Physical Link Security Type of Service," RFC 1455 (1993).
Housley, "Security Label Framework for the Internet," RFC:1457 (1993).
Kastenholz, "The Definitions of Managed Objects for the Security Protocols of the Point to Point Protocol," RFC 1472 (1993).
Kaufman, "DASS Distribution Authentication Security Service," RFC 1507 (1993).
Linn, "Generic Security Service Application Program Interface," RFC 1508 (1993).
Wray, Generic Security Service API: C-Bindings, RFC 1509 (1993).
Postel, "Domain Name System Structure and Delegation," RFC 1591 (1994).
Austein et al., "DNS Server MIB Extension," RFC 1611 (1994).
Austein et al., "DNS Resolver MIB Extensions," RFC 1612 (1994).
Manning et al., "DNS NSAP Resource Records," RFC 1637 (1994).
Allocchio et al., "Using the Internet DNS to Distribute RFC 1327 Mail Address Mapping Tables," RFC 1664 (1994).
Manning et al., "DNS NSAP Resource Records," RFC 1706 (1994).
Farrell et al., "DNS Encoding of Geographical Location," RFC 1712 (1994).
Brisco, "DNS Support for Load Balancing," RFC 1794 (1995).
Atkinson, IP Authentication Header, RFC 1826 (1995).
Atkinson, "IP Encapsulating Security Payload (ESP)," RFC 1827 (1995).
Metzger, "IP Authentication Using Keyed MD5," RFC 1828 (1995).

(56) References Cited

OTHER PUBLICATIONS

Davis et al., "A Means for Expressing Location Information in the Domain Name System," RFC 1876 (1996).
Cobb, "PPP Internet Protocol Extensions for Name Server Addresses," RFC 1877 (1995).
Thomson et al., "DNS Extensions to Support IP Version 6," RFC 1886 (1995).
Linn, "Generic Security Service Application Program Interface, Version 2," RFC 2078 (1997).
Vixie et al., "Dynamic Updates in the Domain Name System (DNS Update)," RFC 2136 (1997).
Eastlake, "Secure Domain Name System Dynamic Update," RFC 2137 (1997).
Rigney et al., "Remote Authentication Dial in User Service (Radius)," RFC 2138 (1997).
Rigney, "RADIUS Accounting," RFC 2139 (1997).
Allocchio, "Using the Internet DNS to Distribute Mixer Conformant Global Address Mapping," RFC 2163 (1998).
Daniel et al., "Resolution of Uniform Identifiers Using the Domain Name System," RFC 2168 (1997).
Elz et al., "Clarifications to the DNS Specification," RFC 2181 (1997).
Hamilton et al., "Use of DNS Aliases for Network Services," RFC 2219 (1997).
Kille et al., "Using Domains in LDAP/X.500 Distinguished Names," RFC 2247 (1998).
Bellovin et al., "Report of the IAB Security Architecture Workshop," RFC 2316 (1998).
Moats et al., "Building Directories from DNS: Experiences from WWWSeeker," RFC 2517 (1999).
Eastlake, "RSA/MD5 Keys and Sigs in the Domain Name System (DNS)," RFC 2537 (1999).
Eastlake, "Storage of Diffie-Hellman Keys in the Domain Name Systems (DNS)," RFC 2539 (1999).
Eastlake, "DNS Security Operational Considerations," RFC 2541 (1999).
Eastlake, "Reserved Top Level DNS Names," RFC 2606 (1999).
Aboba et al., "Proxy Chaining and Policy Implementation in Roaming," RFC 2607 (1999).
Vixie, "Extensions Mechanisms for DNS (EDNSO)," RFC 2671 (1999).
Crawford, "Non-Terminal DNS Name Redirection," RFC 2672 (1999).
Srisuresh et al., "Security Model with Tunnel-Mode IPsec for NAT Domains," RFC 2709 (1999).
Eastlake, "Secret Key Establishment for DNS (TKEY RR)," RFC 2930 (2000).
Cisco Security Advisory: PIX Private Link Key Processing and Cryptography Issues (1998) available at http://www.cisco.com/warp/public/707/cisco-sa-19980603-pix-key.shtml.
Gauntlet for IRIX Administrator's Guide (1985).
Gauntlet Firewall for UNIX; Administrator's Guide, Version 4.2 (1996-1998).
Gauntlet Firewall for UNIX; Getting Started Guide, Version 4.2 (1996-1998).
Gauntlet Firewall for UNIX; Netperm Table Reference Guide, Version 4.2 (1996-1998).
Gauntlet Firewall for UNIX, User Guide, Version 4.2 (1996-1998).
Snyder "Review: Firewalls," Network World (1998).
Schlaerth, "Service and Network Management Strategies for ATM in Wireless Networks," Bell Labs Technical Journal (2000).
Fischer et al., "Accounting Solutions in the UMTS Core Network," Bell Labs Technical Journal, 6(2):65-73 (2002).
Bakker et al., "Rapid Development and Delivery of Converged Services Using APLS," Bell Labs Technical Journal (2000).
La Roche et al., "High Speed Data Services Using the Switched Digital Broadband Access Systems," Bell Labs Technical Journal (1997).
Mooi Choo Chuah et al., "Mobile Virtual Private Dial-Up Services," Bell Labs Technical Journal (1999).
Fendick et al., "The PacketStar™ 6400 IP Switch—An IP Switch for the Converged Network," Bell Labs Technical Journal (1998).
Schulzrinne et al., "The Session Initiation Protocol: Providing Advanced Telephony Services Across the Internet," Bell Labs Technical Journal (1998).
Moganti et al., "A Framework for Understanding Network Intelligence," Bell Labs Technical Journal (2001).
Bosco et al., "Evolution of the Wide Area Network," Bell Labs Technical Journal (2000).
Raghavan et al., "Virtual Private Networks and Their Role in E-Business," Bell Labs Technical Journal, 6(2):99-115 (2002).
Sijben et al., "Application-Level Control of IP Networks: IP Beyond the Internet," Bell Labs Technical Journal (2001).
Kozik et al., "Voice Services in Next-Generation Networks: The Evolution of the Intelligent Network and its Role in Generating New Revenue Opportunities," Bell Labs Technical Journal (1998).
Brenner et al., "CyberCarrier Service and Network Management," Bell Labs Technical Journal (2000).
Stevens et al., "Policy-Based Management for IP Networks," Bell Labs Technical Journal (1999).
Milonas, "Enterprise Networking for the New Millennium," Bell Labs Technical Journal (2000).
Busschbach, "Toward QoS-Capable Virtual Private Networks," Bell Labs Technical Journal (1998).
McGee et al., "Dynamic Virtual Private Networks," Bell Labs Technical Journal, 6(2):116-135 (2002).
Veeraraghavan, "Connection Control in ATM Networks," Bell Labs Technical Journal (1997).
Erfani et al., "Network Management: Emerging Trends and Challenges," Bell Labs Technical Journal (1999).
Rodriguez-Moral, "LIBRA—An Integrated Framework for Type of Service-Based Adaptive Routing in the Internet and Intranets," Bell Labs Technical Journal (1997).
Colbert et al., "Advanced Services: Changing How We Communicate," Bell Labs Technical Journal (2001).
Kocan et al., "Universal Premises Access to Voice Band and ATM Networks Using a Broadband Interworking Gateway," Bell Labs Technical Journal (1998).
Kozik et al., "On Opening PSTN to Enhances Voice/Data Services—The PINT Protocol Solution," Bell Labs Technical Journal (2000).
Doshi et al., "A Comparison of Next-Generation IP-Centric Transport Architectures," Bell Labs Technical Journal (1998).
Bergren et al., "Wireless and Wireline Convergence," Bell Labs Technical Journal (1997).
Al-Salameh et al., "Optical Networking," Bell Lab Technical Journal (1998).
Bauer, "IP Exchange Systems—Redefining Distributed Communications in the Enterprise," Bell Labs Technical Journal, (1999).
Dianda et al., "Reducing Complexity for Converged Voice/Data Networks and Services Architecture," Bell Labs Technical Journal (2000).
Meeuwissen et al., "The FRIENDS Platform—A Software Platform for Advanced Services and Applications," Bell Labs Technical Journal (2000).
Unmehopa et al., "The Support of Mobile Internet Applications in UMTS Networks Through the Open Service Access," Bell Labs Technical Journal 6(2):47-64 (2002).
Varadharajan et al., "Information Security and Privacy; Lecture Notes in Computer Science 1270," (1997).
Cisco Delivers Internet Infrastructure for Carrier-Class Voice Quality, Apr. 28, 1998.
Cisco Product Catalog, Cisco IP/VC 3500 Series—Videoconferencing Products, May 2000.
Cisco Simplifies H.323 Multimedia Conferencing for Enterprises and Service Providers, Apr. 28, 1998.
Kotha, "Deploying H.323 Applications in Cisco Networks," White Paper, Cisco Systems, Inc. (1998).
H.332 Architecture and Design, Cisco Systems (2000).
Empowering the Internet Generation, Cisco Systems, Inc. (2000).
Intel and Cisco Complete Interoperability Tests to Deliver H.323 Connectivity, Oct. 6, 1998.

(56) References Cited

OTHER PUBLICATIONS

Spectrus Multipoint Video Conferencing Service Operational & Performance Specifications; Technical Reference Guide, Bellsouth, May 1995.
Lambert, "IP Service Switches Could Give CLECs Hosted-App Portal Power," Jul. 1, 1999 available at http://www.exhangmag.com/articles/971work1.html.
IP Service Intelligence at the Edge; Enabling Value-Added Services Over DSL (Apr. 2000).
Next Generation IP Conferencing Systems, Ridgeway Systems & Software; White Paper (1999).
Gupta et al., "Secure and Mobile Networking," Mobile Networks and Applications, 3:381-390 (1998).
Guin et al., "Application of Virtual Private Networking Technology to Standards-Based Management Protocols Across Heterogeneous Firewall-Protected Networks," IEEE (1999).
Zao et al., "A Public-Key Based Secure Mobile IP," Wireless Networks, J.C. Baltzer AG, Science Publishers, 5:373-390 (1999).
Wirbel, "Upgraded Tools Promse Scalable Virtual Networks," Electronic Engineering Times, pp. 60 (1998).
Rescorla et al., "The Secure HyperText Transfer Protocol," RFC 2660 (1999).
Lioy et al., "DNS Security," Terena Networking Conference, May 22-25, 2000.
Gilmore et al., "Secure Remote Access to an Internal Web Server," IEEE Network (1999).
Kiuchi et al., "Using a WWW-based Mail User Agent for Secure Electronic Mail Service for Health Care Users," Methods of Information in Medicine, 37:247-253 (1998).
Kiuchi et al., "Automated Generation of a World Wide Web-Based Data Entry and Check Program for Medical Applications," Computer Methods and Programs in Biomedicine, 52:129-138 (1996).
Kiuchi et al., "A World Wide Web-Based User Interface for a Data Management System for Use in Multi-Institutional Clinical Trials—Development and Experimental Operation of an Automated Patient Registration and Random Allocation System," Elsevier Science Inc., 17:476-493 (1996).
Kiuchi et al., "University Medical Information Network—Past, Present, and Future," Medinfo (1998).
A Natural Extension of Cisco Systems IP Networking Expertise, The Cisco AS5300/Voice Gateway Relays High Quality Voice and Fax Traffic Across an IP Network, Data Sheet (1999).
Altiga Networks, Building Remote Access VPNs (1999).
VPN; The Remote Access Solution, A Comprehensive Guide to Evaluating: Security, Administration, Implementation (1997) available at www.compatible.com.
10/100 Ethernet—DES I/O Card Administrator's Guide, Compatible Systems Corporation (1999) available at www.compatible.com.
Compatiview 5.4 Reference Guide, Compatible Systems Corporation (1999) www.compatible.com.
HSSI-DES I/O Card Administrator's Guide, Compatible Systems Corporation (1999) www.compatible.com.
IntraPort 2 and IntraPort 2+ VPN Access Server Installation Guide, Compatible Systems Corporation (1998) www.compatible.com.
IntraPortVPN Access Server Installation Guide, Compatible Systems Corporation (1998) www.compatible.com.
IntraPort 2 and IntraPort 2+ VPN Access Server Administrator's Guide, Compatible Systems Corporation (1999) www.compatible.com.
IntraPort Carrier-2 Chassis Administrator's Guide, Compatible Systems Corporation (1999) www.compatible.com.
IntraPort Carrier-8 Chassis Administrator's Guide, Compatible Systems Corporation (1999) www.compatible.com.
IntraPort Client Software Reference Guide, Compatible Systems Corporation (1999) www.compatible.com.
IntraPort Enterprise-2 VPN Access Server; Administrator's Guide, Compatible Systems Corporation (1999) www.compatible.com.
IntraPort Enterprise-8 VPN Access Server; Installation Guide, Compatible Systems Corporation (1999) www.compatible.com.
Text-Based Configuration and Command Line Management; Reference Guide, Compatible Systems Corporation (1998) www.compatible.com.
VPN Client Software Reference Guide, Compatible Systems Corporation (1999) www.compatible.com.
Release Notes for Cisco Secure PIX Firewall Version 5.0(3), Cisco Systems (2000).
Valencia et al., "Cisco Layer Two Forwarding (Protocol) L2F," RFC 2341 (1998).
Schulzrinne, "SIP: Status and Directions," Department of Computer Science, Columbia University (1999).
Schulzrinne, "SIP: More Than Grandma's Phone Calls," Department of Computer Science, Columbia University (1999).
Willis, "The Future is SIP," ISSN: 1046-4468, 10(19):1046-4468 (1999).
Borthick, Convergence Gets Complicated; Industry Trend or Event, ISSN:0162-3885, 29(11):6 (1999).
Vovida Networks and Nuera Communications Team to Enhance Vovida's Free SIP Protocol Stack for Voice over IP Applications; Business Wire (1999).
Kraskey et al., "NPN: Next-Generation Network Voice Services; Internet/Web/Online Service Information," ISSN:1093-8001 (1999).
Lucent Technologies Introduces the Elemedia™ SIP Server, A Software Platform for Integrated IP Telecommunications Services, PR Newswire Association, Inc. PR Newswire (1999).
3Com and Level 3 Test Next Generation of Telephone Systems and IP Networks to Speed the Deployment of New Business and Consumer Services, Business Wire, Inc. (2000).
Stahl, "Domain Administrators Guide," RFC 1032 (1987).
Partridge, "Mail Routing and the Domain System," RFC 974 (1986).
Mockapetris, "Domain System Changes and Observations," RFC 973 (1986).
Harrenstien et al., "DOD Internet Host Table Specification," RFC 952 (1985).
Postel, "Domain Name System Implementation Schedule—Revised," RFC 921 (1984).
Postel, Domain Name System Implementation Schedule—RFC 897 (1984).
Mockapetris, "Domain Name—Concepts and Facilities," RFC 882 (1983).
Postel, "The Domain Name Plan and Schedule," RFC 881 (1983).
Zaw-Sing Su, "The Domain Naming Convention for Internet User Applications," RFC 819 (1982).
Earrenstien et al., "Hostnames Server," RFC 811 (1982).
Postel, "Computer Mail Meeting Notes," RFC 805 (1982).
Luotonen, "Tunneling SSL Through a WWW Proxy," Internet-Draft (1997).
Luotonen, "Tunneling SSL Through a WWW Proxy," Internet-Draft (Dec. 1995).
Luotonen, "Tunneling SSL Through a WWW Proxy," Internet-Draft (Nov. 1995).
Luotonen, "Tunneling SSL Through a WWW Proxy," Internet-Draft (Jun. 1995).
Cooper et al., "The US Domain," RFC 1386 (1992).
Rosenbaum, "Using the Domain Name System to Store Arbitrary String Attributes," Digital Equipment Corp., RFC 1464 (1993).
Cooper et al., "The US Domain," RFC 1480 (1993).
Gavron, "A Security Problem and Proposed Correction with Widely Deployed DNS Software," ACES Research Inc., RFC 1535 (1993).
Kumar et al, "Common DNS Implementation Errors and Suggested Fixes," RFC 1536 (1993).
Beertema, "Common DNS Data File Configuration Errors," RFC 1537 (1993).
Hanks et al., "Generic Routing Encapsulation over IPv4 Networks," RFC 1702 (1994).
Romao, "Tools for DNS Debugging," RFC 1713 (1994).
Eastlake et al., "Randomness Recommendations for Security," RFC 1750 (1994).
Federal Networking Council, "U.S. Government Internet Domain Names," RFC 1811 (1995).

(56) References Cited

OTHER PUBLICATIONS

Federal Networking Council, "U.S. Government Internet Domain Names," RFC 1816 (1995).
Karn et al., "The ESP DES-CBC Transform," RFC 1829 (1995).
Hinden et al., "IP Version 6 Addressing Architecture," RFC 1884 (1995).
Schulzrinne et al., "RTP: A Transport Protocol for Real-Time Applications," Audio-Video Transport Working Group, RFC 1889 (1996).
Schulzrinne, "RTP Profile for Audio and Video Conferences with Minimal Control," RFC 1890 (1996).
Barr, "Common DNS Operational and Configuration Errors," RFC 1912 (1996).
Rekher et al., "Address Allocation for Private Internets," RFC 1918 (1996).
Deutsch, "ZLIB Compressed Data Format Specification Version 3.3," Network Working Group, RFC 1950 (1996).
Engebretson et al., "Registration in the MIL Domain," RFC 1956 (1996).
Elz et al., "Serial Number Arithmetic," RFC 1982 (1996).
Ohta, "Incremental Zone Transfer in DNS," RFC 1995 (1996).
Vixie, "A Mechanism for Prompt Notification of Zone Changes (DNS Notify)," Network Working Group, RFC 1996 (1996).
Manning et al., "Operational Criteria for Root Name Servers," Network Working Group, RFC 2010 (1996).
Speer et al., "RTP Payload Format of Sun's CellB Video Encoding," Network Working Group, RFC 2029 (1996).
Turletti et al., "RTP Payload Format for H.261 Video Streams," Network Working Group, RFC 2032 (1996).
Der-Danieliantz, "The AM (Armenia) Domain," Network Working Group, RFC 2053 (1996).
Rigney et al., "Remote Authentication Dial in User Service (Radius)," Network Working Group, RFC 2058 (1997).
Oehler et al., "HMAC-MDS IP Authentication with Replay Prevention," Network Working Group, RFC 2085 (1997).
Ashworth, "The Naming of Hosts," Network Working Group, RFC 2100 (1997).
Krawczyk et al., "HMAC: Keyed-Hashing for Message Authentication," Network Working Group, RFC 2104 (1997).
Bradner, "Key Words for Use in RFC s to Indicate Requirement Levels," Network Working Group, RFC 2119 (1997).
Crocker, "Mailbox Names for Common Services, Roles and Functions," Network Working Group, RFC 2142 (1997).
Federal Networking Council, "U.S. Government Internet Domain Names," Network Working Group, RFC 2146 (1997).
Elz et al., "Selection and Operation of Secondary DNS Service," Network Working Group, RFC 2182 (1997).
Zhu, "RTP Payload Format for H.263 Video Streams," Network Working Group, RFC 2190 (1997).
Perkins et al., "RTP Payload for Redundant Audio Data," Network Working Group, RFC 2198 (1997).
Cheng et al., "Test Cases for HMAC-MDS and HMAC-SHA-1," Network Working Group, RFC 2202 (1997).
Vaughan, "A Legal Basis for Domain Name Allocation," Network Working Group, RFC 2240 (1997).
Dierks et al., "The TLS Protocol Version 1.0," Network Working Group, RFC 2246 (1999).
Hoffman et al., "RTP Payload Format for MPEG1/MPEG2 Video," Network Working Group, RFC 2250 (1998).
Howard et al., "An Approach for Using LDAP as a Network Information Service," Network Working Group, RFC 2307 (1998).
Andrews, "Negative Caching of DNS Queries (DNS NCACHE)," RFC 2308 (1998).
Eidnes et al., "Classless IN-ADDR.ARPA Delegation," Network Working Group, RFC 2317 (1998).
Schulzrinne et al., "Real Time Streaming Protocol (RTSP)," Network Working Group, RFC 2326 (1998).
Civanlar et al., "RTP Payload Format for Bundled MPEG," Network Working Group, RFC 2343 (1998).
Vaughan, "A Convention for Using Legal Names as Domain Names," Network Working Group, RFC 2352 (1998).
McDonald et al., "PF_Key Key Management API, Version 2," Network Working Group, RFC 2367 (1998).
Hinden et al., "IP Version 6 Addressing Architecture," Network Working Group, RFC 2373 (1998).
Hinden et al., "AN IPv6 Aggregatable Global Unicase Address Format," Network Working Group, RFC 2374 (1998).
Grimstad et al., "Naming Plan for Internet Directory-Enabled Applications," Network Working Group, RFC 2377 (1998).
Pereira, "IP Payload Compression Using DEFLATE," Network Working Group, RFC 2394 (1998).
Friend et al., "IP Payload Compression Using LZS," Network Working Group, RFC 2395 (1998).
Bormann et al., "RTP Payload Format for the 1998 Version of ITU-T Rec. H.263 Video (H.263+)," Network Working Group, RFC 2429 (1998).
Tynan, "RTP Payload Format for BT.656 Video Encoding," Network Working Group, RFC 2431 (1998).
Berc et al., "RTP Payload Format for JPEG-Compressed Video," Network Working Group, RFC 2435 (1998).
Pereira, "The ESP CBC-Mode Cipher Algorithms," Network Working Group, RFC 2451 (1998).
Casner et al., "Compressing IP/UDP/RTP Headers for Low-Speed Serial Links," Network Working Groups, RFC 2508 (1999).
Karn et al., "ICMP Security Failures Messages," Network Working Groups, RFC 2521 (1999).
Karn et al., "Photuris: Session-Key Management Protocol," Network Working Group, RFC 2522 (1999).
Eastlake, "DSA Keys and SIGs in the Domain Name System (DNS)," Network Working Group, RFC 2536 (1999).
Gilligan et al., "Basic Socket Interface Extensions for IPv6," Network Working Group, RFC 2553 (1999).
Newman, "Using TLS with IMAP, POP3 and ACAP," Network Working Group, RFC 2595 (1999).
Franks et al., "HTTP Authentication: Basic and Digest Access Authentication," Network Working Group, RFC 2617 (1999).
Hamzeh et al., "Point-to-Point Tunneling Protocol (PPTP)," Network Working Group, RFC 2637 (1999).
McKay, "RTP Payload Format for PureVoice™ Audio," Network Working Group, RFC 2658 (1999).
Rescorla, "The Secure HyperText Transfer Protocol," Network Working Group, RFC 2660 (1999).
Crawford, "Binary Labels in the Domain Name System," Network Working Group, RFC 2673 (1999).
Fox et al., "Virtual Private Networks Identifier," Network Working Group, RFC 2685 (1999).
Medvinskey, "Addition of Kerberos Cipher Suites to Transport Layer Security (TLS)," Network Working Group, RFC 2712 (1999).
Rosenberg, et al., "An RTP Payload Format for Generic Forward Error Correction," Network Working Group, RFC 2733 (1999).
Fox et al., "NHRP Support for Virtual Private Networks," Network Working Group, RFC 2735 (1999).
Handley, et al., "Guidelines for Writers of RTP Payload Format Specifications," Network Working Group, RFC 2736 (1999).
Rosenberg et al., "Sampling of the Group Membership in RTP," Network Working Group, RFC 2762 (2000).
Gleeson et al., "A Framework for IP Based Virtual Private Networks," Network Working Group, RFC 2764 (2000).
Hellstrom, "RTP Payload for Text Conversation," Network Working Group, RFC 2793 (2000).
Aboba et al., "Implementation of L2TP Compulsory Tunneling via RADIUS," Network Working Group, RFC 2809 (2000).
Khare et al., "Upgrading to TLS within HTTP/1.1," Network Working Group, RFC 2817 (2000).
Rescorla, "HTTP Over TLS," Network Working Group, RFC 2818 (2000).
Daigle, "A Tangled Web: Issues of I18N, Domain Names, and the Other Internet Protocols," Network Working Group, RFC 2825 (2000).
Internet Architecture Board, "IAB Technical Comment on the Unique DNS Root," Network Working Group, RFC 2826 (2000).

(56) References Cited

OTHER PUBLICATIONS

Vixie et al., "Secret Key Transaction Authentication for DNS (TSIG)," Network Working Group, RFC 2845 (2000).
Petrack et al., "The PINT Service Protocol: Extensions to SIP and SDP for IP Access to Telephone Call Services," Network Working Group, RFC 2848 (2000).
Keromytis et al., "The Use of HMAC-RIPEMD-160-96 within ESP and AH," Network Working Group, RFC 2857 (2000).
Civanlar et al., "RTP Payload Format for Real-Time Pointers," Network Working Group, RFC 2862 (2000).
Rigney et al., "Remote Authentication Dial in User Service (RADIUS)," Network Working Group, RFC 2865 (2000).
Crawford et al., "DNS Extensions to Support IPv6 Address Aggregation and Renumbering," Network Working Group, RFC 2874 (2000).
Srisuresh, "Secure Remote Access with L2TP," Network Working Group, RFC 2888 (2000).
Mealling, "The Naming Authority Pointer (NAPTR) DNS Resource Record," Network Working Group, RFC 2915 (2000).
Muthukrishnan et al., "A Core MPLS IP VPN Architecture," Network Working Group, RFC 2917 (2000).
Chen, "Route Refresh Capability for BGP-4," Network Working Group, RFC 2918 (2000).
Eastlake et al., "Domain Name System (DNS) IANA Considerations," Network Working Group, RFC 2929 (2000).
Eastlake et al., DNS Request and Transaction Signatures, Network Working Group, RFC 2931 (2000).
Baugher et al., "Real-Time Transport Protocol Management Information Base," Network Working Group, RFC 2959 (2000).
Donovan, "The SIP INFO Method," Network Working Group, RFC 2976 (2000).
Wellington, "Secure Domain Name System (DNS) Dynamic Update," Network Working Group, RFC 3007 (2000).
Wellington, "Domain Name System Security (DNSSEC) Signing Authority," Network Working Group, RFC 3008 (2000).
Rosenberg et al., "Registration of parityfec MIME Types," Network Working Group, RFC 2000 (2000).
Kikuchi et al., "RTP Payload Format for MPEG-4 Audio/Visual Streams," Network Working Group, RFC 3016 (2000).
Rosen et al., "Multiprotocol Label Switching Architecture," Network Working Group, RFC 3031 (2001).
Rosen et al., "MPLS Label Stack Encoding," Network Working Group, RFC 3032 (2001).
Anderson et al., "LDP Specification," Network Working Group, RFC 3036 (2001).
Thomas et al., "LDP Applicability," Network Working Group, RFC 3037 (2001).
Luthi, "RTP Payload Format for ITU-T Recommendation G.722.1," Network Working Group, RFC 2001 (2001).
Lennox et al., "Common Gateway Interface for SIP," Network Working Group, RFC 3050 (2001).
Heath et al., "Pp Payload Compression Using ITU-T V.44 Packet Method," Network Working Group, RFC 3051 (2001).
Rawat et al., "Layer Two Tunneling Protocol (L2TP) over Frame Relay," Network Working Group, RFC 3070 (2001).
Klensin, "Reflections on the DNS, RFC 1591, and Categories of Domains," Network Working Group, RFC 3070 (2001).
Pall et al., "Microsoft Point-To-Point Encryption (MPPE) Protocol," Network Working Group, RFC 3078 (2001).
Zorn, "Deriving Keys for use with Microsoft Point-to-Point Encryption (MPPE)," Network Working Group, RFC 3079 (2001).
Campbell et al., "Control of Service Context Using SIP Request-URI," Network Working Group, RFC 3087 (2001).
Lewis, "DNS Security Extension Clarification on Zone Status," Network Working Group, RFC 3090 (2001).
Bremen et al., "Robust Header Compression (ROHC): Framework and Four Profiles: RTP, UDP,ESP, and Uncompressed," Network Working Group, RFC 3095 (2001).
Borella et al., "Realm Specific IP: Framework," Network Working Group, RFC 3102 (2001).
Borella et al., "Realm Specific IP: Protocol Specification," Network Working Group, RFC 3103 (2001).
Montenegro et al., "RSIP Support for End-to-End IPsec," Network Working Group, RFC 3104 (2001).
Eastlake, "RSA/SHA-1 SIGs and RSA KEYs in the Domain Name System (DNS)," Network Working Group, RFC 3110 (2001).
Finlayson, "A More Loss-Tolerant RTP Payload Format for MP3 Audio," Network Working Group, RFC 3119 (2001).
Thomas, "Requirements for Kerberized Internet Negotiation of Keys," Network Working Group, RFC 3129 (2001).
Lewis, "Notes from the State-of-the-Technology: DNSSEC," Network Working Group, RFC 3130 (2001).
Kempf, "Dormant Mode Host Alerting ("IP Paging") Problem Statement," Network Working Group, RFC 3132 (2001).
Verma et al., "L2TP Disconnect Cause Information," Network Working Group, RFC 3145 (2001).
Bush, "Delegation of IP6.ARPA," Network Working Group, RFC 3152 (2001).
Perkins et al., "RTP Testing Strategies," Network Working Group, RFC 3158 (2001).
Huston, "Management Guidelines & Operational Requirements for the Address and Routing Parameter Area Domain ("arpa")," Network Working Group, RFC 3172 (2001).
Shacham et al., "IP Payload Compression Protocol (IPComp)," Network Working Group, RFC 3173 (2001).
Kobayashi et al., "RTP Payload Format for DV (IEC 61834) Video," Network Working Group, RFC 3189 (2002).
Kobayashi et al., "RTP Payload Format for 12-bit DAT Audio and 20- and 24-bit Linear Sampled Audio," Network Working Group, RFC 3190 (2002).
Patel et al., "Securing L2TP Using IPsec," Network Working Group, RFC 3193 (2001).
Austein, "Applicability Statement for DNS MIB Extensions," Network Working Group, RFC 3197 (2001).
Hoffman, "SMTP Service Extensions for Secure SMTP over Transport Layer Security," Network Working Group, RFC 3207 (2002).
Conrad, "Indicating Resolver Support of DNSSEC," Network Working Group, RFC 3225 (2001).
Gudmundsson, "DNSSEC and IPv6 A6 Aware Server/Resolver Message Size Requirements," Network Working Group, RFC 3226 (2001).
Hardie, "Distributing Authoritative Name Servers via Shared Unicast Addresses," Network Working Group, RFC 3258 (2002).
Rosenberg et al., "SIP: Session Initiation Protocol," Network Working Group, RFC 3261 (2002).
Rosenberg et al., "Reliability of Provisional Responses in the Session Initiation Protocol (SIP)," Network Working Group, RFC 3262 (2002).
Resenberg et al., "Session Initiation Protocol (SIP): Locating SIP Servers," Network Working Group, RFC 3263 (2002).
Rosenberg et al., "An Offer/Answer Model with the Session Description Protocol (SDP)," Network Working Group, RFC 3264 (2002).
Roach et al., "Session Initiation Protocol (SIP)-Specific Event Notification," Network Working Group, RFC 3265 (2002).
Olson et al., "Support for IPv6 in Session Description Protocol (SDP)," Network Working Group, RFC 3266 (2002).
Sjoberg et al., "Real-Time Transport Protocol (RTP) Payload Format and File Storage Format for the Adaptive Multi-Rate (AMR) and Adaptive Multi-Rate Wideband (AMR-WB) Audio Codecs," Network Working Group, RFC 3267 (2002).
Chown, "Advanced Encryption Standard (AES) Ciphersuites for Transport Layer Security (TLS)," Network Working Group, RFC 3268 (2002).
T'Jones et al., "Layer Two Tunneling Protocol (L2TP0:ATM Access Network Extensions," Network Working Group, RFC 3301 (2002).
Srisuresh et al., "Middlebox Communication Architecture and Framework," Network Working Group, RFC 3303 (2002).
Calhoun et al., "Layer Two Tunneling Protocol (L2TP) Differentiated Services Extension," Network Working Group, RFC 3308 (2002).

(56) References Cited

OTHER PUBLICATIONS

Niemi et al., "Hypertext Transfer Protocol (HTTP) Digest Authentication Using Authentication and Key Agreement (AKA)," Network Working Group, RFC 3310 (2002).
Rosenberg, "The Session Initiation Protocol (SIP) Update Method," Network Working Group, RFC 3311 (2002).
Camarillo et al., "Integration of Resource Management and SIP," Network Working Group, RFC 3312 (2002).
Marshall, "Private Session Initiation," Private Session Initiation Protocol (SIP) Extensions for Media Authorization, Network Working Group, RFC 3313 (2003).
Wasserman, "Recommendations for IPv6 in Third Generation Partnership Project (3GPP) Standards," Network Working Group, RFC 3314 (2002).
Schulzrinne et al., "Dynamic Host Configuration Protocol (DHCPv6) Options for Session Initiation Protocol (SIP) Servers," Network Working Group, RFC 3319 (2003).
Price et al., "Signaling Compression (SigComp)," Network Working Group, RFC 3320 (2003).
Hannu et al., "Signaling Compression (SigComp)—Extended Operations," Network Working Group, RFC 3321 (2003).
Hannu et al., "Signaling Compression (SigComp) Requirements & Assumptions," Network Working Group, RFC 3322 (2003).
Peterson, "A Privacy Mechanism for the Session Initiation Protocol," Network Working Group, RFC 3323 (2002).
Watson, "Short Term Requirements for Network Asserted Identity," Network Working Group, RFC 3324 (2002).
Jennings et al., "Private Extensions to the Session Initiation Protocol (SIP) for Asserted Identity within Trusted Networks," Network Working Group, RFC 3325 (2002).
Schulzrinne et al., "The Reason Header Field for the Session Initiation Protocol (SIP)," Network Working Group, RFC 3326 (2002).
Willis et al., "Session Initiation Protocol (SIP) Extension Header Field for Registering Non-Adjacent Contracts," Network Working Group, RFC 3327 (2002).
Arkko et al., "Security Mechanism Agreement for the Session Initiation Protocol (SIP)," Network Working Group, RFC 3329 (2003).
Charlton et al., "User Requirements for the Session Initiation Protocol (SIP) in Support of Deaf, Hard of Hearing and Speech-Impaired Individuals," Network Working Group, RFC 3351 (2002).
Singh et al., "Layer Two Tunneling Protocol (L2TP) Over ATM Adaptation Layer 5 (AAL5)," Network Working Group, RFC 3355 (2002).
Schulzrinne, "Dynamic Host Configuration Protocol (DHCP-for-Ipv4) Option for Session Initiation Protocol (SIP) Servers," Network Working Group, RFC 3361 (2002).
Bush et al., "Representing Internet Protocol Version 6 (IPv6) Addresses in the Domain Name System (DNS)," Network Working Group, R 3363 (2002).
Austein, "Tradeoffs in Domain Name System (DNS) Support for Internet Protocol Version 6 (IPv6)," Network Working Group, RFC 3364 (2002).
Caves et al., "Layer Two Tunneling Protocol "L2TP" Management Information Base," Network Working Group, RFC 3371 (2002).
Vemuri et al., "Session Initiation Protocol for Telephone (SIP-T): Context and Architectures," Network Working Group, RFC 3372 (2002).
Camarillo et al., "Grouping of Media Lines in the Session Description Protocol (SDP)," Network Working Group, RFC 338 (2002).
Zopf, "Real-Time Transport Protocol (RTP) Payload for Comfort Noise (CN)," Network Working Group, RFC 3389 (2002).
Camarillo et al., "Integrated Services Digital Network (ISDN) User Part (ISUP) to Session Initiation Protocol (SIP) Mapping," Network Working Group, RFC 3398 (2002).
Mealling, "Dynamic Delegation Discovery System (DDDS) Part One: The Comprehensive DDDS," Network Working Group, RFC 3401 (2002).

Mealling, "Dynamic Delegation Discovery System (DDDS) Part Two: The Algorithm," Network Working Group, RFC 3402 (2002).
Mealling, "Dynamic Delegation Discovery System (DDDS) Part Three: The Domain Name System (DNS) Database," Network Working Group, RFC 3403 (2002).
Mealling, "Dynamic Delegation Discovery System (DDDS) Part Four: The Uniform Resource Identifiers (URI) Resolution Application," Network Working Group, RFC 3404 (2002).
Mealing, "Dynamic Delegation Discovery System (DDDS) Part Five: URI.ARPA Assignment Procedures," Network Working Group, RFC 3405 (2002).
Andersen, "Session Description Protocol (SDP) Simple Capability Declaration," Network Working Group, RFC 3407 (2002).
Sparks, "Internet Media Type Message/Sipfrag," Network Working Group, RFC 3420 (2002).
Lawrence, "Obsoleting Iquery," Network Working Group, RFC 3425 (2002).
Mankin et al., "Change Process for the Session Initiation Protocol (SIP)," Network Working Group, RFC 3427 (2002).
Campbell et al., "Session Initiation Protocol (SIP) Extension for Instant Messaging," Network Working Group, RFC 3428 (2002).
Palter et al., "Layer-Two Tunneling Protocol Extension for PPP Link Control Protocol Negotiation," Network Working Group, RFC 3437 (2002).
Massay et al., "Limiting the Scope of the KEY Resource Record," Network Working Group, RFC 3445 (2002).
Garcia-Martin, "Private Header (P-Header) Extensions to the Session Initiation Protocol (SIP) for the $3^{rd}$-Generation Partnership Project (3GPP)," Network Working Group, RFC 3455 (2003).
Patel et al., "Dynamic Host Configuration Protocol (DHCPv4) Configuration of IPsec Tunnel Mode," Network Working Group, RFC 3456 (2003).
Kelly et al., "Requirements for IPsec Remote Access Scenarios," Network Working Group, RFC 3457 (2003).
Klensin, "Role of the Domain Name System (DNS)," Network Working Group, RFC 3467 (2003).
Garcia-Martin, "The Session Initiation Protocol (SIP) and Session Description Protocol (SDP) Static Dictionary for Signaling Compression (SigComp)," Network Working Group, RFC 3485 (2003).
Camarillo, "Compressing the Session Initiation Protocol (SIP)," Network Working Group, RFC 3486 (2003).
Schulzrinne, "Requirements for Resource Priority Mechanisms for the Session Initiation Protocol (SIP)," Network Working Group, RFC 3487 (2003).
Faltstrom et al., "Internationalizing Domain Names in Applications (IDNA)," Network Working Group, RFC 3490 (2003).
Hoffman et al., "Nameprep: A Stringprep Profile for Internationalized Domain Names (IDN)," Network Working Group, RFC 3491 (2003).
Costello, "Punycode: A Bootstring Encoding of Unicode for Internationalized Domain Names in Applications (IDNA)," Network Working Group, RFC 3492 (2003).
Gilligan et al., "Basic Socket interface Extensions for IPv6," Network Working Group, RFC 3493 (2003).
Gharai et al., "RTP Payload Format for Society of Motion Picture and Television Engineers (SMPTE) 292M Video," Network Working Group, RFC 3497 (2003).
Hinden et al., "Internet Protocol Version 6 (IPv6) Addressing Architecture," Network Working Group, RFC 3513 (2003).
Sparks, "The Session Initiation Protocol (SIP) Refer Method," Network Working Group, RFC 3515 (2003).
Camarillo et al., "Mapping of Media Streams to Resource Reservation Flows," Network Working Group, RFC 3524 (2003).
Kivinen et al., "More Modular Exponential (MODP) Diffie-Hellman Groups for Internet Key Exchange (IKE)," Network Working Group, RFC 3526 (2003).
Koren et al., "Enhanced Compressed RTP (CRTP) for Links with High Delay, Packet Loss and Reordering," Network Working Group, RFC 3545 (2003).
Blake-Wilson et al., "Transport Layer Security (TLS) Extensions," Network Working Group, RFC 3546 (2003).
Baugher et al., "The Group Domain of Interpretation," Network Working Group, RFC 3547 (2003).

(56) References Cited

OTHER PUBLICATIONS

Schulzrinne et al., "RTP: A Transport Protocol for Real-Time Applications," Network Working Group, RFC 3550 (2003).
Schulzrinne et al., "RTP Prole for Audio and Video Conferences with Minimal Control," Network Working Group, RFC 3551 (2003).
Bellovin et al., "On the Use of Stream Control Transmission Protocol (SCTP) with IPsec," Network Working Group, RFC 3554 (2003).
Casner et al., "MIME Type Registration of RTP Payload Formats," Network Working Group, RFC 3555 (2003).
Xie, "RTP Payload Format for European Telecommunications Standards Institute (ETSI) European Standard ES 201 108 Distributed Speech Recognition Encoding," Network Working Group, RFC 3557 (2003).
Li, "RTP Payload Format for Enhanced Variable Rate Codecs (EVRC) and Selectable Mode Vocoders (SMV)," Network Working Group, RFC 3558 (2003).
Press Release, Microsoft releases Windows NetMeeting 3 to the Web; New Version Now Available for Download (1999).
Microsoft Windows NetMeeting 3 Readme Windows 2000, Microsoft Corporation Business Review (1999).
Microsoft Windows NetMeeting 3.03 Beta 1 Readme, Microsoft Corporation (1999).
Baan Midmarket Solutions (BMS), Baan Can Company ,Microsoft Corporation Business Review (1998).
Portland Trail Blazers, Business Review, Microsoft Corporation Business Review (1998).
Deere & Company, Intranet Solutions, Microsoft Corporation Business Review (1997).
Dow Chemical, Microsoft Corporation Business Review (1998).
FileNet Corporation, Netmeeting, Microsoft Corporation Business Review (1997).
Ford Motor Company, Netmeeting, Microsoft Corporation Business Review (1997).
Irving, "Meet Me on the Internet," Internet Magazine Archive, Microsoft Corporation (1997).
Microsoft Netmeeting and the Role of Internet Conferencing for Deaf and Hard-of-Hearing Users, Netmeeting, Microsoft Corporation (1997).
Northrop Grumman, Microsoft Corporation Business Review (1998).
The Tompkins Group, Netmeeting, Microsoft Corporation Business Review (1997).
Toys "R" Us, Microsoft Business Review (1998).
Windows NetMeeting, Overview an Direction, Microsoft Corporation (1999).
PC Expo in New York, Technology for Business, Miller Freeman Group (1997-1999).
Microsoft Windows NetMeeting 3 Resource Kit, The Technical Guide to Installing, Configuring, and Supporting NetMeeting 3 in your Organization, Microsoft Corporation (1996-1999).
Hayes et al., Microsoft NetMeeting 3.0 Security Assessment and Configuration Guide, Systems and Network Attack Center, Version 1.14 (2001).
Schulzrinne, The Session Initiation Protocol (SIP), Columbia University (1998-1999).
NetMeeting Data Conferencing Strategy, Microsoft Corporation (1998).
Integrating NetMeeting & TAPI 3.0, NetMeeting Development Team TAPI 3.0 IP Telephony Team, Microsoft Corporation (Oct. 28, 1998).
Microsoft Windows NetMeeting 3 Resource Kit, The Technical Guide to Installing, Configuring, and Supporting NetMeeting 3 in your Organization, Microsoft Corporation (1996-2001).
ITU-T Recommendation T.127 "Terminals for Telematic Services—Multipoint Binary File Transfer Protocol," Telecommunication Standardization Sector of ITU (1995).
ITU-T Recommendation T.128 "Terminals for Telematic Services—Multipoint Application Sharing," Telecommunication Standardization Sector of ITU (1998).
ITU-T Recommendation T.140 "Series T: Terminal Equipment and Protocols for Telematic Services; Text Conversation Protocol for Multimedia Application," ITU-T—Telecommunication Standardization Sector of ITU (1997).
Buddy List: A Whitepaper, Microsoft Corporation (1997).
Corporate Remote Access Alternatives—iPass White Paper, Nov. 21, 1998, iPass, Inc. ("IPASS").
International Technical Support Organization, "Understanding OSF DCE 1.1 for AIX and OS/2," IBM (1995).
Wenger et al., "RTP Payload Format for H.264 Video," Network Working Group, RFC 3984 (2005).
Bryant et al., "Pseudo Wire Emulation Edge-to-Edge (PWE3) Architecture," Network Working Group, RFC 3985 (2005).
Berners-Lee, et al., "Uniform Resource Identifier (URI): Generic Syntax," Network Working Group, RFC 3986 (2005).
Duerst, et al., "International Resource Identifiers (IRIs)," Network Working Group, RFC 3987 (2005).
Schulzrinne, "Indication of Message Composition for Instant Messaging," Network Working Group, RFC 3994 (2005).
SonicWall/Aventail Whitepaper, SSL VPN Combined with Network Security. SonicWALL Clean VPN (2008).
Anyware Technology Announces Java Technology Security Product for Internet Communications, EverLink Suite Provides Secure Remote Network Access Via the Internet, (1998).
RSA Provides Security for Anyware Technology's Java-Based Internet Communications Product, EverLink Suite Incorporates RSA Technology to Provide Secure Remote Network Access, (1998).
Anyware Technology to Introduce New Channel Partner Program During Varvision 1998, Media Alert (1998).
Anyware Technology Launches Channel Partner Program, Company Builds VAR Channel for Its Everlink Suite of Secure Remote Access and Communications Software, News for Immediate Release (1998).
Anyware Technology Adds Three New Key Personnel, Fast Growing Software Developer Hires Director of Channel Sales, Telemarking Account Manager and Quality Assurance Engineer, News for Immediate Release (1998).
Anyware Technology Ships EverLink, The World's First Personal Virtual Private Network Software, News for Immediate Release (1998).
Anyware Technology Includes 30-Day Trial of Esafe Anti-Virus/ Anti Vandal Software With Its Personal VPN Product, Pioneer of Remote Access & Secure Communications Software Partners with ESafe Technologies to Enhance EverLink Suite with Anti-Virus/ Anti-Vandal Protection, News for Immediate Release (1998).
Anyware Technology Announces Strategic Var Partnerships with Codaram Corporation and RF Microsystems, Resellers Bring EverLink Suite of Secure Remote Access and Communications Software to Two Specific Vertical and Regional Markets, News for Immediate Release (1998).
Anyware Technology Ships New Version of Everlink Suite, Software Upgrade Brings New Levels of Flexibility and Ease of Use to Instant Secure Remote Access and Communications, News for Immediate Release (1999).
Quittek et al., "Definitions of Managed Objects for Robust Header Compression (ROHC)," Network Working Group, RFC 3816 (2004).
Townsley et al., "Layer 2 Tunneling Protocol (L2TP) Active Discovery Relay for PPP over Ethernet (PPPoE)," Network Working Group, RFC 3817 (2004).
Peterson et al., "Using E.164 Numbers with the Session Initiation Protocol (SIP)," Network Working Group, RFC 3824 (2004).
Polk et al., "Dynamic Host Configuration Protocol Option for Coordinate-Based Location Configuration Information," Network Working Group, RFC 3825 (2004).
Arkko et al., "MIKEY: Multimedia Internet KEYing," Network Working Group, RFC 3830 (2004).
Atkins et al., "Threat Analysis of the Domain Name System (DNS)," Network Working Group, RFC 3833 (2004).

(56) References Cited

OTHER PUBLICATIONS

Rosenberg et al., "Indicating User Agent Capabilities in the Session Initiation," Network Working Group, RFC 3840 (2004).
Rosenberg et al., "Caller Preferences for the Session Initiation Protocol (SIP)," Network Working Group, RFC 3841 (2004).
Mahy, "A Message Summary and Message Waiting Indication Event Package for the Session Initiation Protocol (SIP)," Network Working Group, RFC 3842 (2004).
Schlyter, "DNS Security (DNSSEC) NextSECure (NSEC) RDATA Format," Network Working Group, RFC 3845 (2004).
Peterson, "S/MIME Advanced Encryption Standard (AES) Requirement for the Session Initiation Protocol (SIP)," Network Working Group, RFC 3853 (2004).
Rosenberg, "A Presence Event Package for the Session Initiation Protocol (SIP)," Network Working Group, RFC 3856 (2004).
Rosenberg, A Watcher Information Event Template-Package for the Session Initiation Protocol (SIP), Network Working Group, RFC 3857 (2004).
Rosenberg, "An Extensible Markup Language (XML) Based Format for Watcher Information," Network Working Group, RFC 3858 (2004).
Peterson, "Common Profile for Presence (CPP)," Network Working Group, RFC 3859 (2004).
Peterson, "Common Profile for Instance Messaging (CPIM)," Network Working Group, RFC 3860 (2004).
Peterson, "Address Resolution for Instant Messaging and Presence," Network Working Group, RFC 3861 (2004).
Klyne et al, "Common Presence and Instant Messaging (CPIM): Message Format," Network Working Group, RFC 3862 (2004).
Sugano et al., "Presence Information Data Format (PIDF)," Network Working Group, RFC 3863 (2004).
Lennox et al., "Call Processing Language (CPL): A Language for User Control of Internet Telephony Services," Network Working Group, RFC 3880 (2004).
Touch et al., "Use of IPsec Transport Mode for Dynamic Routing," Network Working Group, RFC 3884 (2004).
Westerlund, "A Transport Independent Bandwidth Modifier for the Session Description Protocol (SDP)," Network Working Group, RFC 3890 (2004).
Mahy et al., "The Session Initiation Protocol (SIP) "Replaces" Header," Network Working Group, RFC 3891 (2004).
Sparks, "The Session Initiation Protocol (SIP) Referred-Vs. Mechanism," Network Working Group, RFC 3892 (2004).
Peterson, "Session Initiation Protocol (SIP) Authenticated Identity Body (AIB) Format," Network Working Group, RFC 3892 (2004).
Durand et al., "DNS IPv6 Transport Operational Guidelines," Network Working Group, RFC 3901 (2004).
Niemi, "Session Initiation Protocol (SIP) Extension for Event State Publication," Network Working Group, RFC 3903 (2004).
Gurbani et al., "The Spirits (Services in PSTN Requesting Internet Services) Protocol," Network Working Group, RFC 3910 (2004).
Mahy et al., "The Session Initiation Protocol (SIP) "Join" Header," Network Working Group, RFC 3911 (2004).
Xiao et al., "Requirements for Pseudo-Wire Emulation Edge-to-Edge (PWE3)," Network Working Group, RFC 3916 (2004).
Lau et al., "Layer Two Tunneling Protocol—Version 3 (L2TPv3)," Network Working Group, RFC 3931 (2005).
Friend, "Transport Layer Security (TLS) Protocol Compression Using Lempel-Ziv-Stac (LZS)," Network Working Group, RFC 3943 (2004).
Kivinen et al., "Negotiation of NAT-Traversal in the IKE," Network Working Group, RFC 3947 (2005).
Huttunen et al., "UDP Encapsulation of IPsec ESP Packets," Network Working Group, RFC 3948 (2005).
Duric, "Real-Time Transport Protocol (RTP) Payload Format for Internet Low Bit Rate Codec (iLBC) Speech," Network Working Group, RFC 3952 (2004).
Peterson, "Telephone No. Mapping (ENUM) Service Registration for Presence Services," Network Working Group, RFC 3953 (2005).

Daigle et al., "Domain-Based Applications Service Location Using SRV RRS and the Dynamic Delegation Discovery Service (DDDS)," Network Working Group, RFC 3958 (2005).
Camarillo, "The Early Session Disposition Type for the Session Initiation Protocol (SIP)," Network Working Group, RFC 3959 (2004).
Camarillo et al, Early Media and Ringing Tone Generation in the Session Initiation Protocol (SIP), Network Working Group, RFC 3960 (2004).
Schulzrinne, "The tel URI for Telephone Numbers," Network Working Group, RFC 3966 (2004).
Camarillo, "The Internet Assigned Number Authority (IANA) Header Field Parameter Registry for the Session Initiation Protocol (SIP)," Network Working Group, RFC 3968 (2004).
Camarillo, "The Internet Assigned Number Authority (IANA) Uniform Resource Identifier (URI) Parameter Registry for the Session Initiation Protocol (SIP)," Network Working Group, RFC 3969 (2004).
Gurbani et al., "Interworking SIP and Intelligent Network (IN) Applications," Network Working Group, RFC 3976 (2005).
Frankel, et al, "The AES-XCBC-MAC-96 Algorithm and Its use with IPsec," Network Working Group, RFC 3556 (2003).
Goyret, "Signaling of Modem-On-Hold Status in Layer 2 Tunneling Protocol (L2TP)," Network Working Group, RFC 3573 (2003).
Soininen, "Transition Scenarios for 3GPP Networks," Network Working Group, RFC 3574 (2003).
Camarillo et al., "Mapping of Integrated Services Digital Network (ISDN) User Part (ISUP) Overlap Signaling to the Session Initiation Protocol (SIP)," Network Working Group, RFC 3578 (2003).
Rosenberg et al., "An Extension to the Session Initiation Protocol (SIP) for Symmetric Response Routing," Network Working Group, RFC 3581 (2003).
Jason et al., "IPsec Configuration Policy Information Model," Network Working Group, RFC 3585 (2003).
Blaze et al., "IP Security Policy (IPSP) Requirements," Network Working Group, RFC 3586 (2003).
Thompson et al., "DNS Extensions to Support IP Version 6," Network Working Group, RFC 3596 (2003).
Gustafsson, "Handling of Unknown DNS Resource Record (RR) Types," Network Working Group, RFC 3597 (2003).
Frankel et al., "The AFS-CBC Cipher Algorithm and its use with IPsec," Network Working Group, RFC 3602 (2003).
Marshall et al., "Private Session Initiation Protocol (SIP) Proxy-to-Proxy Extensions for Supporting the PacketCable Distributed Call Signaling Architecture," Network Working Group, RFC 3603 (2003).
Huitema, "Real Time Control Protocol (RTCP) Attribute in Session Description Protocol," Network Working Group, RFC 3605 (2003).
Willis et al., "Session Initiation Protocol (SIP) Extension Header Field for Service Route Discovery During Registration," Network Working Group, RFC 3608 (2003).
Friedman et al., "RTP Control Protocol Extended Reports (RTCP XR)," Network Working Group, RFC 3611 (2003).
Van Der Meer et al., "RTP Payload Format for Transport of MPEG-4 Elementary Streams," Network Working Group, RFC 3640 (2003).
Kwan et al., "Generic Security Service Algorithm for Secret Key Transaction Authentication for DNS (GSS-TSIG)," Network Working Group, RFC 3645 (2003).
Droms, "DNS Configuration Options for Dynamic Host Configuration Protocol for IPv6 (DHCPv6)," Network Working Group, RFC 3646 (2003).
Wellington et al., "Redefinition of DNS Authenticated Data (AD) Bit," Network Working Group, RFC 3655 (2003).
Gudmudsson, "Delegation Signer (DS) Resource Record (RR)," Network Working Group, RFC 3658 (2003).
Johnston et al., "Session Initiation Protocol (SIP) Basic Call Flow Examples," Network Working Group, RFC 3665 (2003).
Johnston et al., "Session Initiation Protocol (SIP) Public Switched Telephone Network (PSTN) Call Flows," Network Working Group, RFC 3666 (2003).
Rosenberg, "A Session Initiation Protocol (SIP) Event Package for Registrations," Network Working Group, RFC 3680 (2004).

(56) References Cited

OTHER PUBLICATIONS

Housley, "Using Advanced Encryption Standard (AES) Counter Mode with IPsec Encapsulating Security Payload (ESP)," Network Working Group, RFC 3686 (2004).
Cuellar et al., "Geopriv Requirements," Network Working Group, RFC 3693 (2004).
Danley et al., "Threat Analysis of the Geopriv Protocol," Network Working Group, RFC 3694 (2004).
Klensin, "Application Techniques for Checking and Transformation of Names," Network Working Group, RFC 3696 (2004).
Loughney et al., "Authentication, Authorization and Accounting Requirements for the Session Initiation Protocol (SIP)," Network Working Group, RFC 3702 (2004).
Huang et al., "A Traffic-Based Method of Detecting Dead Internet Key Exchange (IKE) Peers," Network Working Group, RFC 3706 (2004).
Baugher et al., "The Secure Real-Time Transport Protocol (SRTP)," Network Working Group, RFC 3711 (2004).
Aboba et al., "IPsec-Network Address Translation (NAT) Compatibility Requirements," Network Working Group, RFC 3715 (2004).
Aboba et al., "Securing Block Storage Protocols Over IP," Network Working Group, RFC 3723 (2004).
Rosenberg et al., "Best Current Practices for Third Party Call Control (3pcc) in the Session Initiation Protocol (SIP)," Network Working Group, RFC 3725 (2004).
Hollenbeck, "Transport Layer Security Protocol Compression Methods," Network Working Group, RFC 3749 (2004).
Nikander et al, "IPv6 Neighbor Discovery (ND) Trust Models and Threats," Network Working Group, RFC 3756 (2004).
Kolkman et al., "Domain in Name System Key (DNSKEY) Resource Record (RR) Secure Entry Point (SEP) Flag," Network Working Group, RFC 3757 (2004).
Faltstrom et al., "The E. 164 to Uniform Resource Identifiers (URI) Dynamic Delegation Discovery System (DDDS) Application (ENUM)," Network Working Group, RFC 3761 (2004).
Peterson, "Enumservice Registration for Session Initiation Protocol (SIP) Addresses of Record," Network Working Group, RFC 3764 (2004).
Arkko et al, "Using IPsec to Protect Mobile IPv6 Signaling Between Mobile Nodes and Home Agents," Network Working Group, RFC 3776 (2004).
Nagarajan, "Generic Requirements for Provider Provisioned Virtual Private Networks (PPVPN),"3809 (2004).
"Altiga Proves Multi-Vendor Interoperability for Seamless VPN Deployment; VPN Workshop Marks Significant Development in the VPN Market," Business Publications, Business Wire Jul. 12, 1999.
Thomas, "Recipe for E-Commerce,", IEEE Internet Computing, (1997) available for download at http://computer.org/internet/.
Vyncke, "Build a Site to Site VPN Without Static Address," (1999).
Altiga Networks, Inc., Altiga VPN Concentrator Series (C50) Versus Nortel Networks Contivity Extranet Switch 4000 and 45000, VPN Tunneling Competitive Evaluation, The Tolly Group, (1999).
International Telecommunication Union; H.323, Series H: Audio-visual and Multimedia Systems; Infrastructure of Audiovisual Services—Systems and Terminal Equipment for Audiovisual Services (1999).
Cisco Systems, VPN 3000 Concentrator Series, User Guide; Release 2.5 (2000).
Cisco Systems, VPN 3000 Concentrator Series, Getting Started; Release 2.5 (2000).
Cisco Systems, VPN 3000 Client, User Guide; Release 2.5 (2000).
Cisco Simplifies H.323 Multimedia Conferencing for Enterprises and Service Providers, Multimedia Conference Manager Provides Policy Management for Voice over IP and Videoconferencing (1998) Article Available at http://web.archive.org/web/200006231265145/www.cisco.com/warp/public/146/pressroom/1998/apr98/25html.
IP and Frame Relay: Bridging the Gap for Seamless and Secure Virtual Private Networking, White Paper, Cosine Communications (1998-2000).
Cisco Systems, Cisco IP/VC Quick Product Overview (1999).
Aziz et al., "Simple Key-Management for Internet Protocols," IPSEC Working Group, Internet Draft (1996).
Karn et al., "Photuris: Session-Key Management Protocol," Network Working Group, Internet Draft (1997).
Microsoft Claim Chart of U.S. Pat. No. 6,839,759; vs. the Automative Network eXchange (ANX) references (1997, 1999).
Akamatsu et al., "Construction of Infrastructure for Global R&D," Omron Technics, 38(3) Consecutive No. 127 (1998).
Zimmerer et al., "MIME Media Types for ISUP and QSIG Objects," Network Working Group, Request for Comments: 3204 (2001).
Karn et al, "Photuris: Extended Schemes and Attributes," Network Working Group, Request for Comments: 2523 (1999).
Klensin et al., "Domain Names and Company Name Retrieval," Network Working Group, Request for Comments: 2345 (1998).
Gilligan et al., "Basic Socket Interface Extensions for IPv6," Network Working Group, Request for Comments: 2133 (1997).
Libes, "Choosing a Name for Your Computer," Network Working Group, Request for Comments: 1178 (1990).
Young, "New Protocol Connects Voice Over IP," NetworkWorldFusion, Network World Dec. 13, 1999.
Mockapetris, "Domain Names—Implementation and Specification," Network Working Group, Request for Comments: 883 (1983).
Handley, "Session Invitation Protocol," Internet Engineering Task Force, Internet Draft (1996).
Berners-Lee, et al., "Uniform Resource Locators (URL)," Network Working Group, Request for Comments: 1738 (1994).
Response to RFP: Altiga, Network World Fusion, May 10, 1999.
Agreement dated Jun. 8, 1999 between Microsoft and Limelight Regarding Event Rental Charge.
Microsoft Netmeeting Conferencing Software, San Diego State University, Case Study Library (1999).
Networked Multimedia Technologies Enable Stanford Collaborative Learning Program, Stanford University: Creating a Virtual Master Builder Atelier, Draft: Sep. 28, 1998.
Compatible Systems Corporation; CompatiView 4 Reference Guide 1995-1997.
Remote Access VPN User Authentication Model—VPN/VLAN Textbook, Sep. 11, 1999. (English Abstract not Available).
Cisco PIX Firewall Series 1992-1999.
IPR2014-00481; Inter Partes Review of U.S. Pat. No. 7,188,180 filed on Mar. 7, 2014, Petitioner Apple Inc.,—Petition for Inter Partes Review, 65 pages.
IPR2014-00481; Inter Partes Review of U.S. Pat. No. 7,188,180 filed on Mar. 7, 2014, Petitioner Apple Inc.,—Exhibit 1029: Declaration of Michael Fratto Regarding U.S. Pat. No. 7,188,180, 233 pages (2014).
IPR2014-00482; Inter Partes Review of U.S. Pat. No. 7,188,180 filed on Mar. 7, 2014, Petitioner Apple Inc.,—Petition for Inter Partes Review, 68 pages.
IPR2014-00482; Inter Partes Review of U.S. Pat. No. 7,188,180 filed on Mar. 7, 2014, Petitioner Apple Inc.,—Exhibit 1029: Declaration of Michael Fratto Regarding U.S. Pat. No. 7,188,180, 233 pages (2014).
IPR2014-00483; Inter Partes Review of U.S. Pat. No. 7,987,274 filed on Mar. 7, 2014, Petitioner Apple Inc.,—Petition for Inter Partes Review, 63 pages.
IPR2014-00483; Inter Partes Review of U.S. Pat. No. 7,987,274 filed on Mar. 7, 2014, Petitioner Apple Inc.,—Exhibit 1029: Declaration of Michael Fratto Regarding U.S. Pat. No. 7,188,180, 191 pages (2014).
IPR2014-00484; Inter Partes Review of U.S. Pat. No. 7,987,274 filed on Mar. 7, 2014, Petitioner Apple Inc.,—Petition for Inter Partes Review, 63 pages.
IPR2014-00484; Inter Partes Review of U.S. Pat. No. 7,987,274 filed on Mar. 7, 2014, Petitioner Apple Inc.,—Exhibit 1029: Declaration of Michael Fratto Regarding U.S. Pat. No. 7,987,274, 191 pages (2014).
IPR2014-00485; Inter Partes Review of U.S. Pat. No. 8,051,181 filed on Mar. 7, 2014, Petitioner Apple Inc.,—Petition for Inter Partes Review, 73 pages.

(56) References Cited

OTHER PUBLICATIONS

IPR2014-00485; Inter Partes Review of U.S. Pat. No. 8,051,181 filed on Mar. 7, 2014, Petitioner Apple Inc.,—Exhibit 1011: Declaration of Dr. Roch Guerin, 24 pages (2014).
IPR2014-00485; Inter Partes Review of U.S. Pat. No. 8,051,181 filed on Mar. 7, 2014, Petitioner Apple Inc.,—Exhibit 1029: Declaration of Michael Fratto, 448 pages (2014).
IPR2014-00485; Inter Partes Review of U.S. Pat. No. 8,051,181 filed on Mar. 7, 2014, Petitioner Apple Inc.,—Exhibit 1014: US District Court Civil Docket 6:10cv94, *Virnetx Inc. v. Microsoft Corporation* dated Aug. 21, 2013.
IPR2014-00485; Inter Partes Review of U.S. Pat. No. 8,051,181 filed on Mar. 7, 2014, Petitioner Apple Inc.,—Exhibit 1083: ITU-T Recommendation H.225.0; Call Signaling Protocols and Media Stream Packetization for Packet-Based Multimedia Communication Systems, Series H: Audiovisual and Multimedia Systems (1998).
IPR2014-00485; Inter Partes Review of U.S. Pat. No. 8,051,181 filed on Mar. 7, 2014, Petitioner Apple Inc.,—Exhibit 1084: ITU-T Recommendation H.235; Security and Encryption for H-Series (H.323 and other H.245-Based) Multimedia Terminals, Series H: Audiovisual and Multimedia Systems (1998).
IPR2014-00485; Inter Partes Review of U.S. Pat. No. 8,051,181 filed on Mar. 7, 2014, Petitioner Apple Inc.,—Exhibit 1085: ITU-T Recommendation H.245;Control Protocol for Multimedia Communication, Series H: Audiovisual and Multimedia Systems (1998).
IPR2014-00485; Inter Partes Review of U.S. Pat. No. 8,051,181 filed on Mar. 7, 2014, Petitioner Apple Inc.,—Exhibit 1070: Joint Claim Construction and Prehearing Statement filed Feb. 14, 2014.
IPR2014-00485; Inter Partes Review of U.S. Pat. No. 8,051,181 filed on Mar. 7, 2014, Petitioner Apple Inc.,—Exhibit 1071: Parties' Joint List of Proposed Construction of Remaining Disputed Claim Terms dated Feb. 25, 2013.
IPR2014-00486; Inter Partes Review of U.S. Pat. No. 8,051,181 filed on Mar. 7, 2014, Petitioner Apple Inc.,—Petition for Inter Partes Review, 72 pages.
IPR2014-00486; Inter Partes Review of U.S. Pat. No. 8,051,181 filed on Mar. 7, 2014, Petitioner Apple Inc.,—Exhibit 1029: Declaration of Michael Fratto, 448 pages (2014).
Request for Inter Partes Reexamination of U.S. Pat. No. 7,490,151 filed on Aug. 16, 2011, Requester Cisco Systems.,—Original Petition to Request Inter Partes Reexamination, 210 pages.
BinTec Communications AG; Extended Feature Guide, Version 1.2 (1999).
Eagle Integrated Enterprise; Network Security System, 5.0 Reference Guide (1998).
Configuration Guide for the Cisco Secure PIX Firewall Version 5.0; Configuration Forms (1999).
Overview of Access VPNs and Tunneling Technologies, 1998, Cisco Systems, Inc.
Bianca/Brick—XMP; User's Guide—Hardware and Installation, Version 1.3 (1999).
Cisco Multimedia Conference Manager; Provides H.323 Gatekeeper and Proxy Services for Reliable and Scalable Videoconferencing and Voice-over-IP Deployments (1999).
Cisco Multimedia Conference Manager; Release 11.3 (Microsoft Invalidity Contentions Documents dated Mar. 20, 2014).
Trial Transcript in *VirnetX Inc. v. Apple Inc.*, 6:10-cv-417 (E.D. Tex. Oct. 31, 2012 to Nov. 6, 2012.
VirnetX's Opening Claim Construction Brief, *VirntX Inc. v. Apple Inc.*, 6:11-cv-563, 6:12-cv-855 (E.D. Tex. Mar. 24, 2014).
IPR2014-00558; Inter Partes Review of U.S. Pat. No. 6,502,135 filed on Mar. 31, 2014, Petitioner Microsoft Corp.,—Petition for Inter Partes Review, 56 pages.
IPR2014-00558, Ex. 1003, Declaration of Dr. Roch Guerin submitted Mar. 31, 2014 (41 pages).
IPR2014-00610—Petition for Inter Partes Review of U.S. Pat. No. 7,490,151 filed on Apr. 10, 2014 by Petitioner Microsoft Corp. (67 pages).
IPR2014-00610—Ex. 1003 Guerin Declaration (43 pages).
VirnetX Opening Claim Construction Brief dated Mar., 24, 2014 (30 Pages).
Exhibit C., Mitel CC Order dated Mar. 24, 2014 (14 pages).
IPR2014-00610—Ex. 1004 Guerin CV filed Apr. 10, 2014 (15 pages).
IPR2014-00612—Petition for Inter Partes Review of U.S. Pat. No. 7,418,540 filed on Apr. 14, 2014 by Petitioner Microsoft Corp. (66 pages).
IPR2014-00612—Ex. 1004 Guerin Declaration filed Apr. 14, 2014 (43 pages).
IPR2014-00613—Petition for Inter Partes Review of U.S. Pat. No. 7,418,540 filed on Apr. 11, 2014 by Petitioner Microsoft Corp. (64 pages).
IPR2014-00613—Ex. 1023 Guerin Declaration filed Apr. 11, 2014 (24 pages).
IPR2014-00614—Petition for Inter Partes Review of U.S. Pat. No. 7,418,540 filed on Apr. 14, 2014 by Petitioner Microsoft Corp. (66 pages).
IPR2014-00614—Ex. 1021 Guerin Declaration filed Apr. 14, 2014 (25 pages).
IPR2014-00615—Petition for Inter Partes Review of U.S. Pat. No. 7,921,211 filed on Apr. 14, 2014 by Petitioner Microsoft Corp. (65 pages).
IPR2014-00615—Ex. 1021 Guerin Declaration filed Apr. 14, 2014 (26 pages).
IPR2014-00616—Petition for Inter Partes Review of U.S. Pat. No. 7,921,211 filed on Apr. 14, 2014 by Petitioner Microsoft Corp. (66 pages).
IPR2014-00615—Ex. 1022 Guerin Declaration filed Apr. 14, 2014 (36 pages).
IPR2014-00616—Petition for Inter Partes Review of U.S. Pat. No. 7,921,211 filed on Apr. 11, 2014 by Petitioner Microsoft Corp. (65 pages).
IPR2014-00615—Ex. 1023 Guerin Declaration filed Apr. 11, 2014 (24 pages).
Decision on Appeal in Reexamination Control No. 95/001,792 mailed Apr. 1, 2014 (27 pages).
Institution Decision in IPR2014-00237 mailed May 14, 2014 (34 pages).
Institution Decision in IPR2014-00238 mailed May 14, 2014 (23 pages).
Microsoft's Amended Preliminary Invalidity Contentions in Case No. 6:13-cv-00351 submitted Apr. 1, 2014 (43 pages).
Curry Declaration in *VirnetX Inc. v. Apple Inc.*, Case No. 6:11-cv-00563 (E.D Tex. Mar. 24, 2014) (3 pages).
Ex. D, VirnetX, Inc. Opening Brief in support of its Construction of Claims in *VirnetX Inc. v. Microsoft Corporation*, Case No. 6:07-cv-00080-LED (E.D Tex. Dec. 30, 2008) (54 pages).
Ex. E, VirnetX, Inc. Reply Brief in support of its Construction of Claims in *VirnetX Inc. v. Microsoft Corporation*, Case No. 6:07-cv-00080-LED (E.D Tex. Feb. 3, 2009) (29 pages).
Ex. F, Transcript of Claim Construction Markman Hearing in *VirnetX Inc. v. Microsoft Corporation*, Case No. 6:07-cv-00080-LED (E.D Tex. Feb. 17, 2009) (94 pages).
Ex. G, Declaration of Mark T. Jones, Ph.D for Opening Brief in *VirnetX Inc. v. Microsoft Corporation*, Case No. 6:07-cv-00080-LED (E.D Tex. Dec. 30, 2009) (33 pages).
Ex. H, Declaration of Mark T. Jones, Ph.D for Reply Brief in *VirnetX Inc. v. Microsoft Corporation*, Case No. 6:07-cv-00080-LED (E.D Tex. Feb. 3, 2009) (183 pages).
Ex. I, Virnetx's Opening Claim Construction Brief in *VirnetX Inc. v. Cisco Systems, Inc.*, Case No. 6:10-cv-00417 (E.D Tex. Nov. 4, 2011) (37 pages).
Ex. J, Virnetx's Reply Claim Construction Brief in *VirnetX Inc. v. Cisco Systems, Inc.*, Case No. 6:10-cv-00417 (E.D Tex. Dec. 19, 2011) (14 pages).
Ex. K, Transcript of Claim Construction Markman Hearing in *VirnetX Inc. v. Cisco Systems, Inc.*, Case No. 6:10-cv-00417 (E.D Tex. Jan. 5, 2012) (124 pages).
Ex. L, Declaration of Mark T. Jones, Ph.D for Opening Brief in *VirnetX Inc. v. Cisco Systems, Inc.*, Case No. 6:10-cv-00417 (E.D Tex. Nov. 3, 2011) (17 pages).

(56) References Cited

OTHER PUBLICATIONS

Ex. M, Virnetx's Opening Claim Construction Brief in *VirnetX Inc. v. Mitel Networks Corporation et al.*, Case No. 6:11-cv-00018 (E.D Tex. May 21, 2012) (29 pages).
Ex. N, Virnetx's Reply Claim Construction Brief in *VirnetX Inc. v. Mitel Networks Corporation et al.*, Case No. 6:11-cv-00018 (E.D Tex. Jun. 25, 2012) (14 pages).
Ex. O, Transcript of Claim Construction Markman Hearing in *VirnetX Inc. v. Cisco Systems, Inc.*, and Mitel Networks Corporation et al., Case No. 6:10-cv-00417 (E.D Tex. Jul. 12, 2012) (169 pages).
Ex. P, Declaration of Mark T. Jones, Ph.D for Opening Brief in *VirnetX Inc. v. Mitel Networks Corporation et al.*, Case No. 6:11-cv-00018 (E.D Tex. May 20, 2012) (8 pages).
Ex. Q, Patent Owner's Response to Office Action of Sep. 26, 2012 (65 pages).
Declaration of Mark T. Jones, Ph.D for Opening Brief in *VirnetX Inc. v. Apple, Inc.*, Case No. 6:11-cv-00563 (E.D Tex. Mar. 24, 2014) (15 pages).
Apple's Responsive Claim Construction Brief in *VirnetX Inc. v. Apple, Inc.*, Case No. 6:12-cv-00855-LED (E.D Tex. Apr. 21, 2014) (36 pages).
Declaration of Akshay S. Deoras in support of Apple's Responsive Claim Construction Brief in *VirnetX Inc. v. Apple, Inc.*, Case No. 6:12-cv-00855-LED (E.D Tex. Apr. 21, 2014) (4 pages).
Ex. 7, Memorandum Opinion in *VirnetX Inc. v. Microsoft Corporation*, Case No. 6:07-cv-00080 (E.D Tex. Jul. 30, 2009) (36 pages).
Ex. 8, Memorandum Opinion and Order in *VirnetX Inc. v. Cisco Systems, Inc.*, Case No. 6:10- cv-00417-LED (E.D Tex. Apr. 25, 2012) (32 pages).
Ex. 9, Memorandum Opinion and Order in *VirnetX Inc. v. Mitel Networks Corporation*, Case No. 6:11-cv-00018-LED (E.D Tex. Aug. 1, 2012) (14 pages).
Ex. 10, Cisco's Reply Claim Construction Brief in *VirnetX Inc. v. Cisco Systems, Inc.*, Case No. 6:10-cv-00417 LED (E.D Tex. Dec. 7, 2011) (38 pages).
Ex. 11, Declaration of John P. Kelly for Reply Brief in *VirnetX Inc. v. Cisco Systems, Inc.*, Case No. 6:10-cv-00417 LED (E.D Tex. Dec. 5, 2011) (7 pages).
Ex. 12, OA Closing Prosecution regarding U.S. Pat. No. 7,418,504 (55 pages).
Ex. 13, Resp to Sep. 26, 2012 OA regarding U.S. Pat. No. 7,418,504 (65 pages).
Ex. 14, Dec. 26, 2012 Resp to Sep. 26, 2012 OA regarding U.S. Pat. No. 7,921,211 (68 pages).
Ex. 15, Dec. 26, 2013 Appeal Brief regarding U.S. Pat. No. 7,418,504 (87 pages).
Ex. 16, Excerpt of VirnetX's Apr. 21, 2014 Corrected IC regarding U.S. Pat. No. 8,504,697(3 pages).
Ex. 17, U.S. Appl. No. 13/339,257 regarding U.S. Pat. No. 8,504,697 (94 pages).
Ex. 18, Final Rejection dated Dec. 10, 2012 regarding U.S. Pat. No. 8,504,697 (9 pages).
Ex. 19, Feb. 27, 2013 Resp. To Final Rejection of Dec. 10, 2012 regarding U.S. Pat. No. 8,504,697 (9 pages).
Ex. 20, May 16, 2013 Notice of Allowance regarding U.S. Pat. No. 8,504,697 (9 pages).
Ex. 21, Excerpt of Am. Heritage Dictionary 2000.
Ex. 22, Excerpt of Webster's II New College Dictionary 2001.
Ex. 23, Oct. 8, 2010 Request for Cont Examination & Resp.
Declaration of John P. Kelly for Reply Brief in *VirnetX Inc. v. Apple, Inc.*, Case No. 6:12-cv-00855 LED (E.D Tex. Apr. 21, 2014) (8 pages).
Virnetx's Final Reply Claim Construction Brief in *VirnetX Inc. v. Apple Inc.*, Case No. 6:11-cv-00563 (E.D Tex. Apr. 28, 2014) (13 pages).
Ex. A, John P. Kelly Expert report regarding NonInfringement in *VirnetX Inc. v. Cisco Systems, Inc.*, E.D Tex. (Apr. 28, 2014) Case No. 6:10-cv-00417 LED (4 pages).
Apple's Notice of Filing Hearing Presentation Slides in *VirnetX Inc. v. Apple, Inc.*, Case No. 6:12-cv-00855 LED (E.D Tex. May. 20, 2014) (3 pages).
Ex. A, Markman Hearing Presentation Slides in *VirnetX Inc. v. Apple, Inc.*, Case No. 6:12-cv-00855 LED (E.D Tex. May. 20, 2014) (141 pages).
Ex. B, MPSJ on Invalidity Counterclaims Presentation Slides in *VirnetX Inc. v. Apple, Inc.*, Case No. 6:12-cv-00855 LED (E.D Tex. May, 20, 2014) (40 pages).
Ferguson et al., What is VPN (1998).
Gaur, Securing Name Servers on UNIX/Linux Journal, Linux Journal, No. 68 (1999).
1081—Deposition Transcript of M. Fratto.
1083—IPR2014-00237 Deposition Transcript of Fabian Monrose.
Ex 2019 Guerin Deposition Transcript.
IPR2014-00403 Institution Decision.
IPR2014-00404 Institution Decision.
IPR2014-00481 Institution Decision.
IPR2014-00482 Institution Decision.
IPR2014-00483 Institution Decision.
IPR2014-00484 Institution Decision.
IPR2014-00610 Institution Decision.
P033 IPR2014-00237_Nov. 21, 2014 Petitioner's Reply.
P033 IPR2014-00238_Nov. 21, 2014 Petitioner's Reply.
European Office Action dated Mar. 30, 2015 from corresponding European Application No. 11005793.2.
Microsoft Petition for Inter Partes Review of U.S. Pat. No. 7,921,211, filed on Apr. 11, 2014, (65 pages).
Declaration of Dr. Roch Guerin, U.S. Pat. No. 7,921,211, filed on Apr. 11, 2014, 24 pages.
IPR2014-01418—Petition for Inter Partes Review of U.S. Pat. No. 7,188,180 filed on Aug. 29, 2014, (67 pages).
IPR2014-01421—Declaration of Dr. Roch Guerin, U.S. Pat. No. 7.188.180, filed on Aug. 29, 2014, 24 pages.
IPR2014-01421—Microsoft Petition for Inter Partes Review of U.S. Pat. No. 7,188,180 filed on Aug. 29, 2014, (65 pages).
Declaration of Dr. Roch Guerin, U.S. Pat. No. 7,188,180, filed on Aug. 29, 2014, 24 pages.
IPR2013-00376—Apple Petition for Inter Partes Review of U.S. Pat. No. 7,490,151 filed on Jun. 23, 2013, (68 pages).
IPR2015-00187—Declaration of Dr. Roch Guerin, U.S. Pat. No. 7,490,151, filed on Oct. 30, 2014, 43 pages.
IPR2015-00185—Declaration of Dr. Roch Guerin, U.S. Pat. No. 7,921,211, filed on Oct. 30, 2014, 26 pages.
IPR2015-00186—Declaration of Dr. Roch Guerin, U.S. Pat. No. 7,921,211, filed on Oct. 30, 2014, 24 pages.
IPR2015-00188—Declaration of Dr. Roch Guerin, U.S. Pat. No. 7,418,504, filed on Oct. 30, 2014, 24 pages.
IPR2015-00189—Declaration of Dr. Roch Guerin, U.S. Pat. No. 7,418,504, filed on Oct. 30, 2014, 25 pages.
IPR2015-00185—Apple Petition for Inter Partes Review of U.S. Pat. No. 7,921,211 filed on Oct. 30, 2014, (69 pages).
IPR2015-00186—Apple Petition for Inter Partes Review of U.S. Pat. No. 7,921,211 filed on Oct. 30, 2014, (69 pages).
IPR2015-00189—Apple Petition for Inter Partes Review of U.S. Pat. No. 7,418,504 filed on Oct. 30, 2014, (70 pages).
IPR2015-00188—Apple Petition for Inter Partes Review of U.S. Pat. No. 7,418,504 filed on Oct. 30, 2014, (66 pages).
IPR2015-00811—Apple Petition for Inter Partes Review of U.S. Pat. No. 8,868,705 filed on Mar. 2, 2015, (70 pages).
IPR2015-00810—Apple Petition for Inter Partes Review of U.S. Pat. No. 8,868,705 filed on Mar. 2, 2015, (63 pages).
IPR2015-00812—Apple Petition for Inter Partes Review of U.S. Pat. No. 8,850,009 filed on Mar. 2, 2015, (70 pages).
IPR2015-00812—Declaration of Dr. Roberto Tamassia Regarding U.S. Pat. Nos. 8,868,705 and 8,850,009, filed on Mar. 2, 2015, 183 pages.
IPR2015-00811—Declaration of Dr. Roberto Tamassia Regarding U.S. Pat. Nos. 8,868,705 and 8,850,009, filed on Mar. 2, 2015, 183 pages.
IPR2015-00810—Declaration of Dr. Roberto Tamassia Regarding U.S. Pat. Nos. 8,868,705 and 8,850,009, Mar. 2, 2015, 183 pages.

(56) References Cited

OTHER PUBLICATIONS

IPR2015-00813—Declaration of Dr. Roberto Tamassia Regarding U.S. Pat. Nos. 8,868,705 and 8,850,009, filed on Mar. 2, 2015, 183 pages.
IPR2015-00813—Petition for Inter Partes Review of U.S. Pat. No. 8,850,009 filed on Mar. 2, 2015, (70 pages).
IPR2015-00866—Petition for Inter Partes Review of U.S. Pat. No. 8,458,341 filed on Mar. 17, 2015, (67 pages).
IPR2015-00866—Declaration of Dr. Roberto Tamassia Regarding U.S. Pat. Nos. 8,458,341, 8,516,131 and 8,560,705, filed on Mar. 17, 2015, 197 pages.
IPR2015-00867—Declaration of Dr. Roberto Tamassia Regarding U.S. Pat. Nos. 8,458,341, 8,516,131 and 8,560,705, filed on Mar. 17, 2015, 197 pages.
IPR2015-00867—Petition for Inter Partes Review of U.S. Pat. No. 8,458,341 filed on Mar. 17, 2015, (70 pages).
IPR2015-00868—Declaration of Dr. Roberto Tamassia Regarding U.S. Pat. Nos. 8,458,341, 8,516,131 and 8,560,705, filed on Mar. 17, 2015, 197 pages.
IPR2015-00868—Petition for Inter Partes Review of U.S. Pat. No. 8,516,131 filed on Mar. 17, 2015, (68 pages).
IPR2015-00869—Declaration of Dr. Roberto Tamassia Regarding U.S. Pat. Nos. 8,458,341, 8,516,131 and 8,560,705, filed on Mar. 17, 2015, 197 pages.
IPR2015-00869—Petition for Inter Partes Review of U.S. Pat. No. 8,516,131 filed on Mar. 17, 2015, (70 pages).
IPR2015-00870—Declaration of Dr. Roberto Tamassia Regarding U.S. Pat. Nos. 8,458,341, 8,516,131 and 8,560,705, filed on Mar. 17, 2015, 197 pages.
IPR2015-00870—Petition for Inter Partes Review of U.S. Pat. No. 8,560,705 filed on Mar. 17, 2015, (66 pages).
IPR2015-00871—Declaration of Dr. Roberto Tamassia Regarding U.S. Pat. Nos. 8,458,341, 8,516,131 and 8,560,705, filed on Mar. 17, 2015, 197 pages.
IPR2015-00871—Petition for Inter Partes Review of U.S. Pat. No. 8,560,705 filed on Mar. 17, 2015, (70 pages).
IPR2015-01009—Microsoft Windows 2000 Professional Resource Kit; Microsoft, filed on Apr. 9, 2015, 1,811 pages.
IPR2015-01009—Microsoft Internet Explorer 5 Resource Kit, filed on Apr. 9, 2015, 673 pages.
IPR2015-01009—U.S. Pat. No. 5,657,390, filed on Apr. 9, 2015, 118 pages.
IPR2015-01010—MS Windows 2000 Professional Resource Kit; Registration Request, filed on Apr. 19, 2015, 2 pages.
IPR2015-01010—Amazon Reviews Microsoft Windows 2000 Server Resource Kit, filed on Apr. 9, 2015, 6 pages.
VanHeyningen, Secure Sockets Layer for SOCKS Version 5; Aventail Corporation dated Mar. 20, 1997, filed on Apr. 9, 2015, 4 pages.
IPR201501010—CERN httpd Reference Manual, filed on Apr. 9, 2015, 82 pages.
IPR2015 —Mangrove Petition for Inter Partes Review for U.S. Pat. No. 6,502,135, filed on Apr. 17, 2015, 42 pages.
IPR2015 —Mangrove Petition for Inter Partes Review for U.S. Pat. No. 7,490,151, filed on Apr. 17, 2015, 63 pages.
Declaration of Dr. Roch Guerin, U.S. Pat. No. 7,490,151, filed on Apr. 17, 2015, 32 pages.
Declaration of Dr. Roch Guerin, U.S. Pat. No. 6,502,135, filed on Apr. 17, 2015, 26 pages.
IPR2015-01009—Declaration of Robert Tamassia, U.S. Pat. No. 8,843,643, filed on Apr. 28, 2015, 127 pages.
IPR2015-01010—Declaration of Robert Tamassia, U.S. Pat. No. 8,843,643, filed on Apr. 28, 2015, 127 pages.
IPR2015-01010—MKP Website (Archive.org Apr. 29, 1997), filed on Apr. 28, 2015.
IPR2015-01010—Web Server Technology Yeager; Google Scholar, filed on Apr. 28, 2015, 3 pages.
IPR2015-01010—U.S. Pat. No. 6,012,126, filed on Apr. 28, 2015, 14 pages.
IPR2015-01009—Petition for Inter Partes Review of U.S. Pat. No. 8,843,643 filed on Apr. 28, 2015, (71 pages).
IPR2015-01010—Petition for Inter Partes Review of U.S. Pat. No. 8,843,643 filed on Apr. 28, 2015, (63 pages).
IPR2014-00404—Final Written Decision, filed on Aug. 11, 2015, 18 pages.
IPR2014-00238—Final Written Decision, filed on Aug. 11, 2015, 15 pages.
IPR2014-00237—Final Written Decision, filed on Aug. 11, 2015, 48 pages.
IPR2014-00403—Final Written Decision, filed on Aug. 11, 2015, 41 pages.
Decision on Appeal in Control U.S. Appl. No. 95/001,746 dated Feb. 11, 2016 (61 pages).

* cited by examiner

PHYSICAL LINK REDUNDANCY

| MODE OR EMBODIMENT | HARDWARE ADDRESSES | IP ADDRESSES | DISCRIMINATOR FIELD VALUES |
|---|---|---|---|
| 1. PROMISCUOUS | SAME FOR ALL NODES OR COMPLETELY RANDOM | CAN BE VARIED IN SYNC | CAN BE VARIED IN SYNC |
| 2. PROMISCUOUS PER VPN | FIXED FOR EACH VPN | CAN BE VARIED IN SYNC | CAN BE VARIED IN SYNC |
| 3. HARDWARE HOPPING | CAN BE VARIED IN SYNC | CAN BE VARIED IN SYNC | CAN BE VARIED IN SYNC |

FIG. 12B

AGILE NETWORK PROTOCOL FOR SECURE COMMUNICATIONS WITH ASSURED SYSTEM AVAILABILITY

RELATED APPLICATIONS

This application is a divisional of U.S. application Ser. No. 11/839,937, filed Aug. 16, 2007, which is a continuation of U.S. application Ser. No. 11/301,022, filed Dec. 13, 2005, now U.S. Pat. No. 7,996,539, issued Aug. 9, 2011, which is a divisional of U.S. application Ser. No. 09/429,643, filed on Oct. 29, 1999, now U.S. Pat. No. 7,010,604, issued Mar. 7, 2006, which claims priority from and bodily incorporates the subject matter of two previously filed provisional patent applications: U.S. Application Ser. No. 60/137,704, filed on Jun. 7, 1999 and U.S. Application Ser. No. 60/106,261, filed on Oct. 30, 1998.

BACKGROUND OF THE INVENTION

A tremendous variety of methods have been proposed and implemented to provide security and anonymity for communications over the Internet. The variety stems, in part, from the different needs of different Internet users. A basic heuristic framework to aid in discussing these different security techniques is illustrated in FIG. 1. Two terminals, an originating terminal 100 and a destination terminal 110 are in communication over the Internet. It is desired for the communications to be secure, that is, immune to eavesdropping. For example, terminal 100 may transmit secret information to terminal 110 over the Internet 107. Also, it may be desired to prevent an eavesdropper from discovering that terminal 100 is in communication with terminal 110. For example, if terminal 100 is a user and terminal 110 hosts a web site, terminal 100's user may not want anyone in the intervening networks to know what web sites he is "visiting." Anonymity would thus be an issue, for example, for companies that want to keep their market research interests private and thus would prefer to prevent outsiders from knowing which web-sites or other Internet resources they are "visiting." These two security issues may be called data security and anonymity, respectively.

Data security is usually tackled using some form of data encryption. An encryption key 48 is known at both the originating and terminating terminals 100 and 110. The keys may be private and public at the originating and destination terminals 100 and 110, respectively or they may be symmetrical keys (the same key is used by both parties to encrypt and decrypt). Many encryption methods are known and usable in this context.

To hide traffic from a local administrator or ISP, a user can employ a local proxy server in communicating over an encrypted channel with an outside proxy such that the local administrator or ISP only sees the encrypted traffic. Proxy servers prevent destination servers from determining the identities of the originating clients. This system employs an intermediate server interposed between client and destination server. The destination server sees only the Internet Protocol (IP) address of the proxy server and not the originating client. The target server only sees the address of the outside proxy. This scheme relies on a trusted outside proxy server. Also, proxy schemes are vulnerable to traffic analysis methods of determining identities of transmitters and receivers. Another important limitation of proxy servers is that the server knows the identities of both calling and called parties. In many instances, an originating terminal, such as terminal A, would prefer to keep its identity concealed from the proxy, for example, if the proxy server is provided by an Internet service provider (ISP).

To defeat traffic analysis, a scheme called Chaum's mixes employs a proxy server that transmits and receives fixed length messages, including dummy messages. Multiple originating terminals are connected through a mix (a server) to multiple target servers. It is difficult to tell which of the originating terminals are communicating to which of the connected target servers, and the dummy messages confuse eavesdroppers' efforts to detect communicating pairs by analyzing traffic. A drawback is that there is a risk that the mix server could be compromised. One way to deal with this risk is to spread the trust among multiple mixes. If one mix is compromised, the identities of the originating and target terminals may remain concealed. This strategy requires a number of alternative mixes so that the intermediate servers interposed between the originating and target terminals are not determinable except by compromising more than one mix. The strategy wraps the message with multiple layers of encrypted addresses. The first mix in a sequence can decrypt only the outer layer of the message to reveal the next destination mix in sequence. The second mix can decrypt the message to reveal the next mix and so on. The target server receives the message and, optionally, a multi-layer encrypted payload containing return information to send data back in the same fashion. The only way to defeat such a mix scheme is to collude among mixes. If the packets are all fixed-length and intermixed with dummy packets, there is no way to do any kind of traffic analysis.

Still another anonymity technique, called 'crowds,' protects the identity of the originating terminal from the intermediate proxies by providing that originating terminals belong to groups of proxies called crowds. The crowd proxies are interposed between originating and target terminals. Each proxy through which the message is sent is randomly chosen by an upstream proxy. Each intermediate proxy can send the message either to another randomly chosen proxy in the "crowd" or to the destination. Thus, even crowd members cannot determine if a preceding proxy is the originator of the message or if it was simply passed from another proxy.

ZKS (Zero-Knowledge Systems) Anonymous IP Protocol allows users to select up to any of five different pseudonyms, while desktop software encrypts outgoing traffic and wraps it in User Datagram Protocol (UDP) packets. The first server in a 2+-hop system gets the UDP packets, strips off one layer of encryption to add another, then sends the traffic to the next server, which strips off yet another layer of encryption and adds a new one. The user is permitted to control the number of hops. At the final server, traffic is decrypted with an untraceable IP address. The technique is called onion-routing. This method can be defeated using traffic analysis. For a simple example, bursts of packets from a user during low-duty periods can reveal the identities of sender and receiver.

Firewalls attempt to protect LANs from unauthorized access and hostile exploitation or damage to computers connected to the LAN. Firewalls provide a server through which all access to the LAN must pass. Firewalls are centralized systems that require administrative overhead to maintain. They can be compromised by virtual-machine applications ("applets"). They instill a false sense of security that leads to security breaches for example by users sending sensitive information to servers outside the firewall or encouraging use of modems to sidestep the firewall security. Firewalls are not useful for distributed systems such as business travelers, extranets, small teams, etc.

SUMMARY OF THE INVENTION

A secure mechanism for communicating over the internet, including a protocol referred to as the Tunneled Agile Routing Protocol (TARP), uses a unique two-layer encryption format and special TARP routers. TARP routers are similar in function to regular IP routers. Each TARP router has one or more IP addresses and uses normal IP protocol to send IP packet messages ("packets" or "datagrams"). The IP packets exchanged between TARP terminals via TARP routers are actually encrypted packets whose true destination address is concealed except to TARP routers and servers. The normal or "clear" or "outside" IP header attached to TARP IP packets contains only the address of a next hop router or destination server. That is, instead of indicating a final destination in the destination field of the IP header, the TARP packet's IP header always points to a next-hop in a series of TARP router hops, or to the final destination. This means there is no overt indication from an intercepted TARP packet of the true destination of the TARP packet since the destination could always be next-hop TARP router as well as the final destination.

Each TARP packet's true destination is concealed behind a layer of encryption generated using a link key. The link key is the encryption key used for encrypted communication between the hops intervening between an originating TARP terminal and a destination TARP terminal. Each TARP router can remove the outer layer of encryption to reveal the destination router for each TARP packet. To identify the link key needed to decrypt the outer layer of encryption of a TARP packet, a receiving TARP or routing terminal may identify the transmitting terminal by the sender/receiver IP numbers in the cleartext IP header.

Once the outer layer of encryption is removed, the TARP router determines the final destination. Each TARP packet 140 undergoes a minimum number of hops to help foil traffic analysis. The hops may be chosen at random or by a fixed value, As a result, each TARP packet may make random trips among a number of geographically disparate routers before reaching its destination. Each trip is highly likely to be different for each packet composing a given message because each trip is independently randomly determined. This feature is called agile routing. The fact that different packets take different routes provides distinct advantages by making it difficult for an interloper to obtain all the packets forming an entire multi-packet message. The associated advantages have to do with the inner layer of encryption discussed below. Agile routing is combined with another feature that furthers this purpose; a feature that ensures that any message is broken into multiple packets.

The IP address of a TARP router may not remain constant; a feature called IP agility. Each TARP router, independently or under direction from another TARP terminal or router, may change its IP address. A separate, unchangeable identifier or address is also defined. This address, called the TARP address, is known only to TARP routers and terminals and may be correlated at any time by a TARP router or a TARP terminal using a Lookup Table (LUT). When a TARP router or terminal changes its IP address, it updates the other TARP routers and terminals which in turn update their respective LUTs.

The message payload is hidden behind an inner layer of encryption in the TARP packet that can only be unlocked using a session key. The session key is not available to any of the intervening TARP routers. The session key is used to decrypt the payloads of the TARP packets permitting the data stream to be reconstructed.

Communication may be made private using link and session keys, which in turn may be shared and used according any desired method. For example, public/private keys or symmetric keys may be used.

To transmit a data stream, a TARP originating terminal constructs a series of TARP packets from a series of IP packets generated by a network (IP) layer process. (Note that the terms "network layer," "data link layer," "application layer," etc. used in this specification correspond to the Open Systems Interconnection (OSI) network terminology.) The payloads of these packets are assembled into a block and chain-block encrypted using the session key. This assumes, of course, that all the IP packets are destined for the same TARP terminal, The block is then interleaved and the interleaved encrypted block is broken into a series of payloads, one for each TARP packet to be generated. Special TARP headers $IP_T$ are then added to each payload using the IP headers from the data stream packets. The TARP headers can be identical to normal IP headers or customized in some way. They should contain a formula or data for deinterleaving the data at the destination TARP terminal, a time-to-live (TTL) parameter to indicate the number of hops still to be executed, a data type identifier which indicates whether the payload contains, for example, TCP or UDP data, the sender's TARP address, the destination TARP address, and an indicator as to whether the packet contains real or decoy data or a formula for filtering out decoy data if decoy data is spread in some way through the TARP payload data.

Note that although chain-block encryption is discussed here with reference to the session key, any encryption method may be used. Preferably, as in chain block encryption, a method should be used that makes unauthorized decryption difficult without an entire result of the encryption process. Thus, by separating the encrypted block among multiple packets and making it difficult for an interloper to obtain access to all of such packets, the contents of the communications are provided an extra layer of security.

Decoy or dummy data can be added to a stream to help foil traffic analysis by reducing the peak-to-average network load. It may be desirable to provide the TARP process with an ability to respond to the time of day or other criteria to generate more decoy data during low traffic periods so that communication bursts at one point in the Internet cannot be tied to communication bursts at another point to reveal the communicating endpoints.

Dummy data also helps to break the data into a larger number of inconspicuously-sized packets permitting the interleave window size to be increased while maintaining a reasonable size for each packet. (The packet size can be a single standard size or selected from a fixed range of sizes.) One primary reason for desiring for each message to be broken into multiple packets is apparent if a chain block encryption scheme is used to form the first encryption layer prior to interleaving. A single block encryption may be applied to portion, or entirety, of a message, and that portion or entirety then interleaved into a number of separate packets. Considering the agile IP routing of the packets, and the attendant difficulty of reconstructing an entire sequence of packets to form a single block-encrypted message element, decoy packets can significantly increase the difficulty of reconstructing an entire data stream.

The above scheme may be implemented entirely by processes operating between the data link layer and the network layer of each server or terminal participating in the TARP system. Because the encryption system described above is insertable between the data link and network layers, the processes involved in supporting the encrypted communication may be completely transparent to processes at the IP (network) layer and above. The TARP processes may also be completely transparent to the data link layer processes as well. Thus, no operations at or above the Network layer, or at or below the data link layer, are affected by the insertion of the TARP stack. This provides additional security to all processes at or above the network layer, since the difficulty of unauthorized penetration of the network layer (by, for example, a hacker) is increased substantially. Even newly developed servers running at the session layer leave all processes below the session layer vulnerable to attack. Note that in this architecture, security is distributed. That is, notebook computers used by executives on the road, for example, can communicate over the Internet without any compromise in security.

IP address changes made by TARP terminals and routers can be done at regular intervals, at random intervals, or upon detection of "attacks." The variation of IP addresses hinders traffic analysis that might reveal which computers are communicating, and also provides a degree of immunity from attack. The level of immunity from attack is roughly proportional to the rate at which the IP address of the host is changing.

As mentioned, IP addresses may be changed in response to attacks. An attack may be revealed, for example, by a regular series of messages indicating that a router is being probed in some way. Upon detection of an attack, the TARP layer process may respond to this event by changing its IP address. In addition, it may create a subprocess that maintains the original IP address and continues interacting with the attacker in some manner.

Decoy packets may be generated by each TARP terminal on some basis determined by an algorithm. For example, the algorithm may be a random one which calls for the generation of a packet on a random basis when the terminal is idle. Alternatively, the algorithm may be responsive to time of day or detection of low traffic to generate more decoy packets during low traffic times. Note that packets are preferably generated in groups, rather than one by one, the groups being sized to simulate real messages. In addition, so that decoy packets may be inserted in normal TARP message streams, the background loop may have a latch that makes it more likely to insert decoy packets when a message stream is being received. Alternatively, if a large number of decoy packets is received along with regular TARP packets, the algorithm may increase the rate of dropping of decoy packets rather than forwarding them. The result of dropping and generating decoy packets in this way is to make the apparent incoming message size different from the apparent outgoing message size to help foil traffic analysis.

In various other embodiments of the invention, a scalable version of the system may be constructed in which a plurality of IP addresses are preassigned to each pair of communicating nodes in the network. Each pair of nodes agrees upon an algorithm for "hopping" between IP addresses (both sending and receiving), such that an eavesdropper sees apparently continuously random IP address pairs (source and destination) for packets transmitted between the pair. Overlapping or "reusable" IP addresses may be allocated to different users on the same subnet, since each node merely verifies that a particular packet includes a valid source/destination pair from the agreed-upon algorithm. Source/destination pairs are preferably not reused between any two nodes during any given end-to-end session, though limited IP block sizes or lengthy sessions might require it.

BRIEF DESCRIPTION OF THE DRAWINGS

FIG. 12B shows several different approaches for hopping hardware addresses, IP addresses, and discriminator fields in combination.

DETAILED DESCRIPTION OF THE EMBODIMENTS

Figure 1:
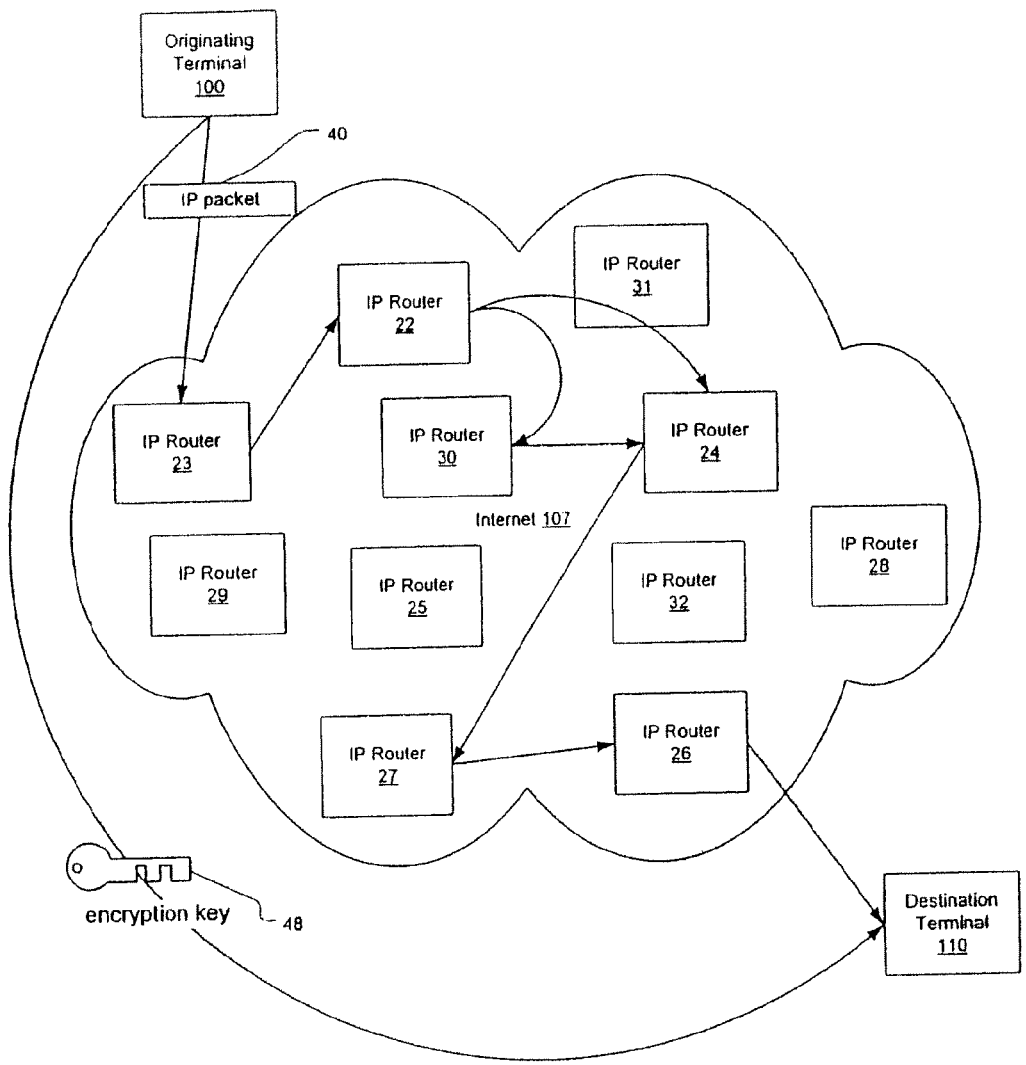
FIG. 1 is an illustration of secure communications over the Internet according to a prior art embodiment.
Figure 2:
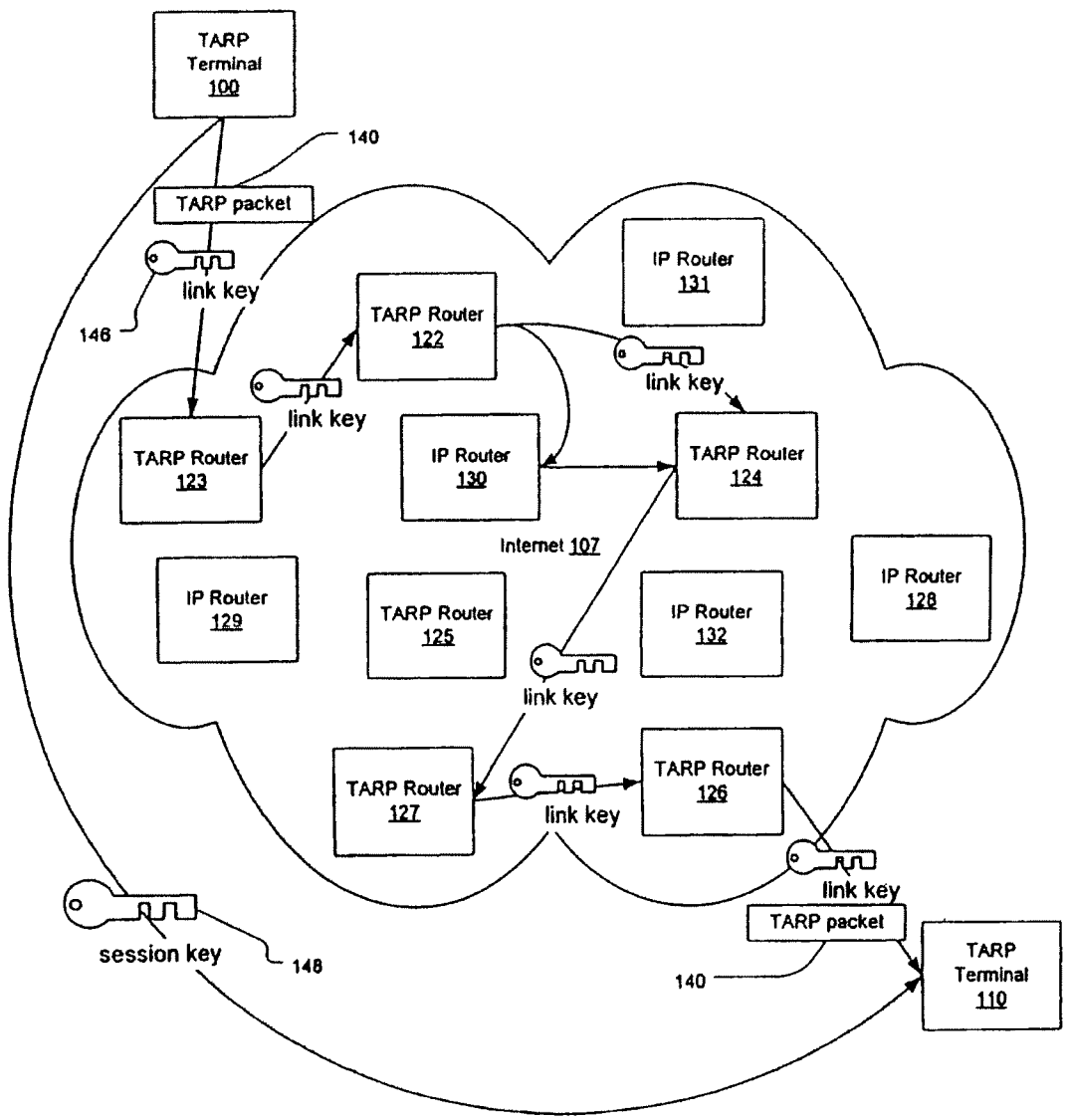
FIG. 2 is an illustration of secure communications over the Internet according to a an embodiment of the invention.

Referring to FIG. 2, a secure mechanism for communicating over the internet employs a number of special routers or servers, called TARP routers 122-127 that are similar to regular IP routers 128-132 in that each has one or more IP addresses and uses normal IP protocol to send normal-looking IP packet messages, called TARP packets 140. TARP packets 140 are identical to normal IP packet messages that are routed by regular IP routers 128-132 because each TARP packet 140 contains a destination address as in a normal IP packet. However, instead of indicating a final destination in the destination field of the IP header, the TARP packet's 140 IP header always points to a next-hop in a series of TARP router hops, or the final destination, TARP terminal 110. Because the header of the TARP packet contains only the next-hop destination, there is no overt indication from an intercepted TARP packet of the true destination of the TARP packet 140 since the destination could always be the next-hop TARP router as well as the final destination, TARP terminal 110.

Each TARP packet's true destination is concealed behind an outer layer of encryption generated using a link key 146. The link key 146 is the encryption key used for encrypted communication between the end points (TARP terminals or TARP routers) of a single link in the chain of hops connecting the originating TARP terminal 100 and the destination TARP terminal 110. Each TARP router 122-127, using the link key 146 it uses to communicate with the previous hop in a chain, can use the link key to reveal the true destination of a TARP packet. To identify the link key needed to decrypt the outer layer of encryption of a TARP packet, a receiving TARP or routing terminal may identify the transmitting terminal (which may indicate the link key used) by the sender field of the clear IP header. Alternatively, this identity may be hidden behind another layer of encryption in available bits in the clear IP header. Each TARP router, upon receiving a TARP message, determines if the message is a TARP message by using authentication data in the TARP packet. This could be recorded in available bytes in the TARP packet's IP header. Alternatively, TARP packets could be authenticated by attempting to decrypt using the link key 146 and determining if the results are as expected. The former may have computational advantages because it does not involve a decryption process.

Once the outer layer of decryption is completed by a TARP router 122-127, the TARP router determines the final destination. The system is preferably designed to cause each TARP packet 140 to undergo a minimum number of hops to help foil traffic analysis. The time to live counter in the IP header of the TARP message may be used to indicate a number of TARP router hops yet to be completed. Each TARP router then would decrement the counter and determine from that whether it should forward the TARP packet 140 to another TARP router 122-127 or to the destination TARP terminal 110. If the time to live counter is zero or below zero after decrementing, for an example of usage, the TARP router receiving the TARP packet 140 may forward the TARP packet 140 to the destination TARP terminal 110. If the time to live counter is above zero after decrementing, for an example of usage, the TARP router receiving the TARP packet 140 may forward the TARP packet 140 to a TARP router 122-127 that the current TARP terminal chooses at random. As a result, each TARP packet 140 is routed through some minimum number of hops of TARP routers 122-127 which are chosen at random.

Thus, each TARP packet, irrespective of the traditional factors determining traffic in the Internet, makes random trips among a number of geographically disparate routers before reaching its destination and each trip is highly likely to be different for each packet composing a given message because each trip is independently randomly determined as described above. This feature is called agile routing. For reasons that will become clear shortly, the fact that different packets take different routes provides distinct advantages by making it difficult for an interloper to obtain all the packets forming an entire multi-packet message. Agile routing is combined with another feature that furthers this purpose, a feature that ensures that any message is broken into multiple packets.

A TARP router receives a TARP packet when an IP address used by the TARP router coincides with the IP address in the TARP packet's IP header $IP_c$. The IP address of a TARP router, however, may not remain constant. To avoid and manage attacks, each TARP router, independently or under direction from another TARP terminal or router, may change its IP address. A separate, unchangeable identifier or address is also defined. This address, called the TARP address, is known only to TARP routers and terminals and may be correlated at any time by a TARP router or a TARP terminal using a Lookup Table (LUT). When a TARP router or terminal changes its IP address, it updates the other TARP routers and terminals which in turn update their respective LUTs. In reality, whenever a TARP router looks up the address of a destination in the encrypted header, it must convert a TARP address to a real IP address using its LUT.

While every TARP router receiving a TARP packet has the ability to determine the packet's final destination, the message payload is embedded behind an inner layer of encryption in the TARP packet that can only be unlocked using a session key. The session key is not available to any of the TARP routers 122-127 intervening between the originating 100 and destination 110 TARP terminals. The session key is used to decrypt the payloads of the TARP packets 140 permitting an entire message to be reconstructed.

In one embodiment, communication may be made private using link and session keys, which in turn may be shared and used according any desired method. For example, a public key or symmetric keys may be communicated between link or session endpoints using a public key method. Any of a variety of other mechanisms for securing data to ensure that only authorized computers can have access to the private information in the TARP packets 140 may be used as desired.

Figure 3A:
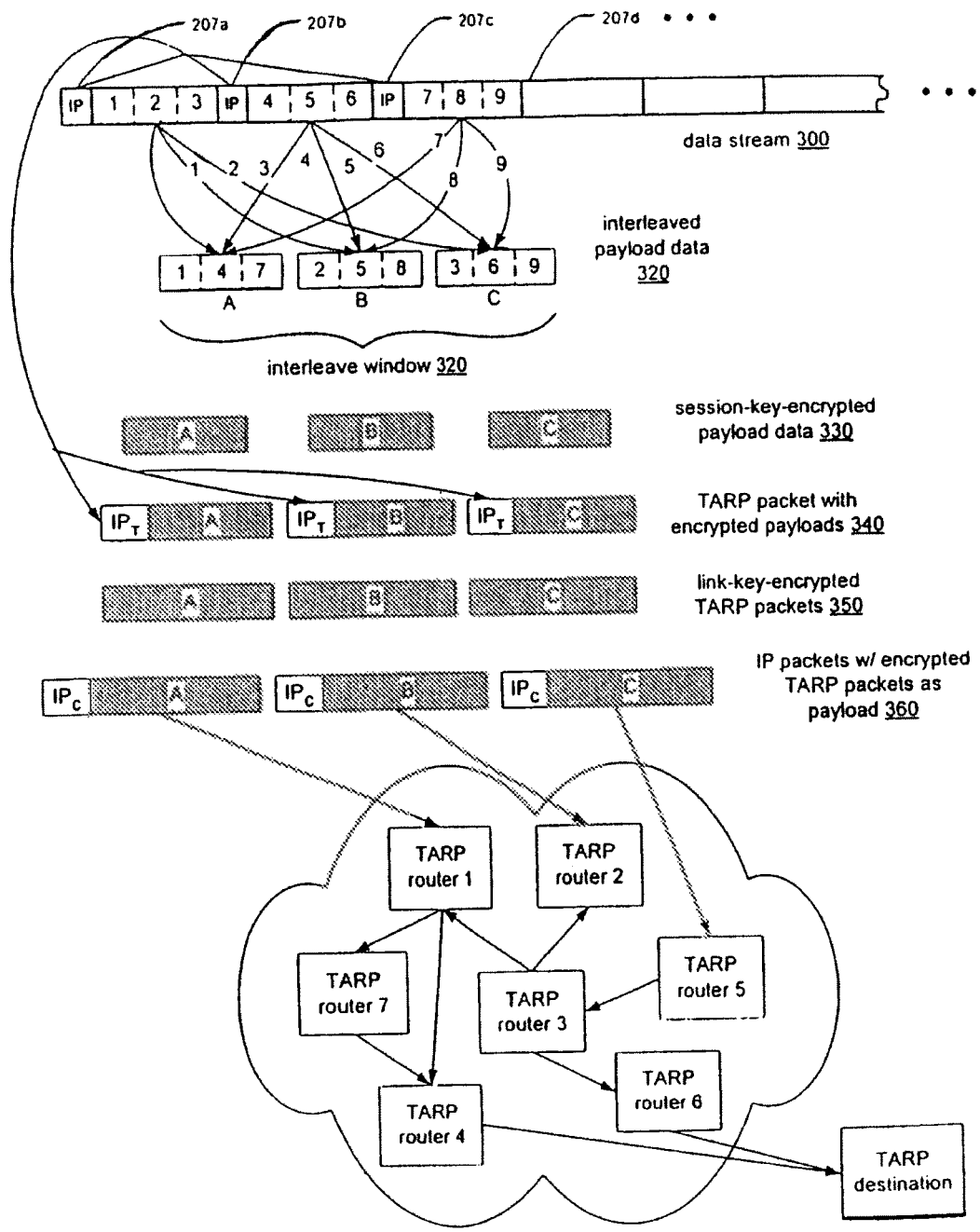
FIG. 3a is an illustration of a process of forming a tunneled IP packet according to an embodiment of the invention.

Referring to FIG. 3a, to construct a series of TARP packets, a data stream 300 of IP packets 207a, 207b, 207c, etc., such series of packets being formed by a network (IP) layer process, is broken into a series of small sized segments. In the present example, equal-sized segments 1-9 are defined and used to construct a set of interleaved data packets A, B, and C. Here it is assumed that the number of interleaved packets A, B, and C formed is three and that the number of IP packets 207a-207c used to form the three interleaved packets A, B, and C is exactly three. Of course, the number of IP packets spread over a group of interleaved packets may be any convenient number as may be the number of interleaved packets over which the incoming data stream is spread. The latter, the number of interleaved packets over which the data stream is spread, is called the interleave window.

To create a packet, the transmitting software interleaves the normal IP packets 207a et. seq. to form a new set of interleaved payload data 320. This payload data 320 is then encrypted using a session key to form a set of session-key-encrypted payload data 330, each of which, A, B, and C, will form the payload of a TARP packet. Using the IP header data, from the original packets 207a-207c, new TARP headers $IP_T$ are formed. The TARP headers $IP_T$ can be identical to normal IP headers or customized in some way. In a preferred embodiment, the TARP headers $IP_T$ are IP headers with added data providing the following information required for routing and reconstruction of messages, some of which data is ordinarily, or capable of being, contained in normal IP headers: A window sequence number—an identifier that indicates where the packet belongs in the original message sequence.

1. An interleave sequence number—an identifier that indicates the interleaving sequence used to form the packet so that the packet can be deinterleaved along with other packets in the interleave window.
2. A time-to-live (TTL) datum—indicates the number of TARP-router-hops to be executed before the packet reaches its destination. Note that the TTL parameter may provide a datum to be used in a probabilistic formula for determining whether to route the packet to the destination or to another hop.
3. Data type identifier—indicates whether the payload contains, for example, TCP or UDP data.
4. Sender's address—indicates the sender's address in the TARP network.
5. Destination address—indicates the destination terminal's address in the TARP network.
6. Decoy/Real—an indicator of whether the packet contains real message data or dummy decoy data or a combination.

Obviously, the packets going into a single interleave window must include only packets with a common destination. Thus, it is assumed in the depicted example that the IP headers of IP packets 207a-207c all contain the same destination address or at least will be received by the same terminal so that they can be deinterleaved. Note that dummy or decoy data or packets can be added to form a larger interleave window than would otherwise be required by the size of a given message. Decoy or dummy data can be added to a stream to help foil traffic analysis by leveling the load on the network. Thus, it may be desirable to provide the TARP process with an ability to respond to the time of day or other criteria to generate more decoy data during low traffic periods so that communication bursts at one point in the Internet cannot be tied to communication bursts at another point to reveal the communicating endpoints.

Dummy data also helps to break the data into a larger number of inconspicuously-sized packets permitting the interleave window size to be increased while maintaining a reasonable size for each packet. (The packet size can be a single standard size or selected from a fixed range of sizes.) One primary reason for desiring for each message to be broken into multiple packets is apparent if a chain block encryption scheme is used to form the first encryption layer prior to interleaving. A single block encryption may be applied to portion, or entirety, of a message, and that portion or entirety then interleaved into a number of separate packets.

Figure 3B:
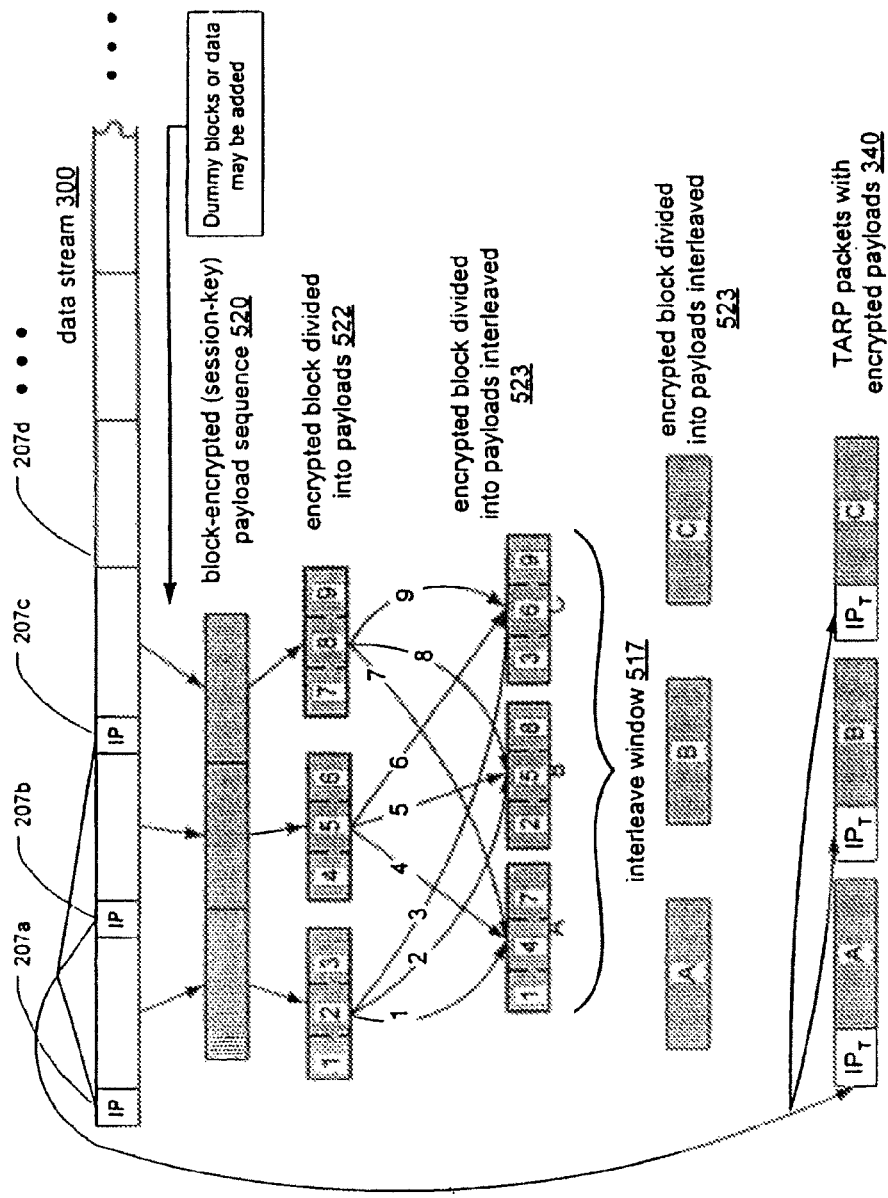
FIG. 3b is an illustration of a process of forming a tunneled IP packet according to another embodiment of the invention.

Referring to FIG. 3b, in an alternative mode of TARP packet construction, a series of IP packets are accumulated to make up a predefined interleave window. The payloads of the packets are used to construct a single block 520 for chain block encryption using the session key. The payloads used to form the block are presumed to be destined for the same terminal. The block size may coincide with the interleave window as depicted in the example embodiment of FIG. 3b. After encryption, the encrypted block is broken into separate payloads and segments which are interleaved as in the embodiment of FIG. 3a. The resulting interleaved packets A, B, and C, are then packaged as TARP packets with TARP headers as in the Example of FIG. 3a. The remaining process is as shown in, and discussed with reference to, FIG. 3a.

Once the TARP packets 340 are formed, each entire TARP packet 340, including the TARP header $IP_T$, is encrypted using the link key for communication with the first-hop-TARP router. The first hop TARP router is randomly chosen. A final unencrypted IP header $IP_c$ is added to each encrypted TARP packet 340 to form a normal IP packet 360 that can be transmitted to a TARP router. Note that the process of constructing the TARP packet 360 does not have to be done in stages as described. The above description is just a useful heuristic for describing the final product, namely, the TARP packet.

Note that, TARP header $IP_T$ could be a completely custom header configuration with no similarity to a normal IP header except that it contain the information identified above. This is so since this header is interpreted by only TARP routers.

Figure 4:
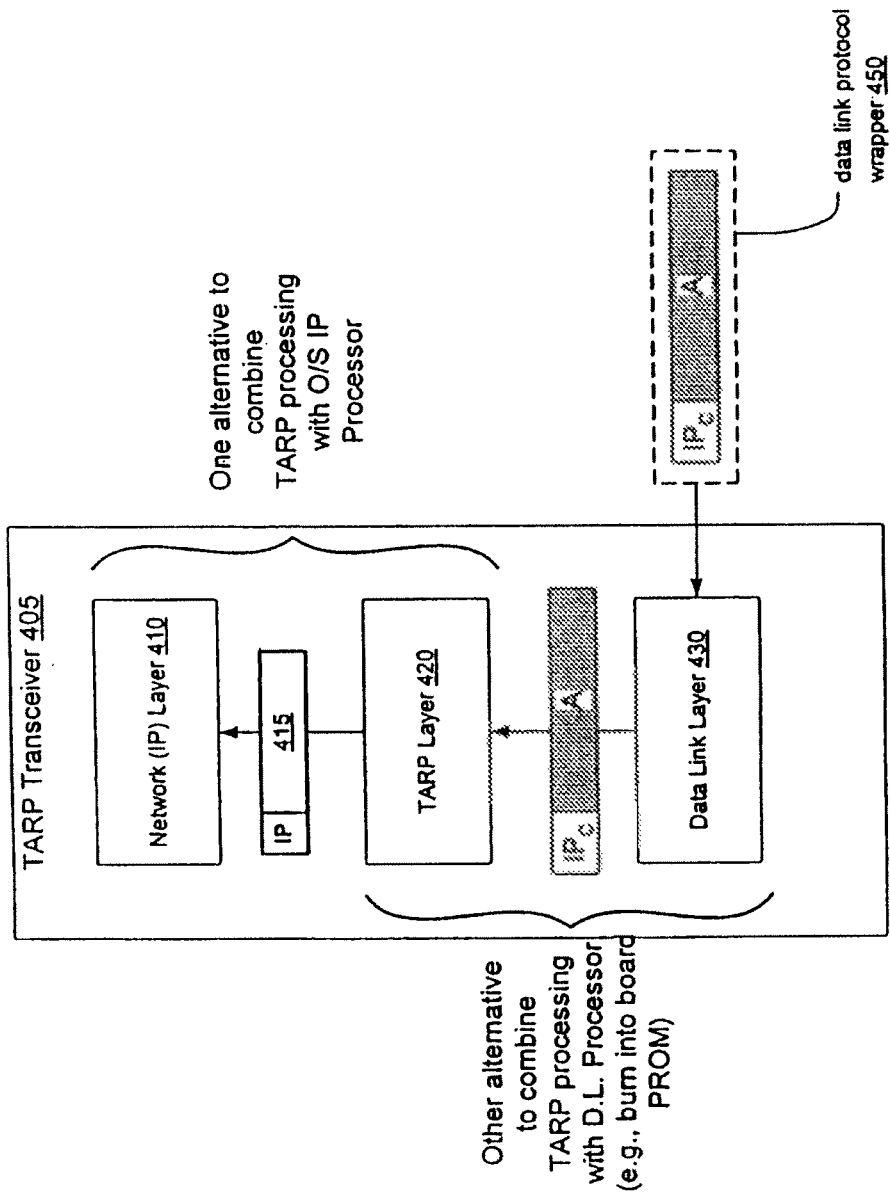
FIG. 4 is an illustration of an OSI layer location of processes that may be used to implement the invention.

The above scheme may be implemented entirely by processes operating between the data link layer and the network layer of each server or terminal participating in the TARP system. Referring to FIG. 4, a TARP transceiver 405 can be an originating terminal 100, a destination terminal 110, or a TARP router 122-127. In each TARP Transceiver 405, a transmitting process is generated to receive normal packets from the Network (IP) layer and generate TARP packets for communication over the network. A receiving process is generated to receive normal IP packets containing TARP packets and generate from these normal IP packets which are "passed up" to the Network (IP) layer. Note that where the TARP Transceiver 405 is a router, the received TARP packets 140 are not processed into a stream of IP packets 415 because they need only be authenticated as proper TARP packets and then passed to another TARP router or a TARP destination terminal 110. The intervening process, a "TARP Layer" 420, could be combined with either the data link layer 430 or the Network layer 410. In either case, it would intervene between the data link layer 430 so that the process would receive regular IP packets containing embedded TARP packets and "hand up" a series of reassembled IP packets to the Network layer 410. As an example of combining the TARP layer 420 with the data link layer 430, a program may augment the normal processes running a communications card, for example, an ethernet card. Alternatively, the TARP layer processes may form part of a dynamically loadable module that is loaded and executed to support communications between the network and data link layers.

Because the encryption system described above can be inserted between the data link and network layers, the processes involved in supporting the encrypted communication may be completely transparent to processes at the IP (network) layer and above. The TARP processes may also be completely transparent to the data link layer processes as well. Thus, no operations at or above the network layer, or at or below the data link layer, are affected by the insertion of the TARP stack. This provides additional security to all processes at or above the network layer, since the difficulty of unauthorized penetration of the network layer (by, for example, a hacker) is increased substantially. Even newly developed servers pinning at the session layer leave all processes below the session layer vulnerable to attack. Note that in this architecture, security is distributed. That is, notebook computers used by executives on the road, for example, can communicate over the Internet without any compromise in security.

Note that IP address changes made by TARP terminals and routers can be done at regular intervals, at random intervals, or upon detection of "attacks." The variation of IP addresses hinders traffic analysis that might reveal which computers are communicating, and also provides a degree of immunity from attack. The level of immunity from attack is roughly proportional to the rate at which the IP address of the host is changing.

As mentioned, IP addresses may be changed in response to attacks. An attack may be revealed, for example, by a regular series of messages indicates that a router is being probed in some way. Upon detection of an attack, the TARP layer process may respond to this event by changing its IP address. To accomplish this, the TARP process will construct a TARP—formatted message, in the style of Internet Control Message Protocol (ICMP) datagrams as an example; this message will contain the machine's TARP address, its previous IP address, and its new IP address. The TARP layer will transmit this packet to at least one known TARP router; then upon receipt and validation of the message, the TARP router will update its LUT with the new IP address for the stated TARP address. The TARP router will then format a similar message, and broadcast it to the other TARP routers so that they may update their LUTs. Since the total number of TARP routers on any given subnet is expected to be relatively small, this process of updating the LUTs should be relatively fast. It may not, however, work as well when there is a relatively large number of TARP routers and/or a relatively large number of clients; this has motivated a refinement of this architecture to provide scalability; this refinement has led to a second embodiment, which is discussed below.

Upon detection of an attack, the TARP process may also create a subprocess that maintains the original IP address and continues interacting with the attacker. The latter may provide an opportunity to trace the attacker or study the attacker's methods (called "fishbowling" drawing upon the analogy of a small fish in a fish bowl that "thinks" it is in the ocean but is actually under captive observation). A history of the communication between the attacker and the abandoned (fishbowled) IP address can be recorded or transmitted for human analysis or further synthesized for purposes of responding in some way.

As mentioned above, decoy or dummy data or packets can be added to outgoing data streams by TARP terminals or routers. In addition to making it convenient to spread data over a larger number of separate packets, such decoy packets can also help to level the load on inactive portions of the Internet to help foil traffic analysis efforts.

Decoy packets may be generated by each TARP terminal 100, 110 or each router 122-127 on some basis determined by an algorithm. For example, the algorithm may be a random one which calls for the generation of a packet on a random basis when the terminal is idle. Alternatively, the algorithm may be responsive to time of day or detection of low traffic to generate more decoy packets during low traffic times. Note that packets are preferably generated in groups, rather than one by one, the groups being sized to simulate real messages. In addition, so that decoy packets may be inserted in normal TARP message streams, the background loop may have a latch that makes it more likely to insert decoy packets when a message stream is being received. That is, when a series of messages are received, the decoy packet generation rate may be increased. Alternatively, if a large number of decoy packets is received along with regular TARP packets, the algorithm may increase the rate of dropping of decoy packets rather than forwarding them. The result of dropping and generating decoy packets in this way is to make the apparent incoming message size different from the apparent outgoing message size to help foil traffic analysis. The rate of reception of packets, decoy or otherwise, may be indicated to the decoy packet dropping and generating processes through perishable decoy and regular packet counters. (A perishable counter is one that resets or decrements its value in response to time so that it contains a high value when it is incremented in rapid succession and a small value when incremented either slowly or a small number of times in rapid succession.) Note that destination TARP terminal 110 may generate decoy packets equal in number and size to those TARP packets received to make it appear it is merely routing packets and is therefore not the destination terminal.

Figure 5:
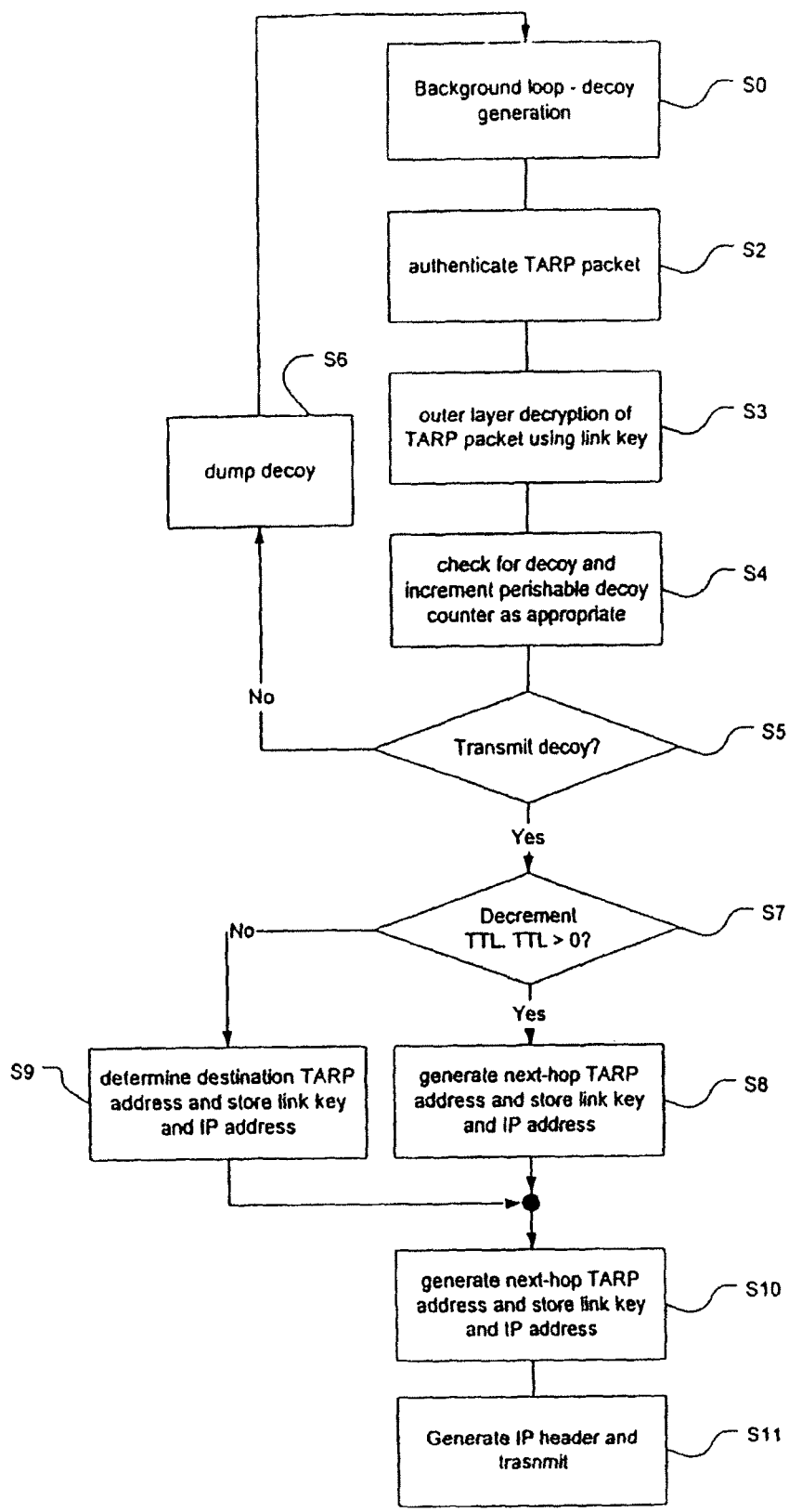
FIG. 5 is a flow chart illustrating a process for routing a tunneled packet according to an embodiment of the invention.

Referring to FIG. 5, the following particular steps may be employed in the above-described method for routing TARP packets.

S0. A background loop operation is performed which applies an algorithm which determines the generation of decoy IP packets. The loop is interrupted when an encrypted TARP packet is received.

S2. The TARP packet may be probed in some way to authenticate the packet before attempting to decrypt it using the link key. That is, the router may determine that the packet is an authentic TARP packet by performing a selected operation on some data included with the clear IP header attached to the encrypted TARP packet contained in the payload. This makes it possible to avoid performing decryption on packets that are not authentic TARP packets.

S3. The TARP packet is decrypted to expose the destination TARP address and an indication of whether the packet is a decoy packet or part of a real message.

S4. If the packet is a decoy packet, the perishable decoy counter is incremented.

S5. Based on the decoy generation/dropping algorithm and the perishable decoy counter value, if the packet is a decoy packet, the router may choose to throw it away. If the received packet is a decoy packet and it is determined that it should be thrown away (S6), control returns to step SO.

S7. The TTL parameter of the TARP header is decremented and it is determined if the TTL parameter is greater than zero.

S8. If the TTL parameter is greater than zero, a TARP address is randomly chosen from a list of TARP addresses maintained by the router and the link key and IP address corresponding to that TARP address memorized for use in creating a new IP packet containing the TARP packet.

S9. If the TTL, parameter is zero or less, the link key and IP address corresponding to the TARP address of the destination are memorized for use in creating the new IP packet containing the TARP packet.

S10. The TARP packet is encrypted using the memorized link key.

S11. An IP header is added to the packet that contains the stored IP address, the encrypted TARP packet wrapped with an IP header, and the completed packet transmitted to the next hop or destination.

Figure 6:
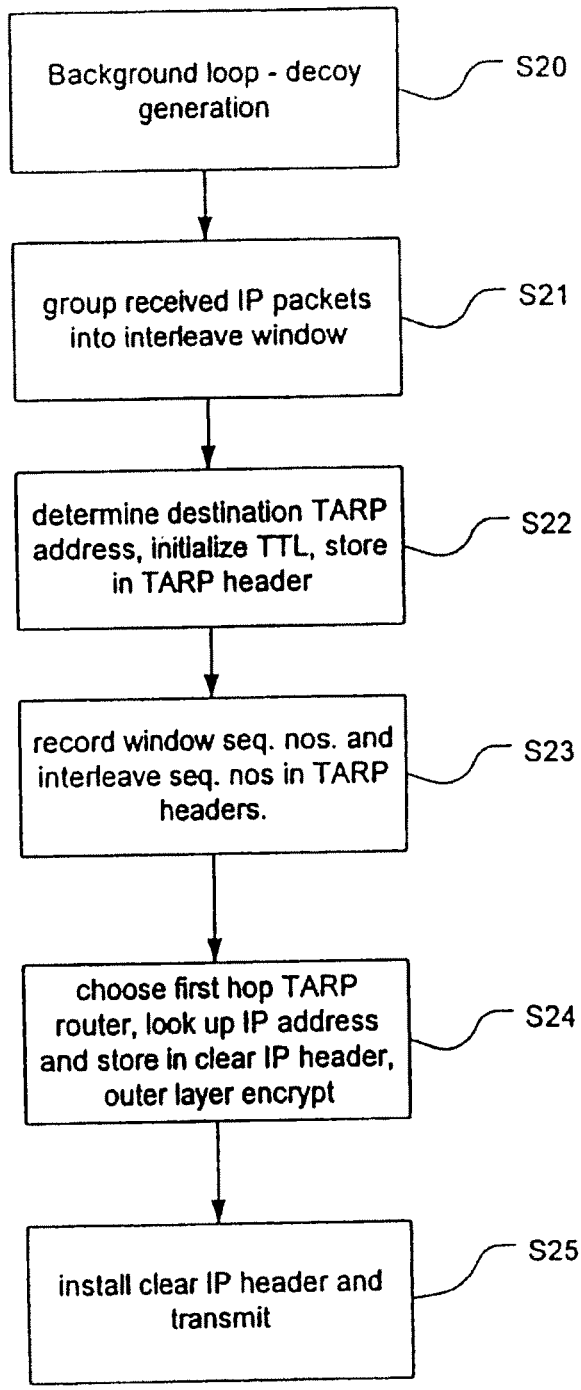
FIG. 6 is a flow chart illustrating a process for forming a tunneled packet according to an embodiment of the invention.

Referring to FIG. 6, the following particular steps may be employed in the above-described method for generating TARP packets.

S20. A background loop operation applies an algorithm that determines the generation of decoy IP packets. The loop is interrupted when a data stream containing IP packets is received for transmission.

S21. The received IP packets are grouped into a set consisting of messages with a constant IP destination address. The set is further broken down to coincide with a maximum size of an interleave window The set is encrypted, and interleaved into a set of payloads destined to become TARP packets.

S22. The TARP address corresponding to the IP address is determined from a lookup table and stored to generate the TARP header. An initial TTL count is generated and stored in the header. The TTL count may be random with minimum and maximum values or it may be fixed or determined by some other parameter.

S23. The window sequence numbers and interleave sequence numbers are recorded in the TARP headers of each packet.

S24. One TARP router address is randomly chosen for each TARP packet and the IP address corresponding to it stored for use in the clear IP header. The link key corresponding to this router is identified and used to encrypt TARP packets containing interleaved and encrypted data and TARP headers.

S25. A clear IP header with the first hop router's real IP address is generated and added to each of the encrypted TARP packets and the resulting packets.

Figure 7:
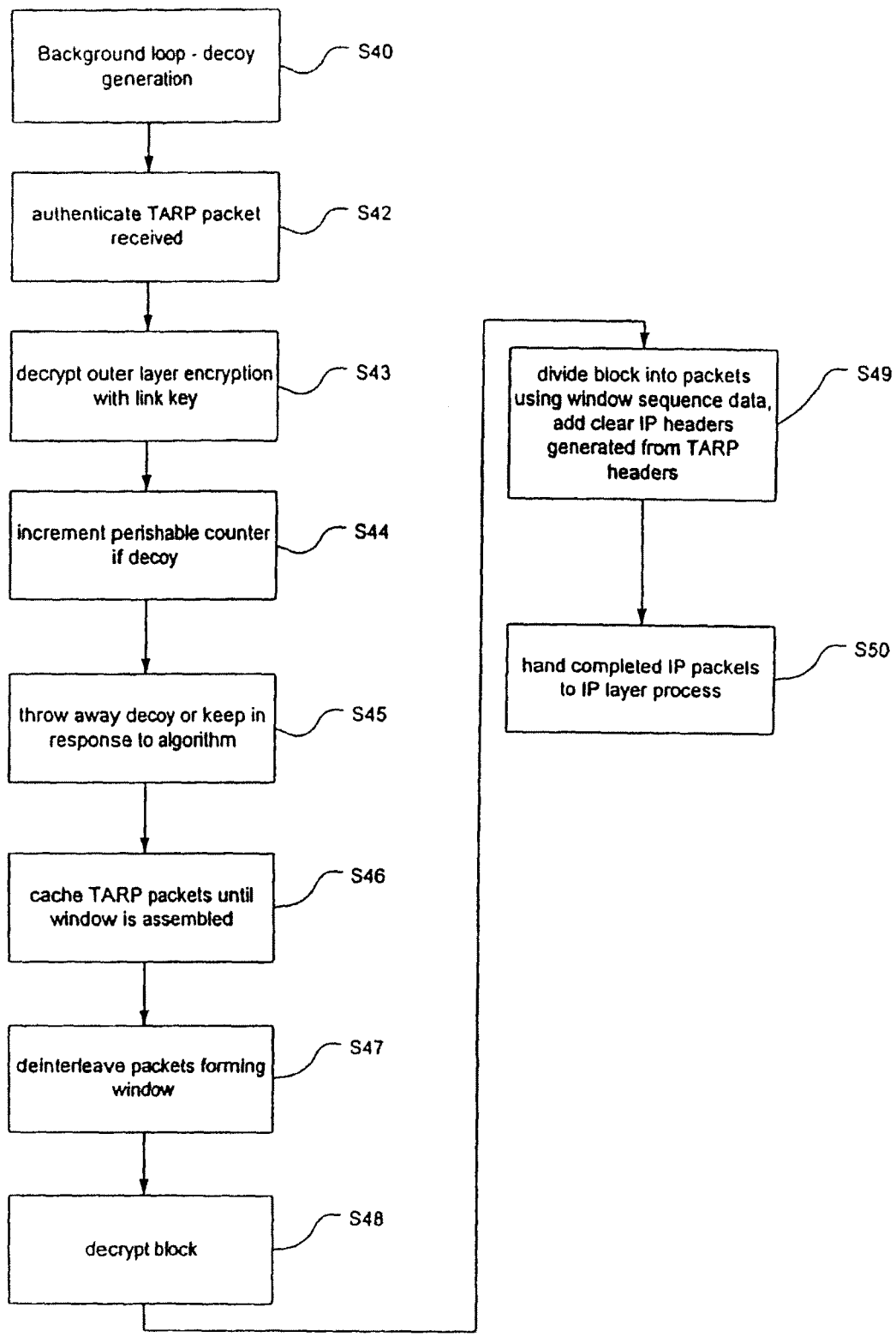
FIG. 7 is a flow chart illustrating a process for receiving a tunneled packet according to an embodiment of the invention.

Referring to FIG. 7, the following particular steps may be employed in the above-described method for receiving TARP packets.

S40. A background loop operation is performed which applies an algorithm which determines the generation of decoy IP packets. The loop is interrupted when an encrypted TARP packet is received.

S42. The TARP packet may be probed to authenticate the packet before attempting to decrypt it using the link key.

S43. The TARP packet is decrypted with the appropriate link key to expose the destination TARP address and an indication of whether the packet is a decoy packet or part of a real message.

S44. If the packet is a decoy packet, the perishable decoy counter is incremented.

S45. Based on the decoy generation/dropping algorithm and the perishable decoy counter value, if the packet is a decoy packet, the receiver may choose to throw it away.

S46. The TARP packets are cached until all packets forming an interleave window are received.

S47. Once all packets of an interleave window are received, the packets are deinterleaved.

S48. The packets block of combined packets defining the interleave window is then decrypted using the session key.

S49. The decrypted block is then divided using the window sequence data and the IPT headers are converted into normal IPc headers. The window sequence numbers are integrated in the IPc headers.

S50. The packets are then handed up to the IP layer processes.

Scalability Enhancements

The IP agility feature described above relies on the ability to transmit IP address changes to all TARP routers. The embodiments including this feature will be referred to as "boutique" embodiments due to potential limitations in scaling these features up for a large network, such as the Internet. (The "boutique" embodiments would, however, be robust for use in smaller networks, such as small virtual private networks, for example). One problem with the boutique embodiments is that if IP address changes are to occur frequently, the message traffic required to update all routers sufficiently quickly creates a serious burden on the Internet when the TARP router and/or client population gets large. The bandwidth burden added to the networks, for example in ICMP packets, that would be used to update all the TARP routers could overwhelm the Internet for a large scale implementation that approached the scale of the Internet. In other words, the boutique system's scalability is limited.

A system can be constructed which trades some of the features of the above embodiments to provide the benefits of IP agility without the additional messaging burden. This is accomplished by IP address-hopping according to shared algorithms that govern IP addresses used between links participating in communications sessions between nodes such as TARP nodes. (Note that the IP hopping technique is also applicable to the boutique embodiment.) The IP agility feature discussed with respect to the boutique system can be modified so that it becomes decentralized under this scalable regime and governed by the above-described shared algorithm. Other features of the boutique system may be combined with this new type of IP-agility.

The new embodiment has the advantage of providing IP agility governed by a local algorithm and set of IP addresses exchanged by each communicating pair of nodes. This local governance is session-independent in that it may govern communications between a pair of nodes, irrespective of the session or end points being transferred between the directly communicating pair of nodes.

In the scalable embodiments, blocks of IP addresses are allocated to each node in the network. (This scalability will increase in the future, when Internet Protocol addresses are increased to 128-bit fields, vastly increasing the number of distinctly addressable nodes). Each node can thus use any of the IP addresses assigned to that node to communicate with other nodes in the network. Indeed, each pair of communicating nodes can use a plurality of source IP addresses and destination IP addresses for communicating with each other.

Each communicating pair of nodes in a chain participating in any session stores two blocks of IP addresses, called netblocks, and an algorithm and randomization seed for selecting, from each netblock, the next pair of source/destination IP addresses that will be used to transmit the next message. In other words, the algorithm governs the sequential selection of IP-address pairs, one sender and one receiver IP address, from each netblock. The combination of algorithm, seed, and netblock (IP address block) will be called a "hopblock." A router issues separate transmit and receive hopblocks to its clients. The send address and the receive address of the IP header of each outgoing packet sent by the client are filled with the send and receive IP addresses generated by the algorithm. The algorithm is "clocked" (indexed) by a counter so that each time a pair is used, the algorithm turns out a new transmit pair for the next packet to be sent.

The router's receive hopblock is identical to the client's transmit hopblock. The router uses the receive hopblock to predict what the send and receive IP address pair for the next expected packet from that client will be. Since packets can be received out of order, it is not possible for the router to predict with certainty what IP address pair will be on the next sequential packet. To account for this problem, the router generates a range of predictions encompassing the number of possible transmitted packet send/receive addresses, of which the next packet received could leap ahead. Thus, if there is a vanishingly small probability that a given packet will arrive at the router ahead of 5 packets transmitted by the client before the given packet, then the router can generate a series of 6 send/receive IP address pairs (or "hop window") to compare with the next received packet. When a packet is received, it is marked in the hop window as such, so that a second packet with the same IP address pair will be discarded. If an out-of-sequence packet does not arrive within a predetermined timeout period, it can be requested for retransmission or simply discarded from the receive table, depending upon the protocol in use for that communications session, or possibly by convention.

When the router receives the client's packet, it compares the send and receive IP addresses of the packet with the next N predicted send and receive IP address pairs and rejects the packet if it is not a member of this set. Received packets that do not have the predicted source/destination IP addresses falling with the window are rejected, thus thwarting possible hackers. (With the number of possible combinations, even a fairly large window would be hard to fall into at random.) If it is a member of this set, the router accepts the packet and processes it further. This link-based IP-hopping strategy, referred to as "IHOP," is a network element that stands on its own and is not necessarily accompanied by elements of the boutique system described above. If the routing agility feature described in connection with the boutique embodiment is combined with this link-based IP-hopping strategy, the router's next step would be to decrypt the TARP header to determine the destination TARP router for the packet and determine what should be the next hop for the packet. The TARP router would then forward the packet to a random TARP router or the destination TARP router with which the source TARP router has a link-based IP hopping communication established.

Figure 8:
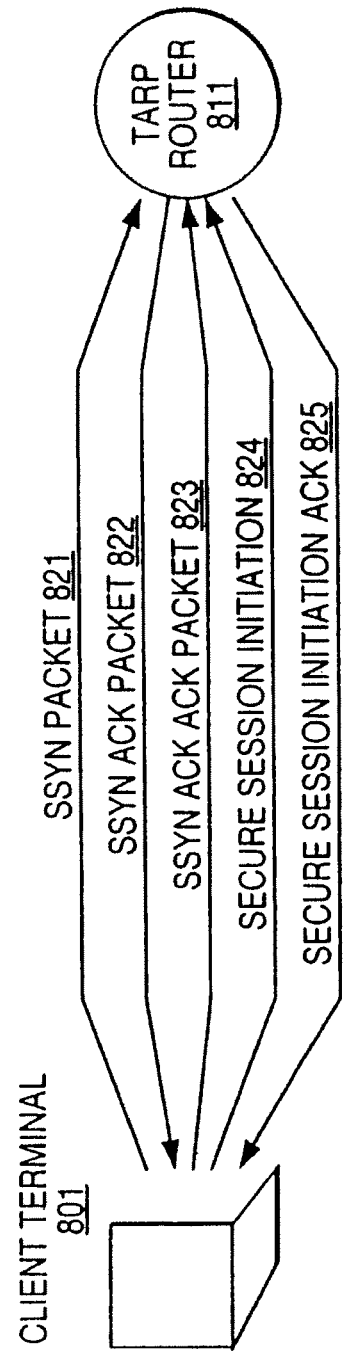
FIG. 8 shows how a secure session is established and synchronized between a client and a TARP router.
Figure 9:
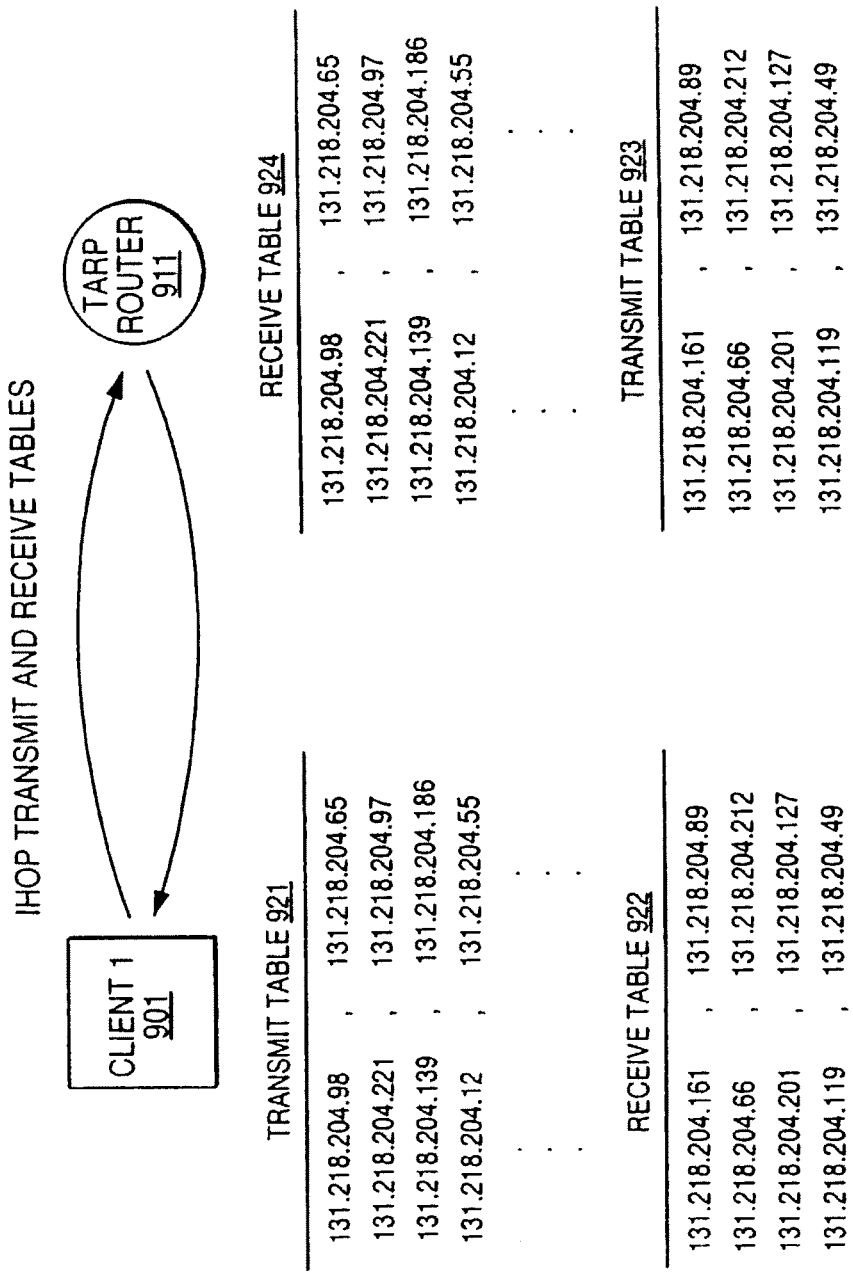
FIG. 9 shows an IP address hopping scheme between a client computer and TARP router using transmit and receive tables in each computer.

FIG. 8 shows how a client computer 801 and a TARP router 811 can establish a secure session. When client 801 seeks to establish an IHOP session with TARP router 811, the client 801 sends "secure synchronization" request ("SSYN") packet 821 to the TARP router 811. This SYN packet 821 contains the client's 801 authentication token, and may be sent to the router 811 in an encrypted format. The source and destination IP numbers on the packet 821 are the client's 801 current fixed IP address, and a "known" fixed IP address for the router 811. (For security purposes, it may be desirable to reject any packets from outside of the local network that are destined for the router's known fixed IP address.) Upon receipt and validation of the client's 801 SSYN packet 821, the router 811 respond by sending an encrypted "secure synchronization acknowledgment" ("SSYN ACK") 822 to the client 801. This SSYN ACK 822 will contain the transmit and receive hopblocks that the client 801 will use when communicating with the TARP router 811. The client 801 will acknowledge the TARP router's 811 response packet 822 by generating an encrypted SSYN ACK ACK packet 823 which will be sent from the client's 801 fixed IP address and to the TARP router's 811 known fixed IP address. The client 801 will simultaneously generate a SSYN ACK ACK packet; this SSYN ACK packet, referred to as the Secure Session Initiation (SSI) packet 824, will be sent with the first {sender, receiver} IP pair in the client's transmit table 921 (FIG. 9), as specified in the transmit hopblock provided by the TARP router 811 in the SSYN ACK. packet 822. The TARP router 811 will respond to the SSI packet 824 with an SSI ACK packet 825, which will be sent with the first {sender, receiver} IP pair in the TARP router's transmit table 923. Once these packets have been successfully exchanged, the secure communications session is established, and all further secure communications between the client 801 and the TARP router 811 will be conducted via this secure session, as long as synchronization is maintained. If synchronization is lost, then the client 801 and TARP router 802 may re-establish the secure session by the procedure outlined in FIG. 8 and described above.

While the secure session is active, both the client 901 and TARP router 911 (FIG. 9) will maintain their respective transmit tables 921, 923 and receive tables 922, 924, as provided by the TARP router during session synchronization 822. It is important that the sequence of IP pairs in the client's transmit table 921 be identical to those in the TARP router's receive table 924; similarly, the sequence of IP pairs in the client's receive table 922 must be identical to those in the router's transmit table 923. This is required for the session synchronization to be maintained. The client 901 need maintain only one transmit table 921 and one receive table 922 during the course of the secure session. Each sequential packet sent by the client 901 will employ the next {send, receive} IP address pair in the transmit table, regardless of TCP or UDP session. The TARP router 911 will expect each packet arriving from the client 901 to bear the next IP address pair shown in its receive table.

Since packets can arrive out of order, however, the router 911 can maintain a "look ahead" buffer in its receive table, and will mark previously-received IP pairs as invalid for future packets; any future packet containing an IP pair that is in the look-ahead buffer but is marked as previously received will be discarded. Communications from the TARP router 911 to the client 901 are maintained in an identical manner; in particular, the router 911 will select the next IP address pair from its transmit table 923 when constructing a packet to send to the client 901, and the client 901 will maintain a look-ahead buffer of expected IP pairs on packets that it is receiving. Each TARP router will maintain separate pairs of transmit and receive tables for each client that is currently engaged in a secure session with or through that TARP router.

While clients receive their hopblocks from the first server linking them to the Internet, routers exchange hopblocks. When a router establishes a link-based IP-hopping communication regime with another router, each router of the pair exchanges its transmit hopblock. The transmit hopblock of each router becomes the receive hopblock of the other router. The communication between routers is governed as described by the example of a client sending a packet to the first router.

While the above strategy works fine in the IP milieu, many local networks that are connected to the Internet are ethernet systems. In ethernet, the IP addresses of the destination devices must be translated into hardware addresses, and vice versa, using known processes ("address resolution protocol," and "reverse address resolution protocol"). However, if the link-based IP-hopping strategy is employed, the correlation process would become explosive and burdensome. An alternative to the link-based IP hopping strategy may be employed within an ethernet network. The solution is to provide that the node linking the Internet to the ethernet (call it the border node) use the link-based IP-hopping communication regime to communicate with nodes outside the ethernet LAN. Within the ethernet LAN, each TARP node would have a single IP address which would be addressed in the conventional way. Instead of comparing the {sender, receiver} IP address pairs to authenticate a packet, the intra-LAN TARP node would use one of the IP header extension fields to do so. Thus, the border node uses an algorithm shared by the intra-LAN TARP node to generate a symbol that is stored in the free field in the IP header, and the intra-LAN TARP node generates a range of symbols based on its prediction of the next expected packet to be received from that particular source IP address. The packet is rejected if it does not fall into the set of predicted symbols (for example, numerical values) or is accepted if it does. Communications from the intra-LAN TARP node to the border node are accomplished in the same manner, though the algorithm will necessarily be different for security reasons. Thus, each of the communicating nodes will generate transmit and receive tables in a similar manner to that of FIG. 9; the intra-LAN TARP nodes transmit table will be identical to the border node's receive table, and the intra-LAN TARP node's receive table will be identical to the border node's transmit table.

The algorithm used for IP address-hopping can be any desired algorithm. For example, the algorithm can be a given pseudo-random number generator that generates numbers of the range covering the allowed IP addresses with a given seed. Alternatively, the session participants can assume a certain type of algorithm and specify simply a parameter for applying the algorithm. For example the assumed algorithm could be a particular pseudo-random number generator and the session participants could simply exchange seed values.

Note that there is no permanent physical distinction between the originating and destination terminal nodes. Either device at either end point can initiate a synchronization of the pair. Note also that the authentication/synchronization-request (and acknowledgment) and hopblock-exchange may all be served by a single message so that separate message exchanges may not be required.

Figure 10:
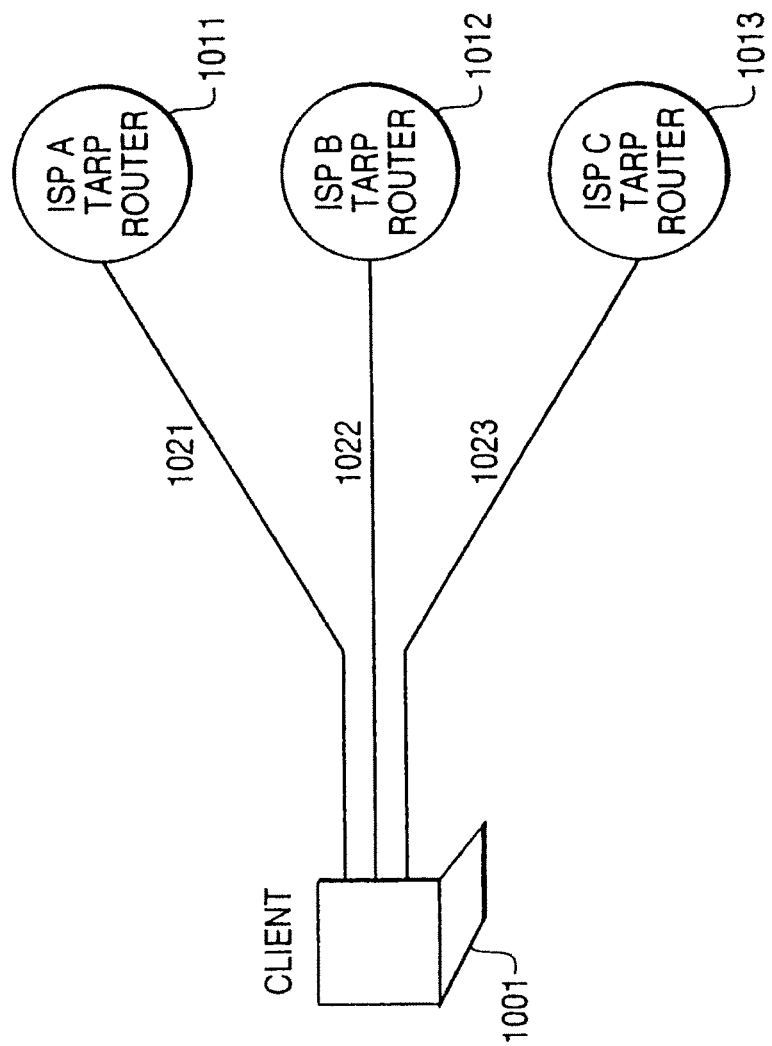
FIG. 10 shows physical link redundancy among three Internet Service Providers (ISPs) and a client computer.

As another extension to the stated architecture, multiple physical paths can be used by a client, in order to provide link redundancy and further thwart attempts at denial of service and traffic monitoring. As shown in FIG. 10, for example, client 1001 can establish three simultaneous sessions with each of three TARP routers provided by different ISPs 1011, 1012, 1013. As an example, the client 1001 can use three different telephone lines 1021, 1022, 1023 to connect to the ISPs, or two telephone lines and a cable modem, etc. In this scheme, transmitted packets will be sent in a random fashion among the different physical paths. This architecture provides a high degree of communications redundancy, with improved immunity from denial-of-service attacks and traffic monitoring.

Further Extensions

The following describes various extensions to the techniques, systems, and methods described above. As described above, the security of communications occurring between computers in a computer network (such as the Internet, an Ethernet, or others) can be enhanced by using seemingly random source and destination Internet Protocol (IP) addresses for data packets transmitted over the network. This feature prevents eavesdroppers from determining which computers in the network are communicating with each other while permitting the two communicating computers to easily recognize whether a given received data packet is legitimate or not. In one embodiment of the above-described systems, an IP header extension field is used to authenticate incoming packets on an Ethernet.

Various extensions to the previously described techniques described herein include: (1) use of hopped hardware or "MAC" addresses in broadcast type network; (2) a self-synchronization technique that permits a computer to automatically regain synchronization with a sender; (3) synchronization algorithms that allow transmitting and receiving computers to quickly re-establish synchronization in the event of lost packets or other events; and (4) a fast-packet rejection mechanism for rejecting invalid packets. Any or all of these extensions can be combined with the features described above in any of various ways.

A. Hardware Address Hopping

Figure 11:
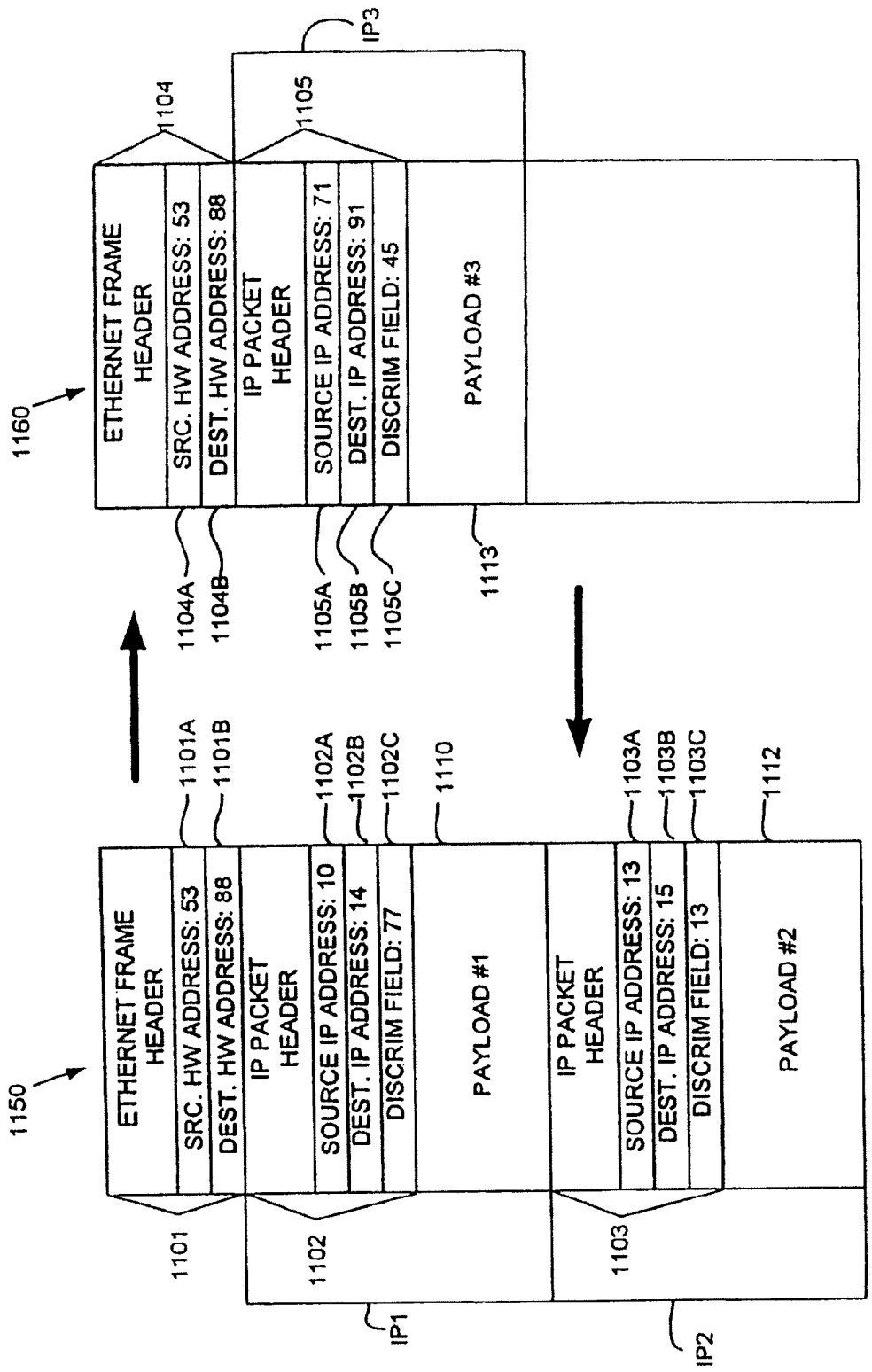
FIG. 11 shows how multiple IP packets can be embedded into a single "frame" such as an Ethernet frame, and further shows the use of a discriminator field to camouflage true packet recipients.

Internet protocol-based communications techniques on a LAN or across any dedicated physical medium-typically embed the IP packets within lower-level packets, often referred to as "frames." As shown in FIG. 11, for example, a first Ethernet frame 1150 comprises a frame header 1101 and two embedded IP packets IP1 and IP2, while a second Ethernet frame 1160 comprises a different frame header 1104 and a single IP packet IP3. Each frame header generally includes a source hardware address 1101A and a destination hardware address 1101B; other well-known fields in frame headers are omitted from FIG. 11 for clarity. Two hardware nodes communicating over a physical communication channel insert appropriate source and destination hardware addresses to indicate which nodes on the channel or network should receive the frame.

It may be possible for a nefarious listener to acquire information about the contents of a frame and/or its communicants by examining frames on a local network rather than (or in addition to) the IP packets themselves. This is especially true in broadcast media, such as Ethernet, where it is necessary to insert into the frame header the hardware address of the machine that generated the frame and the hardware address of the machine to which frame is being sent. All nodes on the network can potentially "see" all packets transmitted across the network. This can be a problem for secure communications, especially in cases where the communicants do not want for any third party to be able to identify who is engaging in the information exchange. One way to address this problem is to push the address-hopping scheme down to the hardware layer. In accordance with various embodiments of the invention, hardware addresses are "hopped" in a manner similar to that used to change IP addresses, such that a listener cannot determine which hardware node generated a particular message nor which node is the intended recipient.

Figure 12A:
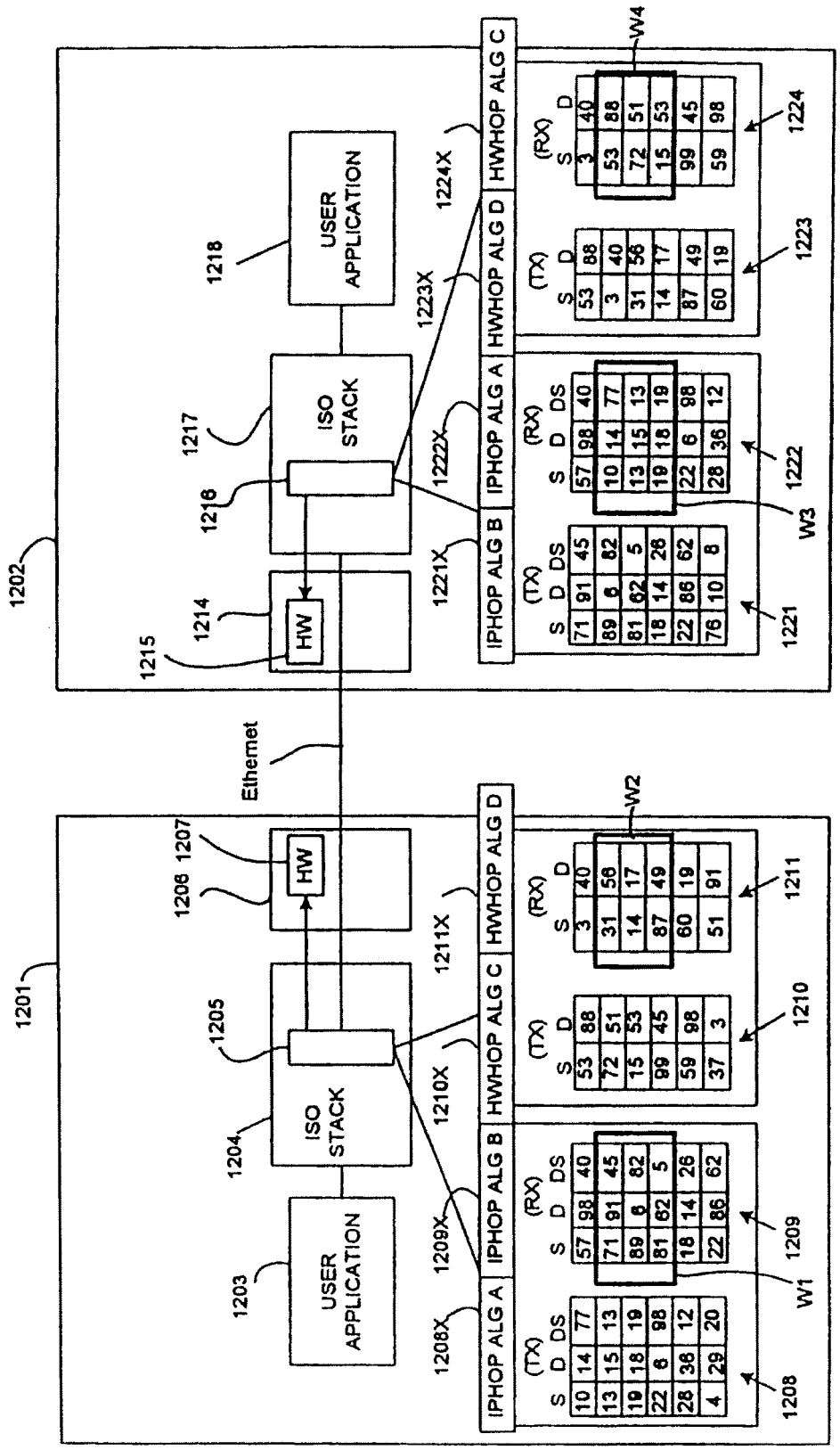
FIG. 12A shows a system that employs hopped hardware addresses, hopped IP addresses, and hopped discriminator fields.

FIG. 12A shows a system in which Media Access Control ("MAC") hardware addresses are "hopped" in order to increase security over a network such as an Ethernet. While the description refers to the exemplary case of an Ethernet environment, the inventive principles are equally applicable to other types of communications media. In the Ethernet case, the MAC address of the sender and receiver are inserted into the Ethernet frame and can be observed by anyone on the LAN who is within the broadcast range for that frame. For secure communications, it becomes desirable to generate frames with MAC addresses that are not attributable to any specific sender or receiver.

As shown in FIG. 12A, two computer nodes 1201 and 1202 communicate over a communication channel such as an Ethernet. Each node executes one or more application programs 1203 and 1218 that communicate by transmitting packets through communication software 1204 and 1217, respectively. Examples of application programs include video conferencing, e-mail, word processing programs, telephony, and the like. Communication software 1204 and 1217 can comprise, for example, an OSI layered architecture or "stack" that standardizes various services provided at different levels of functionality.

The lowest levels of communication software 1204 and 1217 communicate with hardware components 1206 and 1214 respectively, each of which can include one or more registers 1207 and 1215 that allow the hardware to be reconfigured or controlled in accordance with various communication protocols. The hardware components (an Ethernet network interface card, for example) communicate with each other over the communication medium. Each hardware component is typically pre-assigned a fixed hardware address or MAC number that identifies the hardware component to other nodes on the network. One or more interface drivers control the operation of each card and can, for example, be configured to accept or reject packets from certain hardware addresses. As will be described in more detail below, various embodiments of the inventive principles provide for "hopping" different addresses using one or more algorithms and one or more moving windows that track a range of valid addresses to validate received packets. Packets transmitted according to one or more of the inventive principles will be generally referred to as "secure" packets or "secure communications" to differentiate them from ordinary data packets that are transmitted in the clear using ordinary, machine-correlated addresses.

One straightforward method of generating non-attributable MAC addresses is an extension of the IP hopping scheme. In this scenario, two machines on the same LAN that desire to communicate in a secure fashion exchange random-number generators and seeds, and create sequences of quasi-random MAC addresses for synchronized hopping. The implementation and synchronization issues are then similar to that of IP hopping.

This approach, however, runs the risk of using MAC addresses that are currently active on the LAN-which, in turn, could interrupt communications for those machines. Since an Ethernet MAC address is at present 48 bits in length, the chance of randomly misusing an active MAC address is actually quite small. However, if that figure is multiplied by a large number of nodes (as would be found on an extensive LAN), by a Large number of frames (as might be the case with packet voice or streaming video), and by a large number of concurrent Virtual Private Networks (VPNs), then the chance that a non-secure machine's MAC address could be used in an address-hopped frame can become non-trivial. In short, any scheme that runs even a small risk of interrupting communications for other machines on the LAN is bound to receive resistance from prospective system administrators. Nevertheless, it is technically feasible, and can be implemented without risk on a LAN on which there is a small number of machines, or if all of the machines on the LAN are engaging in MAC-hopped communications.

Synchronized MAC address hopping may incur some overhead in the course of session establishment, especially if there are multiple sessions or multiple nodes involved in the communications. A simpler method of randomizing MAC addresses is to allow each node to receive and process every incident frame on the network. Typically, each network interface driver will check the destination MAC address in the header of every incident frame to see if it matches that machine's MAC address; if there is no match, then the frame is discarded. In one embodiment, however, these checks can be disabled, and every incident packet is passed to the TARP stack for processing. This will be referred to as "promiscuous" mode, since every incident frame is processed. Promiscuous mode allows the sender to use completely random, unsynchronized MAC addresses, since the destination machine is guaranteed to process the frame. The decision as to whether the packet was truly intended for that machine is handled by the TARP stack, which checks the source and destination IP addresses for a match in its IP synchronization tables. If no match is found, the packet is discarded; if there is a match, the packet is unwrapped, the inner header is evaluated, and if the inner header indicates that the packet is destined for that machine then the packet is forwarded to the IP stack—otherwise it is discarded.

One disadvantage of purely-random MAC address hopping is its impact on processing overhead; that is, since every incident frame must be processed, the machine's CPU is engaged considerably more often than if the network interface driver is discriminating and rejecting packets unilaterally. A compromise approach is to select either a single fixed MAC address or a small number of MAC addresses (e.g., one for each virtual private network on an Ethernet) to use for MAC-hopped communications, regardless of the actual recipient for which the message is intended. In this mode, the network interface driver can check each incident frame against one (or a few) pre-established MAC addresses, thereby freeing the CPU from the task of physical-layer packet discrimination. This scheme does not betray any useful information to an interloper on the LAN; in particular, every secure packet can already be identified by a unique packet type in the outer header. However, since all machines engaged in secure communications would either be using the same MAC address, or be selecting from a small pool of predetermined MAC addresses, the association between a specific machine and a specific MAC address is effectively broken.

In this scheme, the CPU will be engaged more often than it would be in non-secure communications (or in synchronized MAC address hopping), since the network interface driver cannot always unilaterally discriminate between secure packets that are destined for that machine, and secure packets from other VPNs. However, the non-secure traffic is easily eliminated at the network interface, thereby reducing the amount of processing required of the CPU. There are boundary conditions where these statements would not hold, of course—e.g., if all of the traffic on the LAN is secure traffic, then the CPU would be engaged to the same degree as it is in the purely-random address hopping case; alternatively, if each VPN on the LAN uses a different MAC address, then the network interface can perfectly discriminate secure frames destined for the local machine from those constituting other VPNs. These are engineering tradeoffs that might be best handled by providing administrative options for the users when installing the software and/or establishing VPNs.

Even in this scenario, however, there still remains a slight risk of selecting MAC addresses that are being used by one or more nodes on the LAN. One solution to this problem is to formally assign one address or a range of addresses for use in MAC-hopped communications. This is typically done via an assigned numbers registration authority; e.g., in the case of Ethernet, MAC address ranges are assigned to vendors by the Institute of Electrical and Electronics Engineers (IEEE). A formally-assigned range of addresses would ensure that secure frames do not conflict with any properly-configured and properly-functioning machines on the LAN.

Reference will now be made to FIGS. 12A and 12B in order to describe the many combinations and features that follow the inventive principles. As explained above, two computer nodes 1201 and 1202 are assumed to be communicating over a network or communication medium such as an Ethernet. A communication protocol in each node (1204 and 1217, respectively) contains a modified element 1205 and 1216 that performs certain functions that deviate from the standard communication protocols. In particular, computer node 1201 implements a first "hop" algorithm 1208X that selects seemingly random source and destination IP addresses (and, in one embodiment, seemingly random IP header discriminator fields) in order to transmit each packet to the other computer node. For example, node 1201 maintains a transmit table 1208 containing triplets of source (S), destination (D), and discriminator fields (DS) that are inserted into outgoing IP packet headers. The table is generated through the use of an appropriate algorithm (e.g., a random number generator that is seeded with an appropriate seed) that is known to the recipient node 1202. As each new IP packet is formed, the next sequential entry out of the sender's transmit table 1208 is used to populate the IP source, IP destination, and IP header extension field (e.g., discriminator field). It will be appreciated that the transmit table need not be created in advance but could instead be created on-the-fly by executing the algorithm when each packet is formed.

At the receiving node 1202, the same IP hop algorithm 1222X is maintained and used to generate a receive table 1222 that lists valid triplets of source IP address, destination IP address, and discriminator field. This is shown by virtue of the first five entries of transmit table 1208 matching the second five entries of receive table 1222. (The tables may be slightly offset at any particular time due to lost packets, misordered packets, or transmission delays). Additionally, node 1202 maintains a receive window W3 that represents a list of valid IP source, IP destination, and discriminator fields that will be accepted when received as part of an incoming IP packet. As packets are received, window W3 slides down the list of valid entries, such that the possible valid entries change over time. Two packets that arrive out of order but are nevertheless matched to entries within window W3 will be accepted; those falling outside of window W3 will he rejected as invalid. The length of window W3 can be adjusted as necessary to reflect network delays or other factors.

Node 1202 maintains a similar transmit table 1221 for creating IP packets and frames destined for node 1201 using a potentially different hopping algorithm 1221X, and node 1201 maintains a matching receive table 1209 using the same algorithm 1209X. As node 1202 transmits packets to node 1201 using seemingly random IP source, IP destination, and/or discriminator fields, node 1201 matches the incoming packet values to those falling within window W1 maintained in its receive table. In effect, transmit table 1208 of node 1201 is synchronized (i.e., entries are selected in the same order) to receive table 1222 of receiving node 1202. Similarly, transmit table 1221 of node 1202 is synchronized to receive table 1209 of node 1201. It will be appreciated that although a common algorithm is shown for the source, destination and discriminator fields in FIG. 12A (using, e.g., a different seed for each of the three fields), an entirely different algorithm could in fact he used to establish values for each of these fields. It will also be appreciated that one or two of the fields can be "hopped" rather than all three as illustrated.

In accordance with another aspect of the invention, hardware or "MAC" addresses are hopped instead of or in addition to IP addresses and/or the discriminator field in order to improve security in a local area or broadcast-type network. To that end, node 1201 further maintains a transmit table 1210 using a transmit algorithm 1210X to generate source and destination hardware addresses that are inserted into frame headers (e.g., fields 1101A and 1101B in FIG. 11) that are synchronized to a corresponding receive table 1224 at node 1202. Similarly, node 1202 maintains a different transmit table 1223 containing source and destination hardware addresses that is synchronized with a corresponding receive table 1211 at node 1201. In this manner, outgoing hardware frames appear to be originating from and going to completely random nodes on the network, even though each recipient can determine whether a given packet is intended for it or not. It will be appreciated that the hardware hopping feature can be implemented at a different level in the communications protocol than the IP hopping feature (e.g., in a card driver or in a hardware card itself to improve performance).

FIG. 12B shows three different embodiments or modes that can be employed using the aforementioned principles. In a first mode referred to as "promiscuous" mode, a common hardware address (e.g., a fixed address for source and another for destination) or else a completely random hardware address is used by all nodes on the network, such that a particular packet cannot be attributed to any one node. Each node must initially accept all packets containing the common (or random) hardware address and inspect the IP addresses or discriminator field to determine whether the packet is intended for that node. In this regard, either the IP addresses or the discriminator field or both can be varied in accordance with an algorithm as described above. As explained previously, this may increase each node's overhead since additional processing is involved to determine whether a given packet has valid source and destination hardware addresses.

In a second mode referred to as "promiscuous per VPN" mode, a small set of fixed hardware addresses are used, with a fixed source/destination hardware address used for all nodes communicating over a virtual private network. For example, if there are six nodes on an Ethernet, and the network is to be split up into two private virtual networks such that nodes on one VPN can communicate with only the other two nodes on its own VPN, then two sets of hardware addresses could be used: one set for the first VPN and a second set for the second VPN. This would reduce the amount of overhead involved in checking for valid frames since only packets arriving from the designated VPN would need to be checked. IP addresses and one or more discriminator fields could still be hopped as before for secure communication within the VPN. Of course, this solution compromises the anonymity of the VPNs (i.e., an outsider can easily tell what traffic belongs in which VPN, though he cannot correlate it to a specific machine/person). It also requires the use of a discriminator field to mitigate the vulnerability to certain types of DoS attacks. (For example, without the discriminator field, an attacker on the LAN could stream frames containing the MAC addresses being used by the VPN; rejecting those frames could lead to excessive processing overhead. The discriminator field would provide a low-overhead means of rejecting the false packets.)

In a third mode referred to as "hardware hopping" mode, hardware addresses are varied as illustrated in FIG. 12A, such that hardware source and destination addresses are changed constantly in order to provide non-attributable addressing. Variations on these embodiments are of course possible, and the invention is not intended to be limited in any respect by these illustrative examples.

B. Extending the Address Space

Address hopping provides security and privacy. However, the level of protection is limited by the number of addresses in the blocks being hopped. A hopblock denotes a field or fields modulated on a packet-wise basis for the purpose of providing a VPN. For instance, if two nodes communicate with IP address hopping using hopblocks of 4 addresses (2 bits) each, there would be 16 possible address-pair combinations. A window of size 16 would result in most address pairs being accepted as valid most of the time. This limitation can be overcome by using a discriminator field in addition to or instead of the hopped address fields. The discriminator field would be hopped in exactly the same fashion as the address fields and it would be used to determine whether a packet should be processed by a receiver.

Suppose that two clients, each using four-bit hopblocks, would like the same level of protection afforded to clients communicating via IP hopping between two A blocks (24 address bits eligible for hopping). A discriminator field of 20 bits, used in conjunction with the 4 address bits eligible for hopping in the IP address field, provides this level of protection. A 24-bit discriminator field would provide a similar level of protection if the address fields were not hopped or ignored. Using a discriminator field offers the following advantages: (1) an arbitrarily high level of protection can be provided, and (2) address hopping is unnecessary to provide protection. This may be important in environments where address hopping would cause routing problems.

C. Synchronization Techniques

It is generally assumed that once a sending node and receiving node have exchanged algorithms and seeds (or similar information sufficient to generate quasi-random source and destination tables), subsequent communication between the two nodes will proceed smoothly. Realistically, however, two nodes may lose synchronization due to network delays or outages, or other problems. Consequently, it is desirable to provide means for re-establishing synchronization between nodes in a network that have lost synchronization.

One possible technique is to require that each node provide an acknowledgment upon successful receipt of each packet and, if no acknowledgment is received within a certain period of time, to re-send the unacknowledged packet. This approach, however, drives up overhead costs and may be prohibitive in high-throughput environments such as streaming video or audio, for example.

A different approach is to employ an automatic synchronizing technique that will be referred to herein as "self-synchronization." In this approach, synchronization information is embedded into each packet, thereby enabling the receiver to re-synchronize itself upon receipt of a single packet if it determines that is has lost synchronization with the sender. (If communications are already in progress, and the receiver determines that it is still in sync with the sender, then there is no need to re-synchronize.) A receiver could detect that it was out of synchronization by, for example, employing a "dead-man" timer that expires after a certain period of time, wherein the timer is reset with each valid packet. A time stamp could be hashed into the public sync field (see below) to preclude packet-retry attacks.

In one embodiment, a "sync field" is added to the header of each packet sent out by the sender. This sync field could appear in the clear or as part of an encrypted portion of the packet. Assuming that a sender and receiver have selected a random-number generator (RNG) and seed value, this combination of RNG and seed can be used to generate a random-number sequence (RNS). The RNS is then used to generate a sequence of source/destination IP pairs (and, if desired, discriminator fields and hardware source and destination addresses), as described above. It is not necessary, however, to generate the entire sequence (or the first N−1 values) in order to generate the Nth random number in the sequence; if the sequence index N is known, the random value corresponding to that index can be directly generated (see below). Different RNGs (and seeds) with different fundamental periods could be used to generate the source and destination IP sequences, but the basic concepts would still apply. For the sake of simplicity, the following discussion will assume that IP source and destination address pairs (only) are hopped using a single RNG sequencing mechanism.

In accordance with a "self-synchronization" feature, a sync field in each packet header provides an index (i.e., a sequence number) into the RNS that is being used to generate IP pairs. Plugging this index into the RNG that is being used to generate the RNS yields a specific random number value, which in turn yields a specific IP pair. That is, an IP pair can be generated directly from knowledge of the RNG, seed, and index number; it is not necessary, in this scheme, to generate the entire sequence of random numbers that precede the sequence value associated with the index number provided.

Since the communicants have presumably previously exchanged RNGs and seeds, the only new information that must be provided in order to generate an IP pair is the sequence number. If this number is provided by the sender in the packet header, then the receiver need only plug this number into the RNG in order to generate an IP pair—and thus verify that the IP pair appearing in the header of the packet is valid. In this scheme, if the sender and receiver lose synchronization, the receiver can immediately re-synchronize upon receipt of a single packet by simply comparing the IP pair in the packet header to the IP pair generated from the index number. Thus, synchronized communications can be resumed upon receipt of a single packet, making this scheme ideal for multicast communications. Taken to the extreme, it could obviate the need for synchronization tables entirely; that is, the sender and receiver could simply rely on the index number in the sync field to validate the IP pair on each packet, and thereby eliminate the tables entirely.

The aforementioned scheme may have some inherent security issues associated with it—namely, the placement of the sync field. If the field is placed in the outer header, then an interloper could observe the values of the field and their relationship to the IP stream. This could potentially compromise the algorithm that is being used to generate the IP-address sequence, which would compromise the security of the communications. If, however, the value is placed in the inner header, then the sender must decrypt the inner header before it can extract the sync value and validate the IP pair; this opens up the receiver to certain types of denial-of-service (DoS) attacks, such as packet replay. That is, if the receiver must decrypt a packet before it can validate the IP pair, then it could potentially be forced to expend a significant amount of processing on decryption if an attacker simply retransmits previously valid packets. Other attack methodologies are possible in this scenario.

A possible compromise between algorithm security and processing speed is to split up the sync value between an inner (encrypted) and outer (unencrypted) header. That is, if the sync value is sufficiently long, it could potentially be split into a rapidly-changing part that can be viewed in the clear, and a fixed (or very slowly changing) part that must be protected. The part that can be viewed in the clear will be called the "public sync" portion and the part that must be protected will be called the "private sync" portion.

Both the public sync and private sync portions are needed to generate the complete sync value. The private portion, however, can be selected such that it is fixed or will change only occasionally. Thus, the private sync value can be stored by the recipient, thereby obviating the need to decrypt the header in order to retrieve it. If the sender and receiver have previously agreed upon the frequency with which the private part of the sync will change, then the receiver can selectively decrypt a single header in order to extract the new private sync if the communications gap that has led to lost synchronization has exceeded the lifetime of the previous private sync. This should not represent a burdensome amount of decryption, and thus should not open up the receiver to denial-of-service attack simply based on the need to occasionally decrypt a single header.

Figure 13:
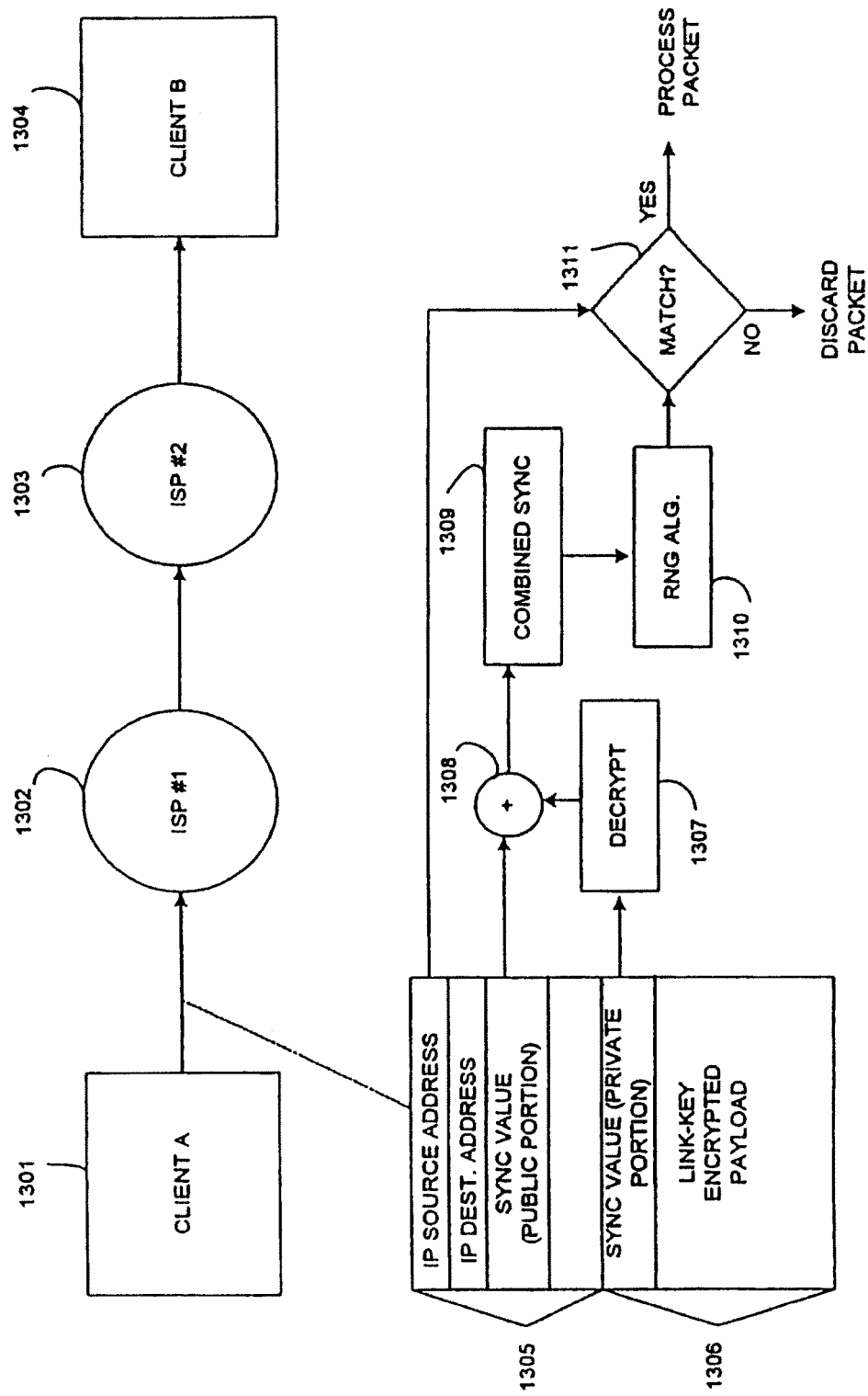
FIG. 13 shows a technique for automatically re-establishing synchronization between sender and receiver through the use of a partially public sync value.

One implementation of this is to use a hashing function with a one-to-one mapping to generate the private and public sync portions from the sync value. This implementation is shown in FIG. 13, where (for example) a first ISP 1302 is the sender and a second ISP 1303 is the receiver. (Other alternatives are possible from FIG. 13.) A transmitted packet comprises a public or "outer" header 1305 that is not encrypted, and a private or "inner" header 1306 that is encrypted using for example a link key. Outer header 1305 includes a public sync portion while inner header 1306 contains the private sync portion. A receiving node decrypts the inner header using a decryption function 1307 in order to extract the private sync portion. This step is necessary only if the lifetime of the currently buffered private sync has expired. (If the currently-buffered private sync is still valid, then it is simply extracted from memory and "added" (which could be an inverse hash) to the public sync, as shown in step 1308.) The public and decrypted private sync portions are combined in function 1308 in order to generate the combined sync 1309. The combined sync (1309) is then fed into the RNG (1310) and compared to the IP address pair (1311) to validate or reject the packet.

An important consideration in this architecture is the concept of "fixture" and "past" where the public sync values are concerned. Though the sync values, themselves, should be random to prevent spoofing attacks, it may be important that the receiver be able to quickly identify a sync value that has already been sent—even if the packet containing that sync value was never actually received by the receiver. One solution is to hash a time stamp or sequence number into the public sync portion, which could be quickly extracted, checked, and discarded, thereby validating the public sync portion itself.

In one embodiment, packets can be checked by comparing the source/destination IP pair generated by the sync field with the pair appearing in the packet header. If (1) they match, (2) the time stamp is valid, and (3) the dead-man timer has expired, then re-synchronization occurs; otherwise, the packet is rejected. If enough processing power is available, the dead-man timer and synchronization tables can be avoided altogether, and the receiver would simply resynchronize (e.g., validate) on every packet.

The foregoing scheme may require large-integer (e.g., 160-bit) math, which may affect its implementation. Without such large-integer registers, processing throughput would be affected, thus potentially affecting security from a denial-of-service standpoint. Nevertheless, as large-integer math processing features become more prevalent, the costs of implementing such a feature will be reduced.

D. Other Synchronization Schemes

As explained above, if W or more consecutive packets are lost between a transmitter and receiver in a VPN (where W is the window size), the receiver's window will not have been updated and the transmitter will be transmitting packets not in the receiver's window. The sender and receiver will not recover synchronization until perhaps the random pairs in the window are repeated by chance. Therefore, there is a need to keep a transmitter and receiver in synchronization whenever possible and to re-establish synchronization whenever it is lost.

A "checkpoint" scheme can be used to regain synchronization between a sender and a receiver that have fallen out of synchronization. In this scheme, a checkpoint message comprising a random IP address pair is used for communicating synchronization information. In one embodiment, two messages are used to communicate synchronization information between a sender and a recipient:

1. SYNC_REQ is a message used by the sender to indicate that it wants to synchronize; and
2. SYNC_ACK is a message used by the receiver to inform the transmitter that it has been synchronized.

Figure 14:
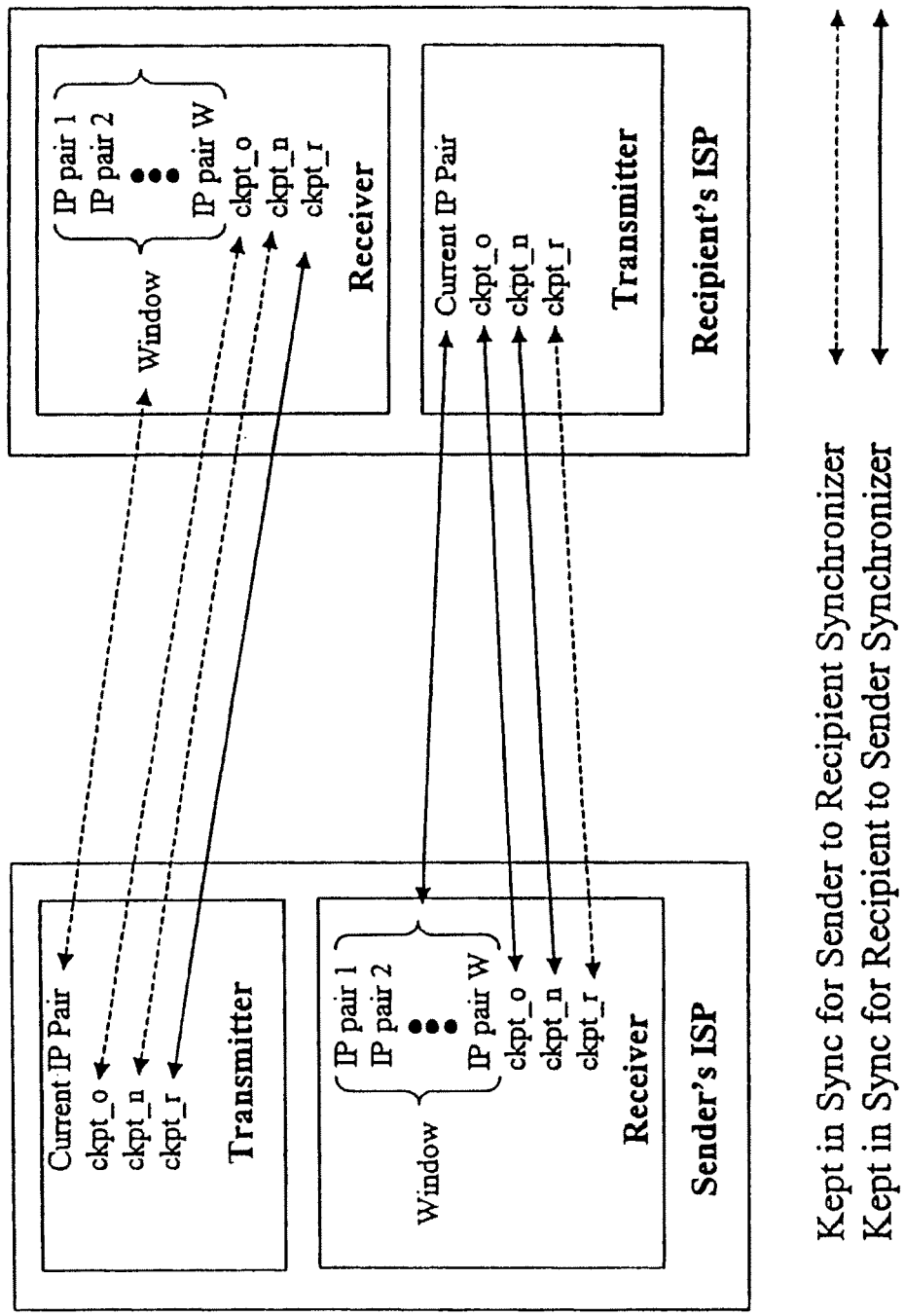
FIG. 14 shows a "checkpoint" scheme for regaining synchronization between a sender and recipient.

According to one variation of this approach, both the transmitter and receiver maintain three checkpoints (see FIG. 14):

1. In the transmitter, ckpt_o ("checkpoint old") is the IP pair that was used to re-send the last SYNC_REQ packet to the receiver. In the receiver, ckpt_o ("checkpoint old") is the IP pair that receives repeated SYNC_REQ packets from the transmitter.
2. In the transmitter, ckpt_n ("checkpoint new") is the IP pair that will be used to send the next SYNC_REQ packet to the receiver. In the receiver, ckpt_n ("checkpoint new") is the IP pair that receives a new SYNC_REQ packet from the transmitter and which causes the receiver's window to be re-aligned, ckpt_o set to ckpt_n, a new ckpt_n to be generated and a new ckpt_r to be generated.
3. In the transmitter, ckpt_r is the IP pair that will be used to send the next SYNC ACK packet to the receiver. In the receiver, ckpt_r is the IP pair that receives a new SYNC_ACK packet from the transmitter and which causes a new ckpt_n to be generated. Since SYNC_ACK is transmitted from the receiver ISP to the sender ISP, the transmitter ckpt_r refers to the ckpt_r of the receiver and the receiver ckpt_r refers to the ckpt_r of the transmitter (see FIG. 14).

When a transmitter initiates synchronization, the IP pair it will use to transmit the next data packet is set to a predetermined value and when a receiver first receives a SYNC_REQ, the receiver window is updated to be centered on the transmitter's next IP pair. This is the primary mechanism for checkpoint synchronization.

Figure 15:
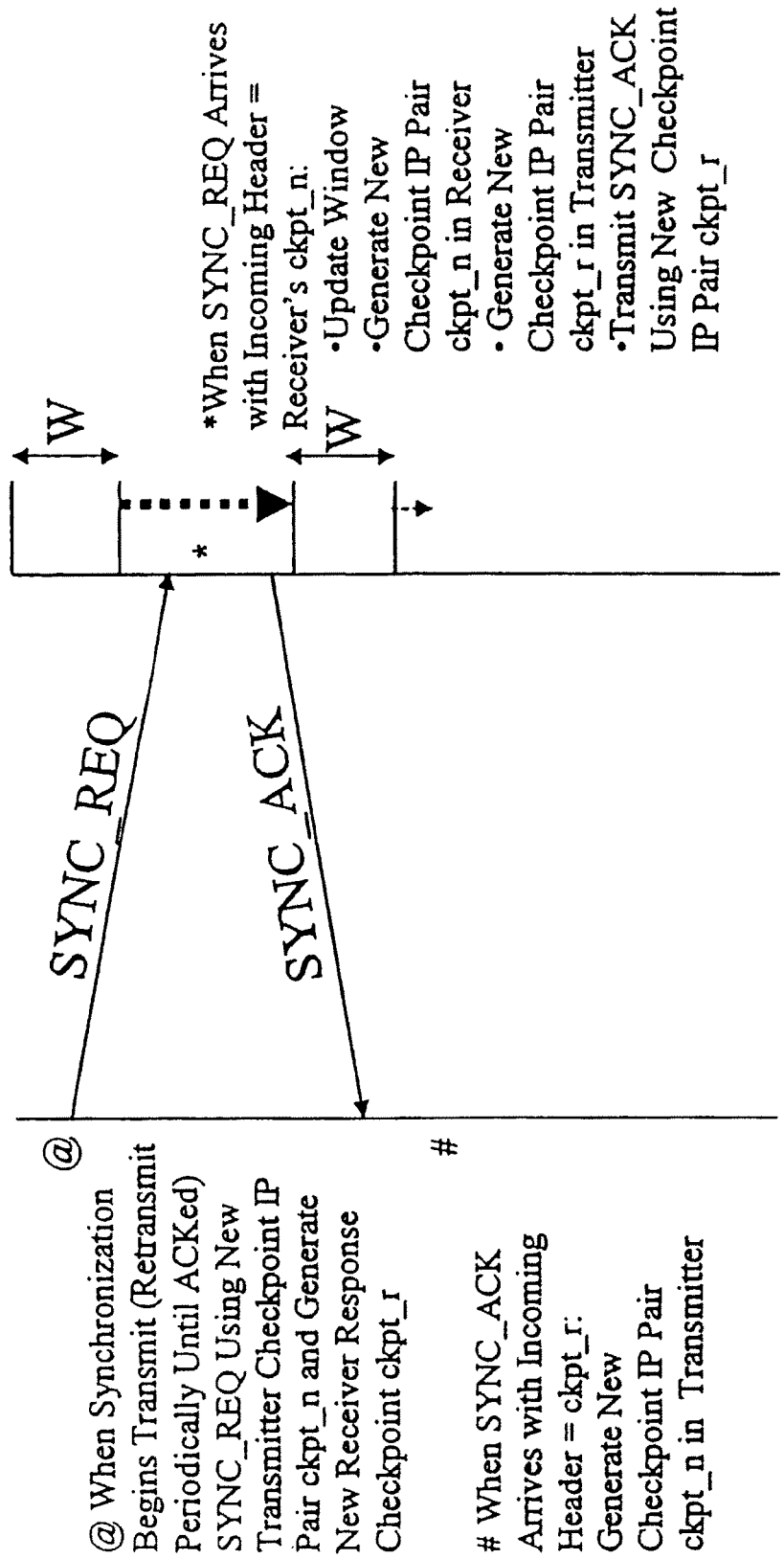
FIG. 15 shows further details of the checkpoint scheme of FIG. 14.

Synchronization can be initiated by a packet counter (e.g., after every N packets transmitted, initiate a synchronization) or by a timer (every S seconds, initiate a synchronization) or a combination of both. See FIG. 15. From the transmitter's perspective, this technique operates as follows: (1) Each transmitter periodically transmits a "sync request" message to the receiver to make sure that it is in sync. (2) If the receiver is still in sync, it sends back a "sync ack" message. (If this works, no further action is necessary). (3) If no "sync ack" has been received within a period of time, the transmitter retransmits the sync request again. If the transmitter reaches the next checkpoint without receiving a "sync ack" response, then synchronization is broken, and the transmitter should stop transmitting. The transmitter will continue to send sync_reqs until it receives a sync_ack, at which point transmission is reestablished.

From the receiver's perspective, the scheme operates as follows: (1) when it receives a "sync request" request from the transmitter, it advances its window to the next checkpoint position (even skipping pairs if necessary), and sends a "sync ack" message to the transmitter. If sync was never lost, then the "jump ahead" really just advances to the next available pair of addresses in the table (i.e., normal advancement).

If an interloper intercepts the "sync request" messages and tries to interfere with communication by sending new ones, it will be ignored if the synchronization has been established or it will actually help to re-establish synchronization.

A window is realigned whenever a re-synchronization occurs. This realignment entails updating the receiver's window to straddle the address pairs used by the packet transmitted immediately after the transmission of the SYNC_REQ packet. Normally, the transmitter and receiver are in synchronization with one another. However, when network events occur, the receiver's window may have to be advanced by many steps during resynchronization. In this case, it is desirable to move the window ahead without having to step through the intervening random numbers sequentially. (This feature is also desirable for the auto-sync approach discussed above).

E. Random Number Generator with a Jump-Ahead Capability

An attractive method for generating randomly hopped addresses is to use identical random number generators in the transmitter and receiver and advance them as packets are transmitted and received. There are many random number generation algorithms that could be used. Each one has strengths and weaknesses for address hopping applications.

Linear congruential random number generators (LCRs) are fast, simple and well characterized random number generators that can be made to jump ahead n steps efficiently. An LCR generates random numbers $X_1, X_2, X_3 \ldots X_k$ starting with seed $X_o$ using a recurrence $$X_i = (aX_{i-1}+b) \bmod c, \quad (1)$$

where a, b and c define a particular LCR. Another expression for $X_i$, $$X_i = ((a^i(X_o+b)-b)/(a-1)) \bmod c \quad (2)$$

enables the jump-ahead capability. The factor $a^i$ can grow very large even for modest i if left unfettered. Therefore some special properties of the modulo operation can be used to control the size and processing time required to compute (2). (2) can be rewritten as:

$$X_i = (a^i(X_o(a-1)+b)-b)/(a-1) \bmod c. \quad (3)$$

It can be shown that:

$$(a^i(X_o(a-1)+b)-b)/(a-1)) \bmod c = ((a^i \bmod ((a-1)c)(X_o(a-1)+b)-b)/(a-1)) \bmod c \quad (4).$$

$(X_o(a-1)+b)$ can be stored as $(X_o(a-1)+b) \bmod c$, b as b mod c and compute $a^i \bmod ((a-1)c)$ (this requires O(log(i)) steps).

A practical implementation of this algorithm would jump a fixed distance, n, between synchronizations; this is tantamount to synchronizing every n packets. The window would commence n IP pairs from the start of the previous window. Using $X_j^w$, the random number at the $j^{th}$ checkpoint, as $X_0$ and n as i, a node can store $a^n \bmod ((a-1)c)$ once per LCR and set $$X_{j+1}^w = X_{n(j+1)} = ((a^n \bmod((a-1)c)(X_j^w(a-1)+b)-b)/(a-1)) \bmod c, \quad (5)$$

to generate the random number for the $j+1^{th}$ synchronization. Using this construction, a node could jump ahead an arbitrary (but fixed) distance between synchronizations in a constant amount of time (independent of n).

Pseudo-random number generators, in general, and LCRs, in particular, will eventually repeat their cycles. This repetition may present vulnerability in the IP hopping scheme. An adversary would simply have to wait for a repeat to predict future sequences. One way of coping with this vulnerability is to create a random number generator with a known long cycle. A random sequence can be replaced by a new random number generator before it repeats. LCRs can be constructed with known long cycles. This is not currently true of many random number generators.

Random number generators can be cryptographically insecure. An adversary can derive the RNG parameters by examining the output or part of the output. This is true of LCGs. This vulnerability can be mitigated by incorporating an encryptor, designed to scramble the output as part of the random number generator. The random number generator prevents an adversary from mounting an attack e.g., a known plaintext attack against the encryptor.

F. Random Number Generator Example

Consider a RNG where a=31,b=4 and c=15. For this case equation (1) becomes:

$$X_i = (31X_{i-1}+4) \bmod 15. \quad (6)$$

If one sets $X_0=1$, equation (6) will produce the sequence 1, 5, 9, 13, 2, 6, 10, 14, 3, 7, 11, 0, 4, 8, 12. This sequence will repeat indefinitely. For a jump ahead of 3 numbers in this sequence $a^n=31^3=29791$, $c^*(a-1)=15^*30=450$ and $a^n \bmod((a-1)c)=31^3 \bmod(15^*30)=29791 \bmod(450)=91$. Equation (5) becomes:

$$((91(X_i 30+4)-4)/30) \bmod 15 \quad (7).$$

Table 1 shows the jump ahead calculations from (7). The calculations start at 5 and jump ahead 3.

TABLE 1

| I | $X_i$ | $(X_i 30 + 4)$ | $91 (X_i 30 + 4) - 4$ | $((91 (X_i 30 + 4) - 4)/30$ | $X_{i+3}$ |
|---|---|---|---|---|---|
| 1 | 5 | 154 | 14010 | 467 | 2 |
| 4 | 2 | 64 | 5820 | 194 | 14 |
| 7 | 14 | 424 | 38580 | 1286 | 11 |
| 10 | 11 | 334 | 30390 | 1013 | 8 |
| 13 | 8 | 244 | 22200 | 740 | 5 |

G. Fast Packet Filter

Address hopping VPNs must rapidly determine whether a packet has a valid header and thus requires further processing, or has an invalid header (a hostile packet) and should be immediately rejected. Such rapid determinations will be referred to as "fast packet filtering." This capability protects the VPN from attacks by an adversary who streams hostile packets at the receiver at a high rate of speed in the hope of saturating the receiver's processor (a so-called "denial of service" attack). Fast packet filtering is an important feature for implementing VPNs on shared media such as Ethernet.

Assuming that all participants in a VPN share an unassigned "A" block of addresses, one possibility is to use an experimental "A" block that will never be assigned to any machine that is not address hopping on the shared medium. "A" blocks have a 24 bits of address that can be hopped as opposed to the 8 bits in "C" blocks. In this case a hopblock will be the "A" block. The use of the experimental "A" block is a likely option on an Ethernet because:

1. The addresses have no validity outside of the Ethernet and will not be routed out to a valid outside destination by a gateway.
2. There are $2^{24}$ (~16 million) addresses that can be hopped within each "A" block. This yields>280 trillion possible address pairs making it very unlikely that an adversary would guess a valid address. It also provides acceptably low probability of collision between separate VPNs (all VPNs on a shared medium independently generate random address pairs from the same "A" block).

3. The packets will not be received by someone on the Ethernet who is not on a VPN (unless the machine is in promiscuous mode) minimizing impact on non-VPN computers.

The Ethernet example will be used to describe one implementation of fast packet filtering. The ideal algorithm would quickly examine a packet header, determine whether the packet is hostile, and reject any hostile packets or determine which active IP pair the packet header matches. The problem is a classical associative memory problem. A variety of techniques have been developed to solve this problem (hashing, B-trees etc). Each of these approaches has its strengths and weaknesses. For instance, hash tables can be made to operate quite fast in a statistical sense, but can occasionally degenerate into a much slower algorithm. This slowness can persist for a period of time. Since there is a need to discard hostile packets quickly at all times, hashing would be unacceptable.

H. Presence Vector Algorithm

A presence vector is a bit vector of length $2^n$ that can be indexed by n-bit numbers (each ranging from 0 to $2^n-1$). One can indicate the presence of k n-bit numbers (not necessarily unique), by setting the bits in the presence vector indexed by each number to 1. Otherwise, the bits in the presence vector are 0. An n-bit number, x, is one of the k numbers if and only if the $x^{th}$ bit of the presence vector is 1. A fast packet filter can be implemented by indexing the presence vector and looking for a 1, which will be referred to as the "test."

For example, suppose one wanted to represent the number 135 using a presence vector. The $135^{th}$ bit of the vector would be set. Consequently, one could very quickly determine whether an address of 135 was valid by checking only one bit: the $135^{th}$ bit. The presence vectors could be created in advance corresponding to the table entries for the IP addresses. In effect, the incoming addresses can be used as indices into a long vector, making comparisons very fast. As each RNG generates a new address, the presence vector is updated to reflect the information. As the window moves, the presence vector is updated to zero out addresses that are no longer valid.

Figure 16:
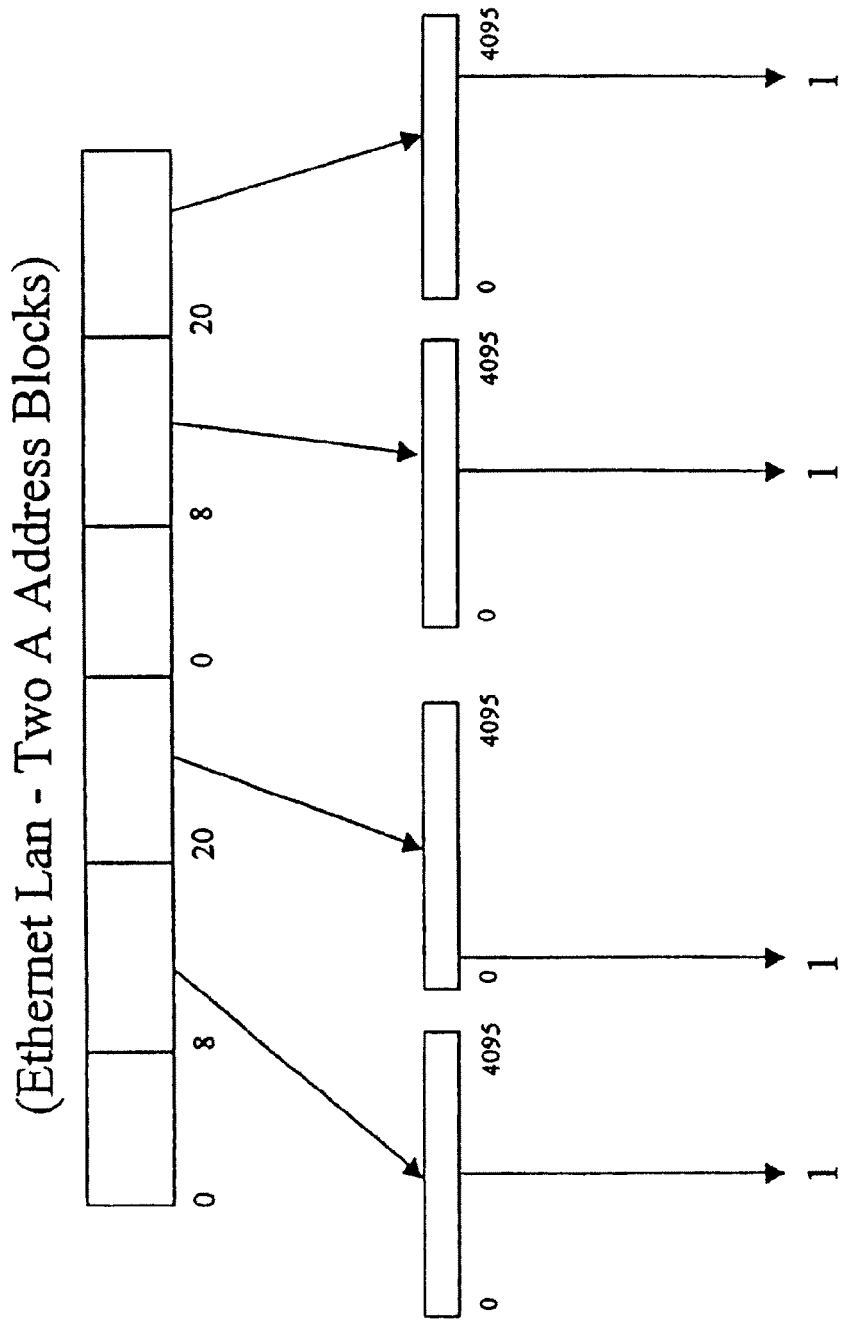
FIG. 16 shows how two addresses can be decomposed into a plurality of segments for comparison with presence vectors.

There is a trade-off between efficiency of the test and the amount of memory required for storing the presence vector(s). For instance, if one were to use the 48 bits of hopping addresses as an index, the presence vector would have to be 35 terabytes. Clearly, this is too large for practical purposes. Instead, the 48 bits can be divided into several smaller fields. For instance, one could subdivide the 48 bits into four 12-bit fields (see FIG. 16). This reduces the storage requirement to 2048 bytes at the expense of occasionally having to process a hostile packet. In effect, instead of one long presence vector, the decomposed address portions must match all four shorter presence vectors before further processing is allowed. (If the first part of the address portion doesn't match the first presence vector, there is no need to check the remaining three presence vectors).

A presence vector will have a 1 in the $y^{th}$ bit if and only if one or more addresses with a corresponding field of y are active. An address is active only if each presence vector indexed by the appropriate sub-field of the address is 1.

Consider a window of 32 active addresses and 3 checkpoints. A hostile packet will be rejected by the indexing of one presence vector more than 99% of the time. A hostile packet will be rejected by the indexing of all 4 presence vectors more than 99.9999995% of the time. On average, hostile packets will be rejected in less than 1.02 presence vector index operations.

The small percentage of hostile packets that pass the fast packet filter will be rejected when matching pairs are not found in the active window or are active checkpoints. Hostile packets that serendipitously match a header will be rejected when the VPN software attempts to decrypt the header. However, these cases will be extremely rare. There are many other ways this method can be configured to arbitrate the space/speed tradeoffs.

I. Further Synchronization Enhancements

Figure 17:
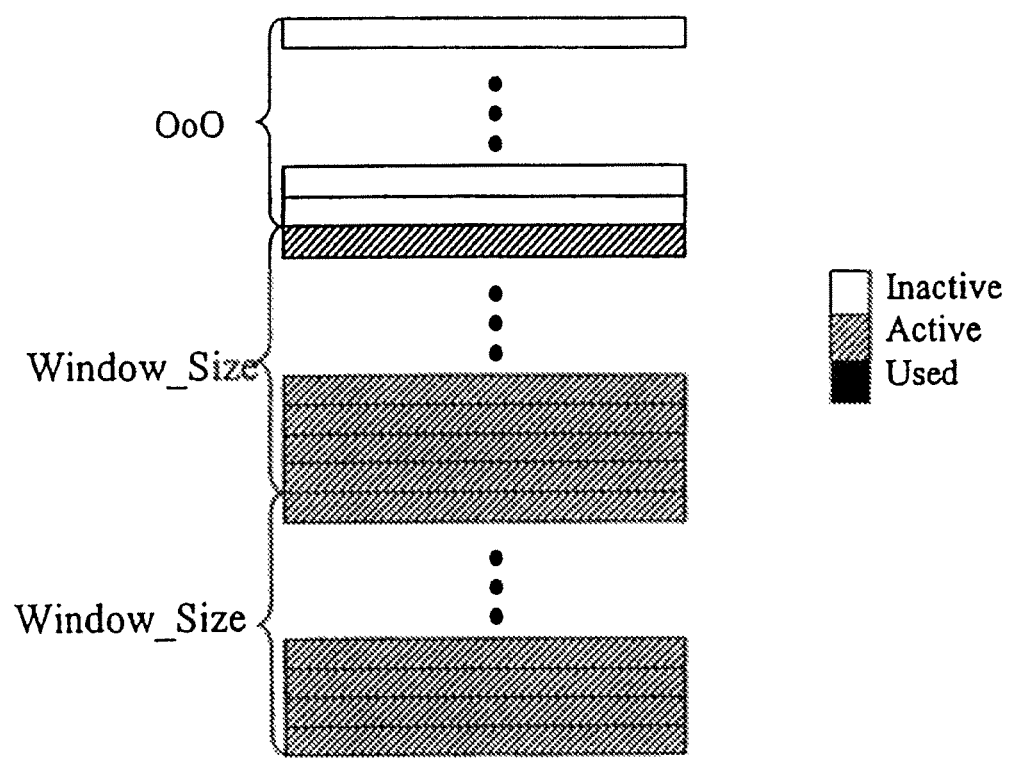
FIG. 17 shows a storage array for a receiver's active addresses.

A slightly modified form of the synchronization techniques described above can be employed. The basic principles of the previously described checkpoint synchronization scheme remain unchanged. The actions resulting from the reception of the checkpoints are, however, slightly different. In this variation, the receiver will maintain between OoO ("Out of Order") and 2×WINDOW_SIZE+OoO active addresses (1≤OoO≤WINDOW_SIZE and WINDOW_SIZE≥1). OoO and WINDOW_SIZE are engineerable parameters, where OoO is the minimum number of addresses needed to accommodate lost packets due to events in the network or out of order arrivals and WINDOW_SIZE is the number of packets transmitted before a SYNC_REQ is issued. FIG. 17 depicts a storage array for a receiver's active addresses.

Figure 18:
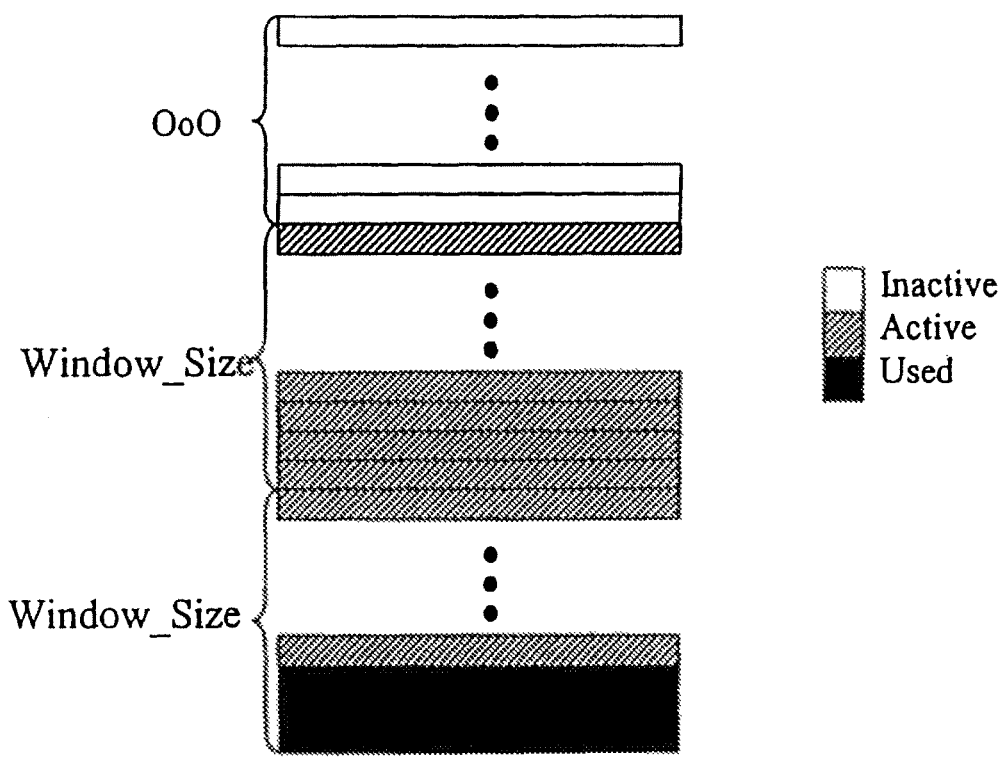
FIG. 18 shows the receiver's storage array after receiving a sync request.

The receiver starts with the first 2×WINDOW_SIZE addresses loaded and active (ready to receive data). As packets are received, the corresponding entries are marked as "used" and are no longer eligible to receive packets. The transmitter maintains a packet counter, initially set to 0, containing the number of data packets transmitted since the last initial transmission of a SYNC_REQ for which SYNC_ACK has been received. When the transmitter packet counter equals WINDOW_SIZE, the transmitter generates a SYNC_REQ and does its initial transmission. When the receiver receives a SYNC_REQ corresponding to its current CKPT_N, it generates the next WINDOW_SIZE addresses and starts loading them in order starting at the first location after the last active address wrapping around to the beginning of the array after the end of the array has been reached. The receiver's array might look like FIG. 18 when a SYNC_REQ has been received. In this case a couple of packets have been either lost or will be received out of order when the SYNC_REQ is received.

Figure 19:
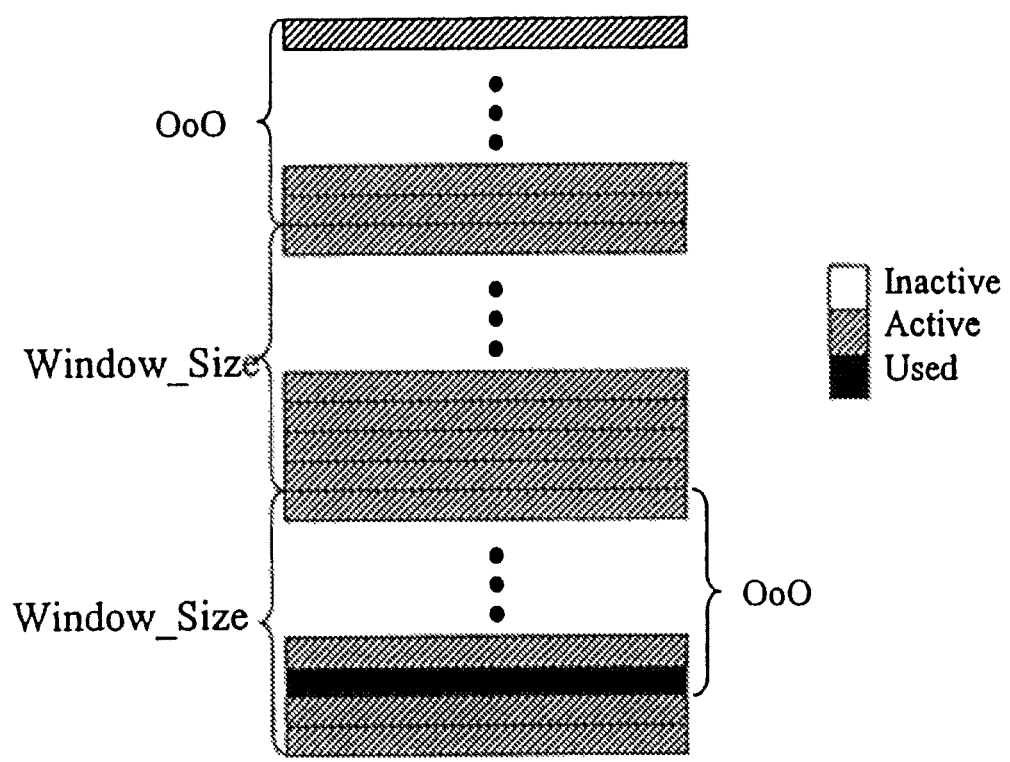
FIG. 19 shows the receiver's storage array after new addresses have been generated.

FIG. 19 shows the receiver's array after the new addresses have been generated. If the transmitter does not receive a SYNC_ACK, it will re-issue the SYNC_REQ at regular intervals. When the transmitter receives a SYNC_ACK, the packet counter is decremented by WINDOW_SIZE. If the packet counter reaches 2×WINDOW_SIZE−OoO then the transmitter ceases sending data packets until the appropriate SYNC_ACK is finally received. The transmitter then resumes sending data packets. Future behavior is essentially a repetition of this initial cycle. The advantages of this approach are:

1. There is no need for an efficient jump ahead in the random number generator,

2. No packet is ever transmitted that does not have a corresponding entry in the receiver side 3. No timer based re-synchronization is necessary. This is a consequence of 2.

4. The receiver will always have the ability to accept data messages transmitted within OoO messages of the most recently transmitted message.

J. Distributed Transmission Path Variant

Figure 20:
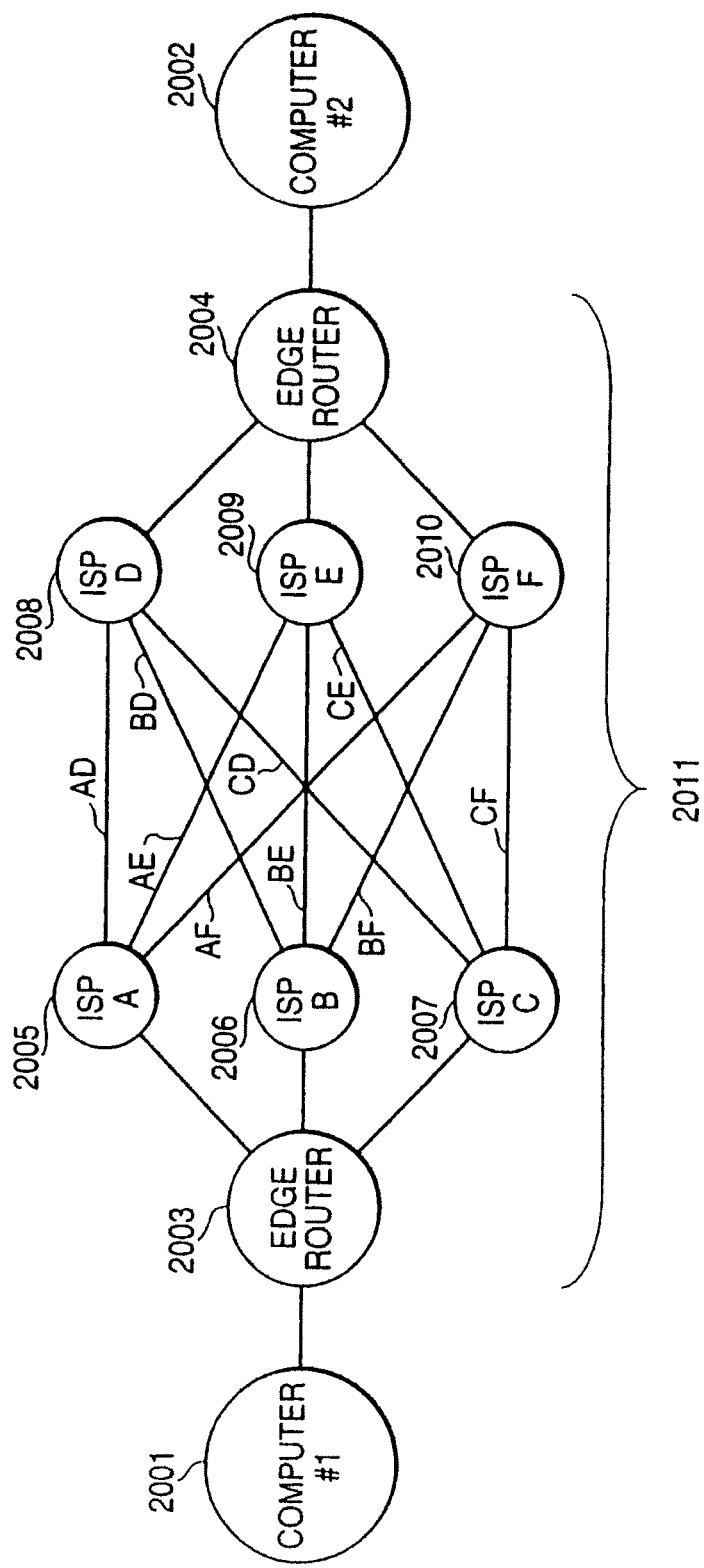
FIG. 20 shows a system employing distributed transmission paths.

Another embodiment incorporating various inventive principles is shown in FIG. 20. In this embodiment, a message transmission system includes a first computer 2001 in communication with a second computer 2002 through a network 2011 of intermediary computers. In one variant of this embodiment, the network includes two edge routers 2003 and 2004 each of which is linked to a plurality of Internet Service Providers (ISPs) 2005 through 2010. Each ISP is coupled to a plurality of other ISPs in an arrangement as shown in FIG. 20, which is a representative configuration only and is not intended to be limiting. Each connection between ISPs is labeled in FIG. 20 to indicate a specific physical transmission path (e.g., AD is a physical path that links ISP A (element 2005) to ISP D (element 2008)). Packets arriving at each edge router are selectively transmitted to one of the ISPs to which the router is attached on the basis of a randomly or quasi-randomly selected basis.

Figure 21:
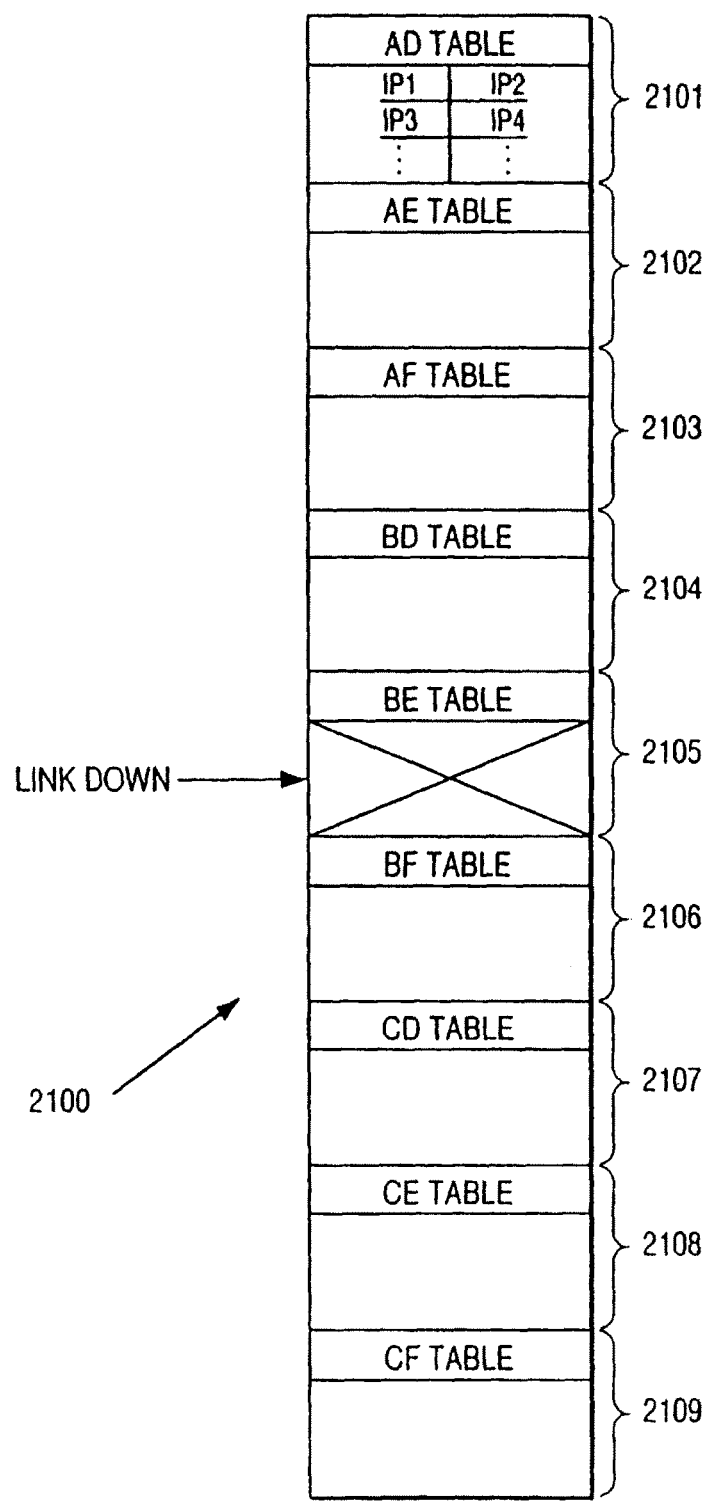
FIG. 21 shows a plurality of link transmission tables that can be used to route packets in the system of FIG. 20.

As shown in FIG. 21, computer 2001 or edge router 2003 incorporates a plurality of link transmission tables 2100 that identify, for each potential transmission path through the network, valid sets of IP addresses that can be used to transmit the packet. For example, AD table 2101 contains a plurality of IP source/destination pairs that are randomly or quasi-randomly generated. When a packet is to be transmitted from first computer 2001 to second computer 2002, one of the link tables is randomly (or quasi-randomly) selected, and the next valid source/destination address pair from that table is used to transmit the packet through the network. If path AD is randomly selected, for example, the next source/destination IP address pair (which is pre-determined to transmit between ISP A (element 2005) and ISP D (element 2008)) is used to transmit the packet. If one of the transmission paths becomes degraded or inoperative, that link table can be set to a "down" condition as shown in table 2105, thus preventing addresses from being selected from that table. Other transmission paths would be unaffected by this broken link.

The invention claimed is:

1. A method of transmitting data over a computer network, comprising the steps of:
   at an originating terminal connected to the computer network, receiving a stream of data and forming a first level packet payload based on the stream of data;
   identifying a network destination address for the stream of data;
   forming a first level packet including the first level packet payload and a first level header containing data representing the network destination address;
   encrypting at least a portion of the first level packet to form a second level packet payload;
   forming a second level packet including the second level packet payload and a second layer header containing a router address of an intermediate router connecting the originating terminal to the network destination address;
   including in one of the first and second layer headers, an indicator of a number of hops to be made by the first level packet before arriving at the network destination address; and
   sending the second level packet to the intermediate router at the router address;
   wherein the intermediate router determines, based on the indicator, whether to forward the second level packet to another intermediate router at another router address or to forward the second level packet to the network destination address.

2. The method of claim 1, further comprising determining the intermediate router by randomly selecting from a group of intermediate routers.

3. The method of claim 1, the intermediate router decrementing the indicator of a number of hops and sending the first level packet to another intermediate router responsive to a value of the indicator of a number of hops.

4. The method of claim 1, further comprising:
   decrypting the second level packet payload;
   determining from the first level header the network destination address;
   forming a new packet containing at least the first level packet payload; and
   attaching a header to the new packet containing the network destination address, whereby a true destination of the data stream is concealed behind a layer of encryption for at least a portion of its travel over the network.

5. The method of claim 4, wherein the step of determining from the first level header the network destination address includes converting the data representing the network destination address to the network destination address using correlation data stored on the intermediate router.

* * * * *